United States Patent
Jabri et al.

(10) Patent No.: US 12,459,927 B2
(45) Date of Patent: Nov. 4, 2025

(54) PLASMA KALLIKREIN INHIBITORS

(71) Applicant: Merck Sharp & Dohme LLC, Rahway, NJ (US)

(72) Inventors: Salman Jabri, Morage, CA (US); Anthony Ken Ogawa, San Mateo, CA (US); Christopher J. Sinz, Walnut Creek, CA (US); Jacqueline D. Hicks, Watchung, NJ (US); Alan C. Cheng, San Francisco, CA (US); Ying-Duo Gao, Middletown, NJ (US); Song Yang, San Francisco, CA (US); Jianming Bao, Princeton, NJ (US); Donna A. A. W. Hayes, San Francisco, CA (US); Simon B. Lang, San Francisco, CA (US); Brandon M. Taoka, San Francisco, CA (US); Maoqun Tian, Forster, CA (US); Galen Paul Shearn-Nance, Tiburon, CA (US); Rongze Kuang, Greenbook, NJ (US); Matthew J. Lombardo, Flemington, NJ (US); Zhicai Wu, Montvale, NJ (US); Zhiqiang Zhao, Little Neck, NY (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 502 days.

(21) Appl. No.: 18/007,787

(22) PCT Filed: Jun. 10, 2021

(86) PCT No.: PCT/US2021/036706
§ 371 (c)(1),
(2) Date: Dec. 2, 2022

(87) PCT Pub. No.: WO2021/257353
PCT Pub. Date: Dec. 23, 2021

(65) Prior Publication Data
US 2023/0286958 A1    Sep. 14, 2023

Related U.S. Application Data

(60) Provisional application No. 63/039,873, filed on Jun. 16, 2020.

(51) Int. Cl.
| C07D 403/14 | (2006.01) |
| A61P 27/00 | (2006.01) |
| C07D 471/04 | (2006.01) |

(52) U.S. Cl.
CPC ............ C07D 403/14 (2013.01); A61P 27/00 (2018.01); C07D 471/04 (2013.01)

(58) Field of Classification Search
CPC .................................................. C07D 471/04
See application file for complete search history.

(56) References Cited

U.S. PATENT DOCUMENTS

| 10,329,260 B2 * | 6/2019 | Kotian ................. C07D 417/12 |
| 2014/0378474 A1 * | 12/2014 | Flohr .................... C07D 401/06 |
| | | 548/362.5 |
| 2019/0218205 A1 * | 7/2019 | Davie ........................ A61P 7/10 |

FOREIGN PATENT DOCUMENTS

| JP | 2018535963 A | 12/2018 |
| RU | 2707870 C2 | 12/2019 |
| WO | 2013111108 A1 | 8/2013 |
| WO | 2015134998 A1 | 9/2015 |
| WO | 2016083820 A1 | 6/2016 |
| WO | 2017072021 A1 | 5/2017 |
| WO | 2019012003 A1 | 1/2019 |

OTHER PUBLICATIONS

Chou, Ting-Chao et al., Quantitative Analysis of Dose-Effect Relationships: The Combined Effects of Multiple Drugs or Enzyme Inhibitors, Adv. Enzyme Regul., 1984, 27-55, 22.
Clermont, Allen et al., Plasma Kallikrein Mediates Retinal Vascular Dysfunction and Induces Retinal Thickening in Diabetic Rats, Diabetes, 2011, 1590-1598, 60.

(Continued)

Primary Examiner — Michael B. Pallay
(74) Attorney, Agent, or Firm — Daniel Woods; John C. Todaro

(57) ABSTRACT

The present invention provides a compound of Formula (I) and pharmaceutical compositions comprising one or more said compounds, and methods for using said compounds for treating or preventing one or more disease states that could benefit from inhibition of plasma kallikrein, including hereditary angioedema, uveitis, posterior uveitis, wet age related macular edema, diabetic macular edema, diabetic retinopathy and retinal vein occlusion. The compounds are selective inhibitors of plasma kallikrein.

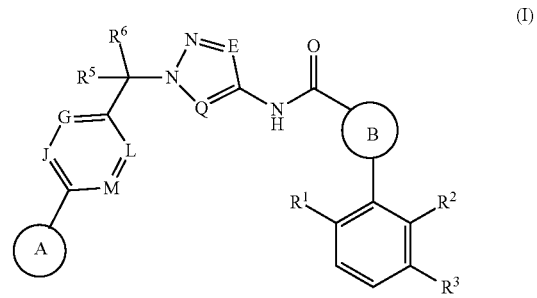

16 Claims, No Drawings

(56) References Cited

OTHER PUBLICATIONS

Colman, Robert W., Contact Activation Pathway: Inflammatory, Fibrinolytic, Anticoagulant, Antiadhesive, and Antiangiogenic Activities, Hemostasis and Thrombosis, 2001, 103-121, Chapter 6.

Daiss, Jurgen, O. et al., Sila-venlafaxine, a Sila-Analogue of the Serotonin/Noradrenaline Reuptake Inhibitor Venlafaxine: Synthesis, Crystal Structure Analysis, and Pharmacological Characterization, Organometallics, 2006, pp. 1188-1198, vol. 25.

Schmaier, Alvin H., Contact Activation, Thrombosis and Hemorrhage, 1998, 105-127, Chapter 5.

Schneider, Lynda et al., Critical role of kallikrein in hereditary angioedema pathogenesis: A clinical trial of ecallantide, a novel kallikrein inhibitor, J Allergy Clin Immunol, 2007, 416-422, 120(2).

Showell, Graham, A. et al., (R)-Sila-venlafaxine: A selective noradrenaline reuptake inhibitor for the treatment of emesis, Bioorganic & Medicinal Chemistry Letters, 2006, pp. 2555-2558, vol. 16.

Xie, Zhouling et al., Discovery and development of plasma kallikrein inhibitors for multiple diseases, European Journal of Medicinal Chemistry, Jan. 14, 2020, 190.

Kholodov, L.E. et al., Clinical Pharmacokinetics, Moscow, Medicine, N/A, 83-98, 134-138, 160, 378-380, 1985.

Sergeeva, P.V. (Sergeev, P.V.), A short course in molecular pharmacology, MOCKBA, N/A, 10, 1975.

Belikov, V.G., Pharmaceutical Chemistry, Moscow MEDpressinform, 4th Edition, 27-29, 2007.

Dyson, G. and May, P., Chemistry of Synthetic Medicinal Substances, M: World, N/A, Dec. 19, 1964.

Kummerer, K., Pharmaceuticals in the environment, Annual Review of Environment and Resources, 35, 57-75, 2010.

\* cited by examiner

PLASMA KALLIKREIN INHIBITORS

CROSS-REFERENCE TO RELATED APPLICATIONS

This application is a National Stage application of International Patent Application No. PCT/US2021/036706, filed Jun. 10, 2021, which claims the benefit of priority to U.S. Provisional Patent Application No. 63/039,873, filed Jun. 16, 2020.

BACKGROUND OF THE INVENTION

Plasma kallikrein is a zymogen of a trypsin-like serine protease and is present in plasma. The gene structure is similar to that of factor XI. Overall, the amino acid sequence of plasma kallikrein has 58% homology to factor XI. Proteolyticactivation by factor XIIa at an internal I 389-R390 bond yields a heavy chain (371 amino acids) and a light chain (248 amino acids). The active site of plasma kallikrein is contained in the light chain. The light chain of plasma kallikrein reacts with protease inhibitors, including alpha 2 macroglobulin and Cl-inhibitor. Interestingly, heparin significantly accelerates the inhibition of plasma kallikrein by antithrombin III in the presence of high molecular weight kininogen (HMWK). In blood, the majority of plasma kallikrein circulates in complex with HMWK. Plasma kallikrein cleaves HMWK to liberate bradykinin. Bradykinin release results in increase of vascular permeability and vasodilation (for review, Coleman, R., "Contact Activation Pathway", Hemostasis and Thrombosis, pp. 103-122, Lippincott Williams & Wilkins (2001); Schmaier A. H., "Contact Activation", Thrombosis and Hemorrhage, pp. 105-128 (1998)).

Patients presenting genetic deficiency on Cl-esterase inhibitor suffer from hereditary angioedema (HAE), a lifelong disease that results in intermittent swelling throughout the body, including the hands, feet, face, throat, genitals and gastrointestinal tract. Analysis of blisters arising from acute episodes have been shown to contain high levels of plasma kallikrein, and treatment with a protein-based reversible plasma kallikrein inhibitor, Ecallantide (Kalbitor), has been approved by the FDA for the treatment of acute attacks of HAE (Schneider, L, et al., J. Allergy Clin. Immunol., 120: p. 416 (2007)).

Additionally, the plasma kallikrein-kinin system is abnormally abundant in patients diagnosed with advanced diabetic macular edema (DME). Recent publications have shown that plasma kallikrein contributes to observed retinal vascular leakage and dysfunction in diabetic rodent models (A. Clermont, et al., Diabetes, 60:1590 (2011)), and that treatment with a small molecule plasma kallikrein inhibitor ameliorated the observed retinal vascular permeability and other abnormalities related to retinal blood flow.

It would be desirable in the art to develop plasma kallikrein inhibitors having utility to treat a wide range of disorders, including hereditary angioedema, diabetic macular edema and diabetic retinopathy.

SUMMARY OF THE INVENTION

The present invention relates to compounds of Formula I:

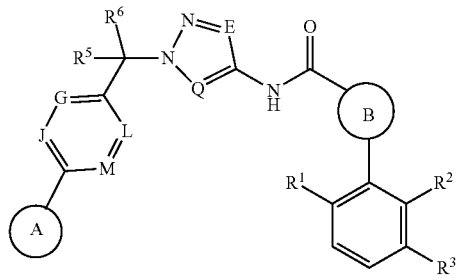

I and pharmaceutically acceptable salts thereof. The compounds of Formula I are inhibitors of plasma kallikrein, and as such may be useful in the treatment, inhibition or amelioration of one or more disease states that could benefit from inhibition of plasma kallikrein, including hereditary angioedema, uveitis, posterior uveitis, wet age related macular edema, diabetic macular edema, diabetic retinopathy and retinal vein occlusion. The compounds of this invention could further be used in combination with other therapeutically effective agents, including but not limited to, other drugs useful for the treatment of hereditary angioedema, uveitis, posterior uveitis, wet age related macular edema, diabetic macular edema, diabetic retinopathy and retinal vein occlusion. The invention furthermore relates to processes for preparing compounds of Formula I, and pharmaceutical compositions which comprise compounds of Formula I and pharmaceutically acceptable salts thereof.

DETAILED DESCRIPTION OF THE INVENTION

The present invention relates to compounds of Formula I:

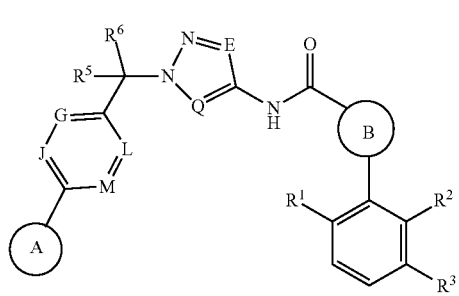

I wherein (A) is selected from

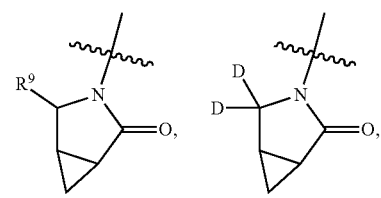

-continued

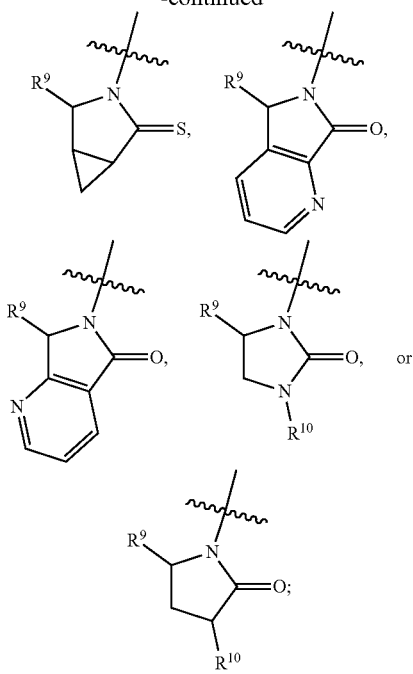

(B) is selected from

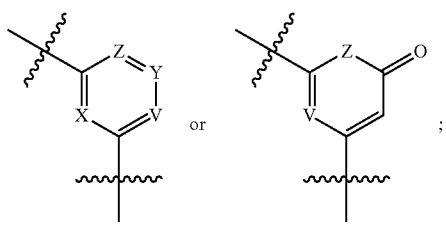

V is CH or N;
X is CH or N;
Y is N, NO, NR$^x$ or C=O;
Z is NR$^4$ or CR$^4$;
E is N or CH;
Q is N or CH;
G is N or CR$^7$;
J is N or CR$^7$;
L is N or CR$^7$;
M is N or CR$^8$;
R$^1$ is selected from the group consisting of hydrogen, halo, cyano, R$^x$, OR$^x$ and SO$_2$R$^x$;
R$^2$ is hydrogen or halo;
R$^3$ is hydrogen or halo;
R$^4$ is hydrogen, R$^x$, OR$^x$, C$_{1-3}$ alkyl-OR$^x$, C$_{1-3}$ alkyl-O—C$_{3-6}$ cycloalkyl or CH=CH$_2$;
R$^5$ is hydrogen or C$_{1-3}$ alkyl, which is optionally substituted with one to three substituents selected from halo and hydroxy;
R$^6$ is hydrogen or C$_{1-3}$ alkyl;
or R$^5$ and R$^6$ can be taken together with the carbon atom between them to form a C$_{3-6}$ cycloalkyl group;
each R$^7$ is independently selected from the group consisting of halo, R$^x$, OR$^x$, C$_{1-3}$ alkyl-OR$^x$, NH(C=O)OR$^x$ and NH$_2$;

R$^8$ is selected from the group consisting of R$^x$ or OR$^x$;
or R$^7$ and R$^8$ can be taken together with the carbon atoms between them to form a 5-membered cycloalkyl or heterocyclyl group, wherein said heterocyclyl group is optionally substituted with one to two substituents independently selected from the group consisting of halo, methyl or ethyl;
R$^9$ is hydrogen or C$_{1-3}$ alkyl;
R$^{10}$ is hydrogen, hydroxy or C$_{1-3}$ alkyl;
R$^x$ is hydrogen or C$_{1-6}$ alkyl, which is optionally substituted with one to four substituents selected from halo and hydroxy;
or a pharmaceutically salt thereof.

In an embodiment of the invention, (A) is

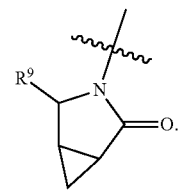

In another embodiment of the invention, (A) is

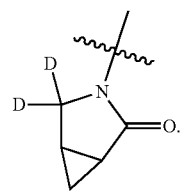

In another embodiment of the invention, (A) is

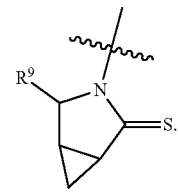

In another embodiment of the invention, (A) is

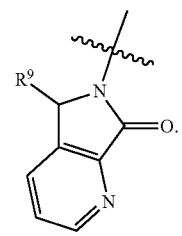

In another embodiment of the invention, (A) is

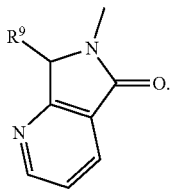

In another embodiment of the invention, (A) is

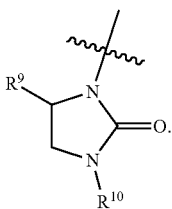

In another embodiment of the invention, (A) is

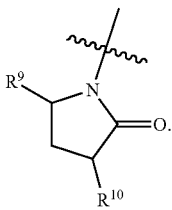

In an embodiment of the invention, X is $CR^2$. In another embodiment of the invention, X is N.

In an embodiment of the invention, (B) is

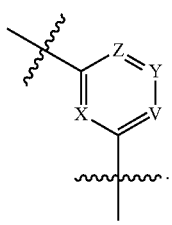

In another embodiment of the invention, (B) is

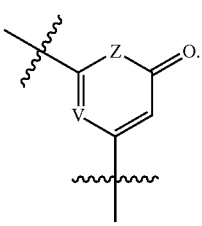

In an embodiment of the invention, V is CH. In another embodiment of the invention, V is N.

In an embodiment of the invention, X is CH. In another embodiment of the invention, X is N.

In an embodiment of the invention, Y is N. In another embodiment of the invention, Y is NO. In another embodiment of the invention, Y is $NR^x$. In another embodiment of the invention, Y is C=O.

In an embodiment of the invention, Z is $NR^4$. In another embodiment of the invention, Z is $CR^4$. In a class of the invention, Z is CH.

In an embodiment of the invention, E is N. In another embodiment of the invention, E is CH.

In an embodiment of the invention, Q is N. In another embodiment of the invention, Q is CH.

In an embodiment of the invention, G is N. In another embodiment of the invention, G is $CR^7$. In a class of the invention, G is CH.

In an embodiment of the invention, J is N. In another embodiment of the invention, J is $CR^7$. In a class of the invention, J is CH.

In an embodiment of the invention, L is N. In another embodiment of the invention, L is $CR^7$. In a class of the invention, L is CH.

In an embodiment of the invention, M is N. In another embodiment of the invention, M is $CR^8$. In a class of the invention, M is CH.

In an embodiment of the invention, $R^1$ is hydrogen, $CH_3$, $CHF_2$, $CF_3$, $OCHF_2$ or $SO_2CH_3$. In a class of the embodiment, $R^1$ is hydrogen. In another class of the embodiment, $R^1$ is $CH_3$. In another class of the embodiment, $R^1$ is $CHF_2$. In another class of the embodiment, $R^1$ is $CF_3$. In a class of the embodiment, $R^1$ is $OCHF_2$. In a class of the embodiment, $R^1$ is $SO_2CH_3$ In an embodiment of the invention, $R^2$ is hydrogen. In another embodiment of the invention, $R^2$ is halo. In a class of the invention, $R^2$ is fluoro.

In an embodiment of the invention, $R^3$ is hydrogen. In another embodiment of the invention, $R^3$ is halo. In a class of the invention, $R^3$ is chloro.

In an embodiment of the invention, $R^4$ is cyano, $CH_3$, $CHF_2$, $CH_2OH$, $CH_2OCH_3$, $CH_2OC(CH_3)_3$, $CH_2O$(cyclopropyl), $CH(OH)CF_3$, $CH_2C(CH_3)_2OH$, $CD_2OH$, $CH(CH_3)OH$ or $OCH_3$, In an embodiment of the invention, $R^5$ is hydrogen, $CH_3$ or $CH_2OH$. In a class of the invention, $R^5$ is hydrogen. In another class of the invention, $R^5$ is $CH_3$. In another class of the invention, $R^5$ is $CH_2OH$.

In an embodiment of the invention, $R^6$ is hydrogen.

In an embodiment of the invention, $R^7$ is hydrogen, chloro, fluoro, $CH_3$, $OCH_3$, $CHF_2$, $OCHF_2$, $CH_2OH$, $NH_2$ and NH(C=O)OR.

In an embodiment of the invention, $R^7$ and $R^8$ can be taken together with the carbon atoms between them to form a 5-membered cycloalkyl or heterocyclyl group, wherein said heterocyclyl group is optionally substituted with one to two substituents independently selected from the group consisting of halo, methyl or ethyl. In a class of the invention, $R^7$ and $R^8$ can be taken together with the carbon atoms between them to form a heterocyclyl group substituted with two fluoro.

Reference to the preferred classes and subclasses set forth above is meant to include all combinations of particular and preferred groups unless stated otherwise.

Specific embodiments of the present invention include, but are not limited to the compounds identified herein as Examples 1 to 255, or pharmaceutically acceptable salts thereof.

Also included within the scope of the present invention is a pharmaceutical composition which is comprised of a compound of Formula I as described above and a pharmaceutically acceptable carrier. The invention is also contemplated to encompass a pharmaceutical composition which is comprised of a pharmaceutically acceptable carrier and any of the compounds specifically disclosed in the present application. These and other aspects of the invention will be apparent from the teachings contained herein.

The invention includes compositions for treating diseases or condition in which plasma kallikrein activity is implicated. Accordingly the invention includes compositions for treating impaired visual activity, diabetic retinopathy, diabetic macular edema, retinal vein occlusion, hereditary angioedema, diabetes, pancreatitis, cerebral hemorrhage, nephropathy, cardiomyopathy, neuropathy, inflammatory bowel disease, arthritis, inflammation, septic shock, hypotension, cancer, adult respiratory distress syndrome, disseminated intravascular coagulation, blood coagulation during cardiopulmonary bypass surgery, and bleeding from postoperative surgery in a mammal, comprising a compound of the invention in a pharmaceutically acceptable carrier. A class of the invention includes compositions for treating hereditary angioedema, uveitis, posterior uveitis, wet age related macular edema, diabetic macular edema, diabetic retinopathy and retinal vein occlusion. These compositions may optionally include anti-inflammatory agents, anti-VEGF agents, immunosuppressive agents, anticoagulants, antiplatelet agents, and thrombolytic agents. The compositions can be added to blood, blood products, or mammalian organs in order to effect the desired inhibitions.

The invention also includes compositions for preventing or treating retinal vascular permeability associated with diabetic retinopathy and diabetic macular edema in a mammal, comprising a compound of the invention in a pharmaceutically acceptable carrier. These compositions may optionally include anti-inflammatory agents, anti-VEGF agents, immunosuppressive agents, anticoagulants, antiplatelet agents, and thrombolytic agents.

The invention also includes compositions for treating inflammatory conditions of the eye, which includes, but is not limited to, uveitis, posterior uveitis, macular edema, acute macular degeneration, wet age related macular edema, retinal detachments, retinal vein occlusion, ocular tumors, fungal infections, viral infections, multifocal choroiditis, diabetic uveitis, diabetic macular edema, diabetic retinopathy, proliferative vitreoretinopathy, sympathetic opthalmia, Vogt Koyanagi-Harada syndrome, histoplasmosis and uveal diffusion. These compositions may optionally include anti-inflammatory agents, anti-VEGF agents, immunosuppressive agents, anticoagulants, antiplatelet agents, and thrombolytic agents.

The invention also includes compositions treating posterior eye disease, which includes, but is not limited to, uveitis, posterior uveitis, wet age related macular edema, diabetic macular edema, diabetic retinopathy and retinal vein occlusion. These compositions may optionally include anti-inflammatory agents, anti-VEGF agents, immunosuppressive agents, anticoagulants, antiplatelet agents, and thrombolytic agents.

It will be understood that the invention is directed to the compounds of structural Formula I described herein, as well as the pharmaceutically acceptable salts of the compounds of structural Formula I and also salts that are not pharmaceutically acceptable when they are used as precursors to the free compounds or their pharmaceutically acceptable salts or in other synthetic manipulations.

The compounds of the present invention may be administered in the form of a pharmaceutically acceptable salt. The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, ascorbate, adipate, alginate, aspirate, benzenesulfonate, benzoate, bicarbonate, bisulfate, bitartrate, borate, bromide, butyrate, camphorate, camphorsulfonate, camsylate, carbonate, chloride, clavulanate, citrate, cyclopentane propionate, diethylacetic, digluconate, dihydrochloride, dodecylsulfanate, edetate, edisylate, estolate, esylate, ethanesulfonate, formic, fumarate, gluceptate, glucoheptanoate, gluconate, glutamate, glycerophosphate, glycollylarsanilate, hemisulfate, heptanoate, hexanoate, hexylresorcinate, hydrabamine, hydrobromide, hydrochloride, 2-hydroxyethanesulfonate, hydroxynaphthoate, iodide, isonicotinic, isothionate, lactate, lactobionate, laurate, malate, maleate, mandelate, mesylate, methylbromide, methylnitrate, methylsulfate, methanesulfonate, mucate, 2-naphthalenesulfonate, napsylate, nicotinate, nitrate, N-methylglucamine ammonium salt, oleate, oxalate, pamoate (embonate), palmitate, pantothenate, pectinate, persulfate, phosphate/diphosphate, pimelic, phenylpropionic, polygalacturonate, propionate, salicylate, stearate, sulfate, subacetate, succinate, tannate, tartrate, teoclate, thiocyanate, tosylate, triethiodide, trifluoroacetate, undeconate, valerate and the like. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Also included are the ammonium, calcium, magnesium, potassium, and sodium salts. Salts derived from pharmaceutically acceptable organic non-toxic bases include salts of primary, secondary, and tertiary amines, cyclic amines, dicyclohexyl amines and basic ion-exchange resins, such as arginine, betaine, caffeine, choline, N,N-dibenzylethylenediamine, diethylamine, 2-diethylaminoethanol, 2-dimethylaminoethanol, ethanolamine, ethylamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like. Also, included are the basic nitrogen-containing groups may be quaternized with such agents as lower alkyl halides, such as methyl, ethyl, propyl, and butyl chloride, bromides and iodides; dialkyl sulfates like dimethyl, diethyl, dibutyl; and diamyl sulfates, long chain halides such as decyl, lauryl, myristyl and stearyl chlorides, bromides and iodides, aralkyl halides like benzyl and phenethyl bromides and others.

These salts can be obtained by known methods, for example, by mixing a compound of the present invention with an equivalent amount and a solution containing a desired acid, base, or the like, and then collecting the desired salt by filtering the salt or distilling off the solvent. The compounds of the present invention and salts thereof may form solvates with a solvent such as water, ethanol, or glycerol. The compounds of the present invention may form an acid addition salt and a salt with a base at the same time according to the type of substituent of the side chain.

If the compounds of Formula I simultaneously contain acidic and basic groups in the molecule the invention also includes, in addition to the salt forms mentioned, inner salts or betaines (zwitterions).

The present invention encompasses all stereoisomeric forms of the compounds of Formula I. Unless a specific stereochemistry is indicated, the present invention is meant to comprehend all such isomeric forms of these compounds. Centers of asymmetry that are present in the compounds of Formula I can all independently of one another have (R) configuration or (S) configuration. When bonds to the chiral carbon are depicted as straight lines in the structural Formulas of the invention, it is understood that both the (R) and (S) configurations of the chiral carbon, and hence both each individual enantiomer and mixtures thereof, are embraced within the Formula. When a particular configuration is depicted, that entantiomer (either (R) or (S), at that center) is intended. Similarly, when a compound name is recited without a chiral designation for a chiral carbon, it is understood that both the (R) and (S) configurations of the chiral carbon, and hence individual enantiomers and mixtures thereof, are embraced by the name. The production of specific stereoisomers or mixtures thereof may be identified in the Examples where such stereoisomers or mixtures were obtained, but this in no way limits the inclusion of all stereoisomers and mixtures thereof from being within the scope of this invention.

Unless a specific enantiomer or diastereomer is indicated, the invention includes all possible enantiomers and diastereomers and mixtures of two or more stereoisomers, for example mixtures of enantiomers and/or diastereomers, in all ratios. Thus, enantiomers are a subject of the invention in enantiomerically pure form, both as levorotatory and as dextrorotatory antipodes, in the form of racemates and in the form of mixtures of the two enantiomers in all ratios. In the case of a cis/trans isomerism the invention includes both the cis form and the transform as well as mixtures of these forms in all ratios. The preparation of individual stereoisomers can be carried out, if desired, by separation of a mixture by customary methods, for example by chromatography or crystallization, by the use of stereochemically uniform starting materials for the synthesis or by stereoselective synthesis. Optionally a derivatization can be carried out before a separation of stereoisomers. The separation of a mixture of stereoisomers can be carried out at an intermediate step during the synthesis of a compound of Formula I or it can be done on a final racemic product. Absolute stereochemistry may be determined by X-ray crystallography of crystalline products or crystalline intermediates which are derivatized, if necessary, with a reagent containing a stereogenic center of known configuration. Where compounds of this invention are capable of tautomerization, all individual tautomers as well as mixtures thereof are included in the scope of this invention. The present invention includes all such isomers, as well as salts, solvates (including hydrates) and solvated salts of such racemates, enantiomers, diastereomers and tautomers and mixtures thereof.

In the compounds of the invention, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the specifically and generically described compounds. For example, different isotopic forms of hydrogen (H) include protium ($1_H$) and deuterium ($2_H$). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds can be prepared without undue experimentation by conventional techniques well known to those skilled in the art or by processes analogous to those described in the general process schemes and examples herein using appropriate isotopically-enriched reagents and/or intermediates.

When any variable (e.g. $R^x$, etc.) occurs more than one time in any constituent, its definition on each occurrence is independent at every other occurrence. Also, combinations of substituents and variables are permissible only if such combinations result in stable compounds.

Lines drawn into the ring systems from substituents represent that the indicated bond may be attached to any of the substitutable ring atoms. If the ring system is bicyclic, it is intended that the bond be attached to any of the suitable atoms on either ring of the bicyclic moiety.

It is understood that one or more silicon (Si) atoms can be incorporated into the compounds of the instant invention in place of one or more carbon atoms by one of ordinary skill in the art to provide compounds that are chemically stable and that can be readily synthesized by techniques known in the art from readily available starting materials. Carbon and silicon differ in their covalent radius leading to differences in bond distance and the steric arrangement when comparing analogous C-element and Si-element bonds. These differences lead to subtle changes in the size and shape of silicon-containing compounds when compared to carbon. One of ordinary skill in the art would understand that size and shape differences can lead to subtle or dramatic changes in potency, solubility, lack of off-target activity, packaging properties, and so on. (Diass, J. O. et al. Organometallics (2006) 5:1188-1198; Showell, G. A. et al. Bioorganic & Medicinal Chemistry Letters (2006) 16:2555-2558).

It is understood that substituents and substitution patterns on the compounds of the instant invention can be selected by one of ordinary skill in the art to provide compounds that are chemically stable and that can be readily synthesized by techniques known in the art, as well as those methods set forth below, from readily available starting materials. If a substituent is itself substituted with more than one group, it is understood that these multiple groups may be on the same carbon or on different carbons, so long as a stable structure results. The phrase "optionally substituted" (with one or more substituents) should be understood as meaning that the group in question is either unsubstituted or may be substituted with one or more substituents.

Furthermore, compounds of the present invention may exist in amorphous form and/or one or more crystalline forms, and as such all amorphous and crystalline forms and mixtures thereof of the compounds of Formula I are intended to be included within the scope of the present invention. In addition, some of the compounds of the instant invention may form solvates with water (i.e., a hydrate) or common organic solvents. Such solvates and hydrates, particularly the pharmaceutically acceptable solvates and hydrates, of the instant compounds are likewise encompassed within the scope of this invention, along with unsolvated and anhydrous forms.

Also, in the case of a carboxylic acid (—COOH) or alcohol group being present in the compounds of the present invention, pharmaceutically acceptable esters of carboxylic acid derivatives, such as methyl, ethyl, or pivaloyloxymethyl, or acyl derivatives of alcohols, such as O-acetyl, O-pivaloyl, O-benzoyl, and O-aminoacyl, can be employed. Included are those esters and acyl groups known in the art for modifying the solubility or hydrolysis characteristics for use as sustained-release or prodrug formulations.

Any pharmaceutically acceptable pro-drug modification of a compound of this invention which results in conversion in vivo to a compound within the scope of this invention is also within the scope of this invention. For example, esters can optionally be made by esterification of an available carboxylic acid group or by formation of an ester on an available hydroxy group in a compound. Similarly, labile amides can be made. Pharmaceutically acceptable esters or amides of the compounds of this invention may be prepared to act as pro-drugs which can be hydrolyzed back to an acid (or —COO⁻ depending on the pH of the fluid or tissue where conversion takes place) or hydroxy form particularly in vivo and as such are encompassed within the scope of this invention. Examples of pharmaceutically acceptable pro-drug modifications include, but are not limited to, —$C_{1-6}$alkyl esters and —$C_{1-6}$alkyl substituted with phenyl esters.

Accordingly, the compounds within the generic structural formulas, embodiments and specific compounds described and claimed herein encompass salts, all possible stereoisomers and tautomers, physical forms (e.g., amorphous and crystalline forms), solvate and hydrate forms thereof and any combination of these forms, as well as the salts thereof, pro-drug forms thereof, and salts of pro-drug forms thereof, where such forms are possible unless specified otherwise.

Except where noted herein, the terms "alkyl" and "alkylene" are intended to include both branched- and straight-chain saturated aliphatic hydrocarbon groups having the specified number of carbon atoms. Commonly used abbreviations for alkyl groups are used throughout the specification, e.g. methyl, may be represented by conventional abbreviations including "Me" or $CH_3$ or a symbol that is an extended bond as the terminal group, e.g. "⇃— ", ethyl may be represented by "Et" or $CH_2CH_3$, propyl may be represented by "Pr" or $CH_2CH_2CH_3$, butyl may be represented by "Bu" or $CH_2CH_2CH_2CH_3$, etc. "$C_{1-4}$ alkyl" (or "$C_1$-$C_4$ alkyl") for example, means linear or branched chain alkyl groups, including all isomers, having the specified number of carbon atoms. For example, the structures

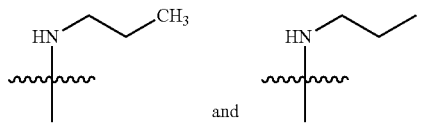

and have equivalent meanings. $C_{1-4}$ alkyl includes n-, iso-, sec- and t-butyl, n- and isopropyl, ethyl and methyl. If no number is specified, 1-4 carbon atoms are intended for linear or branched alkyl groups.

Except where noted, the term "cycloalkyl" means a monocyclic or bicyclic saturated aliphatic hydrocarbon group having the specified number of carbon atoms. For example, "cycloalkyl" includes cyclopropyl, cyclobutyl, cyclopentyl, cyclohexyl, and so on.

Except where noted, the term "aryl", as used herein, represents a stable monocyclic or bicyclic ring system of up to 10 carbon atoms in each ring, wherein at least one ring is aromatic. Bicyclic aryl ring systems include fused ring systems, where two rings share two atoms, and spiro ring systems, where two rings share one atom. Aryl groups within the scope of this definition include, but are not limited to: phenyl, indene, isoindene, naphthalene, and tetralin.

Except where noted, the term "heteroaryl", as used herein, represents a stable monocyclic or bicyclic ring system of up to 10 atoms in each ring, wherein at least one ring is aromatic, and at least one ring contains from 1 to 4 heteroatoms selected from the group consisting of O, N and S. Bicyclic heteroaryl ring systems include fused ring systems, where two rings share two atoms, and spiro ring systems, where two rings share one atom. Heteroaryl groups within the scope of this definition include but are not limited to: azaindolyl, benzoimidazolyl, benzisoxazolyl, benzofuranyl, benzofurazanyl, benzopyrazolyl, benzotriazolyl, benzothiophenyl, benzoxazolyl, carbazolyl, carbolinyl, cinnolinyl, dihydroindenyl, furanyl, indolinyl, indolyl, indolazinyl, indazolyl, isobenzofuranyl, isoindolyl, isoquinolyl, isothiazolyl, isoxazolyl, naphthalenyl, naphthpyridinyl, oxadiazolyl, oxazolyl, oxazoline, isoxazoline, pyranyl, pyrazinyl, pyrazolyl, pyrazolopyrimidinyl, pyridazinyl, pyridopyridinyl, pyridyl, pyrimidinyl, pyrrolyl, quinazolinyl, quinolyl, quinoxalinyl, tetrazolyl, tetrazolopyridyl, thiadiazolyl, thiazolyl, thienyl, triazolyl, dihydrobenzoimidazolyl, dihydrobenzofuranyl, dihydrobenzothiophenyl, dihydrobenzoxazolyl, dihydroindolyl, dihydroquinolinyl, dihydrobenzodioxinyl, dihydropyrazoloxazinyl, dihydropyrazolyothiazinedioxidyl, methylenedioxybenzene, benzothiazolyl, benzothienyl, quinolinyl, isoquinolinyl, oxazolyl, tetra-hydroquinoline and 3-oxo-3,4dihydro-2N-benzo[b][1,4]thiazine. If the heteroaryl contains nitrogen atoms, it is understood that the corresponding N-oxides thereof are also encompassed by this definition.

The term "heterocycle" or "heterocyclyl" as used herein is intended to mean a stable nonaromatic monocyclic or bicyclic ring system of up to 10 atoms in each ring, unless otherwise specified, containing from 1 to 4 heteroatoms selected from the group consisting of O, N, S, SO, or $SO_2$. Bicyclic heterocyclic ring systems include fused ring systems, where two rings share two atoms, and spiro ring systems, where two rings share one atom. "Heterocyclyl" therefore includes, but is not limited to the following: azaspirononanyl, azaspirooctanyl, azetidinyl, dioxanyl, oxadiazaspirodecenyl, oxaspirooctanyl, oxazolidinonyl, piperazinyl, piperidinyl, pyrrolidinyl, morpholinyl, thiomorpholinyl, tetrahydrofumayl, tetrahydropyranyl, dihydropiperidinyl, tetrahydrothiophenyl and the like. If the heterocycle contains a nitrogen, it is understood that the corresponding N-oxides thereof are also encompassed by this definition.

Except where noted, the term "halogen" or "halo" means fluorine, chlorine, bromine or iodine.

"Celite®" (Fluka) diatomite is diatomaceous earth, and can be referred to as "celite".

Except where noted herein, structures containing substituent variables such as variable "R" below:

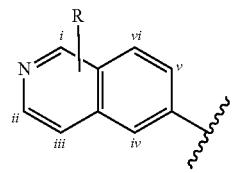

which are depicted as not being attached to any one particular bicyclic ring carbon atom, represent structures in which the variable can be optionally attached to any bicyclic ring carbon atom. For example, variable R shown in the above structure can be attached to any one of 6 bicyclic ring carbon atoms i, ii, iii, iv, v or vi.

Except where noted herein, bicyclic ring systems include fused ring systems, where two rings share two atoms, and spiro ring systems, where two rings share one atom.

The invention also relates to medicaments containing at least one compound of the Formula I and/or of a pharmaceutically acceptable salt of the compound of the Formula I and/or an optionally stereoisomeric form of the compound of the Formula I or a pharmaceutically acceptable salt of the stereoisomeric form of the compound of Formula I, together with a pharmaceutically suitable and pharmaceutically acceptable vehicle, additive and/or other active substances and auxiliaries.

The term "patient" used herein is taken to mean mammals such as primates, humans, sheep, horses, cattle, pigs, dogs, cats, rats, and mice.

The medicaments according to the invention can be administered by oral, inhalative, rectal or transdermal administration or by subcutaneous, intraarticular, intraperitoneal or intravenous injection. Oral administration is preferred. Coating of stents with compounds of the Formulas I and other surfaces which come into contact with blood in the body is possible.

The invention also relates to a process for the production of a medicament, which comprises bringing at least one compound of the Formula I into a suitable administration form using a pharmaceutically suitable and pharmaceutically acceptable carrier and optionally further suitable active substances, additives or auxiliaries.

Suitable solid or galenical preparation forms are, for example, granules, powders, coated tablets, tablets, (micro) capsules, suppositories, syrups, juices, suspensions, emulsions, drops or injectable solutions and preparations having prolonged release of active substance, in whose preparation customary excipients such as vehicles, disintegrants, binders, coating agents, swelling agents, glidants or lubricants, flavorings, sweeteners and solubilizers are used. Frequently used auxiliaries which may be mentioned are magnesium carbonate, titanium dioxide, lactose, mannitol and other sugars, talc, lactose, gelatin, starch, cellulose and its derivatives, animal and plant oils such as cod liver oil, sunflower, peanut or sesame oil, polyethylene glycol and solvents such as, for example, sterile water and mono- or polyhydric alcohols such as glycerol.

The dosage regimen utilizing the plasma kallikrein inhibitors is selected in accordance with a variety of factors including type, species, age, weight, sex and medical condition of the patient; the severity of the condition to be treated; the route of administration; the renal and hepatic function of the patient; and the particular compound or salt thereof employed. An ordinarily skilled physician or veterinarian can readily determine and prescribe the effective amount of the drug required to prevent, counter, or arrest the progress of the condition. Oral dosages of the plasma kallikrein inhibitors, when used for the indicated effects, will range between about 0.01 mg per kg of body weight per day (mg/kg/day) to about 30 mg/kg/day, preferably 0.025-7.5 mg/kg/day, more preferably 0.1-2.5 mg/kg/day, and most preferably 0.1-0.5 mg/kg/day (unless specified otherwise, amounts of active ingredients are on free base basis). For example, an 80 kg patient would receive between about 0.8 mg/day and 2.4 g/day, preferably 2-600 mg/day, more preferably 8-200 mg/day, and most preferably 8-40 mg/kg/day. A suitably prepared medicament for once a day administration would thus contain between 0.8 mg and 2.4 g, preferably between 2 mg and 600 mg, more preferably between 8 mg and 200 mg, and most preferably 8 mg and 40 mg, e.g., 8 mg, 10 mg, 20 mg and 40 mg. Advantageously, the plasma kallikrein inhibitors may be administered in divided doses of two, three, or four times daily. For administration twice a day, a suitably prepared medicament would contain between 0.4 mg and 4 g, preferably between 1 mg and 300 mg, more preferably between 4 mg and 100 mg, and most preferably 4 mg and 20 mg, e.g., 4 mg, 5 mg, 10 mg and 20 mg.

Intravenously, the patient would receive the active ingredient in quantities sufficient to deliver between 0.025-7.5 mg/kg/day, preferably 0.1-2.5 mg/kg/day, and more preferably 0.1-0.5 mg/kg/day. Such quantities may be administered in a number of suitable ways, e.g. large volumes of low concentrations of active ingredient during one extended period of time or several times a day, low volumes of high concentrations of active ingredient during a short period of time, e.g. once a day. Typically, a conventional intravenous formulation may be prepared which contains a concentration of active ingredient of between about 0.01-1.0 mg/mL, e.g. 0.1 mg/mL, 0.3 mg/mL, and 0.6 mg/mL, and administered in amounts per day of between 0.01 mL/kg patient weight and 10.0 mL/kg patient weight, e.g. 0.1 mL/kg, 0.2 mL/kg, 0.5 mL/kg. In one example, an 80 kg patient, receiving 8 mL twice a day of an intravenous formulation having a concentration of active ingredient of 0.5 mg/mL, receives 8 mg of active ingredient per day. Glucuronic acid, L-lactic acid, acetic acid, citric acid or any pharmaceutically acceptable acid/conjugate base with reasonable buffering capacity in the pH range acceptable for intravenous administration may be used as buffers. The choice of appropriate buffer and pH of a formulation, depending on solubility of the drug to be administered, is readily made by a person having ordinary skill in the art.

Compounds of Formula I can be administered both as a monotherapy and in combination with other therapeutic agents, including but not limited to anti-inflammatory agents, anti-VEGF agents, immunosuppressive agents, anticoagulants, antiplatelet agents, and thrombolytic agents.

An "anti-inflammatory agent" is any agent which is directly or indirectly effective in the reduction of inflammation when administered at a therapeutically effective level. "Anti-inflammatory agent" includes, but is not limited to steroidal anti-inflammatory agents and glucocorticoids. Suitable anti-inflammatory agents include, but are not limited to, cortisone, dexamethasone, hydrocortisone, methylprednisolone, prednisolone, prednisone and triamcinolone.

An "anti-VEGF agent" is any agent which is directly or indirectly effective in inhibiting the activity of VEGF (Vascular Endothelial Growth Factor). Suitable anti-VEGF agents include, but are not limited to, bevacizumab, ranibizumab and aflibercept.

An "immunosuppressant agent" is any agent which is directly or indirectly effective in suppressing, or reducing, the strength of the body's immune system. Suitable immunosuppressant agents include, but are not limited to, corticosteroids (for example, prednisone, budesonide, prednisolone), janus kinase inhibitors (for example, tofacitinib), calcineurin inhibitors (for example, cyclosporin, tacrolimus), mTOR inhibitors (for example, sirolimus, everolimus), IMDH inhibitors (for example, azathioprine, leflunomide, mycophenolate), biologics (for example, abatacept, adalimumab, anakinra, certolizumab, etanercept, golimumab, infliximab, ixekizumab, natalizumab, rituximab, secukinumab, tocilizumab, ustekinumab, vedolizumab), and monoclonal antibodies (for example, basiliximab, daclizumab).

Suitable anticoagulants include, but are not limited to, Factor XIa inhibitors, thrombin inhibitors, thrombin receptor antagonists, factor VIIa inhibitors, factor Xa inhibitors, factor IXa inhibitors, factor XIIa inhibitors, adenosine diphosphate antiplatelet agents (e.g., P2Y12 antagonists), fibrinogen receptor antagonists (e.g. to treat or prevent unstable angina or to prevent reocclusion after angioplasty and restenosis), other anticoagulants such as aspirin, and thrombolytic agents such as plasminogen activators or streptokinase to achieve synergistic effects in the treatment of various vascular pathologies. Such anticoagulants include, for example, apixaban, dabigatran, cangrelor, ticagrelor, vorapaxar, clopidogrel, edoxaban, mipomersen, prasugrel, rivaroxaban, and semuloparin. For example, patients suffering from coronary artery disease, and patients subjected to angioplasty procedures, would benefit from coadministration of fibrinogen receptor antagonists and thrombin inhibitors.

In certain embodiments the anti-inflammatory agents, anti-VEGF agents, immunosuppressant agents, anticoagulants, antiplatelet agents, and thrombolytic agents described herein are employed in their conventional dosage ranges and regimens as reported in the art, including, for example, the dosages described in editions of the *Physicians' Desk Reference*, such as the 70th edition (2016) and earlier editions. In other embodiments, the anti-inflammatory agents, anti-VEGF agents, immunosuppressant agents, anticoagulants, antiplatelet agents, and thrombolytic agents described herein are employed in lower than their conventional dosage ranges.

Alternatively or additionally, one or more additional pharmacologically active agents may be administered in combination with a compound of the invention. The additional active agent (or agents) is intended to mean a pharmaceutically active agent (or agents) that is active in the body, including pro-drugs that convert to pharmaceutically active form after administration, which is different from the compound of the invention, and also includes free-acid, free-base and pharmaceutically acceptable salts of said additional active agents when such forms are sold commercially or are otherwise chemically possible. Generally, any suitable additional active agent or agents, including but not limited to anti-hypertensive agents, additional diuretics, anti-atherosclerotic agents such as a lipid modifying compound, anti-diabetic agents and/or anti-obesity agents may be used in any combination with the compound of the invention in a single dosage formulation (a fixed dose drug combination), or may be administered to the patient in one or more separate dosage formulations which allows for concurrent or sequential administration of the active agents (co-administration of the separate active agents). Examples of additional active agents which may be employed include but are not limited to angiotensin converting enzyme inhibitors (e.g, alacepril, benazepril, captopril, ceronapril, cilazapril, delapril, enalapril, enalaprilat, fosinopril, imidapril, lisinopril, moveltipril, perindopril, quinapril, ramipril, spirapril, temocapril, or trandolapril); angiotensin II receptor antagonists also known as angiotensin receptor blockers or ARBs, which may be in free-base, free-acid, salt or pro-drug form, such as azilsartan, e.g., azilsartan medoxomil potassium (EDARBI®), candesartan, e.g., candesartan cilexetil (ATACAND®), eprosartan, e.g., eprosartan mesylate (TEVETAN®), irbesartan (AVAPRO®), losartan, e.g., losartan potassium (COZAAR®), olmesartan, e.g, olmesartan medoximil (BENICAR®), telmisartan (MICARDIS®), valsartan (DIOVAN®), and any of these drugs used in combination with a thiazide-like diuretic such as hydrochlorothiazide (e.g., HYZAAR®, DIOVAN HCT®, ATACAND HCT®), etc.); potassium sparing diuretics such as amiloride HCl, spironolactone, epleranone, triamterene, each with or without HCTZ; neutral endopeptidase inhibitors (e.g., thiorphan and phosphoramidon); aldosterone antagonists; aldosterone synthase inhibitors; renin inhibitors; enalkrein; RO 42-5892; A 65317; CP 80794; ES 1005; ES 8891; SQ 34017; aliskiren (2(S),4(S),5(S),7(S)—N-(2-carbamoyl-2-methylpropyl)-5-amino-4-hydroxy-2,7-diisopropyl-8-[4-methoxy-3-(3-methoxypropoxy)-phenyl]-octanamid hemifumarate) SPP600, SPP630 and SPP635); endothelin receptor antagonists; vasodilators (e.g. nitroprusside); calcium channel blockers (e.g., amlodipine, nifedipine, verapamil, diltiazem, felodipine, gallopamil, niludipine, nimodipine, nicardipine); potassium channel activators (e.g., nicorandil, pinacidil, cromakalim, minoxidil, aprilkalim, loprazolam); sympatholitics; beta-adrenergic blocking drugs (e.g., acebutolol, atenolol, betaxolol, bisoprolol, carvedilol, metoprolol, metoprolol tartate, nadolol, propranolol, sotalol, timolol); alpha adrenergic blocking drugs (e.g., doxazosin, prazosin or alpha methyldopa); central alpha adrenergic agonists; peripheral vasodilators (e.g. hydralazine); lipid lowering agents, e.g., HMG-CoA reductase inhibitors such as simvastatin and lovastatin which are marketed as ZOCOR® and MEVACOR® in lactone pro-drug form and function as inhibitors after administration, and pharmaceutically acceptable salts of dihydroxy open ring acid HMG-CoA reductase inhibitors such as atorvastatin (particularly the calcium salt sold in LIPITOR®), rosuvastatin (particularly the calcium salt sold in CRESTOR®), pravastatin (particularly the sodium salt sold in PRAVACHOL®), and fluvastatin (particularly the sodium salt sold in LESCOL®); a cholesterol absorption inhibitor such as ezetimibe (ZETIA®), and ezetimibe in combination with any other lipid lowering agents such as the HMG-CoA reductase inhibitors noted above and particularly with simvastatin (VYTORIN®) or with atorvastatin calcium; niacin in immediate-release or controlled release forms, and particularly niacin in combination with a DP antagonist such as laropiprant and/or with an HMG-CoA reductase inhibitor; niacin receptor agonists such as acipimox and acifran, as well as niacin receptor partial agonists; metabolic altering agents including insulin sensitizing agents and related compounds for the treatment of diabetes such as biguanides (e.g., metformin), meglitinides (e.g., repaglinide, nateglinide), sulfonylureas (e.g., chlorpropamide, glimepiride, glipizide, glyburide, tolazamide, tolbutamide), thiazolidinediones also referred to as glitazones (e.g., pioglitazone, rosiglitazone), alpha glucosidase inhibitors (e.g., acarbose, miglitol), dipeptidyl peptidase inhibitors, (e.g., sitagliptin (JANUVIA®), alogliptin, vildagliptin, saxagliptin, linagliptin, dutogliptin, gemigliptin), ergot alkaloids (e.g., bromocriptine), combination medications such as JANUMET® (sitagliptin with metformin), and injectable diabetes medications such as exenatide and pramlintide acetate; inhibitors of glucose uptake, such as sodium-glucose transporter (SGLT) inhibitors and its various isoforms, such as SGLT-1, SGLT-2 (e.g., ASP-1941, TS-071, BI-10773, tofogliflozin, LX-4211, canagliflozin, dapagliflozin, ertugliflozin, ipragliflozin, remogliflozin and sotagliflozin), and SGLT-3; or with other drugs beneficial for the prevention or the treatment of the above-mentioned diseases including but not limited to diazoxide; and including the free-acid, free-base, and pharmaceutically acceptable salt forms, pro-drug forms, e.g., esters, and salts of pro-drugs of the above medicinal agents, where chemically possible. Trademark names of pharmaceutical drugs noted above are provided for exemplification of the marketed form of the active agent(s); such pharmaceutical drugs could be used in a separate dosage form for concurrent or sequential administration with a compound of the invention, or the active agent(s) therein could be used in a fixed dose drug combination including a compound of the invention.

Typical doses of the plasma kallikrein inhibitors of the invention in combination with other suitable agents may be the same as those doses of plasma kallikrein inhibitors administered without coadministration of additional agents, or may be substantially less that those doses of plasma kallikrein inhibitors administered without coadministration of additional agents, depending on a patient's therapeutic needs.

The compounds are administered to a mammal in a therapeutically effective amount. By "therapeutically effective amount" it is meant an amount of a compound of the present invention that, when administered alone or in combination with an additional therapeutic agent to a mammal, is effective to treat (i.e., prevent, inhibit or ameliorate) the disease condition or treat the progression of the disease in a host.

The compounds of the invention are preferably administered alone to a mammal in a therapeutically effective amount. However, the compounds of the invention can also be administered in combination with an additional therapeutic agent, as defined below, to a mammal in a therapeutically effective amount. When administered in a combination, the combination of compounds is preferably, but not necessarily, a synergistic combination. Synergy, as described for example by Chou and Talalay, *Adv. Enzyme Regul.* 1984, 22, 27-55, occurs when the effect (in this case, inhibition of the desired target) of the compounds when administered in combination is greater than the additive effect of each of the compounds when administered individually as a single agent. In general, a synergistic effect is most clearly demonstrated at suboptimal concentrations of the compounds. Synergy can be in terms of lower cytotoxicity, increased anticoagulant effect, or some other beneficial effect of the combination compared with the individual components.

By "administered in combination" or "combination therapy" it is meant that the compound of the present invention and one or more additional therapeutic agents are administered concurrently to the mammal being treated. When administered in combination each component may be administered at the same time or sequentially in any order at different points in time. Thus, each component may be administered separately but sufficiently closely in time so as to provide the desired therapeutic effect. The administration of each component does not need to be via the same route of administration; for example, one component can be administered orally, and another can be delivered into the vitreous of the eye.

The present invention is not limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the relevant art and are intended to fall within the scope of the appended claims.

General Methods

Compounds of the present invention may be prepared using conventional techniques or according to the methodology outlined in the following general synthetic schemes. One skilled in the art can vary the procedures and reagents shown to arrive at similar intermediates and/or final compounds.

NMR spectra were measured on VARIAN or Bruker NMR Systems (400, 500 or 600 MHz). Chemical shifts are reported in ppm downfield and up field from tetramethylsilane (TMS) and referenced to either internal TMS or solvent resonances ($^1$H NMR: δ 7.27 for CDCl$_3$, δ 2.50 for (CD$_3$)(CHD$_2$)SO, and $^{13}$C NMR: δ 77.02 for CDCl$_3$, δ 39.51 for (CD$_3$)$_2$SO. Coupling constants (J) are expressed in hertz (Hz), and spin multiplicities are given as s (singlet), d (doublet), dd (double doublet), t (triplet), m (multiplet), and br (broad). Chiral resolutions were performed on either Waters Thar 80 SFC or Berger MG II preparative SFC systems. LC-MS data were recorded on SHIMADAZU LC-MS-2020, SHIMADAZU LC-MS-2010, or Agilent 1100 series LC-MS, Agilent Prime-1260, or Waters Acquity LC-MS instruments using C18 columns employing a MeCN gradient in water containing 0.02 to 0.1% TFA. UV detections were at 220 and/or 254 nm and ESI ionization was used for MS detection.

When chiral resolution was achieved by chromatography using chiral columns, the chiral columns used for SFC chiral resolutions are listed in tables. Some of the chiral columns used were CHIRALPAK AD, CHIRALCEL OJ, CHIRALPAK AS, CHIRALPAK AY, CHIRALPAK IA, CHIRALPAK AD-H, and CHIRALPAK AS-H. Henceforth, they will be referred by their two or three letter abbreviations. As a convention, the fast-eluting isomer from a chiral resolution is always listed first in this table followed immediately by the slower-eluting isomer from the same resolution. If more than two isomers were separated, they will be always listed in the tables in order they were eluted, such as Peak 1 followed by Peak 2, Peak 3 and so on. A * symbol near a chiral center in a structure denotes that this chiral center was resolved by chiral resolution without its stereochemical configuration unambiguously determined.

Also, TLC is thin layer chromatography; UV is ultraviolet; W is watts; wt. % is percentage by weight; x g is times gravity; α$_D$ is the specific rotation of polarized light at 589 nm; ° C. is degrees Celsius; % w/v is percentage in weight of the former agent relative to the volume of the latter agent; Hz is hertz; cpm is counts per minute; δH is chemical shift; d is doublet; dd is doublet of doublets; MHz is megahertz; MS is mass spectrum, and a mass spectrum obtained by ES-MS may be denoted herein by "LC-MS"; m z is mass to charge ratio; n is normal; N is normal; nm is nanometer; nM is nanomolar.

Several catalysts and ligands are used in the following procedures. "XANTPHOS" is also known as 4,5-bis(diphenylphosphino)-9,9-dimethylxanthene. "XANTPHOS Pd G3" is also known as [(4,5-Bis(diphenylphosphino)-9,9-dimethylxanthene)-2-(2'-amino-1,1'-biphenyl)]palladium (II) methanesulfonate. "SPhos Pd G4" is also known as "(Methanesulfonato-κO)[2'-(methylamino)-2-biphenylyl]palladium-dicyclohexyl(2,6'-dimethoxy-2-biphenylyl)phosphine (1:1)". "BrettPhos" is also known as 2-(dicyclohexylphosphino)-3,6-dimethoxy-2',4',6'-triisopropyl-1,1'-biphenyl and the "BrettPhos Pd G3" is also known as [(2-Di-cyclohexylphosphino-3,6-dimethoxy-2',4',6'-triisopropyl-1,1'-biphenyl)-2-(2'-amino-1,1'-biphenyl))palladium (II) methanesulfonate. "[Ir{dFCF$_3$ppy}$_2$(bpy)]PF$_6$" is bis[2-

(2,4-difluorophenyl)-5-trifluoromethylpyridine]]2-2'-bipyridyl]iridium hexafluorophosphate. These catalysts and ligands are available from Millipore Sigma.

For purposes of this specification, the following abbreviations have the indicated meanings:

Ac acetyl
acac acetylacetone
ACN acetonitrile
AcOH or acetic acid
HOAc
AIBN azobisisobutyronitrile
aq. aqueous
Ar aryl
Bn benzyl
Boc or BOC tert-butoxycarbonyl
Br broad
Brettphos 2-(dicyclohexylphosphino)-3,6-dimethoxy-2',4',6'-triisopropyl-1,1'-biphenyl
nBu butyl
° C. degrees Celsius
calcd. calculated
cBu cyclobutyl
Cbz benyzloxycarbonyl
cHep cycloheptyl
cHex cyclohexyl
cPen cyclopentyl
cPr Cyclopropyl
d day
δ chemical shift
d doublet
DABCO 1,4-diazabicyclo[2.2.2]octane
DAST (diethylamino)sulfur trifluoride
dba dibenzylideneacetone
DBAD Di-tert-butyl azodicarboxylate
DBU 1,8-diazabicyclo[5.4.0]undec-7-ene
DCE 1,2-dichloroethane
DCM dichloromethane
dd doublet of doublets
ddd doublet of doublet of doublets
DIAD diisopropyl azodicarboxylate
DIBAL or Dibal-H diisobutylaluminum hydride
DIEA or Hünig's base N,N-diisopropylethylamine
DIPA diisopropylamine
DMA 1,2-dimethylacetamide
DMAP 4-dimethylaminopyridine
DMF dimethylformamide
DMP Dess-Martin periodinane (1,1,1-triacetoxy)-1,1-dihydro-1,2-benziodoxol-3(1H)-one
DMPU 3,4,5,6-tetrahydro-2(1H)-pyrimidinone
DMS dimethylsulfide
DMSO dimethyl sulfoxide
DPPA Diphenyl phosphoryl azide
dppf 1,1'-bis(diphenylphosphino)ferrocene
dt doublet of triplets
DTT dithiothreitol
DPy 2,2'-Dipyridine
dq doublet of quartets
EDC 1-ethyl-3-(3-dimethylaminopropyl)carbodiimide
EDTA ethylenediamine tetraacetic acid
equiv equivalents
ESI electrospray ionization
Et ethyl
EtOH ethanol
EtOAc ethyl acetate
g grams
GST glutathione S-transferase
h hour
HATU N,N,N,N-tetramethyl-O-(7-azabenzotriazol-1-yl) uronium hexafluorophosphate
HMDS 1,1,1,3,3,3-hexamethyldisilazane
HOBt 1-hydroxybenzotriazole
HPLC high-performance liquid chromatography
Hz hertz
$IC_{50}$ concentration at which 50% inhibition exists
IPA isopropanol
iPr isopropyl
J coupling constant
L liters
LAH lithium aluminum hydride
LC liquid chromatography
LCMS liquid chromatography mass spectrometry
LDA lithium diisopropylamide
LED light emitting diode
M mass
M molar
m multiplet
mCPBA m-choroperoxybenzoic acid
Me methyl
MeOH methanol
mg milligrams
MHz megahertz
min minute
μL microliters
mL milliliters
mmol millimoles
MPLC medium pressure liquid chromatography
MS mass spectrometry
Ms methanesulfonyl (mesyl)
MTBE methyl tert-butyl ether
N normal
NBS N-bromosuccinimide
NMP 1-methylpyrrolidinone
NMR nuclear magnetic resonance spectroscopy
p pentet
Ph phenyl
PMB 4-methoxybenzyl
Pr propyl
psi pounds per square inch
q quartet
qd quartet of doublets
quin quintet
rac racemic mixture
RT or rt room temperature (ambient, about 25° C.)
s singlet
satd. saturated
SEM 2-(trimethylsilyl)ethoxymethyl
sxt sextet
SFC supercritical fluid chromatography
S-Phos 2-dicyclohexylphosphino-2',6'-dimethoxybiphenyl
t triplet
T3P propylphosphonic anhydride TBAF tert-butyl ammonium fluoride
TBS or tert-butyldimethyl silyl
TBDMS
td triplet of doublets
TBDPS tert-butyldiphenylsilyl
TBDPSCl tert-butyldiphenylsilyl chloride
TBSCl tert-butyldimethylsilyl chloride
tBu tert-butyl
tBu X-phos 2-di-tert-butylphosphino-2',4',6'-triisopropyl-biphenyl
TEA triethylamine (Et₃N)
Tf triflate
TFA trifluoroacetic acid
TFAA trifluoroacetic anhydride
THF tetrahydrofuran
TLC thin layer chromatography
TMS trimethylsilyl
Tris tris(hydroxymethyl)aminomethane
Ts toluenesulfonyl (tolyl)
tt triplet of triplets
X-phos 2-dicyclohexylphosphino-2',4',6'-triisopropylbiphenyl
Xantphos 4,5-bis(diphenylphosphino)-9,9-dimethylxanthene General Starting materials used were obtained from commercial sources, prepared in examples, or prepared as known in the literature, unless otherwise noted.

The methods used for the preparation of the compounds of this invention are illustrated by the following schemes.

Scheme AA.

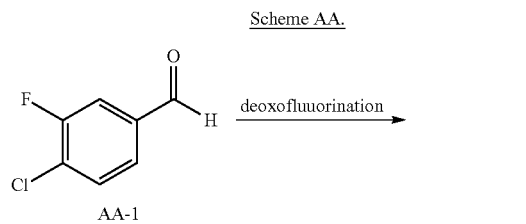

AA-1

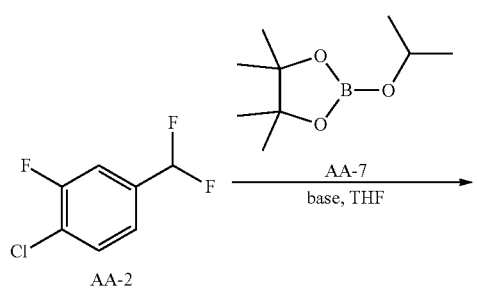

AA-2

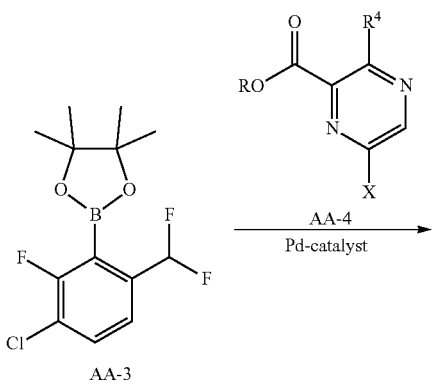

AA-3

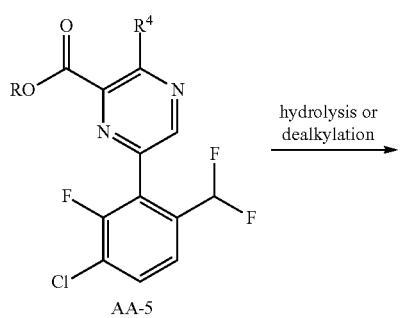

AA-5

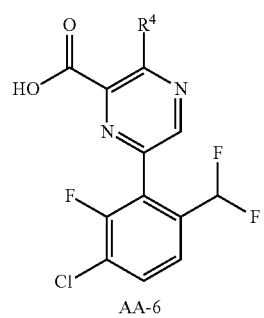

AA-6

R is preferably Me or Et

Scheme AA illustrates a synthetic sequence for the preparation of bi-heteroaryl derivatives such as AA-6 from arene AA-1 and alkyl pyrazine-2-carboxylates such as AA-4. Deoxofluorination of aldehyde AA-1 provides AA-2. Borylation of AA-2 by treatment with a trialkoxyborane such as AA-7 and a base such as LDA furnishes boronate ester AA-3. Palladium-catalyzed cross-coupling of AA-3 with halide AA-4 affords AA-5. Base-mediated hydrolysis or dealkylation of the ester of AA-5 by treatment with reagents such as LiOH, NaOH or LiI furnishes carboxylic acid AA-6.

Scheme AB.

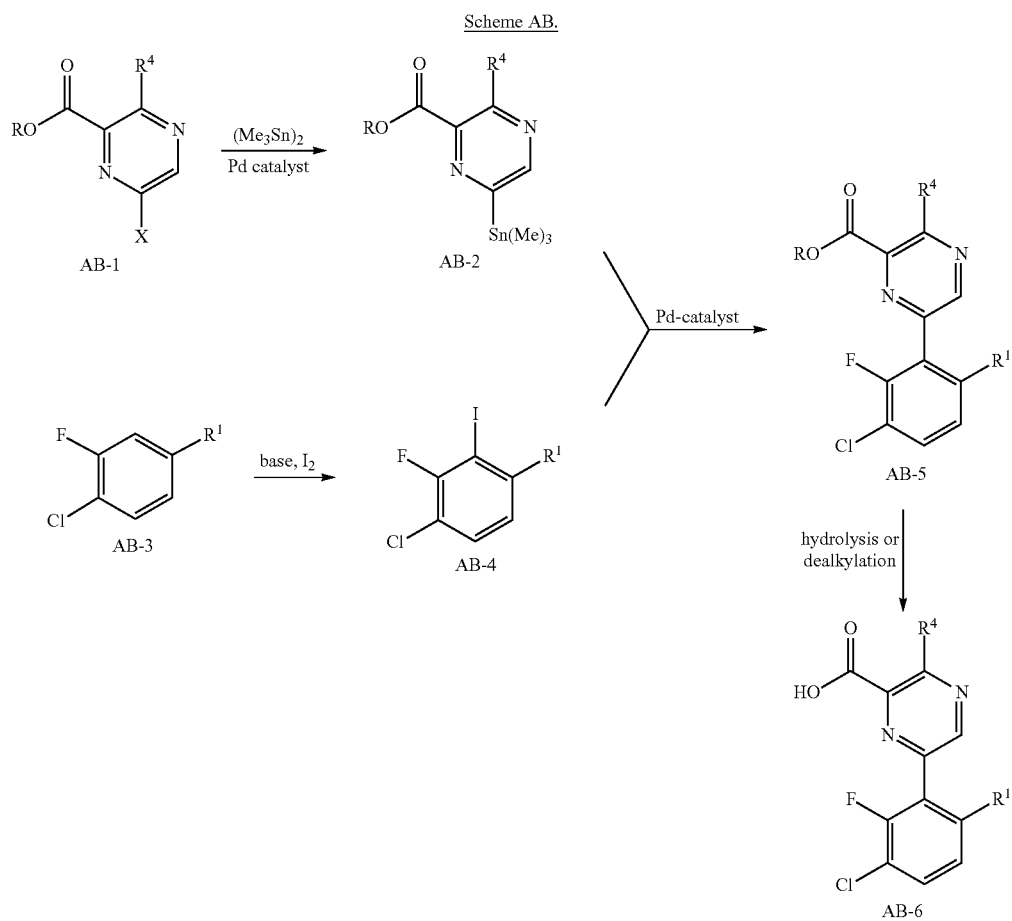

R is perferably Me or Et

Scheme AB illustrates a synthetic sequence for the preparation of bi-heteroaryl derivatives such as AB-6 from alkyl pyrazine-2-carboxylates such as AB-1 and arene AB-3. Palladium-catalyzed substitution of halide AB-1 using a reagent such as hexamethylditin provides stannane AB-2. Iodination of AB-3 by treatment with a base such as LDA, lithium 2,2,6,6-tetramethylpiperidide or n-butyllithium and iodine furnishes AB-4. Then, palladium-catalyzed cross-coupling of AB-2 with iodide AB-4 affords AB-5. Base-mediated hydrolysis or dealkylation of the ester of AB-5 by treatment with reagents such as LiOH, NaOH or LiI furnishes carboxylic acid AB-6.

Scheme AC.

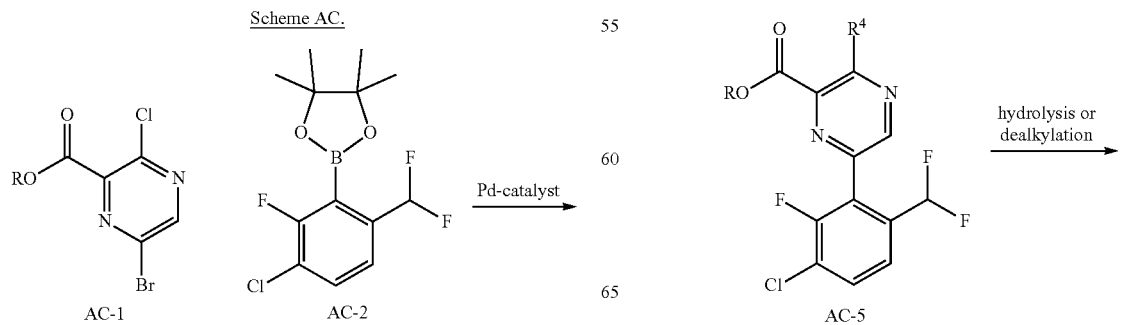

-continued

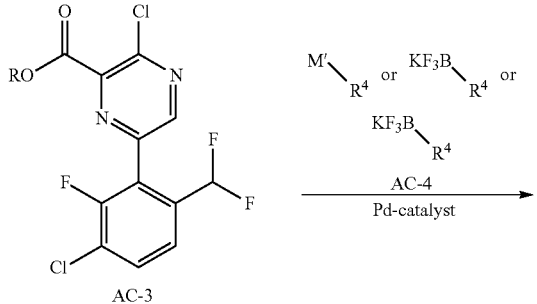

-continued

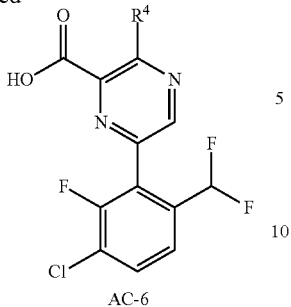

AC-6

R is perferably Me or Et

M' is any suitable metal salt, such as —MgBr, or ZnBr

Scheme AC illustrates a synthetic sequence for the preparation of bi-heteroaryl derivatives such as AC-6 from pyrazine AC-1 and arene AC-2. Palladium-catalyzed cross-coupling of bromide AC-1 with boronate AC-2 affords AC-3. Palladium-catalyzed cross-coupling of AC-3 with AC-4, which can be an organometallic, organoborate or organoboronate reagent, gives AC-5. Base-mediated hydrolysis or dealkylation of the ester of AC-5 by treatment with reagents such as LiOH, NaOH or LiI furnishes carboxylic acid AC-6.

Scheme AD.

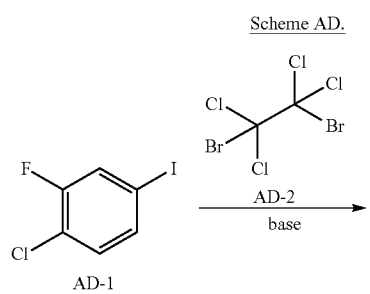

AD-1

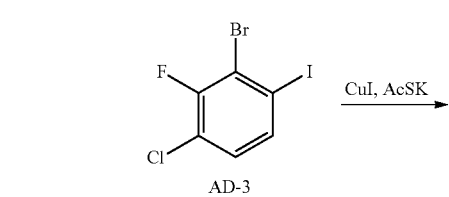

AD-3

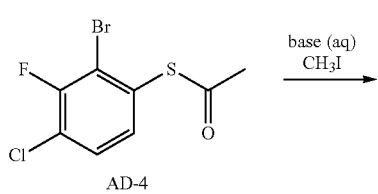

AD-4

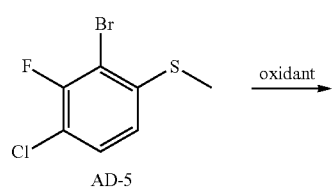

AD-5

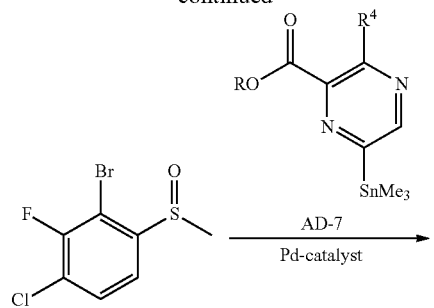

AD-6

[structure] AD-8

[structure] AD-9

[structure] AD-10

R is perferably Me or Et

Scheme AD illustrates a synthetic sequence for the preparation of bi-heteroaryl derivatives such as AD-10 from arene AD-1 and pyrazine AD-7. Bromination of AD-1 by treatment with a base such as LDA and a brominating agent such as 1,2-dibromo-1,1,2,2-tetrachloroethane AD-2 affords AD-3. Copper-catalyzed cross-coupling of AD-2 with potassium thioacetate gives thioester AD-4. Treatment with an aqueous base such as NaOH and an alkylation agent such as methyliodide converts thioester AD-4 to thioether AD-5, which is subsequently oxidized to sulfoxide AD-6 by use of an oxidant such as m-CPBA. Palladium-catalyzed cross-coupling of bromide AD-6 with stannane AD-7 affords AD-8. Oxidation of the sulfoxide of AD-8 using an oxidant such as Oxone® gives sulfone AD-9. Base-mediated hydrolysis or dealkylation of the ester of AD-9 by treatment with reagents such as LiOH, NaOH or LiI furnishes carboxylic acid AD-10.

Scheme AE.

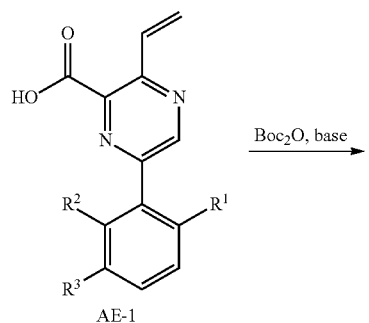

Scheme AE illustrates a synthetic sequence for the preparation of bi-heteroaryl derivatives such as AE-5 from AE-1. Esterification of the carboxylic acid of AE-1 gives t-butyl ester AE-2. Oxidative cleavage of the methylidene group of AE-2 by treatment with reagents such as Osmium tetroxide and sodium periodate affords aldehyde AE-3. Deoxofluorination of AE-3 using a reagent such as bis(2-methoxyethyl)aminosulfur trifluoride provides AE-4. Acid-mediated dealkylation of the ester of AE-4 furnishes carboxylic acid AE-5.

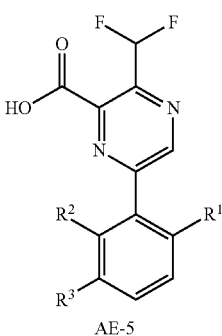

Scheme AF.

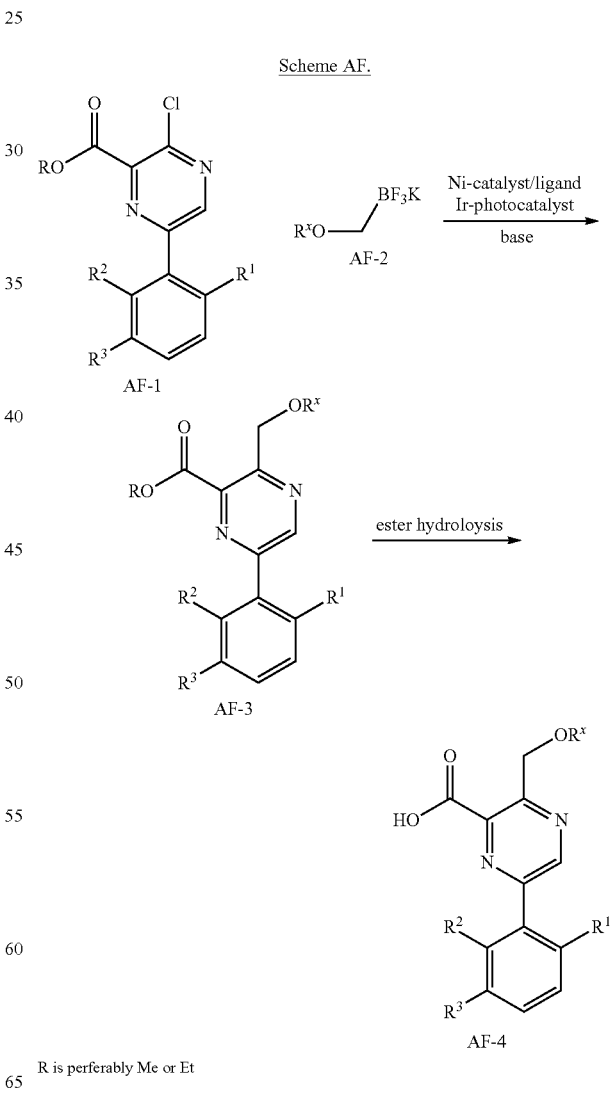

R is perferably Me or Et

Scheme AF illustrates a synthetic sequence for the preparation of bi-heteroaryl derivatives such as AF-4 from AF-1 and alkyltrifluoroborate salt AF-2. Cross-coupling of AF-1 and AF-2 by treatment with a mixture of a Ni salt/ligand, such as Nickel(II) dichloride ethylene glycol dimethyl ether complex and 4,4'-di-tert-butyl-2,2'-bipyridine, and an Ir complex such as [4,4'-Bis(1,1-dimethylethyl)-2,2'-bipyridine-N1,N1']bis[3,5-difluoro-2-[5-(trifluoromethyl)-2-pyridinyl-N]phenyl-C]Iridium(III) hexafluorophosphate, gives pyrazine AF-3. Base-mediated hydrolysis of the ester of AF-3 by treatment with reagents such as LiOH or NaOH furnishes carboxylic acid AF-4.

AG-3. Oxidation of AG-3 with an oxidant such as mCPBA gives N-oxide AG-4. Base-mediated hydrolysis of the ester of AG-4 by treatment with reagents such as LiOH furnishes carboxylic acid AG-5.

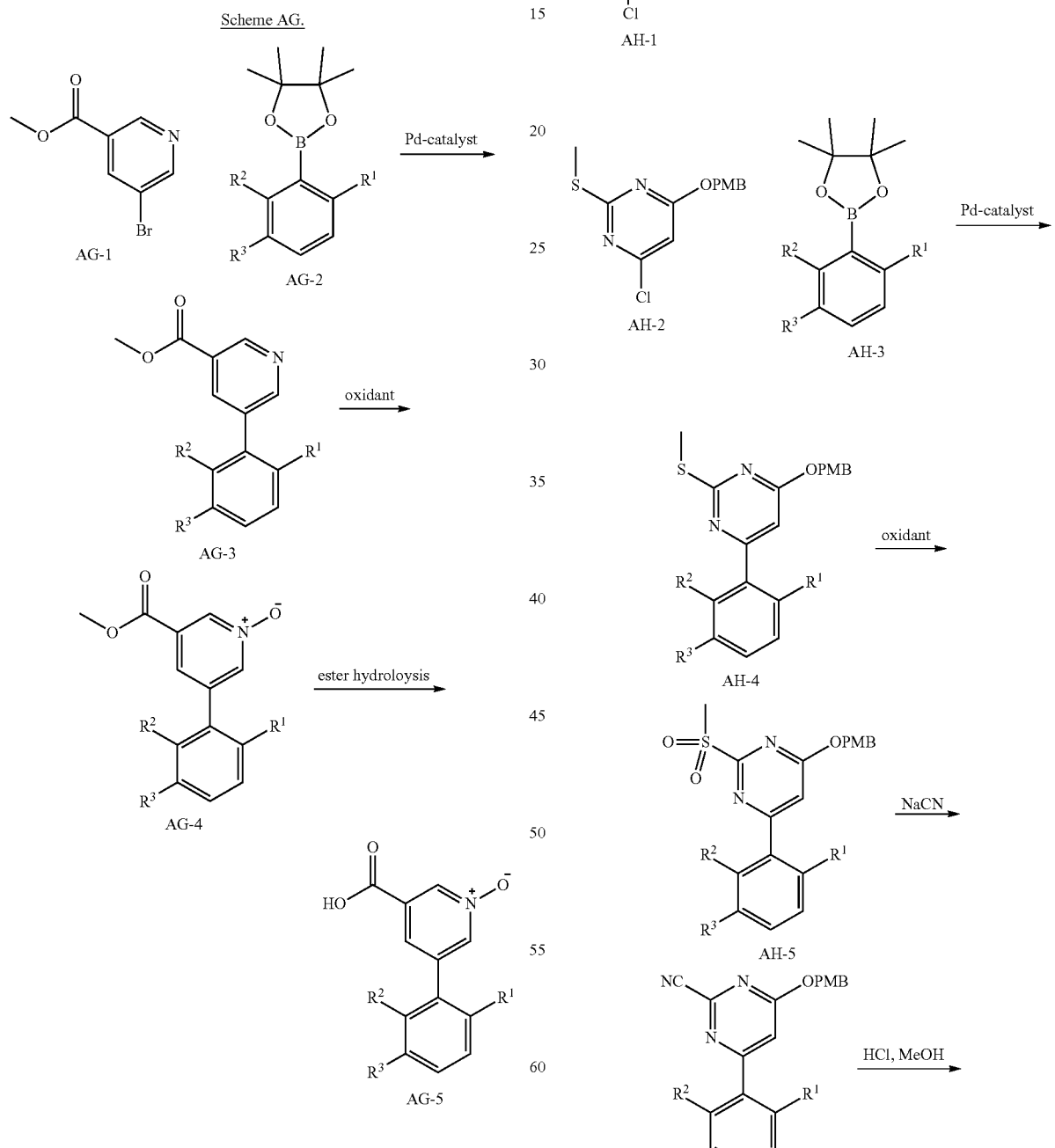

Scheme AG illustrates a synthetic sequence for the preparation of bi-heteroaryl derivatives such as AG-5 from pyridine AG-1 and arene AG-2. Palladium-catalyzed cross-coupling of bromide AG-1 with boronate AG-2 affords

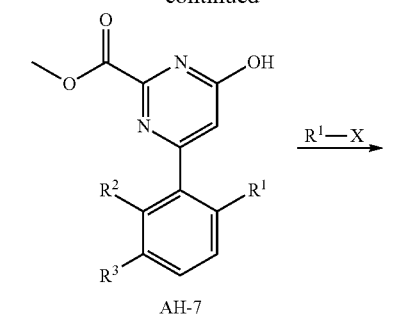

AH-7

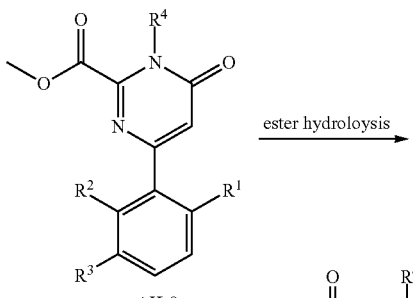

AH-8

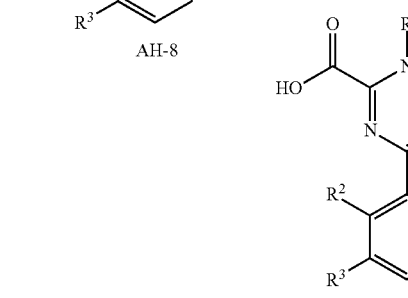

AH-9

Scheme AH illustrates a synthetic sequence for the preparation of bi-heteroaryl derivatives such as AH-9 from pyridine AH-1 and arene AH-3. Substitution of chloropyrimidine AH-1 with (4-methoxyphenyl)methanol alcohol affords AH-2. Palladium-catalyzed cross-coupling of AH-2 and boronate AH-3 gives AH-4. Oxidation of thioether AH-4 by treatment with an oxidant such as Oxone® gives sulfone AH-5. Substitution of AH-5 with a cyanide source such as sodium cyanide furnishes AH-6, which is converted to AH-7 by treatment with methanol under acidic conditions. Alkylation of the pyrimidine of AH-7 with an alkyl electrophile gives AH-8. Base-mediated hydrolysis of the ester of AH-8 by treatment with reagents such as LiOH or NaOH furnishes carboxylic acid AH-9.

Scheme AI.

AI-1

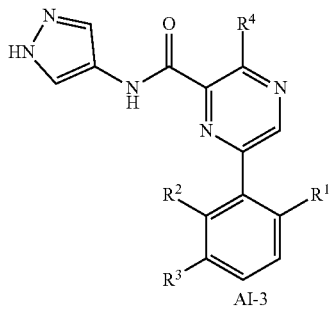

AI-3

Scheme AI illustrates a synthetic sequence for the preparation of bi-heteroaryl derivatives such as AI-3. Amide cross-coupling of AI-1 with 1H-pyrazol-4-amine AI-2 furnishes amide AI-3.

Scheme AJ.

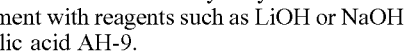

AJ-1        AJ-2

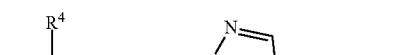

AJ-3

AJ-4

33

-continued

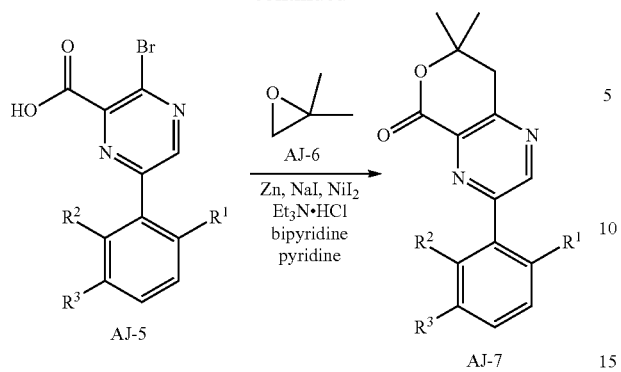

R is preferably Me or Et

Scheme AJ illustrates a synthetic sequence for the preparation of bi-heteroaryl derivatives such as AJ-7 from pyrazine AJ-1 and arene AJ-2. Palladium-catalyzed cross-coupling of bromide AJ-1 with boronate AJ-2 affords AJ-3. Treatment of AJ-3 with copper(II) bromide gives AJ-4. Base-mediated hydrolysis of the ester of AJ-4 by treatment with reagents such as LiOH furnishes carboxylic acid AJ-5. Nickel-catalyzed reductive cross-coupling of AJ-5 with oxirane AJ-6 provides lactone AJ-7.

Scheme AK.

R is preferably Me or Et

Scheme AK illustrates a synthetic sequence for the preparation of bi-heteroaryl derivatives such as AK-4 from intermediate AK-1. Bromination of AK-1 by treatment with reagents such as a mixture of NBS and benzoyl peroxide affords AK-2. Treatment of AK-2 with alcohol AK-3 and a base such as sodium hydride gives ether AK-4.

34

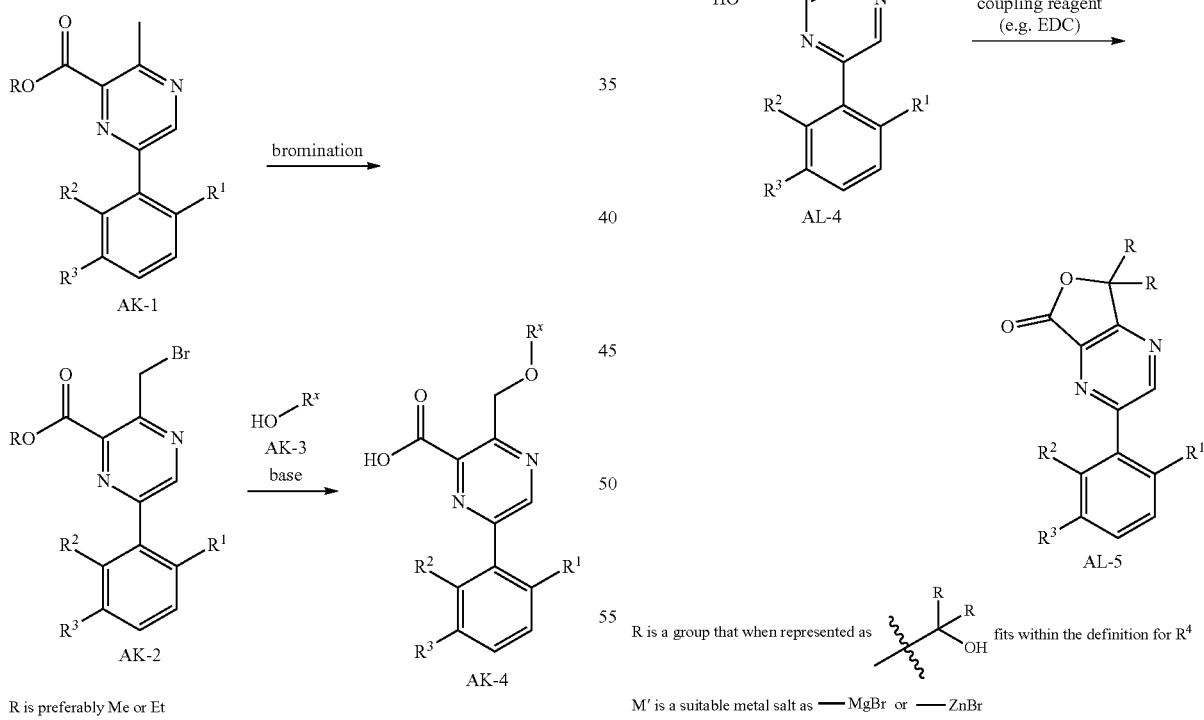

Scheme AL illustrates a synthetic sequence for the preparation of bi-heteroaryl derivatives such as AL-5 from intermediate AL-1. Palladium-catalyzed carboxylation of AL-1 affords methyl ester AL-2. Treatment of AL-2 with an organometallic reagent AL-3 such as an alkylmagnesium salt or a reducing agent such as lithium aluminum hydride or lithium aluminum deuteride gives alcohol AL-4. Cyclization of AL-4 by treatment with a coupling agent such as EDC yields lactone AL-5.

Scheme AM.

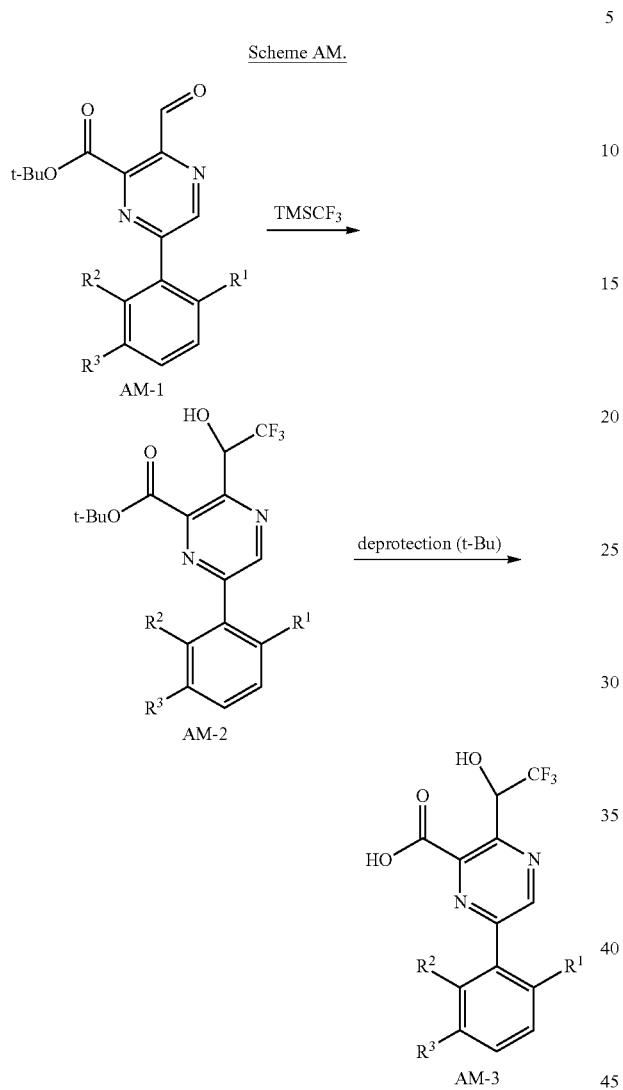

Scheme AM illustrates a synthetic sequence for the preparation of bi-heteroaryl derivatives such as AM-3 from intermediate AM-1. Trifluoromethylation of aldehyde AM-1 by treatment with reagents such as (trifluoromethyl)trimethylsilane in the presence of trimethyl N-oxide gives AM-2. Acid-mediated dealkylation of the ester of AM-2 furnishes carboxylic acid AM-3.

Scheme AN.

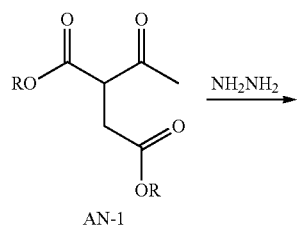

R is preferably Me or Et

Scheme AN illustrates a synthetic sequence for the preparation of bi-heteroaryl derivatives such as AN-7 from acetylsuccinate AN-1 and arene AN-5. Condensation of AN-1 with hydrazine affords 6-oxo-tetrahydropyridazine AN-2, which is subsequently oxidized by treatment with a reagent such as bromine to give dihydropyridazine AN-3. Treatment of AN-3 with a reagent such as phosphorous(V) oxybromide provides bromide AN-4. Palladium-catalyzed cross-coupling of bromide AN-4 with boronate AN-5 affords AN-6. Base-mediated hydrolysis or dealkylation of the ester of AN-6 by treatment with reagents such as LiOH, NaOH or LiI furnishes carboxylic acid AN-7.

Scheme BA.

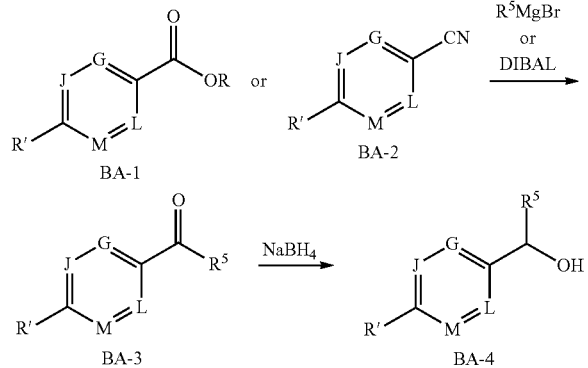

Scheme BA illustrates a synthetic sequence for the preparation of alcohol derivatives such as BA-4 from azaheterocycles BA-1 or BA-2. Treatment of ester BA-1 or BA-2 with an organometallic reagent such as an alkylmagnesium salt or DIBAL gives ketone or aldehyde BA-3, which is subsequently converted to alcohol BA-4 by treatment with a reducing agent such as sodium borohydride.

Scheme BB.

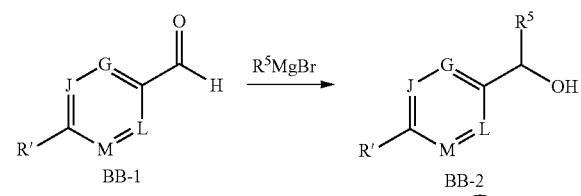

R′ is a suitable group that represents or can be converted to represent (A)

Scheme BB illustrates a synthetic sequence for the synthesis of alcohol derivatives such as BB-2 from aldehydes such as BB-1 via treatment with an organometallic reagent such as an alkylmagnesium salt.

Scheme BC.

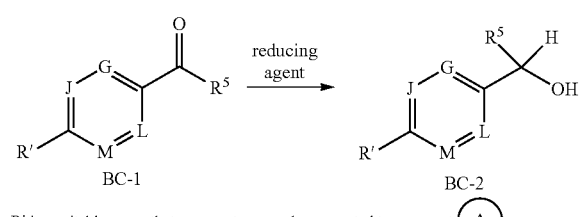

R′ is a suitable group that represents or can be converted to represent (A)

Scheme BC illustrates a synthetic sequence for the synthesis of alcohols such as BC-2 from aldehydes, ketones, esters or carboxylic acids such as BC-1 via treatment with reducing agents such as sodium borohydride, lithium borohydride or borane (for carboxylic acids).

Scheme BD.

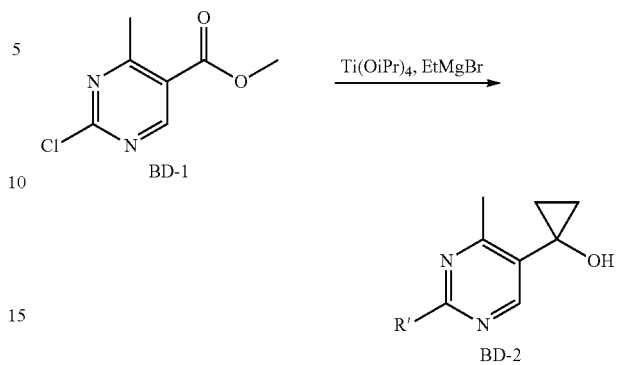

Scheme BC illustrates a synthetic sequence for the synthesis of cyclo-propyl alcohols such as BD-2 from esters such as BD-1 via treatment with titanium(IV) isopropoxide and ethylmagnesium bromide.

Scheme BE.

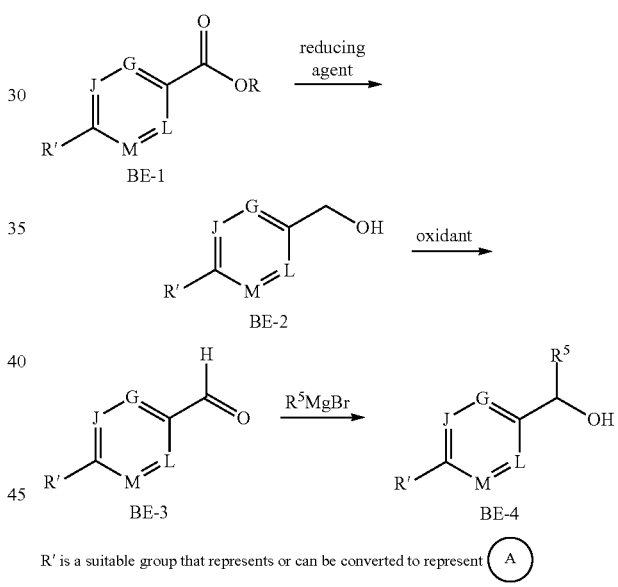

R′ is a suitable group that represents or can be converted to represent (A)

Scheme BE illustrates a synthetic sequence for the synthesis of alcohols such as BE-4 from esters such as BE-1. Ester BE-1 is treated with a reducing reagent such as DIBAL to provide alcohol BE-2, which is subsequently oxidized to aldehyde BE-3 with an oxidant such as DMP. Conversion of the aldehyde of BE-3 with an organometallic reagent such as an alkylmagnesium bromide gives alcohol BE-4.

Scheme BF.

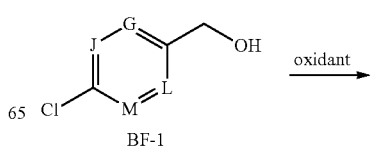

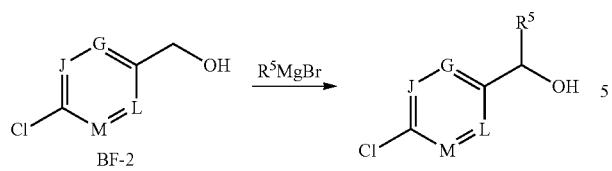

Scheme BF illustrates a synthetic sequence for the synthesis of alcohols such as BF-3 from primary alcohols such as BF-1. Alcohol BF-1 is oxidized to aldehyde BF-2 using an oxidant such as DMP. Conversion of the aldehyde of BF-2 with an organometallic reagent such as an alkylmagnesium bromide gives alcohol BF-3.

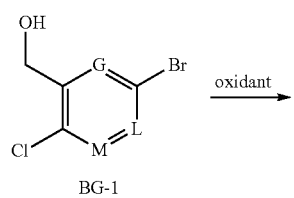

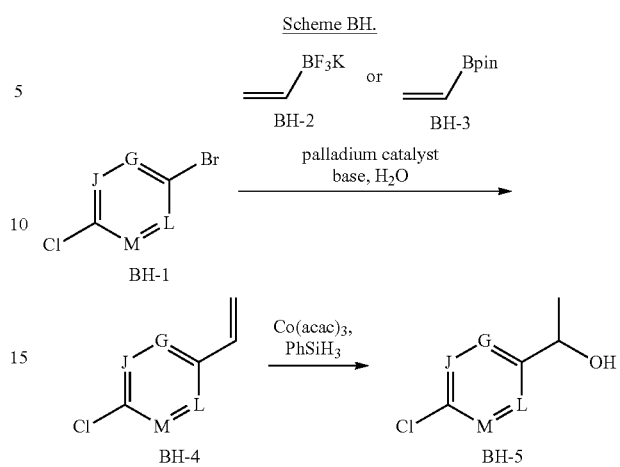

Scheme BH illustrates a synthetic sequence for the synthesis of alcohols such as BH-3 from arenes or heteroarenes such as BH-1. Palladium-catalyzed cross-coupling of BH-1 with potassium vinyltrifluoroborate BH-2 or vinylboronic acid pinacol ester BH-3 provides styrene BH-4. Hydration of BH-2 by treatment with reagents such as cobalt(II) acetylacetonate and phenyl silane gives alcohol BH-3.

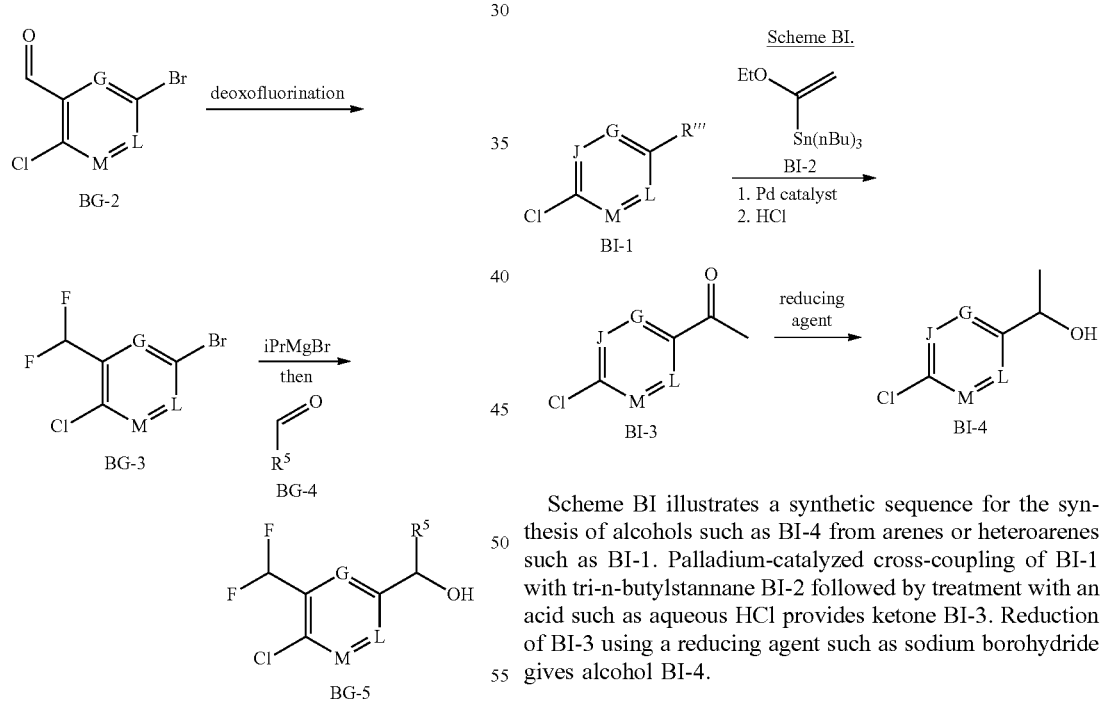

Scheme BI illustrates a synthetic sequence for the synthesis of alcohols such as BI-4 from arenes or heteroarenes such as BI-1. Palladium-catalyzed cross-coupling of BI-1 with tri-n-butylstannane BI-2 followed by treatment with an acid such as aqueous HCl provides ketone BI-3. Reduction of BI-3 using a reducing agent such as sodium borohydride gives alcohol BI-4.

Scheme BG illustrates a synthetic sequence for the synthesis of alcohols such as BG-5 from arenes or heteroarenes such as BG-1. Conversion of BG-1 using an oxidant such as manganese dioxide provides aldehyde BG-2, which is treated with a deoxyfluorinating agent such as DAST to provide BG-3. A two-step sequence involving metal-halogen exchange by adding an organometallic reagent such as iso-propylmagnesium bromide then quenching with the corresponding aldehyde BG-4 gives alcohol BG-5.

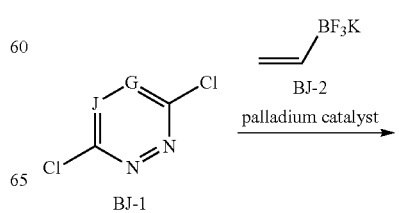

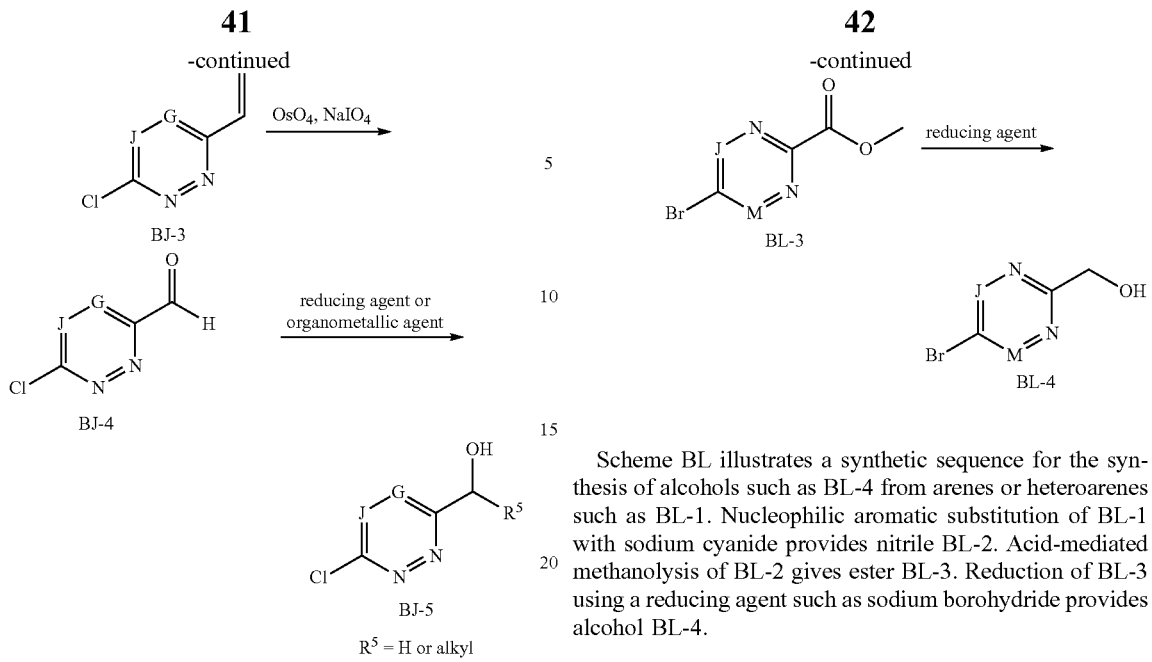

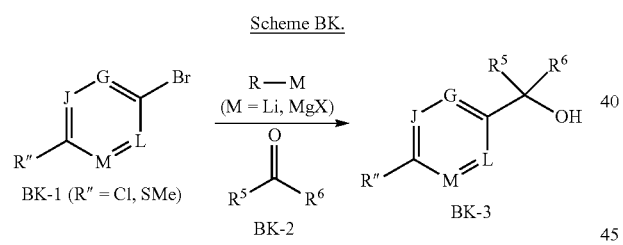

Scheme BJ illustrates a synthetic sequence for the synthesis of alcohols such as BJ-5 from chlorides such as BJ-1. Palladium-catalyzed cross-coupling of BJ-1 with potassium vinyltrifluoroborate BJ-2 provides styrene BJ-3. Oxidative cleavage of the vinyl group of BJ-3 using reagents such as osmium tetroxide and sodium periodinate gives aldehyde BJ-4. Treating BJ-3 with a reducing agent such as sodium borohydride or organometallic reagent such as an alkylmagnesium bromide provides alcohol BJ-5.

Scheme BK.

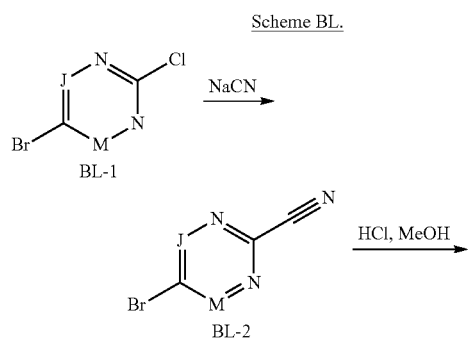

Scheme BK illustrates a synthetic sequence for the synthesis of alcohols such as BK-3 from arenes or heteroarenes such as BK-1. Metal-halogen exchange of BK-1 with an organometallic reagent such as n-butyllithium then addition of a ketone or aldehyde BK-2 provides BK-3.

Scheme BL.

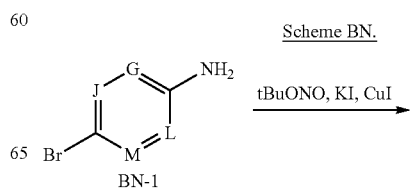

Scheme BL illustrates a synthetic sequence for the synthesis of alcohols such as BL-4 from arenes or heteroarenes such as BL-1. Nucleophilic aromatic substitution of BL-1 with sodium cyanide provides nitrile BL-2. Acid-mediated methanolysis of BL-2 gives ester BL-3. Reduction of BL-3 using a reducing agent such as sodium borohydride provides alcohol BL-4.

Scheme BM.

Scheme BM illustrates a synthetic sequence for the synthesis of alcohols such as BM-3 from esters such as BM-1. Nucleophilic aromatic substitution of BM-1 with sodium methoxide provides ether BM-2. Reduction of the ester of BM-2 using a reducing agent such as sodium borohydride provides alcohol BM-3.

Scheme BN.

-continued

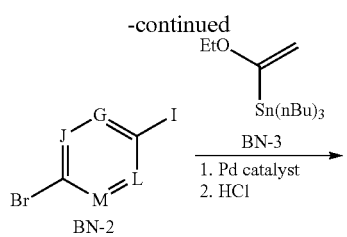

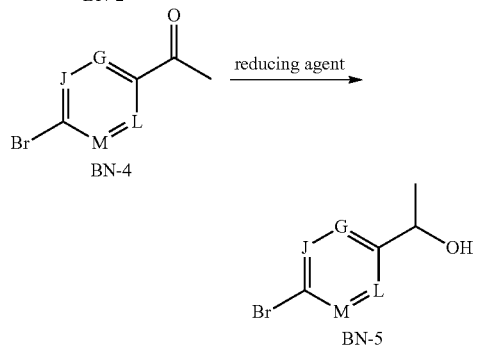

Scheme BM illustrates a synthetic sequence for the synthesis of alcohols such as BN-5 from arenes or heteroarenes such as BN-1. Sandmeyer-type halogenation of BN-1 by treatment with reagents such as tert-butyl nitrite, potassium iodide and copper(I) iodide acid provides iodide BN-2. Palladium-catalyzed cross-coupling of BN-2 with tri-n-butylstannane BN-3 followed by treatment with an acid such as aqueous HCl provides ketone BN-4. Reduction of BN-4 using a reducing agent such as sodium borohydride gives alcohol BN-5.

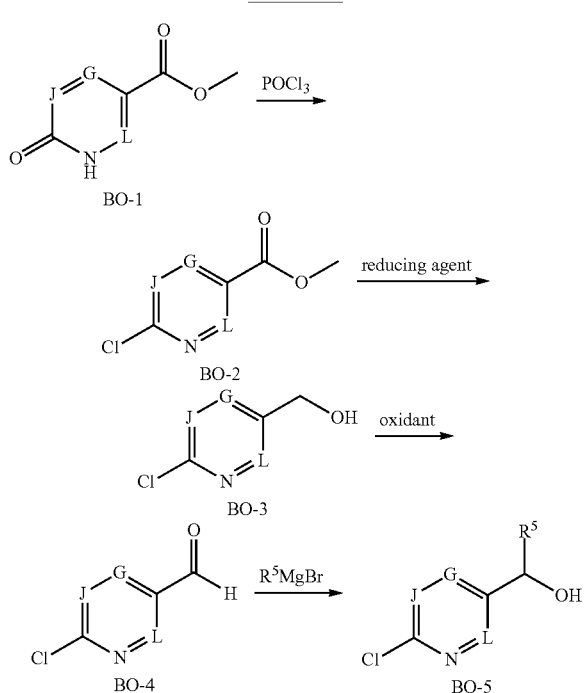

Scheme BO illustrates a synthetic sequence for the synthesis of alcohols such as BO-5 from pyridones such as BO-1. Deoxychlorination of BO-1 using a reagent such as phosphorus(V) oxychloride gives chloropyridine BO-2. Reduction of the ester of BO-2 by treatment with a reducing reagent such as DIBAL provides alcohol BO-3, which is subsequently oxidized to aldehyde BO-4 with an oxidant such as DMP. Conversion of the aldehyde of BO-4 with an organometallic reagent such as an alkylmagnesium bromide gives alcohol BO-5.

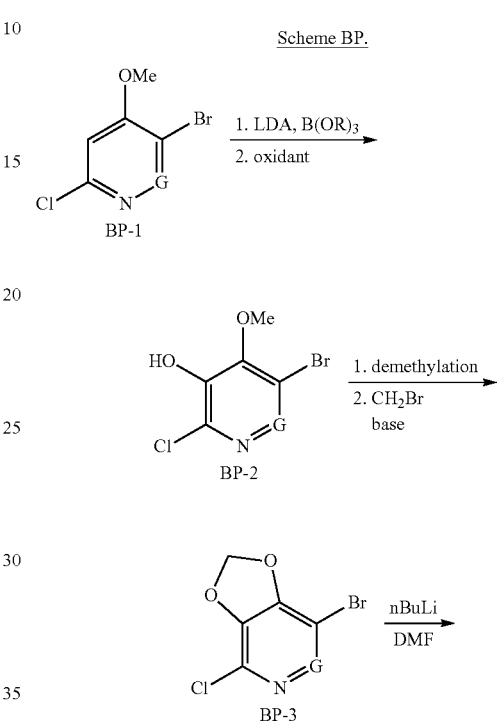

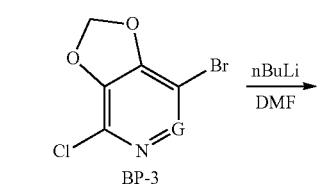

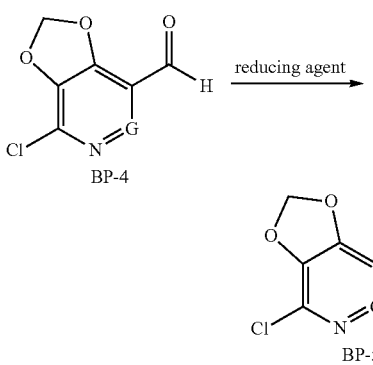

Scheme BP illustrates a synthetic sequence for the synthesis of alcohols such as BP-5 from substituted pyridines such as BP-1. Ortholithiation quenched with a borate ester, followed by oxidative rearrangement gives a phenol BP-2. Demethylation in the presence of a strong acid, preferably boron tribromide, HBr or the like, followed by trapping with dibromomethane in the presence of a suitable mild base, such as cesium carbonate or the like, yields a dioxolane such as BP-3. Villsmeyer condensation in which lithium-halogen exchange is followed by quenching with a formyl donor, such as DMF or the like, yields aldehyde BP-4, which can be reduced under mild conditions as described above in Scheme BO to give alcohol BP-5.

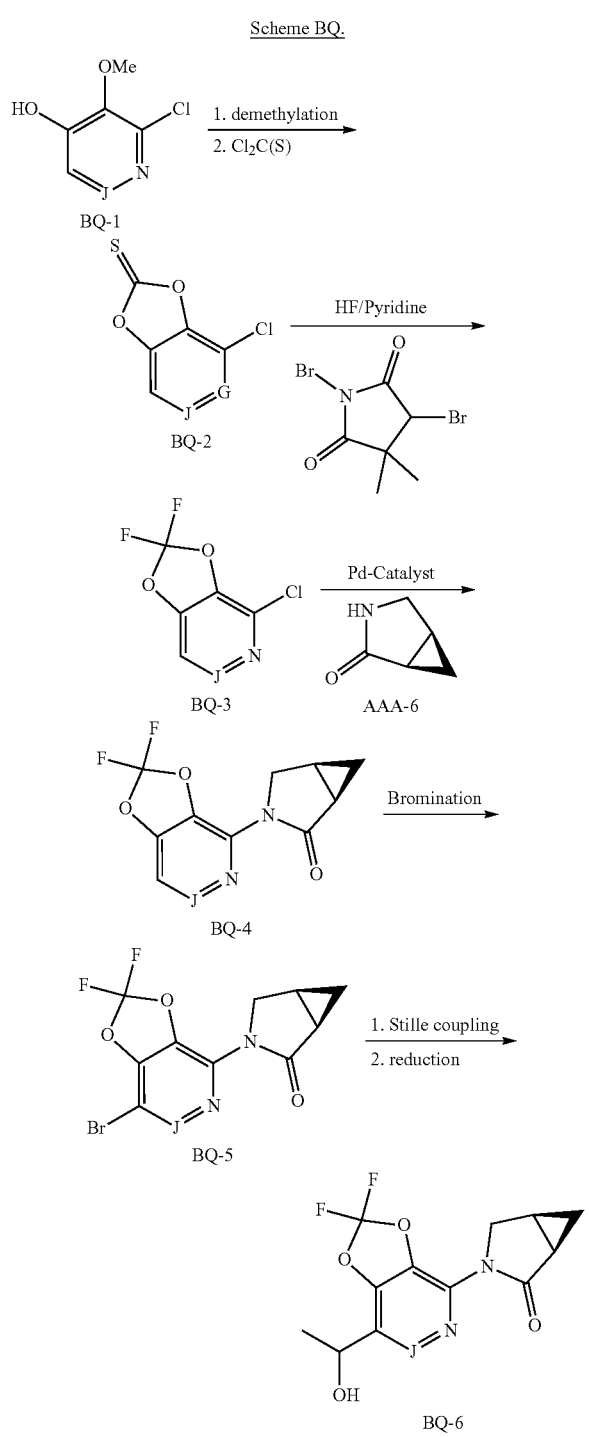

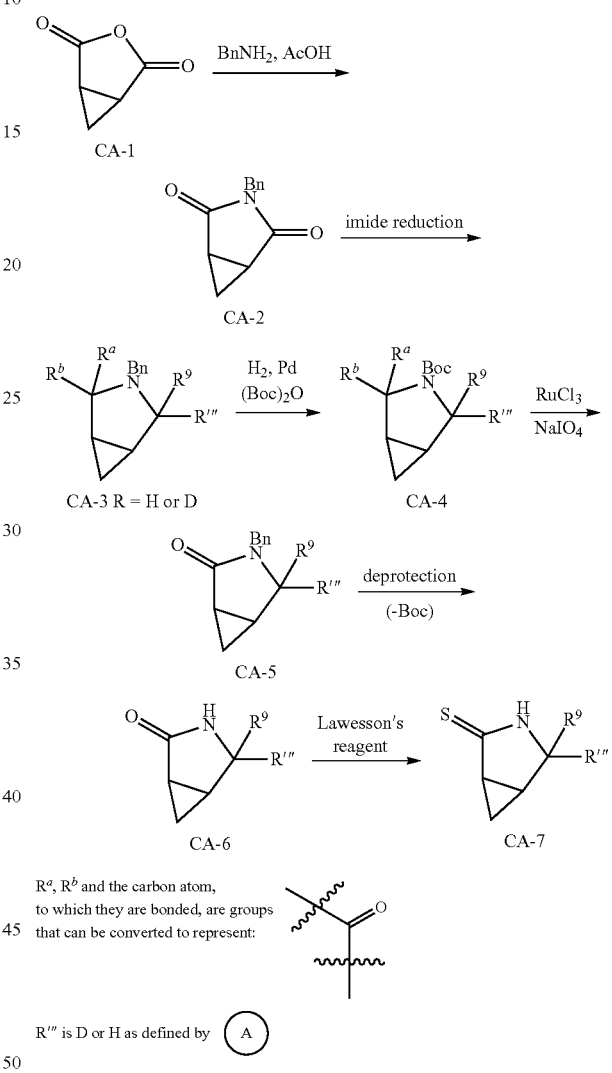

a suitable bromination reagent to afford BQ-5. Stille coupling employing vinyl stannane reagent, such as tributyl(1-ethoxyvinyl)stannane, under Pd-catalysis, followed by reduction of the resultant ketone can give a benzylic alcohol BQ-6, which can be converted following procedures described herein to compounds of this invention.

Scheme BQ illustrates a synthetic sequence for the synthesis of benzylic alcohols such as BQ-6 from substituted pyridines such as BQ-1. Demethylation following methods similar to those described above yields a catechol intermediate that can be trapped with thiophosgene to afford a dioxolothione, such as BQ-2. Thiocarbonate activation with reagents such as the dibromoimidazolodione above in the presence of a fluoride source, such as HF/pyridine can afford a difluorodioxolane such as BQ-3. Pd-catalyzed cross-coupling with a [3.1.0]-lactam (AAA-6) as indicated below can generate a heteroaryl amide BQ-4 that can be reacted with Scheme CA illustrates a 5-step synthetic sequence for the synthesis of lactams such as CA-6 or thiolactams such as CA-7 from lactones such as CA-1. Acid-mediated conversion of CA-1 by treatment with benzylamine gives imide CA-2. Reduction of the imide of CA-2 by treatment with a reducing reagent such as LAH or LiAlD$_4$ provides amine CA-3. Conversion of the protecting group of CA-3 to the tert-butyl carbamate by treatment with palladium and tert-butyl carbonate under a hydrogen atmosphere gives CA-4. Oxidation of CA-4 with reagents such as ruthenium trichloride and sodium periodate affords lactam CA-5. Deprotection of CA-5 by use for example of an acid such as hydrogen chloride or TFA, gives secondary amide CA-6. CA-6 can be carried on to thiolactam CA-7 directly by treatment with Lawesson's reagent or the like.

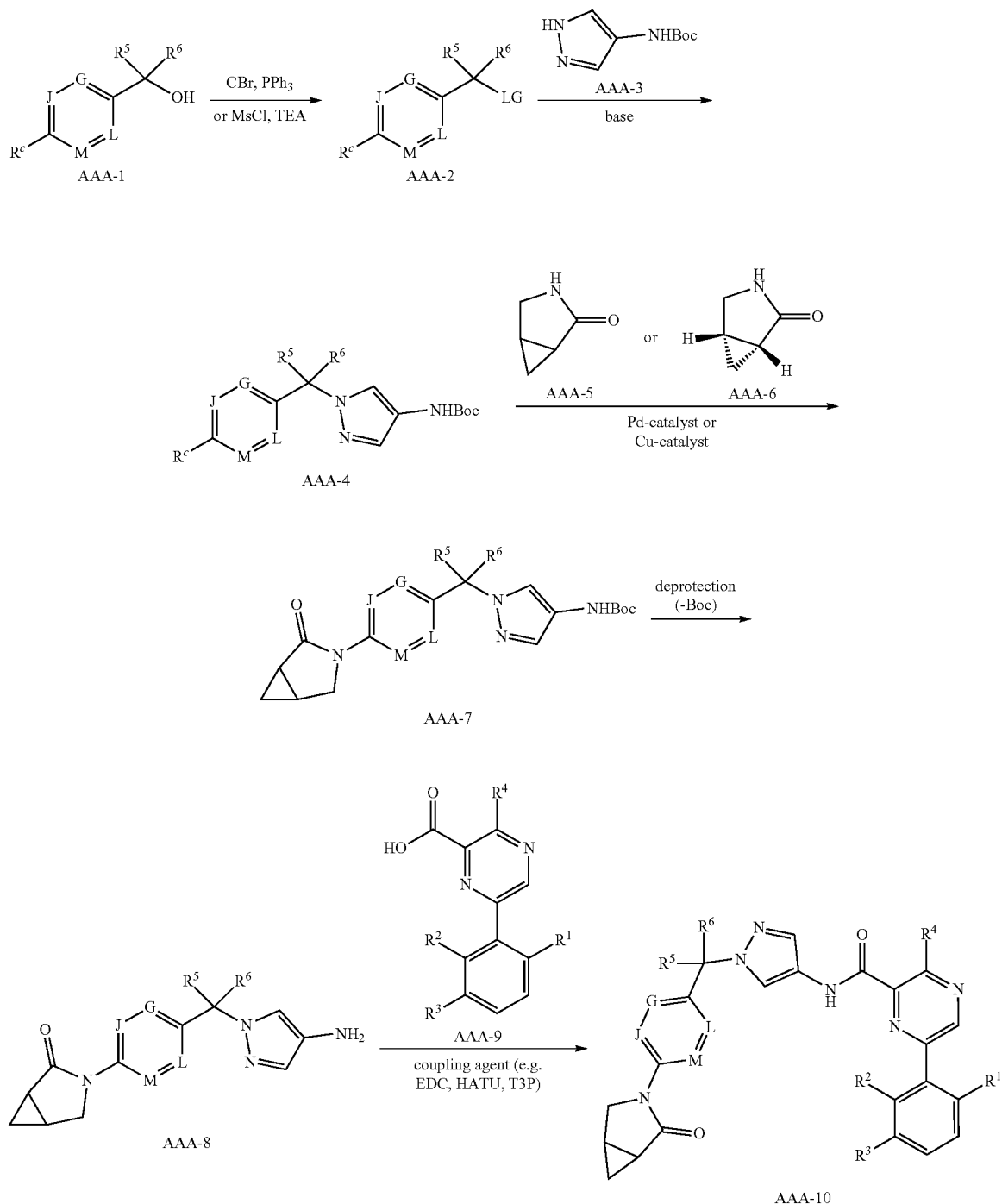

Scheme AAA.

$R^c$ is a group that can be displaced by AAA-5 or AAA-6 in the described reaction LG is Br or OMs Scheme AAA illustrates a 5-step synthetic sequence for the synthesis of amide derivatives such as AAA-10 from alcohols such as AAA-1 and carboxylic acids such as AAA-9. Alcohol AAA-1 is converted to AAA-2, which is then derivatized with pyrazole AAA-3 to furnish intermediate AAA-4. Palladium- or copper-catalyzed cross-coupling of AAA-4 with AAA-5 or AAA-6 yields lactam AAA-7. Removal of the Boc protecting group of AAA-7 gives amine AAA-8, which is then coupled with acid AAA-9 to furnish amide AAA-10.

Scheme AAB.

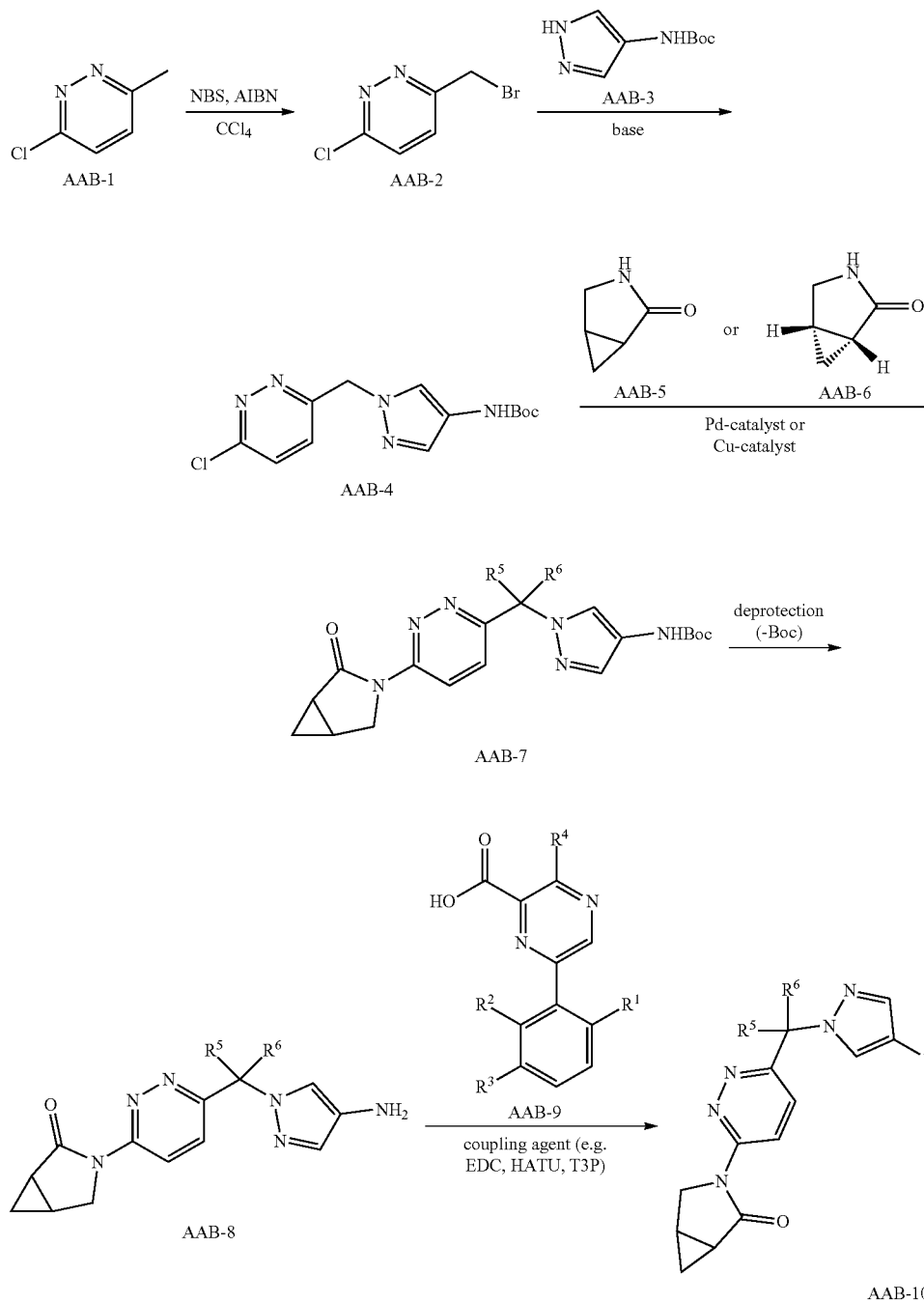

Scheme AAB illustrates a 5-step synthetic sequence for the synthesis of amide derivatives such as AAB-10 from tolyl derivatives such as AAB-1 and carboxylic acids such as AAB-9. Bromination of AAB-1 furnishes AAB-2, which is then derivatized with pyrazole AAB-3 to give intermediate AAB-4. Palladium or copper-catalyzed cross-coupling of AAB-4 and AAB-5 or AAB-6 yields lactam AAB-7. Removal of the Boc protecting group of AAB-7 gives amine AAB-8, which is then coupled with acid AAB-9 to furnish amide AAB-10.

Scheme AAC.

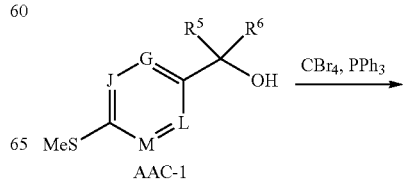

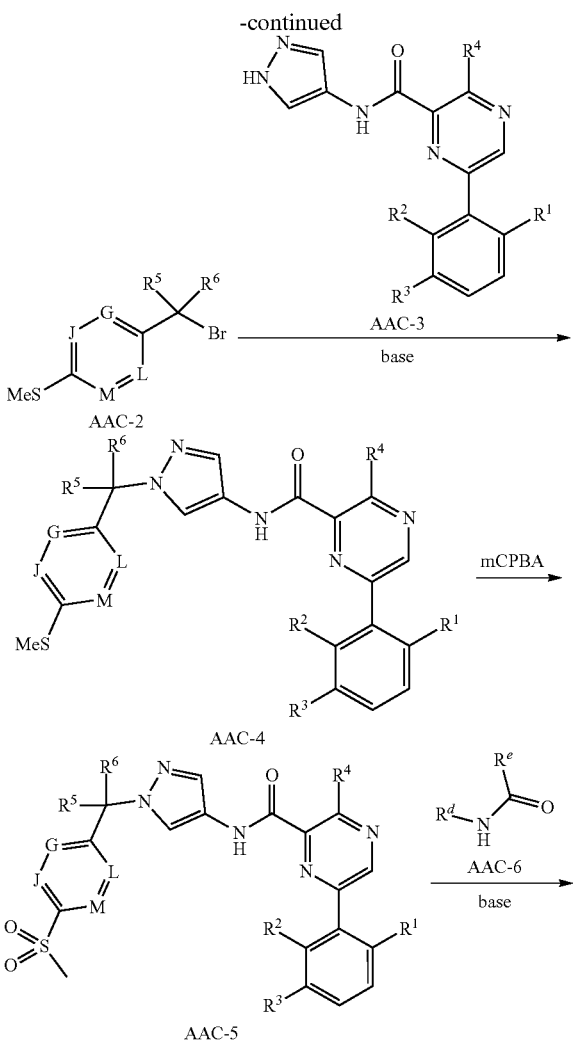
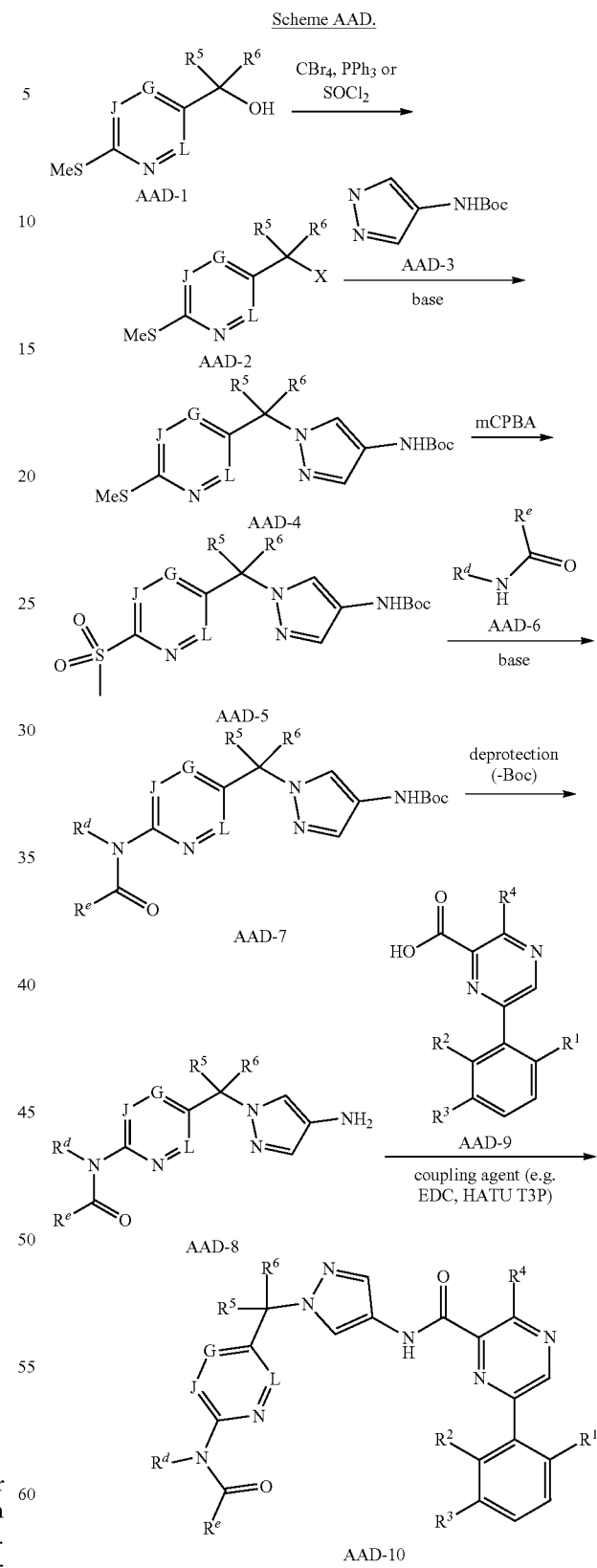

$R^d$ and $R^e$ are groups that allow AAC-6 to define Ⓐ

Scheme AAC illustrates a 4-step synthetic sequence for the synthesis of amide derivatives such as AAC-7 from alcohols such as AAC-1 and pyrazoles such as AAC-3. Alcohol AAC-1 is converted into bromide AAC-2. Base-mediated nucleophilic substitution of AAC-2 with AAC-3 yields pyrazole AAC-4. Oxidation of the thioether of AAC-4 gives sulfone AAC-5, which is then coupled with amide AAC-6 to furnish amide AAC-7.

$R^d$ and $R^e$ are groups that allow AAD-6 to define Ⓐ

Scheme AAD illustrates a 6-step synthetic sequence for the synthesis of amide derivatives such as AAD-10 from alcohols such as AAD-1 and carboxylic acids such as AAD-9. Alcohol AAD-1 is converted into halide AAD-2. Base-mediated nucleophilic substitution of AAD-2 with AAD-3 yields pyrazole AAD-4. Oxidation of the thioether of AAD-4 gives sulfone AAD-5, which is then substituted with amide AAD-6 to furnish amide AAD-7. Removal of the Boc protecting group of AAD-7 gives amine AAD-8, which is then coupled with acid AAD-9 to furnish amide AAD-10.

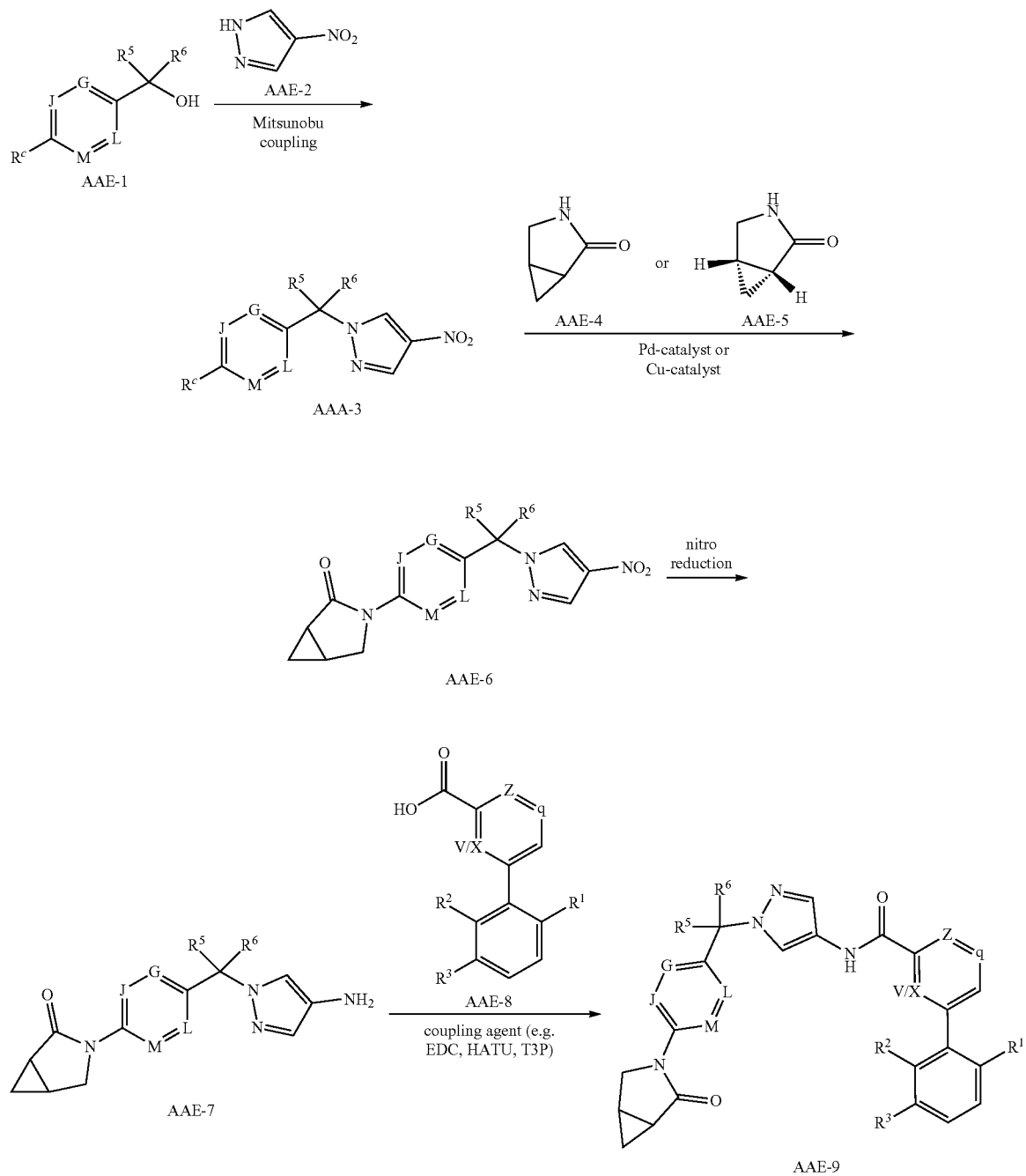

Scheme AAE.

$R^c$ is a group that can be displaced by AAE-4 or AAE-5 in the described reaction q is either Y or C=O as defined for B Scheme AAE illustrates a 4-step synthetic sequence for the synthesis of amide derivatives such as AAE-9 from alcohols such as AAE-1 and carboxylic acids such as AAE-8. Mitsunobu coupling of AAE-1 with pyrazole AAE-2 yields AAE-3. Palladium- or copper-catalyzed cross-coupling of AAE-3 and lactam AAE-4 or AAE-5 furnishes AAE-6. Reduction of the nitro group of AAE-6 by treatment with reagents such as platinum/$H_2$ or iron/ammonium chloride gives amine AAE-7, which is then coupled with acid AAE-8 to furnish amide AAE-9.

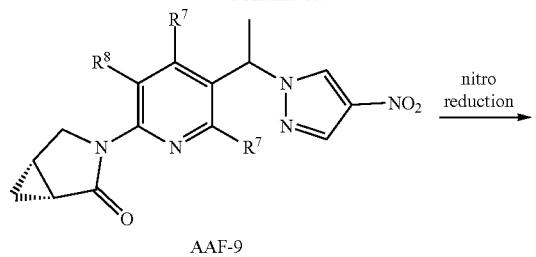

AAF-9

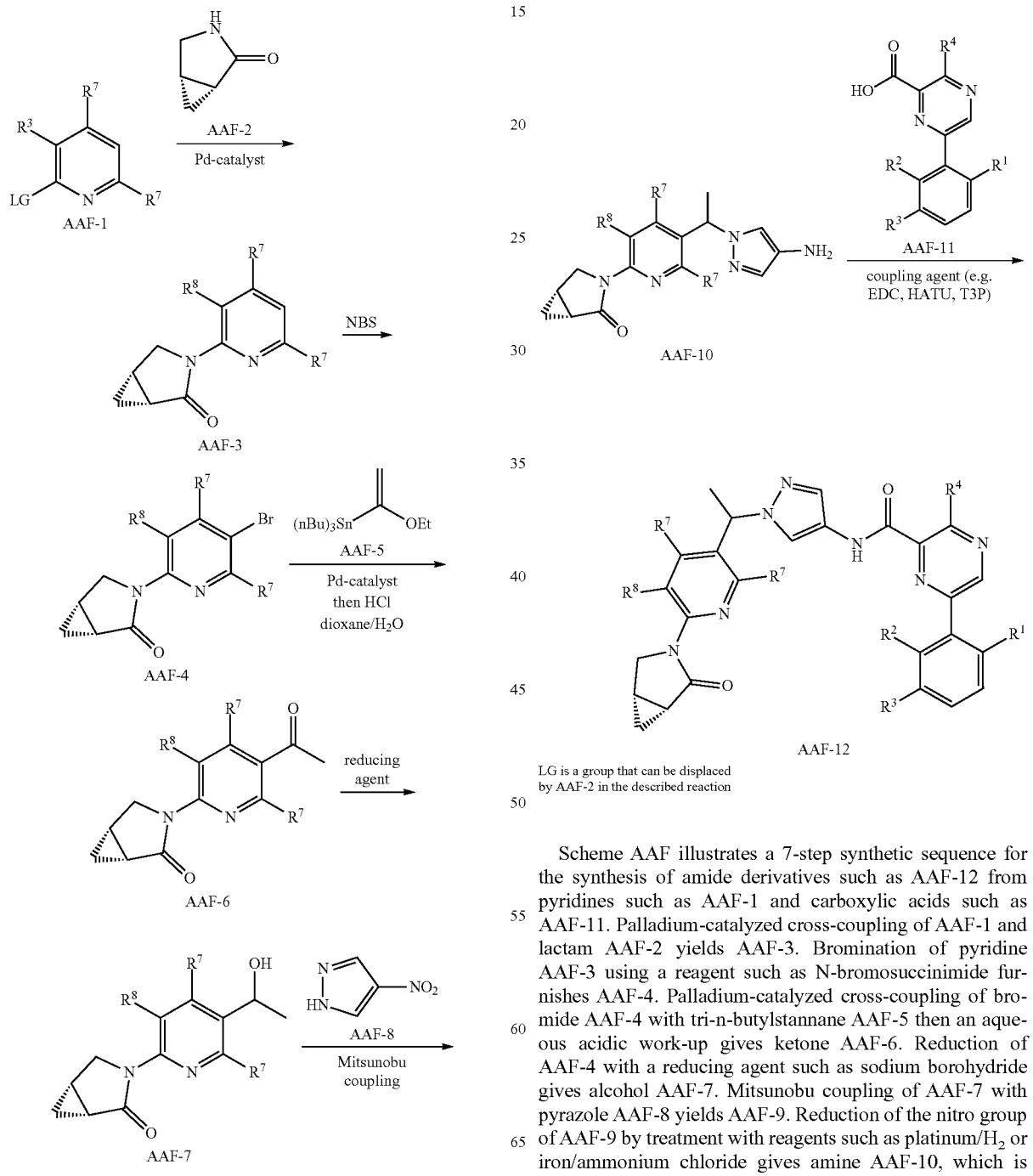

LG is a group that can be displaced by AAF-2 in the described reaction

Scheme AAF illustrates a 7-step synthetic sequence for the synthesis of amide derivatives such as AAF-12 from pyridines such as AAF-1 and carboxylic acids such as AAF-11. Palladium-catalyzed cross-coupling of AAF-1 and lactam AAF-2 yields AAF-3. Bromination of pyridine AAF-3 using a reagent such as N-bromosuccinimide furnishes AAF-4. Palladium-catalyzed cross-coupling of bromide AAF-4 with tri-n-butylstannane AAF-5 then an aqueous acidic work-up gives ketone AAF-6. Reduction of AAF-4 with a reducing agent such as sodium borohydride gives alcohol AAF-7. Mitsunobu coupling of AAF-7 with pyrazole AAF-8 yields AAF-9. Reduction of the nitro group of AAF-9 by treatment with reagents such as platinum/$H_2$ or iron/ammonium chloride gives amine AAF-10, which is then coupled with acid AAF-11 to furnish amide AAF-12.

Scheme AAG.

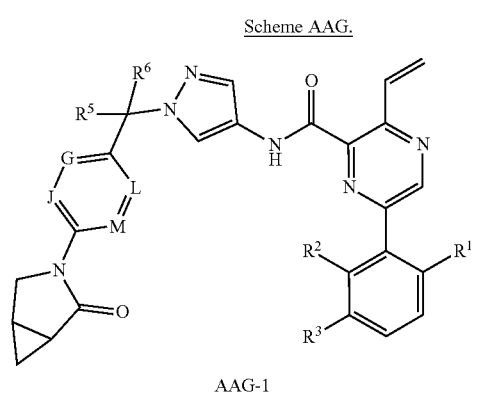

AAG-1

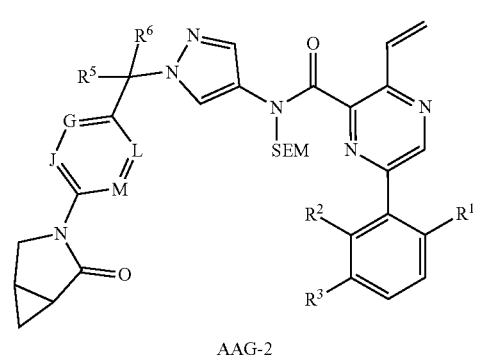

AAG-2

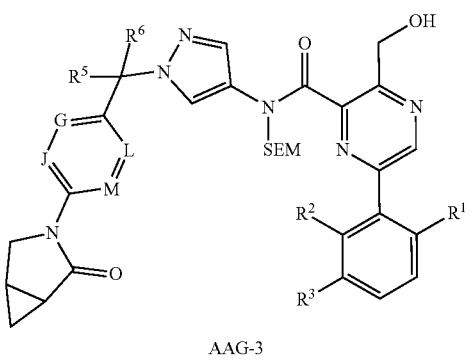

AAG-3

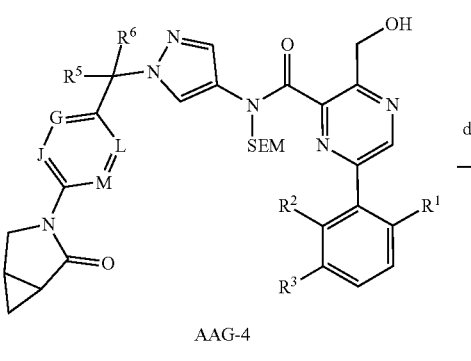

AAG-4

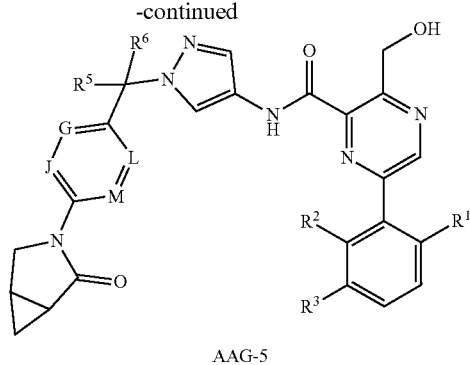

AAG-5

Scheme AAG illustrates a 4-step synthetic sequence for the synthesis of alcohol derivatives such as AAG-5 from vinyl derivatives such as AAG-1. The amide of AAG-1 is protected for example with a SEM group to give AAG-2. Oxidative cleavage of the vinyl group of AAG-2 by treatment with reagents such as osmium tetroxide and sodium periodate furnishes aldehyde AAG-3. Reduction of AAF-3 with a reducing agent such as sodium borohydride gives alcohol AAG-4. Removal of the protecting group of AAG-4 furnishes AAG-5.

Scheme AAH.

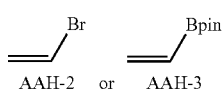

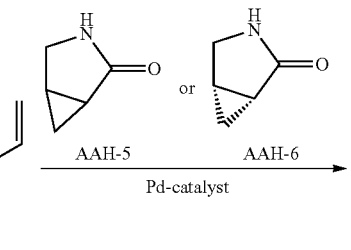

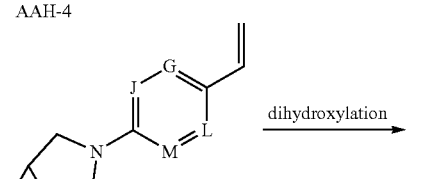

AAH-7

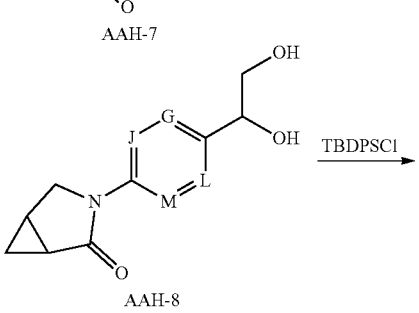

AAH-8

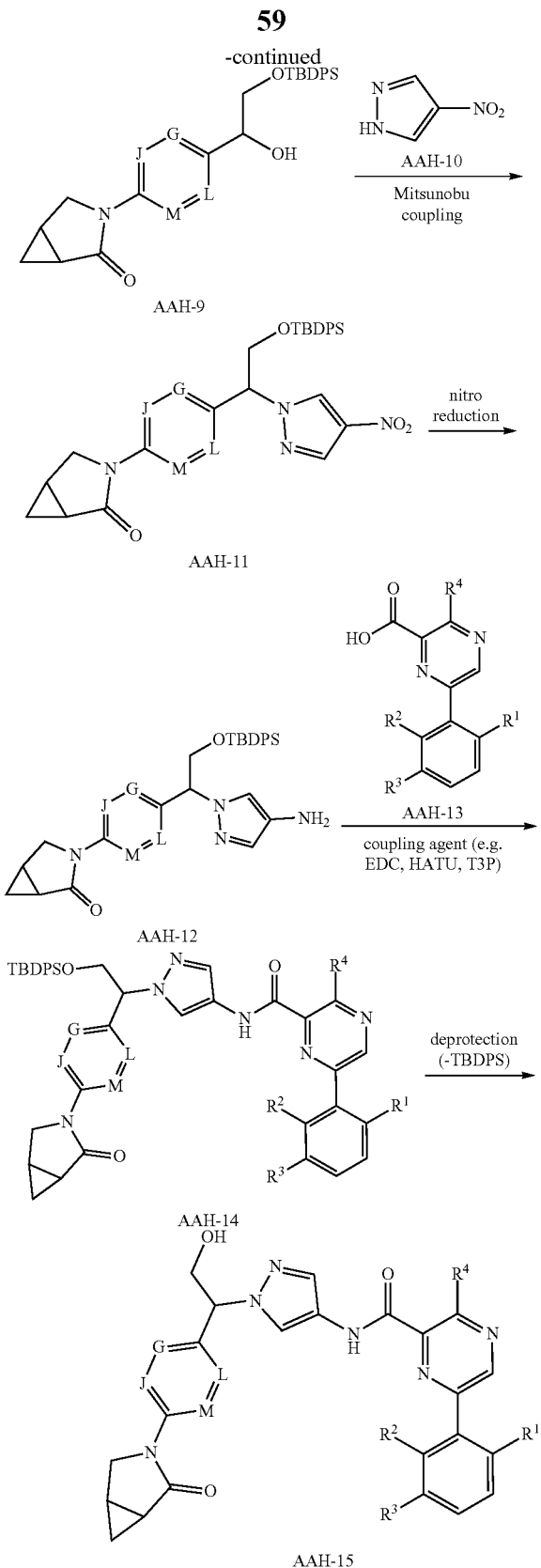

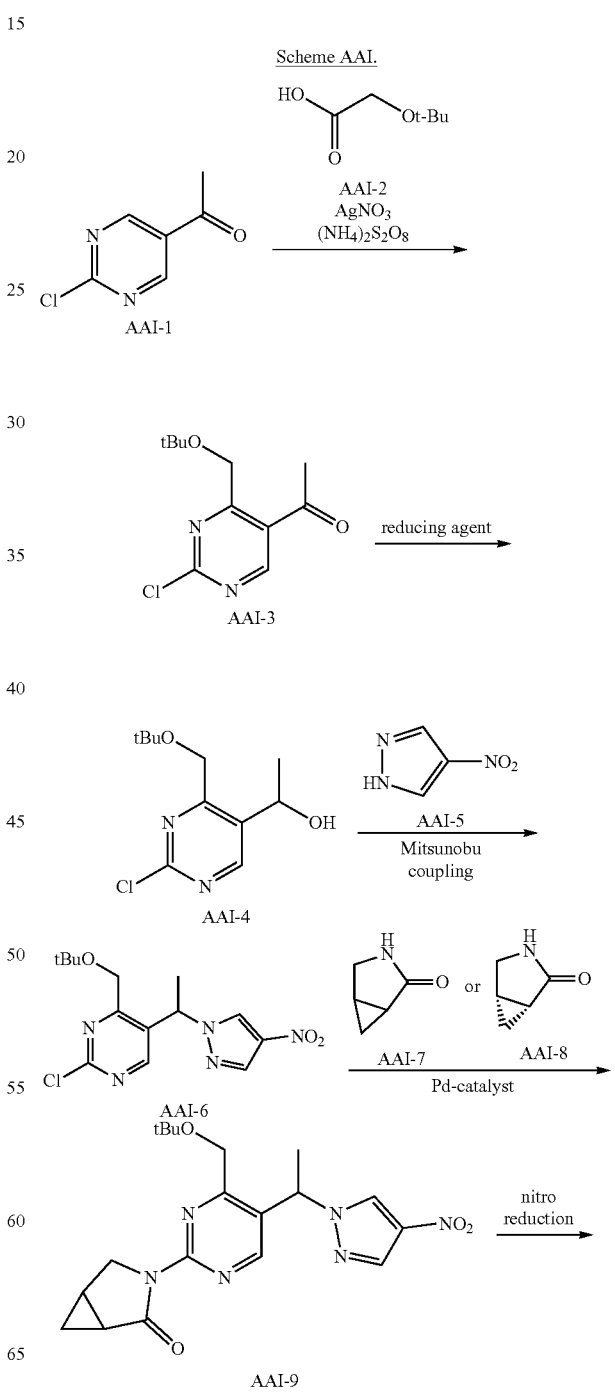

fluoroborate AAH-2 or vinylboronic acid pinacol ester AAH-3 provides styrene AAH-4. Palladium-catalyzed cross-coupling of AAH-4 with lactam AAH-5 or AAH-6 furnishes AAH-7. Dihydroxylation of the vinyl group of AAH-7 using reagents such as osmium tetroxide and 4-methylmorphine N-oxide gives diol AAH-8. Silylation of AAH-8 with a reagent such as tert-butyl(chloro)diphenylsilane provides alcohol AAH-9. Mitsunobu coupling of AAH-9 with pyrazole AAH-10 yields AAH-11. Reduction of the nitro group of AAH-11 by treatment with reagents such as platinum/$H_2$ or iron/ammonium chloride gives amine AAH-12, which is then coupled with acid AAH-13 to furnish amide AAH-14. Deprotection of the silylether of AAH-14 yields alcohol AAH-15.

Scheme AAI.

Scheme AAH illustrates an 8-step synthetic sequence for the synthesis of alcohol derivatives such as AAG-5 from arenes or heteroarenes such as AAH-1. Palladium-catalyzed cross-coupling of bromide AAH-1 with potassium vinyltri-

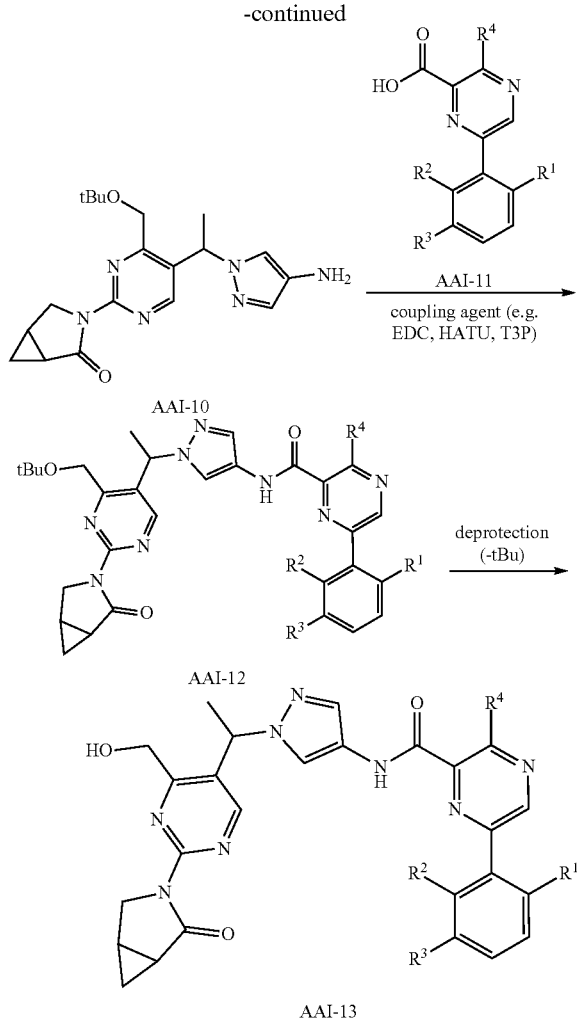

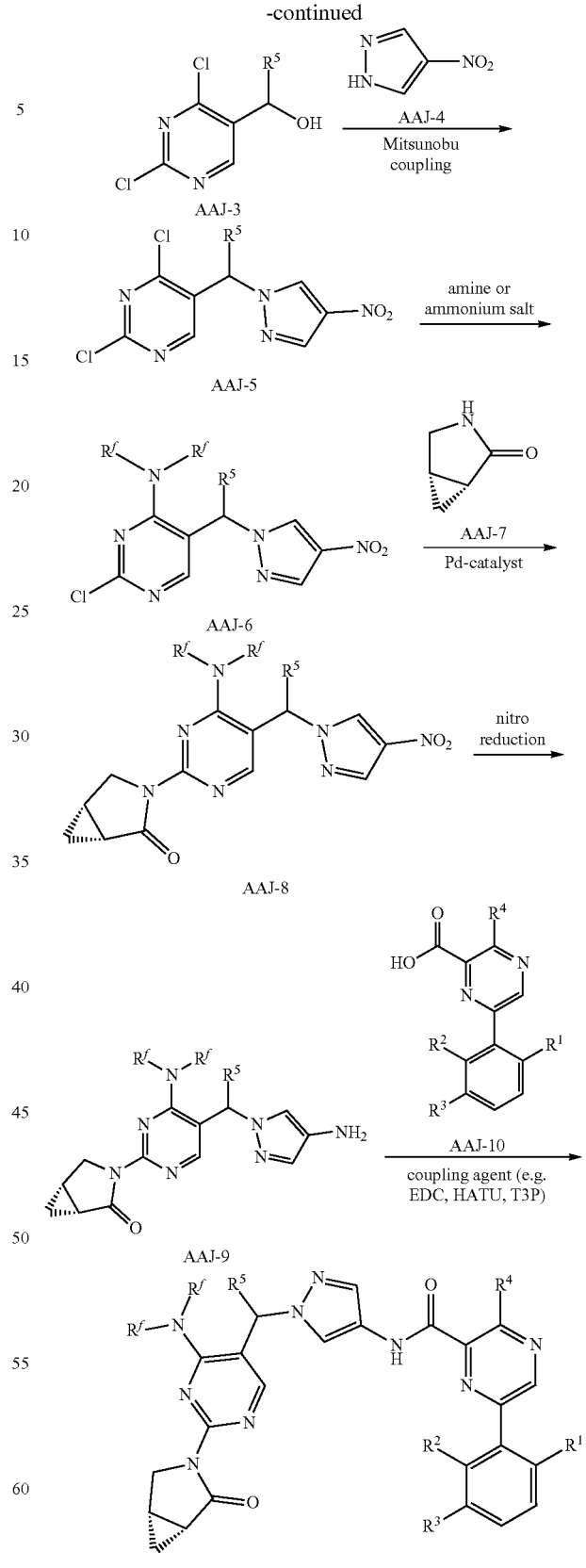

Scheme AAI illustrates a 7-step synthetic sequence for the synthesis of alcohol derivatives such as AAI-13 from pyrimidines such as AAI-1 and carboxylic acid AAI-11. Silver-mediated decarboxylative alkylation of AAI-1 with AAI-2 gives ether AAI-3. Reduction of ketone AAI-3 using reducing agents such as sodium borohydride affords AAI-4. Mitsunobu coupling of AAI-4 with pyrazole AAI-5 yields AAI-6. Palladium-catalyzed cross-coupling of AAI-6 with lactam AAI-7 or AAI-8 furnishes AAI-9. Reduction of the nitro group of AAI-9 by treatment with reagents such as platinum/$H_2$ or iron/ammonium chloride gives amine AAI-10, which is then coupled with acid AAI-11 to furnish amide AAI-12. Deprotection of the tert-butylether of AAI-12 yields alcohol AAI-13.

Scheme AAJ.

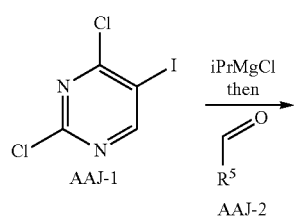

$R^f$ is a group whereby —N($R^f$)$_2$ is defined by $R^7$

Scheme AM illustrates a 6-step synthetic sequence for the synthesis of amide derivatives such as AAJ-11 from pyrimidines such as AAJ-1 and carboxylic acid AAJ-10. A two-step sequence involving metal-halogen exchange of AAJ-1 by adding an organometallic reagent such as iso-propylmagnesium chloride then quenching with the corresponding aldehyde AAJ-2 gives alcohol AAJ-3. Mitsunobu coupling of AAJ-3 with pyrazole AAJ-4 yields AAJ-4. Nucleophilic substitution of pyrimidine AAJ-5 with an amine or ammonium salt such as ammonium hydroxide yields AAJ-6. Palladium-catalyzed cross-coupling of AAJ-6 with lactam AAJ-7 furnishes AAI-8. Reduction of the nitro group of AAJ-8 by treatment with reagents such as platinum/$H_2$ or iron/ammonium chloride gives amine AAJ-9, which is then coupled with acid AAJ-10 to furnish amide AAJ-11.

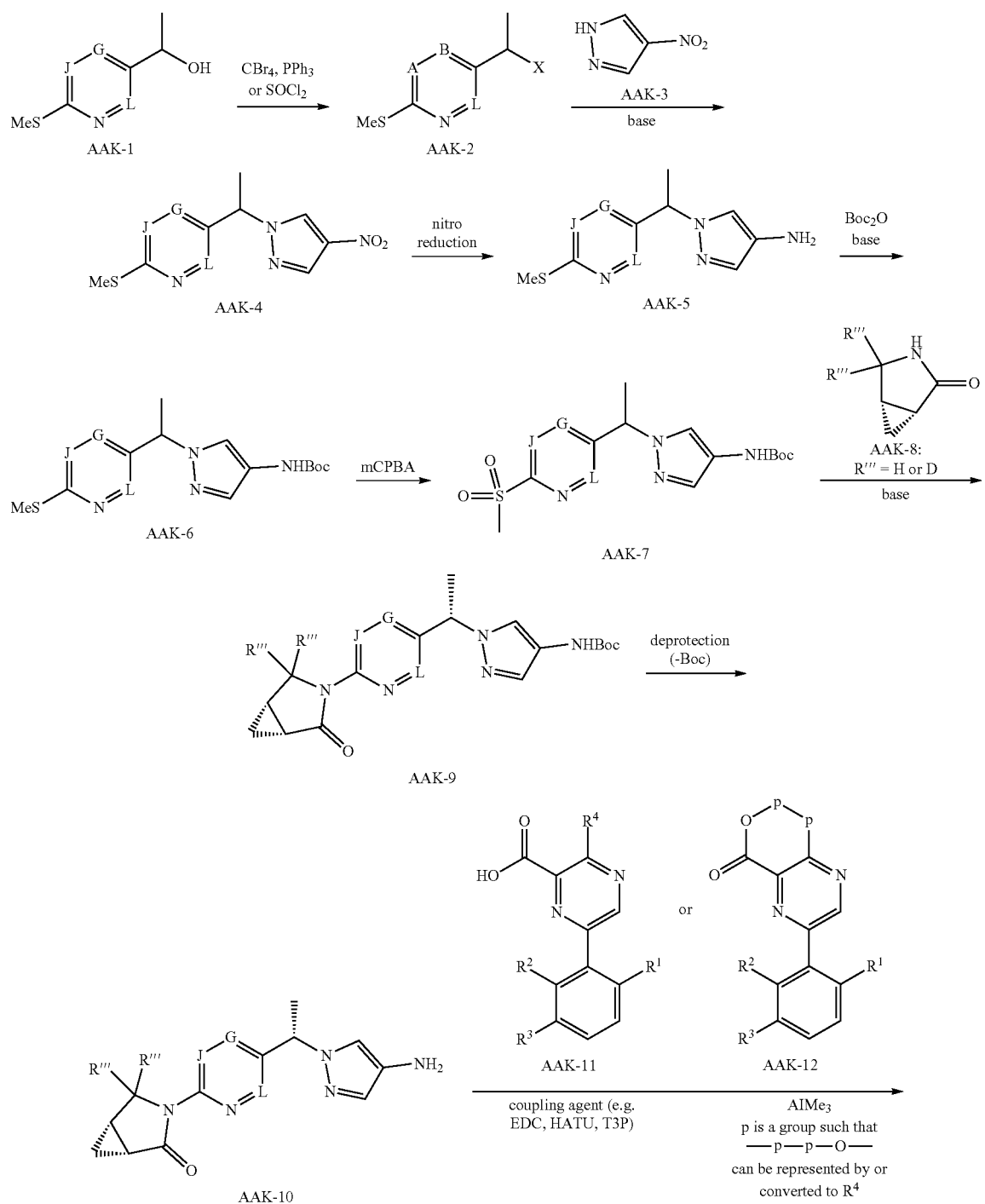

-continued

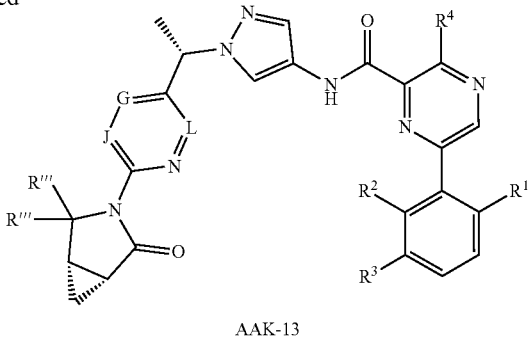

AAK-13

Scheme AAK illustrates an 8-step synthetic sequence for the synthesis of amide derivatives such as AAK-13 from alcohols such as AAK-1 and carboxylic acid AAK-11 or lactone AAK-12. Alcohol AAK-1 is converted into halide AAK-2. Base-mediated nucleophilic substitution of AAK-2 with AAK-3 yields pyrazole AAK-4. Reduction of the nitro group of AAK-4 by treatment with reagents such as platinum/$H_2$ or iron/ammonium chloride gives amine AAK-5, which is then protected as the tert-butyl carbamate furnishing AAK-6. Oxidation of the thioether of AAK-6 gives sulfone AAK-7, which is then substituted with lactam AAK-8 to furnish AAK-9. Removal of the Boc protecting group of AAK-10 gives amine AAK-11, which is then coupled with acid AAK-11 or lactone AAK-12 to furnish amide AAK-13.

Scheme AAL.

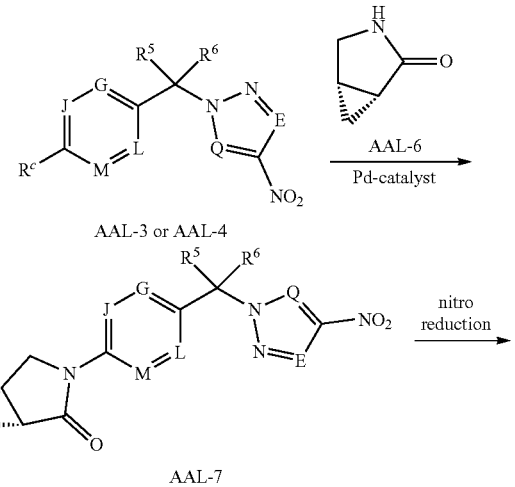

$R^c$ is a group that can be displaced by AAL-6 in the described reaction

Scheme AAL illustrates a 4-step synthetic sequence for the synthesis of amide derivatives such as AAL-10 from alcohols such as AAL-1 and carboxylic acid AAL-9. Mitsunobu coupling of AAL-1 with triazole AAL-2 yields regioisomers AAL-3, AAL-4 and AAL-5. Palladium-catalyzed cross-coupling of AAL-3 or AAL-4 with lactam AAL-6 furnishes AAL-7. Reduction of the nitro group of AAL-7 by treatment with reagents such as platinum/H$_2$ or iron/ammonium chloride gives amine AAL-8, which is then coupled with acid AAL-9 to furnish amide AAL-10.

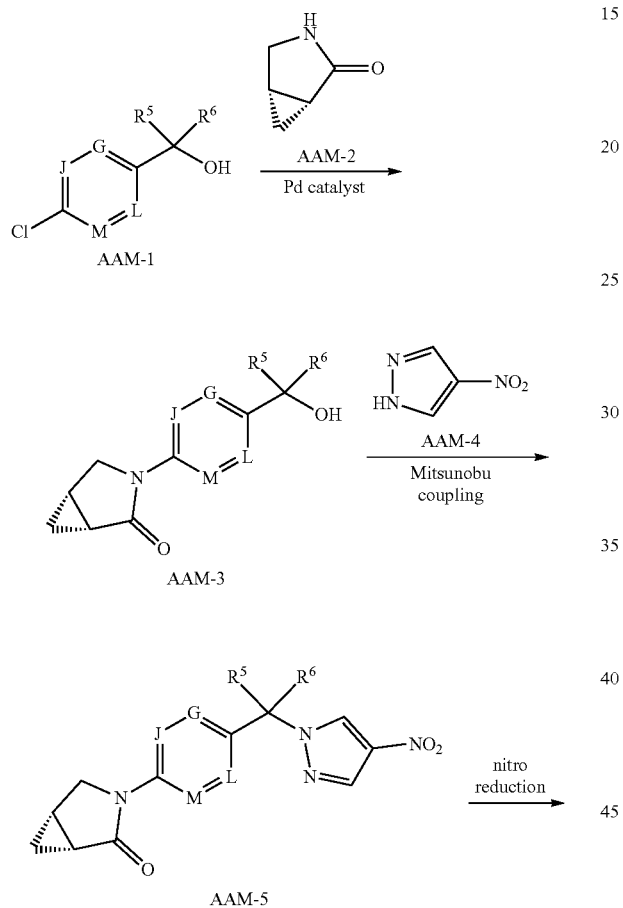

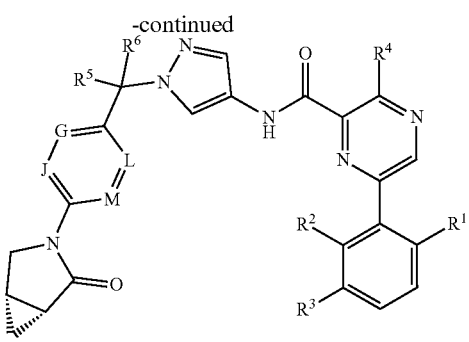

Scheme AAM illustrates a 4-step synthetic sequence for the synthesis of amide derivatives such as AAM-8 from alcohols such as AAM-1 and carboxylic acids such as AAM-7. Palladium-catalyzed cross-coupling of AAM-1 with AAM-2 furnishes lactam AAM-3. Mitsunobu coupling of AAM-3 with pyrazole AAM-4 yields AAM-5. Reduction of the nitro group of AAM-5 by treatment with reagents such as platinum/H$_2$ or iron/ammonium chloride gives amine AAM-6, which is then coupled with acid AAM-7 to furnish amide AAM-8.

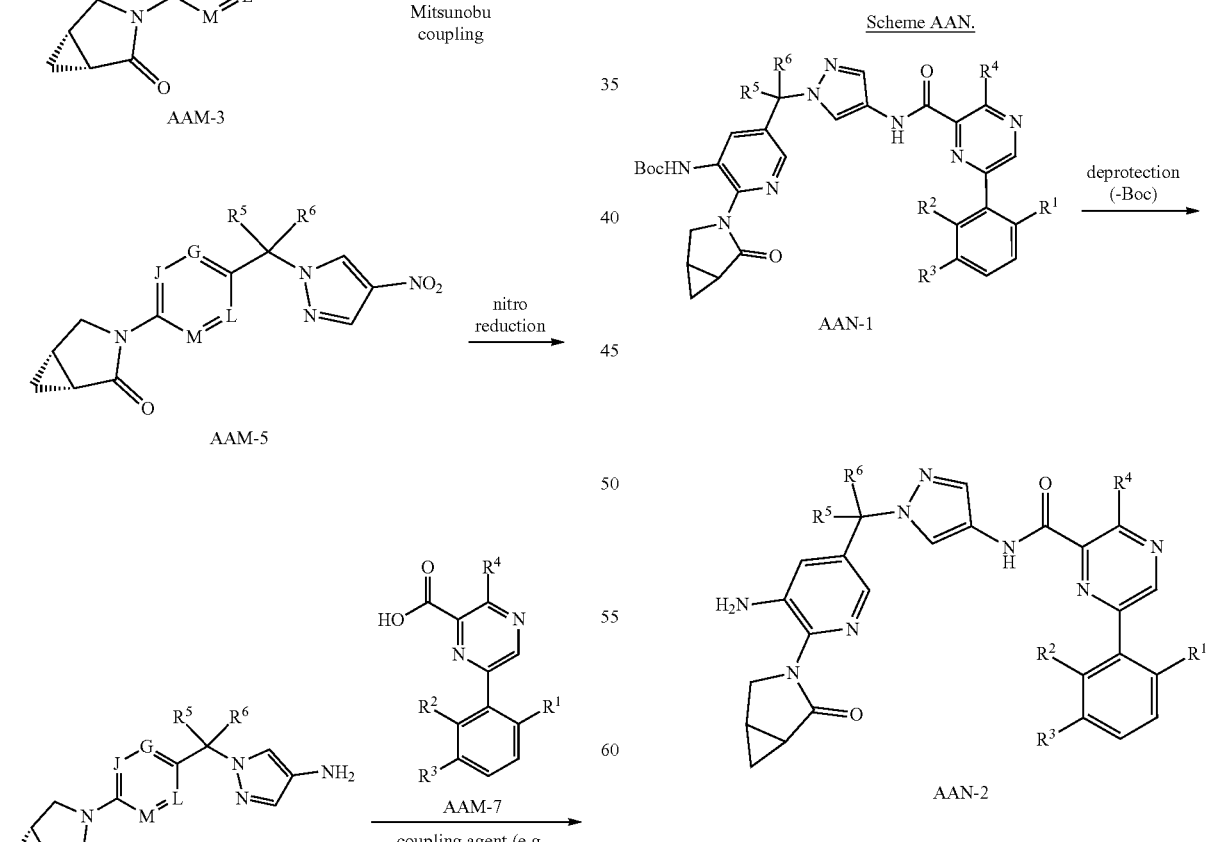

Scheme AAN illustrates a 1-step synthetic sequence for the synthesis of amine derivatives such as AAN-2 from carbamates such as AAN-1. Deprotection of the tert-butyl carbamate of AAN-1 yields AAN-2.

69

Scheme AAO.

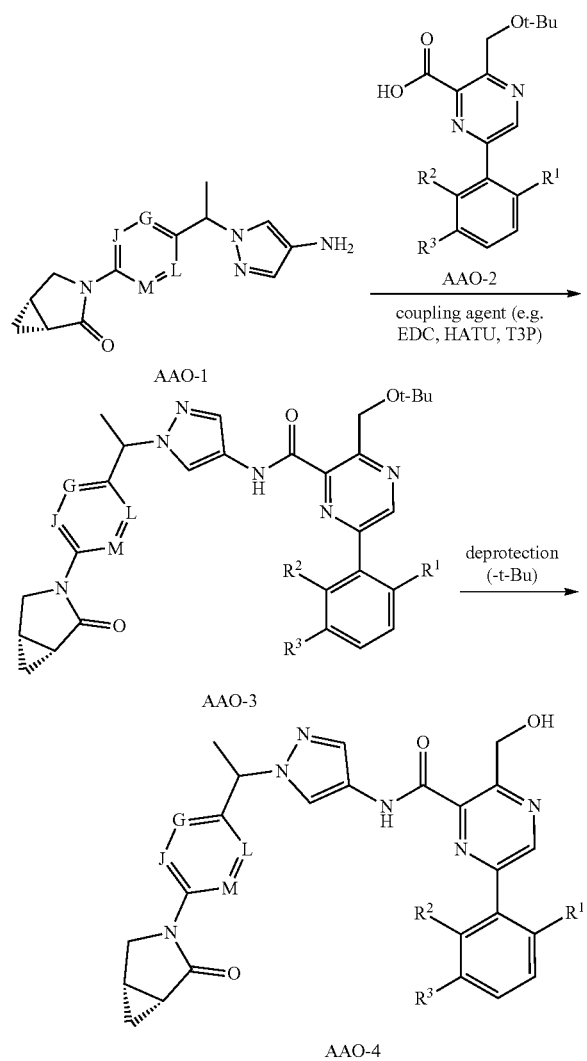

AAO-4

Scheme AAO illustrates a 2-step synthetic sequence for the synthesis of alcohol derivatives such as AAO-3 from amine AAO-1- and t-butylethers such as AAO-2. Amide coupling of AAO-1- and AAO-2 furnishes amide AAO-3. Deprotection of AAO-3 gives alcohol AAO-4.

Scheme AAP.

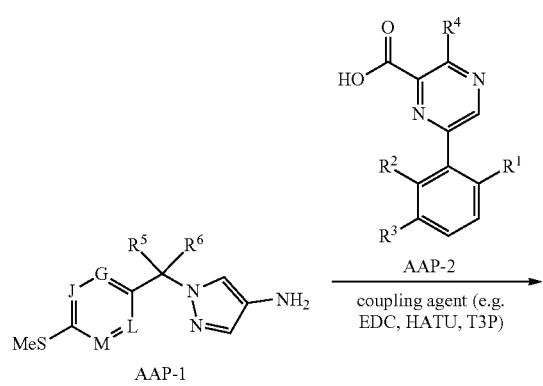

AAP-1

70

Scheme AAP illustrates a 3-step synthetic sequence for the synthesis of amide derivatives such as AAP-6 from amines such as AAP-1 and carboxylic acids such as AAP-2. Amide coupling of AAP-1 with AAP-2 provides AAP-3, which is then treated with an oxidant such as Oxone® or mCPBA giving sulfone AAP-4. Nucleophilic aromatic substitution of AAP-4 with amine AAP-5 yields AAP-6.

Scheme AAQ.

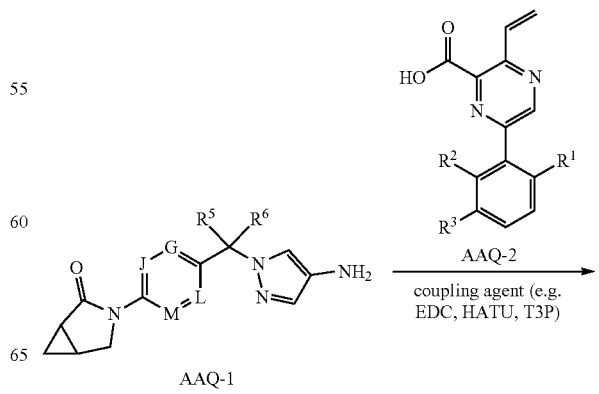

AAQ-1

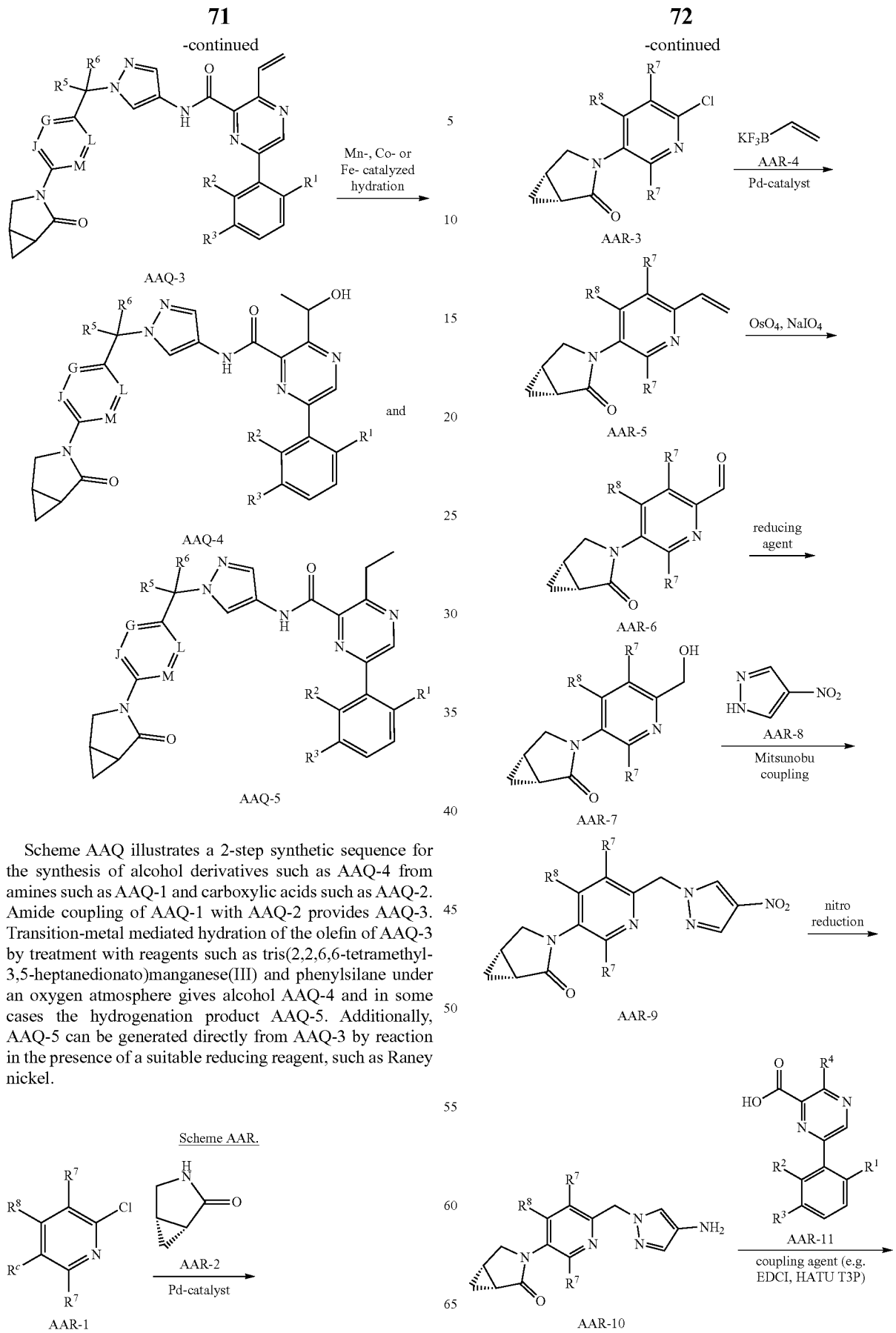

Scheme AAQ illustrates a 2-step synthetic sequence for the synthesis of alcohol derivatives such as AAQ-4 from amines such as AAQ-1 and carboxylic acids such as AAQ-2. Amide coupling of AAQ-1 with AAQ-2 provides AAQ-3. Transition-metal mediated hydration of the olefin of AAQ-3 by treatment with reagents such as tris(2,2,6,6-tetramethyl-3,5-heptanedionato)manganese(III) and phenylsilane under an oxygen atmosphere gives alcohol AAQ-4 and in some cases the hydrogenation product AAQ-5. Additionally, AAQ-5 can be generated directly from AAQ-3 by reaction in the presence of a suitable reducing reagent, such as Raney nickel.

Scheme AAR.

-continued

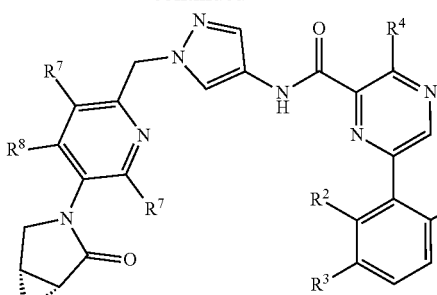

AAR-12

R<sup>c</sup> is a group that can be displaced by AAR-2 in the described reaction Scheme AAR illustrates a 7-step synthetic sequence for the synthesis of amide derivatives such as AAR-12 from pyridines such as AAR-1 and carboxylic acids such as AAR-11. Palladium-catalyzed cross-coupling of AAR-1 and lactam AAR-2 yields AAR-3. Palladium-catalyzed cross-coupling of bromide AAR-3 with potassium vinyltrifluoroborate AAR-4 gives AAR-5. Oxidative cleavage of the vinyl group of AAR-5 by treatment with reagents such as osmium tetraoxide and sodium periodate give aldehyde AAR-6. Reduction of AAR-6 with a reducing agent such as sodium borohydride gives alcohol AAR-7. Mitsunobu coupling of AAR-7 with pyrazole AAR-8 yields AAR-9. Reduction of the nitro group of AAR-9 by treatment with reagents such as platinum/$H_2$ or iron/ammonium chloride gives amine AAR-10, which is then coupled with acid AAR-11 to furnish amide AAR-12.

Scheme AAS.

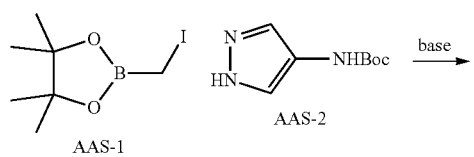

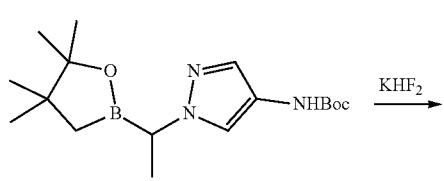

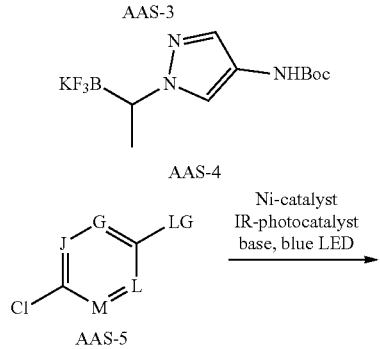

-continued

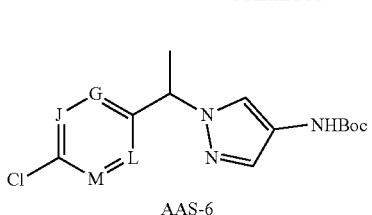 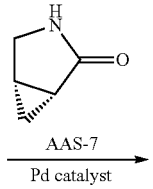

AAS-6 → AAS-7, Pd catalyst

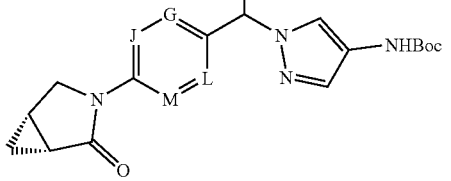

AAS-8, deprotection →

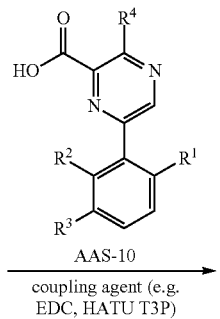

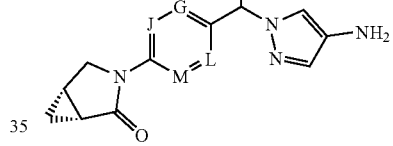

AAS-9

AAS-10, coupling agent (e.g. EDC, HATU T3P) →

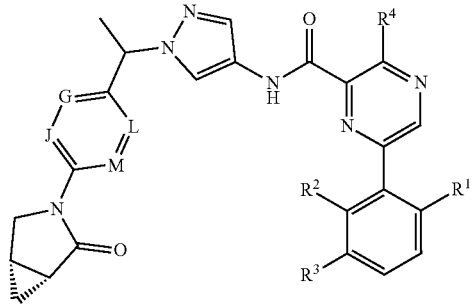

AAS-11

Scheme AAS illustrates a synthetic sequence for the synthesis of amide derivatives such as AAS-11 from alkyltrifluoroborate salts such as AAS-4 and aryl or heteroaryl halides such as AAS-5. Nucleophilic substitution of iodide AAS-1 with pyrazole AAS-2 affords adduct AAS-3. Treatment of boronate AAS-3 with potassium hydrogen difluoride gives alkyltrifluoroborate salt AAS-4. Visible-light-promoted iridium photoredox and nickel dual-catalyzed cross-coupling of AAS-4 and AAS-5 yields AAS-6. Palladium-catalyzed cross-coupling of AAS-6 with lactam AAS-7 gives AAS-8. Acid-mediated removal of the protecting groups of AAS-9 gives amine AAS-7, which is then coupled with acid AAS-10 to furnish amide AAS-11.

Scheme AAT.

Scheme AAU.

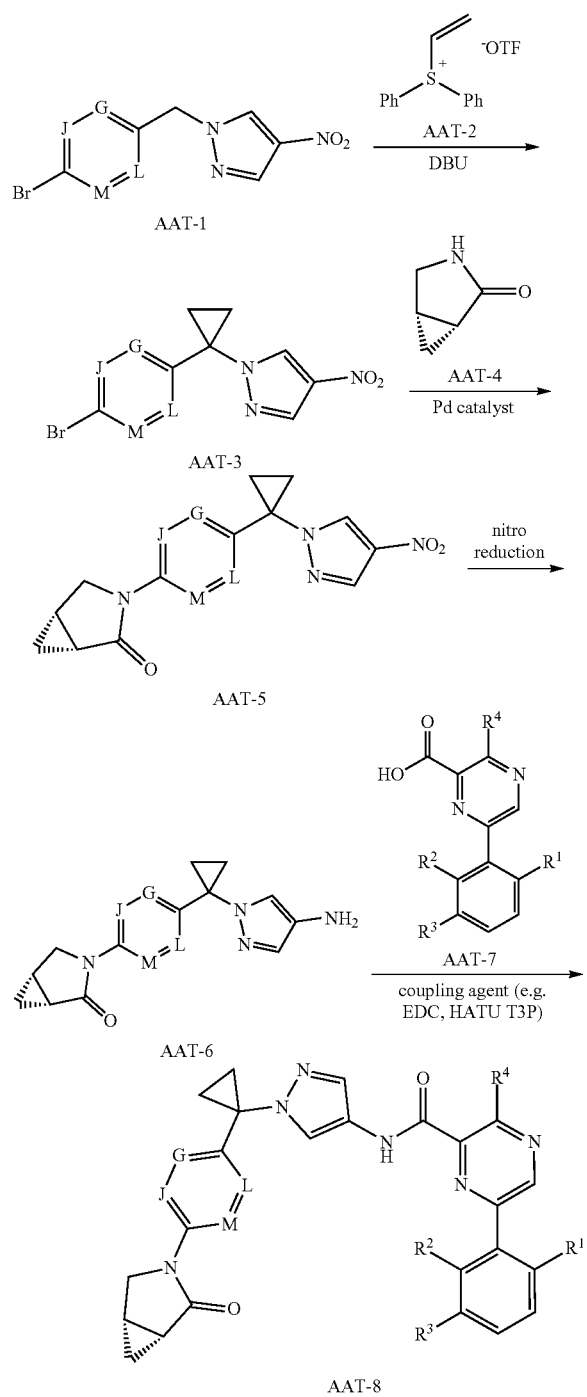

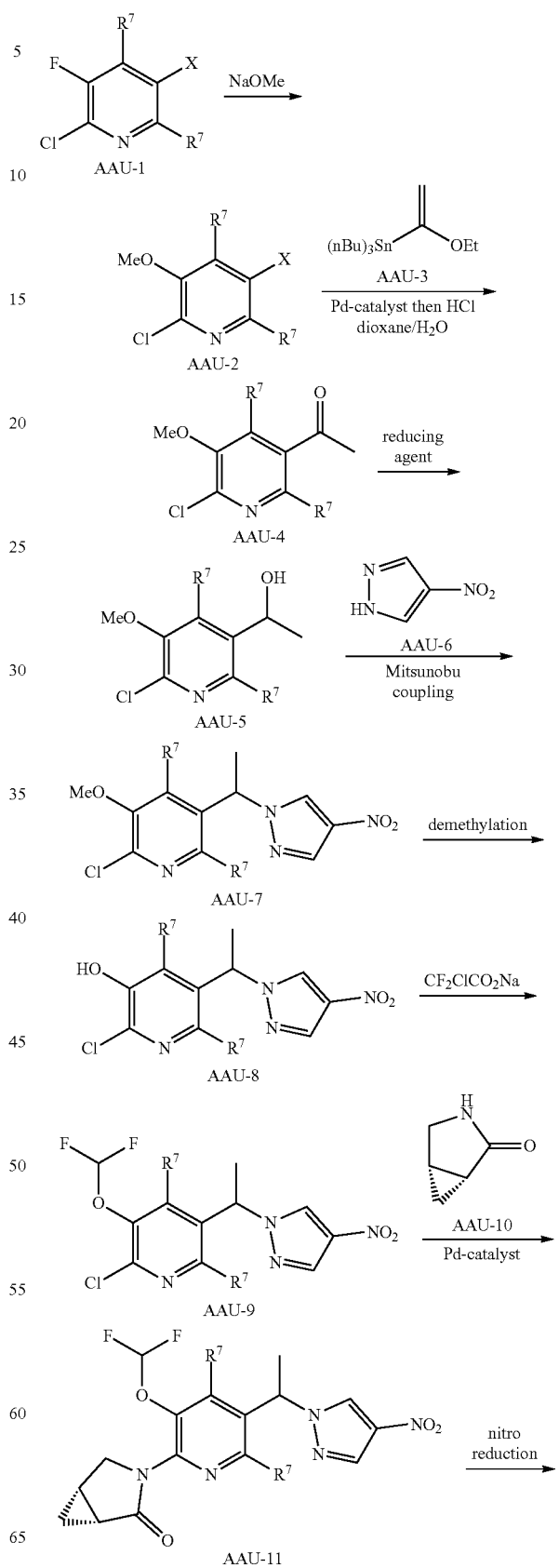

Scheme AAT illustrates a 4-step synthetic sequence for the synthesis of amide derivatives such as AAT-8 from pyrazoles such as AAT-1 and carboxylic acids such as AAT-7. Base-mediated cyclopropanation of AAT-1 by treatment with diphenyl(vinyl)sulfonium salt AAT-2 and DBU gives cyclopropane AAT-3. Palladium-catalyzed cross-coupling of AAT-3 and lactam AAT-4 yields AAT-5. Reduction of the nitro group of AAT-5 by treatment with reagents such as platinum/$H_2$ or iron/ammonium chloride gives amine AAT-6, which is then coupled with acid AAT-7 to furnish amide AAT-8.

-continued

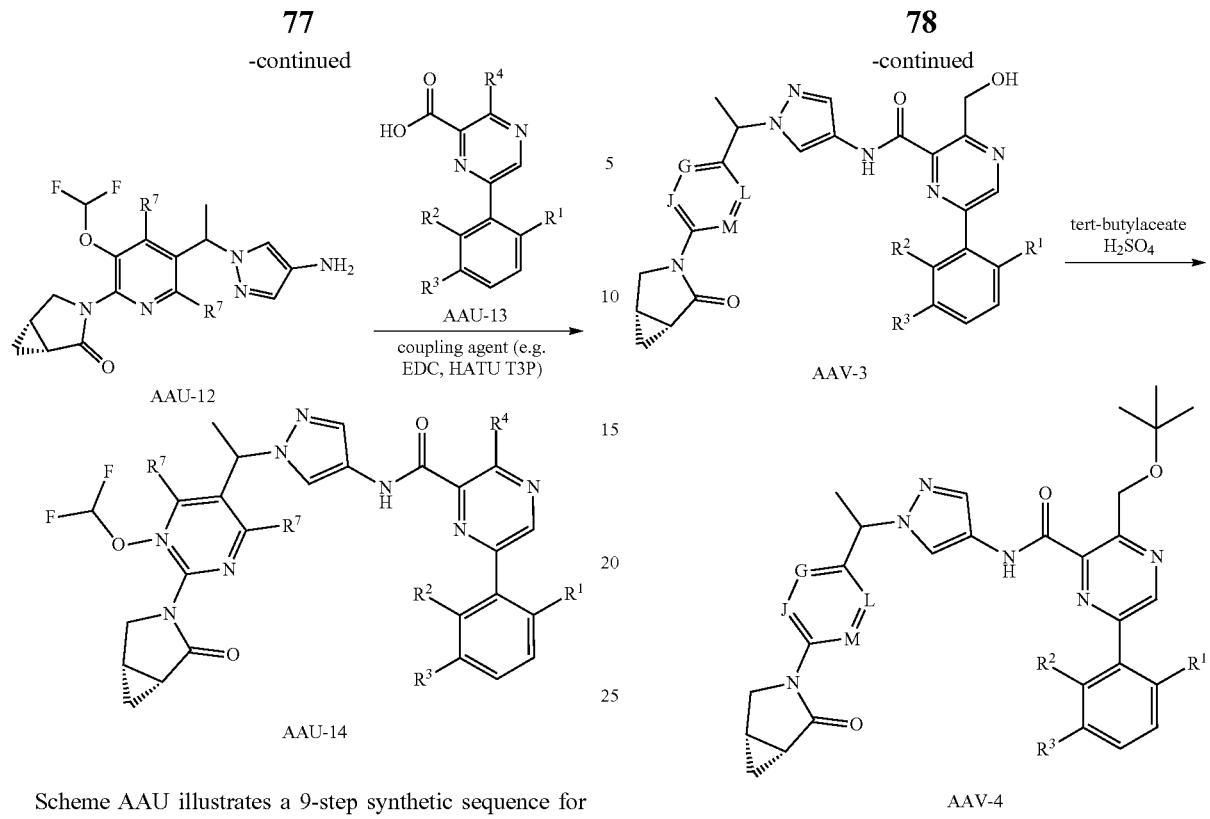

Scheme AAU illustrates a 9-step synthetic sequence for the synthesis of amide derivatives such as AAU-13 from pyridines such as AAU-1 and carboxylic acids such as AAU-12. Nucleophilic aromatic substitution of AAU-1 by treatment with sodium methoxide give methyl ether AAU-2. Palladium-catalyzed cross-coupling of AAU-2 with tri-n-butylstannane AAU-3 followed by treatment with an acid such as aqueous HCl provides ketone AAU-4. Reduction of AAU-4 with a reducing agent such as sodium borohydride gives alcohol AAU-5. Mitsunobu coupling of AAU-5 with pyrazole AAU-6 yields AAU-7. Demethylation of ether AAU-7 with a reagent such as boron tribromide gives alcohol AAU-8. Base-mediated alkylation of AAU-8 by treatment with sodium chlorodifluoroacetate gives difluoromethyl ether AAU-9. Palladium-catalyzed cross-coupling of AAU-9 and lactam AAU-10 yields AAU-11. Reduction of the nitro group of AAU-11 by treatment with reagents such as platinum/$H_2$ or iron/ammonium chloride gives amine AAU-12, which is then coupled with acid AAU-13 to furnish amide AAU-14.

Scheme AAV.

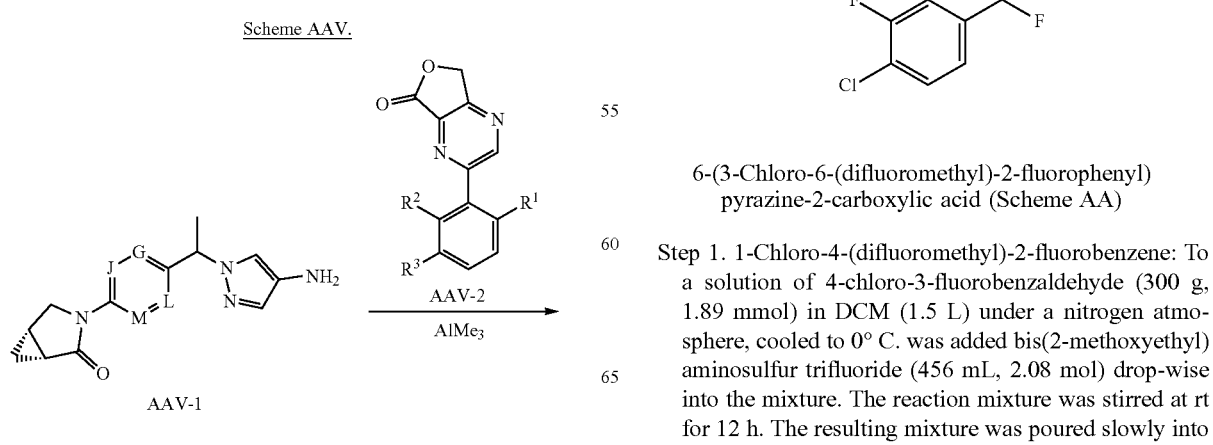

Scheme AAV illustrates an two-step synthetic sequence for the synthesis of amide derivatives such as AAV-4 from amines such as AAV-1 and lactone AAV-2. Treatment of AAV-1 and AAV-2 with a reagent such as trimethylaluminum gives AAV-3. Tert-butylation of alcohol AAV-3 provides AAV-4.

Intermediate AA-6a 6-(3-Chloro-6-(difluoromethyl)-2-fluorophenyl)pyrazine-2-carboxylic acid (Scheme AA)

Step 1. 1-Chloro-4-(difluoromethyl)-2-fluorobenzene: To a solution of 4-chloro-3-fluorobenzaldehyde (300 g, 1.89 mmol) in DCM (1.5 L) under a nitrogen atmosphere, cooled to 0° C. was added bis(2-methoxyethyl)aminosulfur trifluoride (456 mL, 2.08 mol) drop-wise into the mixture. The reaction mixture was stirred at rt for 12 h. The resulting mixture was poured slowly into an ice-water solution, then extracted with DCM. The organic layers were combined and washed with brine, dried over Na₂SO₄ and concentrated under reduced pressure to afford the title compound. ¹H NMR (400 MHz, CDCl₃) δ 7.53 (t, J=8.0 Hz, 1H), 7.34 (d, J=9.6 Hz, 1H), 7.27 (d, J=9.2 Hz, 1H), 6.64 (t, J=56 Hz, 1H).

Step 2. 2-(3-Chloro-6-(difluoromethyl)-2-fluorophenyl)-4,4,5,5-tetramethyl-1,3,2-dioxaborolane: To a solution of 1-chloro-4-(difluoromethyl)-2-fluorobenzene (300 g, 1.66 mol) in THF (1.8 L) under a nitrogen atmosphere, cooled to −78° C. was added LDA (997 mL, 1.99 mol, 2M in THF) drop-wise into the mixture. The reaction mixture was stirred at −78° C. for 30 min, then 2-isopropoxy-4,4,5,5-tetramethyl-1,3,2-dioxaborolane (508 mL, 2.49 mol) was added drop-wise into the mixture. The reaction mixture was stirred at −78° C. for 30 min, then poured into an aq. satd. NH₄Cl solution. The resulting mixture was filtered, then extracted with EtOAc. The organic layers were combined and washed with brine, dried over Na₂SO₄ and concentrated under reduced pressure to afford the title compound. ¹HNMR (400 MHz, CDCl₃) δ 7.53 (t, J=8.0 Hz, 1H), 7.37 (d, J=8.4 Hz, 1H), 7.02 (t, J=56 Hz, 1H), 1.39 (s, 12H).

Step 3. Methyl 6-(3-chloro-6-(difluoromethyl)-2-fluorophenyl)pyrazine-2-carboxylate: The reaction was conducted in two parallel vessels on the equivalent scale as specified. To a solution of 2-(3-chloro-6-(difluoromethyl)-2-fluorophenyl)-4,4,5,5-tetramethyl-1,3,2-dioxaborolane (127 g, 415 mmol), methyl 6-bromopyrazine-2-carboxylate (60.0 g, 276 mmol) and potassium fluoride (48.2 g, 829 mmol, 19.4 mL) in a mixture of dioxane (720 mL) and water (120 mL) under a nitrogen atmosphere was added 1,1'-bis(di-tert-butylphosphino)ferrocene palladium dichloride (11.3 g, 13.8 mmol). The reaction mixture was stirred at 120° C. for 12 h. The reaction mixtures from both reactions conducted in parallel were cooled to rt, combined, then concentrated under reduced pressure. The crude residue was suspended in EtOAc and the resulting mixture was filtered. The filtrate was washed with water, brine, dried over Na₂SO₄ and concentrated under reduced pressure to afford the title compound. ¹HNMR (400 MHz, CDCl₃) δ 9.36 (s, 1H), 8.96 (d, J=2.8 Hz, 1H), 7.65 (t, J=8.4 Hz, 1H), 8.56 (d, J=8.4 Hz, 1H), 6.99 (t, J=56 Hz, 1H), 4.06 (s, 3H).

Step 4. 6-(3-Chloro-6-(difluoromethyl)-2-fluorophenyl)pyrazine-2-carboxylic acid: To a solution of methyl 6-(3-chloro-6-(difluoromethyl)-2-fluorophenyl)pyrazine-2-carboxylate (350 g, 1.11 mol) in EtOH (1.75 L) at 10-20° C. was added aq. sodium hydroxide (2.10 μL, 2.10 mol, 1M aq.). The reaction mixture was stirred at rt for 30 min, then concentrated under reduced vacuum (to remove EtOH). The crude residue was extracted with MTBE. The organic layers were discarded, and the pH of the aq. layer was adjusted to 2-3 by addition of aq. 2N HCl. The resulting mixture was filtered, and the filter cake was dried to afford the title compound. ¹H NMR (400 MHz, DMSO-d₆) δ 13.9 (br s, 1H), 9.28 (s, 1H), 9.14 (s, 1H), 7.98 (t, J=8.0 Hz, 1H), 7.70 (d, J=8.4 Hz, 1H), 7.02 (t, J=56 Hz, 1H).

Intermediate AA-6b

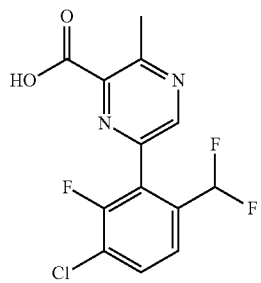 [SMILES: Cc1ncc(-c2c(C(F)F)ccc(Cl)c2F)nc1C(=O)O]

6-(3-Chloro-6-(difluoromethyl)-2-fluorophenyl)-3-methylpyrazine-2-carboxylic acid (Scheme AA)

Step 3. Methyl 6-(3-chloro-6-(difluoromethyl)-2-fluorophenyl)-3-methylpyrazine-2-carboxylate: To a solution of methyl 6-chloro-3-methylpyrazine-2-carboxylate (25.0 g, 134 mmol) and potassium phosphate (85.6 g, 403 mmol) in THF (500 mL) under a nitrogen atmosphere was added 1,1'-bis(di-tert-butylphosphino)ferrocene palladium dichloride (8.75 g, 10.7 mmol). The reaction mixture was heated to 70° C. and 2-(3-chloro-6-(difluoromethyl)-2-fluorophenyl)-4,4,5,5-tetramethyl-1,3,2-dioxaborolane (41.1 g, 134 mmol) was added. The resulting mixture was stirred at 70° C. for 15 h. The reaction mixture was cooled to rt, filtered and concentrated under reduced pressure. The crude residue was purified by silica gel chromatography (10:1 petroleum ether/EtOAc) to afford the title compound. MS: 331 [M+1]⁺. ¹H NMR (400 MHz, CDCl₃) δ 8.84 (d, J=3.1 Hz, 1H), 7.68-7.56 (m, 2H), 7.02 (t, J=55.3 Hz, 1H), 4.03 (d, J=3.5 Hz, 3H), 2.96 (s, 3H).

Step 4. 6-(3-chloro-6-(difluoromethyl)-2-fluorophenyl)-3-methylpyrazine-2-carboxylic acid: The title compound was prepared following procedures similar to those described above in Intermediate AA-6a, step 4. MS: 317 [M+1]⁺. ¹HNMR (400 MHz, CD₃OD) δ 8.86 (d, J=2.6 Hz, 1H), 7.86-7.77 (m, 1H), 7.65 (d, J=8.5 Hz, 1H), 7.04 (t, J=55.0 Hz, 1H), 2.92 (s, 3H).

Intermediate AB-6a

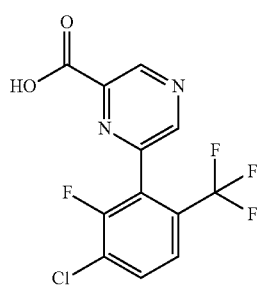 [SMILES: O=C(O)c1cncc(-c2c(C(F)(F)F)ccc(Cl)c2F)n1]

6-(3-Chloro-2-fluoro-6-(trifluoromethyl)phenyl)pyrazine-2-carboxylic acid (Scheme AB)

Step 1. Methyl 6-(trimethylation)pyrazine-2-carboxylate: To a solution of methyl 6-bromopyrazine-2-carboxylate (4.00 g, 18.4 mmol), hexamethyldistannane (9.27 g, 28.3 mmol) in toluene (50.0 mL) under a nitrogen atmosphere was added tetrakis(triphenylphosphine) palladium (1.07 g, 0.922 mmol). The reaction mixture was stirred at 80° C. for 12 h. The mixture was cooled to rt and concentrated under reduced pressure. The crude residue was purified by silica gel chromatography (5:1 petroleum ether/EtOAc) to afford the title compound. MS=303.0 [M+1]$^+$.

Step 2. 1-Chloro-2-fluoro-3-iodo-4-(trifluoromethyl)benzene: To a solution of 1-chloro-2-fluoro-4-(trifluoromethyl)benzene (250 g, 1.26 mol) in THF (2.25 L) under a nitrogen atmosphere, cooled to −78° C. was added n-butyllithium (757 mL, 1.89 mol, 2.5M solution in hexanes) drop-wise into the mixture. The reaction mixture was stirred at −78° C. for 1 h, then iodine (481 g, 1.89 mol) in THF (2.25 L) was added drop-wise into the mixture (duration of addition=2h). The reaction mixture was stirred at −78° C. for 1 h, then allowed to warm up to −20° C. The reaction mixture was quenched by the addition of aq. satd. NH$_4$Cl. The resulting mixture was extracted with EtOAc. The organic layers were combined and washed with water, brine, dried over Na$_2$SO$_4$ and concentrated under reduced pressure to afford the title compound. MS 324 [M+1]$^+$.

Step 3. Methyl 6-(3-chloro-2-fluoro-6-(trifluoromethyl)phenyl)pyrazine-2-carboxylate: To a mixture of methyl 6-(trimethylstannyl)pyrazine-2-carboxylate (1.11 g, 3.70 mmol), 1-chloro-2-fluoro-3-iodo-4-(trifluoromethyl)benzene (800 mg, 2.47 mmol) in toluene (20 mL) under a nitrogen atmosphere was added tris(dibenzylideneacetone)dipalladium (226 mg, 0.247 mmol) and 1,1'-bis(di-tert-butylphosphino)ferrocene (117 mg, 0.247 mmol). The reaction mixture was stirred at 120° C. for 18 h. The mixture was cooled to rt and concentrated under reduced pressure. The crude residue was purified by silica gel chromatography (1:0 to 5:1 petroleum ether/EtOAc) to afford the title compound. MS=335.2 [M+1]$^+$.

Step 4. 6-(3-Chloro-2-fluoro-6-(trifluoromethyl)phenyl)pyrazine-2-carboxylic acid: The title compound was prepared following procedures similar to those described above in Intermediate AA-6a, step 4. MS=321.2 [M+1]$^+$.

TABLE 1

The following compounds were prepared using procedures similar to those described for Intermediate AB-6a using the appropriate starting materials.

| Intermediate No. | Structure | Name | [M + H]$^+$ or [M + Na]$^+$ |
| --- | --- | --- | --- |
| AB-6b | | 6-(3-Chloro-6-(difluoromethoxy)-2-fluorophenyl)pyrazine-2-carboxylic acid | Calcd.: 319.0 Found: 319.2 |
| AB-6c | | 6-(3-Chloro-6-cyano-2-fluorophenyl)-3-methylpyrazine-2-carboxylic acid | Calcd.: 292.0 Found: 291.9 |
| AB-6d | | 6-(3-Chloro-2-fluoro-6-methylphenyl)pyrazine-2-carboxylic acid | Calcd.: 267.0 Found: 267.0 |

TABLE 1-continued

The following compounds were prepared using procedures similar to those described for Intermediate AB-6a using the appropriate starting materials.

| Intermediate No. | Structure | Name | [M + H]+ or [M + Na]+ |
|---|---|---|---|
| AB-6e | | 6-(3-Chloro-6-(difluoromethoxy)-2-fluorophenyl)-3-methylpyrazine-2-carboxylic acid | Calcd.: 333.0<br>Found: 333.0 |
| AB-6f | | 6-(3-Chloro-6-(difluoromethoxy)-2-fluorophenyl)-3-methoxypyrazine-2-carboxylic acid | Calcd.: 349.0<br>Found: 348.8 |

Intermediate AC-6a

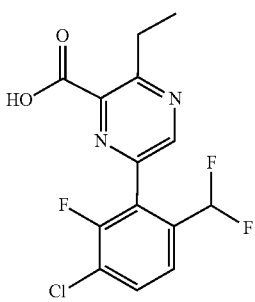 [SMILES: C=Cc1ncc(-c2c(C(F)F)ccc(Cl)c2F)nc1C(=O)O]

6-(3-Chloro-6-(difluoromethyl)-2-fluorophenyl)-3-ethylpyrazine-2-carboxylic acid (Scheme AC)

Step 1. Methyl 3-chloro-6-(3-chloro-6-(difluoromethyl)-2-fluorophenyl)pyrazine-2-carboxylate: To a solution of methyl 6-bromo-3-chloropyrazine-2-carboxylate (1.00 g, 3.98 mmol), 2-(3-chloro-6-(difluoromethyl)-2-fluorophenyl)-4,4,5,5-tetramethyl-1,3,2-dioxaborolane (1.22 g, 3.98 mmol) and potassium phosphate (2.53 g, 11.9 mmol) in THF (15 mL) under a nitrogen atmosphere was added 1,1'-bis(di-tert-butylphosphino)ferrocene palladium dichloride (518 mg, 0.795 mmol). The reaction mixture was heated to 40° C. for 1.5 h. The reaction mixture was cooled to rt then poured into a mixture of water and EtOAc. The layers were separated, and the aq. layer was extracted with EtOAc. The organic layers were combined and washed with brine, dried over $Na_2SO_4$, filtered and concentrated under reduced pressure. The crude residue was purified by silica gel chromatography (1:0 to 10:1 petroleum ether/EtOAc) to afford the title compound. MS: 351.0 [M+1]+.

Step 2. Methyl 6-(3-chloro-6-(difluoromethyl)-2-fluorophenyl)-3-ethylpyrazine-2-carboxylate: To a solution of methyl 3-chloro-6-(3-chloro-6-(difluoromethyl)-2-fluorophenyl)pyrazine-2-carboxylate (100 mg, 0.285 mmol) in toluene (4 mL) was added triethylaluminium (0.854 mL, 0.854 mmol, 1.0M in hexanes) and tetrakis(triphenylphosphine)palladium (32.9 mg, 28.0 μmol) at rt under a nitrogen atmosphere. The reaction mixture was stirred at 80° C. for 16 h, then cooled to rt and concentrated under reduced vacuum. The crude residue was dissolved in a mixture of water and EtOAc. The layers were separated, and the aq. layer was extracted with EtOAc. The organic layers were combined and washed with brine (20 mL), dried over $Na_2SO_4$, filtered and concentrated under reduced pressure. The crude residue was purified by preparatory-TLC (5:1 petroleum ether/EtOAc) to afford the title compound as a mixture with ethyl 6-(3-chloro-6-(difluoromethyl)-2-fluorophenyl)-3-ethylpyrazine-2-carboxylate. MS: 345.1 [M+1]+ and 359.0 [M+1]+.

Step 3. 6-(3-Chloro-6-(difluoromethyl)-2-fluorophenyl)-3-ethylpyrazine-2-carboxylic acid: The title compound was prepared following procedures similar to those described above in Intermediate AA-6a, step 4. aq. $Na_2SO_4$ MS: 331.0 [M+1]+.

TABLE 2

The following compound was prepared using procedures similar to those described for Intermediate AC-6a using the appropriate starting materials.

| Intermediate No. | Structure | Name | [M + H]⁺ or [M + Na]⁺ |
|---|---|---|---|
| AC-6b | 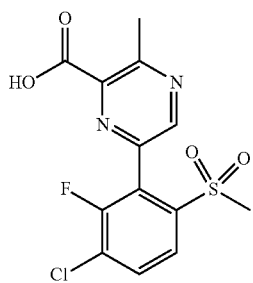 [SMILES: Cc1ncc(-c2c(S(C)(=O)=O)ccc(Cl)c2F)nc1C(=O)O] | 6-(3-Chloro-6-(difluoromethyl)-2-fluorophenyl)-3-vinylpyrazine-2-carboxylic acid | Calcd.: 329.0 Found: 328.9 |

Intermediate AD-10a 6-(3-Chloro-2-fluoro-6-(methylsulfonyl)phenyl)-3-methylpyrazine-2-carboxylic acid (Scheme AD)

Step 1 2-Bromo-4-chloro-3-fluoro-1-iodobenzene: To a mixture of 1-chloro-2-fluoro-4-iodobenzene (4 g, 15.6 mmol) in THF (50.0 mL) under a nitrogen atmosphere at −70° C. was added LDA (8.58 mL, 17.2 mmol, 2M in THF) drop-wise. The reaction mixture was stirred at −70° C. for 30 min, then 1,2-dibromo-1,1,2,2-tetrachloroethane (6.10 g, 18.7 mmol) in THF (10 mL) was added drop-wise. The resulting mixture was stirred at −70° C. for 20 min, then allowed to warm to 10° C. and stirred for an additional 1 h. The reaction mixture was quenched by the addition of aq. satd. NH₄Cl and water, then extracted with EtOAc. The combined organic layers were dried over Na₂SO₄, filtered and concentrated under reduced pressure. The crude residue was purified by silica gel chromatography (petroleum ether/EtOAc) to afford the title compound. ¹H NMR (400 MHz, CDCl₃) δ 7.11 (dd, J=8.4, 6.9 Hz, 1H), 7.60 (dd, J=8.6, 1.6 Hz, 1H).

Step 2 S-(2-Bromo-4-chloro-3-fluorophenyl) ethanethioate: To a solution of 2-bromo-4-chloro-3-fluoro-1-iodobenzene (5.00 g, 14.9 mmol) in toluene (30.0 mL) under a nitrogen atmosphere was added potassium thioacetate (2.55 g, 22.4 mmol), copper(I) iodide (284 mg, 1.49 mmol), and 1,10-phenanthroline (269 g, 1.49 mmol). The resulting mixture was stirred at 90° C. for 16 h. The reaction mixture was cooled to rt, filtered then diluted with water and extracted with EtOAc. The organic layers were combined and washed with brine, then dried over Na₂SO₄, filtered and concentrated under reduced pressure. The crude residue was purified by silica gel chromatography (petroleum ether/EtOAc) to afford the title compound. ¹H NMR (400 MHz, CDCl₃) δ 7.41 (dd, J=8.6, 7.0 Hz, 1H), 7.30 (dd, J=8.6, 1.6 Hz, 1H), 2.47 (s, 3H).

Step 3. (2-Bromo-4-chloro-3-fluorophenyl)(methyl)sulfane: To a solution of S-(2-bromo-4-chloro-3-fluorophenyl) ethanethioate (2.40 g, 8.46 mmol) in EtOH (10.0 mL) was added NaOH (2.5 mL, 25.4 mmol, 10M aq.), then iodomethane (4.81 g, 33.9 mmol). The reaction mixture was stirred at 15° C. for 10 min. The mixture was concentrated under reduced pressure (to remove EtOH), diluted with water, then the mixture was extracted with EtOAc. The organic layers were combined, dried over Na₂SO₄, filtered and concentrated under reduced pressure. The crude residue was purified by silica gel chromatography (petroleum ether/EtOAc) to afford the title compound. ¹H NMR (400 MHz, CDCl₃) δ 7.33 (dd, J=7.0, 8.6 Hz, 1H), 6.85 (dd, J=1.4, 8.8 Hz, 1H), 2.48 (s, 3H).

Step 4. 2-Bromo-4-chloro-3-fluoro-1-(methylsulfinyl)benzene: To a solution of (2-bromo-4-chloro-3-fluorophenyl)(methyl)sulfane (1.90 g, 7.44 mmol) in DCM (20 mL) was added mCPBA (2.57 g, 14.9 mmol). The reaction mixture was stirred at rt for 1 h, then quenched by the addition of added satd. aq. Na₂SO₃ (30 mL). The resulting mixture was stirred at rt for 30 min, then diluted with water and extracted with EtOAc. The organic layers were combined and washed with brine, dried over Na₂SO₄ and concentrated under reduced pressure. The crude residue was purified by silica gel chromatography (petroleum ether/EtOAc) to afford the title compound. ¹H NMR (400 MHz, CDCl₃) δ 7.72-7.67 (m, 1H), 7.65-7.59 (m, 1H), 2.84-2.79 (m, 3H).

Step 5. Methyl 6-(3-chloro-2-fluoro-6-(methylsulfinyl)phenyl)-3-methylpyrazine-2-carboxylate: To a solution of methyl 6-(trimethylstannyl)pyrazine-2-carboxylate (332 mg, 1.11 mmol) and 2-bromo-4-chloro-3-fluoro-1-(methylsulfinyl)benzene (200 mg, 0.737 mmol) in dioxane (3.0 mL) was added 1,1'-bis(di-tert-butylphosphino)ferrocene (34.9 mg, 74.0 D mol) and tris(dibenzylideneacetone)dipalladium (60 mg, 74 μmol). The reaction mixture was stirred under a nitrogen atmosphere at 90° C. for 15 h. The mixture was cooled to rt, filtered and concentrated under reduced pressure. The crude residue was purified by preparatory-TLC (1:1 petroleum ether/EtOAc) to afford the title compound. MS=328.9 [M+1]+.

Step 6. Methyl 6-(3-chloro-2-fluoro-6-(methylsulfonyl)phenyl)-3-methylpyrazine-2-carboxylate: To a solution of methyl 6-(3-chloro-2-fluoro-6-(methylsulfinyl)phenyl)pyrazine-2-carboxylate (40.0 mg, 0.122 mmol) in THF (0.5 mL) and water (0.100 mL) was added Oxone® (150 mg, 0.243 mmol). The resulting mixture was stirred at rt for 16 h. The mixture was diluted by the addition of EtOAc, filtered and concentrated under reduced pressure. The crude residue was purified by preparatory-TLC (1:1 petroleum ether/EtOAc) to afford the title compound. $^1$H NMR (400 MHz, CDCl$_3$) δ 9.35 (s, 1H), 8.92 (d, J=2.5 Hz, 1H), 8.01 (dd, J=1.5, 8.6 Hz, 1H), 7.75 (dd, J=6.9, 8.6 Hz, 1H), 4.03 (s, 3H), 3.41 (s, 3H).

Step 7. 6-(3-Chloro-2-fluoro-6-(methylsulfonyl)phenyl)-3-methylpyrazine-2-carboxylic acid: The title compound was prepared following procedures similar to those described above in Intermediate AA-6a, step 4. MS=330.9 [M+1]+.

Intermediate AE-5

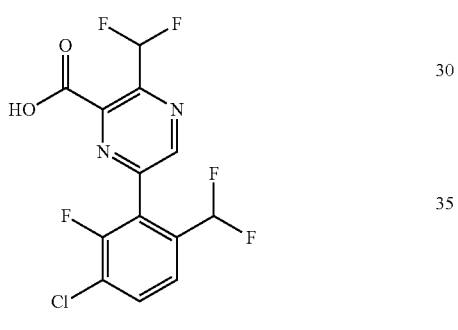

6-(3-Chloro-6-(difluoromethyl)-2-fluorophenyl)-3-(difluoromethyl)pyrazine-2-carboxylic acid (Scheme AE)

Step 1. tert-Butyl 6-(3-chloro-6-(difluoromethyl)-2-fluorophenyl)-3-vinylpyrazine-2-carboxylate: To a solution of 6-(3-chloro-6-(difluoromethyl)-2-fluorophenyl)-3-vinylpyrazine-2-carboxylic acid (700 mg, 2.13 mmol) in THF (15 mL) was added di-tert-butyl dicarbonate (697 mg, 3.19 mmol), triethylamine (0.594 mL, 4.26 mmol) and DMAP (78 mg, 0.64 mmol). The reaction mixture was stirred at rt for 2 h. The reaction mixture was quenched by the addition of satd. aq. NaHCO$_3$ and extracted with EtOAc. The organic layers were combined and dried over Na$_2$SO$_4$, filtered and concentrated under reduced pressure. The crude residue was purified by silica gel chromatography (0-15% EtOAc/petroleum ether) to afford the title compound. MS=385.0 [M+1]+.

Step 2. tert-Butyl 6-(3-chloro-6-(difluoromethyl)-2-fluorophenyl)-3-formylpyrazine-2-carboxylate: To a solution of tert-butyl 6-(3-chloro-6-(difluoromethyl)-2-fluorophenyl)-3-vinylpyrazine-2-carboxylate (150 mg, 0.390 mmol) in THF (4.0 mL) and water (0.5 mL) was added osmium tetroxide (20 mg/mL in water, 0.991 mL, 78.0 µmol) and sodium periodate (334 mg, 1.56 mmol). The mixture was stirred at rt for 2 h then quenched by the addition of added satd. aq. Na$_2$S$_2$O$_3$. The resulting mixture was stirred at rt for 15 min, then extracted with EtOAc. The organic layers were combined, dried over Na$_2$SO$_4$ and concentrated under reduced pressure. The crude residue was purified by silica gel chromatography (0-30% EtOAc/petroleum ether) to afford the title compound. MS=330.9 [M+1-56]+.

Step 3. tert-Butyl 6-(3-chloro-6-(difluoromethyl)-2-fluorophenyl)-3-(difluoromethyl)pyrazine-2-carboxylate: The title compound was prepared following procedures similar to those described above in Intermediate AA-6a, step 1. aq. MS=409.0 [M+1]+.

Step 4. 6-(3-Chloro-6-(difluoromethyl)-2-fluorophenyl)-3-(difluoromethyl)pyrazine-2-carboxylic acid: To a solution of tert-butyl 6-(3-chloro-6-(difluoromethyl)-2-fluorophenyl)-3-(difluoromethyl)pyrazine-2-carboxylate (190 mg, 0.465 mmol) in DCM (6.0 mL) was added TFA (2.0 mL). The reaction mixture was stirred at rt for 2 h, then concentrated under reduced pressure to afford the title compound. MS=352.9 [M+1]+.

Intermediate AF-4a

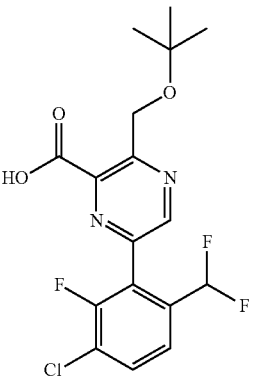 [SMILES: CC(C)(C)OCc1ncc(-c2c(C(F)F)ccc(Cl)c2F)nc1C(=O)O]

3-(tert-Butoxymethyl)-6-(3-chloro-6-(difluoromethyl)-2-fluorophenyl)pyrazine-2-carboxylic acid (Scheme AF)

Step 1. Methyl 3-(tert-butoxymethyl)-6-(3-chloro-6-(difluoromethyl)-2-fluorophenyl)pyrazine-2-carboxylate: A solution of 4,4'-di-tert-butyl-2,2'-bipyridine (38.2 mg, 0.142 mmol) and nickel(II) chloride ethylene glycol dimethyl ether complex (31.3 mg, 0.142 mmol) in THF (1.0 mL) was stirred at 35° C. for 30 min. Then, the mixture was concentrated under reduced pressure (to remove the THF). In a nitrogen-filled glovebox, dibasic potassium phosphate (744 mg, 4.27 mmol), methyl 3-chloro-6-(3-chloro-6-(difluoromethyl)-2-fluorophenyl)pyrazine-2-carboxylate (500 mg, 1.42 mmol), potassium (tert-butoxymethyl)trifluoroborate (553 mg, 2.85 mmol), [4,4'-Bis(1,1-dimethylethyl)-2,2'-bipyridine-N1,N1']bis[3,5-difluoro-2-[5-(trifluoromethyl)-2-pyridinyl-N]phenyl-C]Iridium(III) hexafluorophosphate (Ir(dFCF$_3$ppy)$_2$bpyPF$_6$, 160 mg, 0.142 mmol), 1,4-dioxane (10.0 mL) and DMA (2.0 mL) were added to the mixture. The resulting mixture was stirred for 72 h in front of a single 23 W CFL. The reaction mixture was poured into a mixture of water and EtOAc. The organic layer was separated and the aq. was extracted with EtOAc. The organic layers were combined and washed with brine, dried over Na$_2$SO$_4$ and concentrated under reduced pressure. The crude residue was purified by silica gel chromatography (0-20% EtOAc/petroleum ether) to afford the title compound. MS=403.1 [M+1]$^+$.

Step 2. 3-(tert-Butoxymethyl)-6-(3-chloro-6-(difluoromethyl)-2-fluorophenyl)pyrazine-2-carboxylic acid: The title compound was prepared following procedures similar to those described above in Intermediate AA-6a, step 4. aq. MS=389.1 [M+1]$^+$.

Step 2. 3-(3-Chloro-6-(difluoromethyl)-2-fluorophenyl)-5-(methoxycarbonyl)pyridine-1-oxide: To a solution of methyl 5-(3-chloro-6-(difluoromethyl)-2-fluorophenyl)nicotinate (50.0 mg, 0.158 mmol) in DCM (1.00 mL) at rt was added mCPBA (42.6 mg, 0.190 mmol). The reaction mixture was stirred at rt for 24 h. To the reaction mixture was added water and DCM. The layers were separated, and the aq. layer was extracted with DCM. The organic layers were combined and washed with brine, dried over Na$_2$SO$_4$, and concentrated under reduced pressure. The crude residue was purified by reversed-phase preparatory-HPLC (C18 stationary

TABLE 3

The following compound was prepared using procedures similar to those described for Intermediate AF-4a using the appropriate starting materials.

| Intermediate No. | Structure | Name | [M + H]$^+$ or [M + Na]$^+$ |
|---|---|---|---|
| AF-4b | 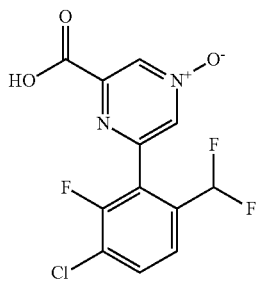 [SMILES: O=C(O)c1c[n+]([O-])cc(-c2c(C(F)F)ccc(Cl)c2F)n1] | 6-(3-Chloro-6-(difluoromethyl)-2-fluorophenyl)-3-(methoxymethyl)pyrazine-2-carboxylic acid | Calcd.: 347.0<br>Found: 347.0 |

Intermediate AG-5a

3-Carboxy-5-(3-chloro-6-(difluoromethyl)-2-fluorophenyl)pyridine 1-oxide (Scheme AG)

Step 1. Methyl 5-(3-chloro-6-(difluoromethyl)-2-fluorophenyl) nicotinate: To a solution of methyl 5-bromonicotinate (50.0 mg, 0.231 mmol), 2-(3-chloro-6-(difluoromethyl)-2-fluorophenyl)-4,4,5,5-tetramethyl-1,3,2-dioxaborolane (85.0 mg, 0.278 mmol), potassium phosphate (147 mg, 0.694 mmol) in THF (1.00 mL) and water (0.500 mL) was added 1,1'-bis(di-tert-butylphosphino)ferrocene-palladium dichloride (15.1 mg, 23.0 μmol). The reaction mixture was then heated at 80° C. for 30 min in a microwave reactor, then concentrated under reduced pressure. The crude residue was purified by silica gel chromatography (0-50% EtOAc/petroleum ether) to afford the title compound. MS=315.9 [M+1]$^+$.

phase, water(0.1% TFA)-ACN Begin B 27%, End B 57%) to afford the title compound. MS=332.0 [M+1]$^+$.

Step 3. 3-Carboxy-5-(3-chloro-6-(difluoromethyl)-2-fluorophenyl)pyridine 1-oxide: The title compound was prepared following procedures similar to those described above in Intermediate AA-6a, step 4. MS=318.0 [M+1]$^+$.

Intermediate AH-8

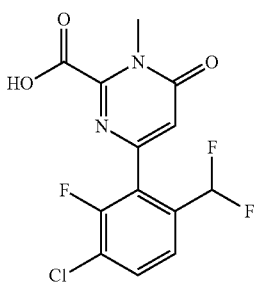 [SMILES: Cn1c(C(=O)O)nc(-c2c(C(F)F)ccc(Cl)c2F)cc1=O]

4-(3-chloro-6-(difluoromethyl)-2-fluorophenyl)-1-methyl-6-oxo-1,6-dihydropyrimidine-2-carboxylic acid (Scheme AH)

Step 1. 4-Chloro-6-((4-methoxybenzyl)oxy)-2-(methylthio)pyrimidine: To a solution of 4,6-dichloro-2-(methylthio)pyrimidine (10.0 g, 51.3 mmol) and (4-methoxyphenyl)methanol (7.08 g, 51.3 mmol) in DMF (150 mL) under a nitrogen atmosphere at 0° C. was added sodium hydride (60% dispersion in mineral oil, 2.05 g, 51.3 mmol) portion-wise. The resulting mixture was stirred at 0° C. for 1 h and rt for 2 h. The reaction mixture was quenched by addition of satd. aq. NH$_4$Cl then extracted with EtOAc. The organic layers were combined and washed with water and brine, then dried over Na$_2$SO$_4$, filtered and concentrated under reduced pressure. The crude residue was purified by silica gel chromatography (0-5% EtOAc/petroleum ether) to afford the title compound. MS=297.0 [M+1]$^+$.

Step 2. 4-(3-Chloro-6-(difluoromethyl)-2-fluorophenyl)-6-((4-methoxybenzyl)oxy)-2-(methylthio)pyrimidine: To a solution of 2-(3-chloro-6-(difluoromethyl)-2-fluorophenyl)-4,4,5,5-tetramethyl-1,3,2-dioxaborolane (3.36 g, 11.0 mmol), 4-chloro-6-((4-methoxybenzyl)oxy)-2-(methylthio)pyrimidine (2.50 g, 8.42 mmol) and potassium phosphate (5.36 g, 25.3 mmol) in toluene (40.0 mL) and water (8.00 mL) was added methanesulfonato(2-dicyclohexylphosphino-2',6'-dimethoxy-1,1'-biphenyl)(2'-methylamino-1,1'-biphenyl-2-yl)palladium(II) dichloromethane adduct (SPhos Pd G4, 0.657 g, 0.842 mmol) under a nitrogen atmosphere. The reaction mixture was stirred at 80° C. for 14 h. The reaction mixture was concentrated under reduced vacuum. To the reaction mixture was added water and it was extracted with EtOAc. The organic layers were combined and dried over Na$_2$SO$_4$ and concentrated under reduced vacuum. The crude residue was purified by silica gel chromatography (0-100% EtOAc/petroleum ether) to afford the title compound. MS=441.1 [M+1]$^+$.

Step 3. 4-(3-Chloro-6-(difluoromethyl)-2-fluorophenyl)-6-((4-methoxybenzyl)oxy)-2-(methylsulfonyl)pyrimidine: To a solution of 4-(3-chloro-6-(difluoromethyl)-2-fluorophenyl)-6-((4-methoxybenzyl)oxy)-2-(methylthio)pyrimidine (2.60 g, 5.90 mmol) in a mixture of THF (100 mL) and water (25 mL) was added Oxone® (36.3 g, 59.0 mmol). The reaction mixture was stirred at rt for 14 h. The reaction mixture was diluted with EtOAc. The organic layer was washed with water and brine then dried over Na$_2$SO$_4$, filtered and concentrated under reduced vacuum. The crude residue was purified by silica gel chromatography (25-100% EtOAc/petroleum ether) to afford the title compound. MS=473.1 [M+1]$^+$.

Step 4. 4-(3-Chloro-6-(difluoromethyl)-2-fluorophenyl)-6-((4-methoxybenzyl)oxy)pyrimidine-2-carbonitrile: To a solution of 4-(3-chloro-6-(difluoromethyl)-2-fluorophenyl)-6-((4-methoxybenzyl)oxy)-2-(methylsulfonyl)pyrimidine (1.90 g, 4.02 mmol) in a mixture of ACN (20.0 mL) and DMSO (1.00 mL) was added sodium cyanide (0.985 g, 20.1 mmol). The reaction mixture was stirred at rt for 14 h then diluted with EtOAc. The organic layer was washed with water and brine, then dried over Na$_2$SO$_4$, filtered and concentrated under reduced vacuum. The crude residue was purified by silica gel chromatography (0-15% EtOAc/petroleum ether) to afford the title compound. MS=420.1 [M+1]$^+$.

Step 5. Methyl 4-(3-chloro-6-(difluoromethyl)-2-fluorophenyl)-6-hydroxypyrimidine-2-carboxylate: A solution of 4-(3-chloro-6-(difluoromethyl)-2-fluorophenyl)-6-((4-methoxybenzyl)oxy)pyrimidine-2-carbonitrile (900 mg, 2.14 mmol) in a 4M methanolic solution of HCl (15 mL) was stirred at rt for 20 h. To the reaction mixture was added triethylamine to quench the acid, then it was concentrated under reduced pressure. The crude residue was purified by reversed-phase preparatory-HPLC (C18 stationary phase, water(0.1% TFA)-ACN Begin B 41%, End B 62%) to afford the title compound. MS=333.0 [M+1]$^+$.

Step 6. Methyl 4-(3-chloro-6-(difluoromethyl)-2-fluorophenyl)-1-methyl-6-oxo-1,6-dihydropyrimidine-2-carboxylate: To a solution of methyl 4-(3-chloro-6-(difluoromethyl)-2-fluorophenyl)-6-oxo-1,6-dihydropyrimidine-2-carboxylate (25.0 mg, 75.0 µmol) in a mixture of DCM (1.0 mL) and MeOH (0.1 mL) was added (trimethylsilyl)diazomethane (2.0 M solution in diethyl ether, 0.400 mL, 0.800 mmol) at rt. After the addition was complete, the reaction mixture was stirred for 1 h, then quenched with acetic acid (several drops) and concentrated under reduced pressure. The residue was purified by preparatory-TLC (3:1 petroleum ether/EtOAc) to afford the title compound. MS=347.0 [M+1]$^+$.

Step 7. 4-(3-Chloro-6-(difluoromethyl)-2-fluorophenyl)-1-methyl-6-oxo-1,6-dihydropyrimidine-2-carboxylic acid: The title compound was prepared following procedures similar to those described above in Intermediate AA-6a, step 4. MS=332.9 [M+1]$^+$.

Intermediate AI-3a

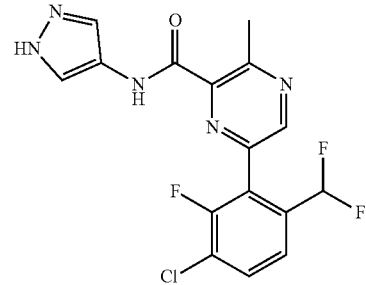 [SMILES: Cc1ncc(-c2c(C(F)F)ccc(Cl)c2F)nc1C(=O)Nc1cn[nH]c1]

6-(3-Chloro-6-(difluoromethyl)-2-fluorophenyl)-3-methyl-N-(1H-pyrazol-4-yl)pyrazine-2-carboxamide
(Scheme AI)

To a solution of 6-(3-chloro-6-(difluoromethyl)-2-fluorophenyl)pyrazine-2-carboxylic acid (1.50 g, 4.96 mmol) and 1H-pyrazol-4-amine (0.618 g, 7.43 mmol) in DCM (20.0 mL) at 0° C. was added 1-propanephosphonic anhydride (5.90 mL, 9.91 mmol) followed by DIEA (3.46 mL, 19.8 mmol). The reaction mixture was allowed to warm to rt and stirred for 2 h. The reaction mixture was diluted with satd. aq. sodium carbonate and extracted with DCM. The organic layers were combined and dried over magnesium sulfate, filtered and concentrated under reduced pressure. The crude residue was purified by silica gel chromatography (0 to 100% EtOAc/hexanes) to afford the title compound. MS 382.0 [M+1]$^+$.

TABLE 4

The following compound was prepared using procedures similar to those described for Intermediate AI-3a using the appropriate starting materials.

| Intermediate No. | Structure | Name | [M + H]+ or [M + Na]+ |
|---|---|---|---|
| AI-3c |  | 6-(3-Chloro-6-(difluoromethoxy)-2-fluorophenyl)-N-(1H-pyrazol-4-yl)pyrazine-2-carboxamide | Calcd.: 368.1 Found: 368.0 |

Intermediate AJ-7a

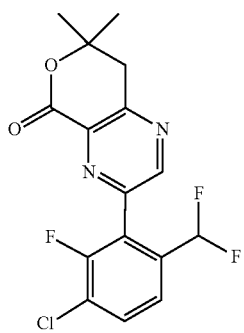 [SMILES: CC1(C)Cc2ncc(-c3c(C(F)F)ccc(Cl)c3F)nc2C(=O)O1]

3-(3-Chloro-6-(difluoromethyl)-2-fluorophenyl)-7,7-dimethyl-7,8-dihydro-5H-pyrano[3,4-b]pyrazin-5-one (Scheme AJ)

Step 1. Methyl 3-amino-6-(3-chloro-6-(difluoromethyl)-2-fluorophenyl)pyrazine-2-carboxylate: The title compound was prepared following procedures similar to those described above in Intermediate AA-6b, step 1. MS=332.1 [M+1]+.

Step 2. Methyl 3-bromo-6-(3-chloro-6-(difluoromethyl)-2-fluorophenyl)pyrazine-2-carboxylate: To a solution of copper(II) bromide (1.62 g, 7.24 mmol) and tert-butyl nitrite (0.746 g, 7.24 mmol) in ACN (20.0 mL) heated at 70° C. was added methyl 3-amino-6-(3-chloro-6-(difluoromethyl)-2-fluorophenyl)pyrazine-2-carboxylate (1.20 g, 3.62 mmol). The reaction mixture was stirred at 70° C. for 16 h. The reaction mixture was cooled to rt, then water was added. The resulting mixture was extracted with EtOAc. The organic layers were combined and dried over Na$_2$SO$_4$, filtered, and concentrated under reduced pressure. The crude residue was purified by silica gel chromatography (0 to 15% EtOAc/petroleum ether) to afford the title compound. MS=396.9 [M+1]+.

Step 3. 3-Bromo-6-(3-chloro-6-(difluoromethyl)-2-fluorophenyl)pyrazine-2-carboxylic acid: The title compound was prepared following procedures similar to those described above in Intermediate AA-6a, step 4. $^1$H NMR (400 MHz, CD$_3$OD) δ 8.74 (d, J=2.4 Hz, 1H), 7.80 (t, J=7.8 Hz, 1H), 7.62 (d, J=8.6 Hz, 1H), 6.95 (t, J=54.8 Hz, 1H). MS=380.8, 382.8 [M+1]+.

Step 4. 3-(3-Chloro-6-(difluoromethyl)-2-fluorophenyl)-7,7-dimethyl-7,8-dihydro-5H-pyrano[3,4-b]pyrazin-5-one: A solution of 3-bromo-6-(3-chloro-6-(difluoromethyl)-2-fluorophenyl)pyrazine-2-carboxylic acid (30 mg, 0.079 mmol), 2,2-dimethyloxirane (11 mg, 0.16 mmol), zinc (10 mg, 0.16 mmol), sodium iodide (2.4 mg, 0.016 mmol), 4,4'-bipyridine (1.2 mg, 7.9 μmol), triethylamine hydrochloride (11 mg, 0.079 mmol), nickel(II) iodide (2.5 mg, 7.9 μmol) and pyridine (1.3 μL, 0.016 mmol) in DMPU (1.0 mL) was stirred at rt for 12 h. The mixture was concentrated under reduced pressure and purified by reversed-phase preparatory-HPLC (C18 stationary phase, water(0.1% TFA)-ACN Begin B 33%, End B 63%) to afford the title compound. MS=357.0 [M+1]+.

Intermediate AK-4a

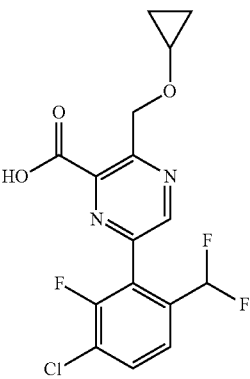 [SMILES: O=C(O)c1nc(-c2c(C(F)F)ccc(Cl)c2F)cnc1COC1CC1]

6-(3-Chloro-6-(difluoromethyl)-2-fluorophenyl)-3-(cyclopropoxymethyl)pyrazine-2-carboxylic acid (Scheme AK)

Step 1. Methyl 3-(bromomethyl)-6-(3-chloro-6-(difluoromethyl)-2-fluorophenyl) pyrazine-2-carboxylate: To a solution of methyl 6-(3-chloro-6-(difluoromethyl)-2-fluorophenyl)-3-methylpyrazine-2-carboxylate (20 mg, 0.060 mmol), NBS (12 mg, 0.067 mmol) in CCl$_4$ (1.0 mL) was added benzoyl peroxide (2.9 mg, 0.012 mmol). The mixture was stirred at 80° C. for 8 h. The reaction mixture was concentrated under reduced pressure to afford the title compound. MS=410.9 [M+1]$^+$.

Step 2. 6-(3-Chloro-6-(difluoromethyl)-2-fluorophenyl)-3-(cyclopropoxymethyl)pyrazine-2-carboxylic acid: To a solution of cyclopropanol (14 mg, 0.24 mmol) in THF (0.5 mL) cooled to 0° C. was added sodium hydride (60% in dispersion oil, 5.3 mg, 0.22 mmol) and the mixture was stirred at rt for 30 min. Then, a solution of methyl 3-(bromomethyl)-6-(3-chloro-6-(difluoromethyl)-2-fluorophenyl) pyrazine-2-carboxylate (30 mg, 0.073 mmol) in THF (0.8 mL) was added to the reaction mixture. The resulting mixture was stirred at rt for 12 h. To the reaction mixture was added satd. aq. NH$_4$Cl and the mixture was extracted with EtOAc. The organic layers were combined and washed with brine, dried over Na$_2$SO$_4$, filtered and concentrated under reduced pressure. The crude residue was purified by reversed-phase preparatory-HPLC (C18 stationary phase, water (0.1% TFA)-ACN Begin B 42% End B 72%) to afford the title compound. MS=372.9 [M+1]$^+$.

Intermediate AL-5a

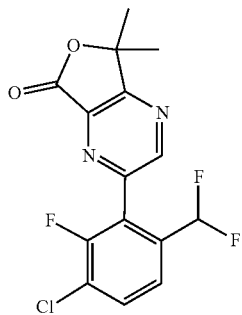 [SMILES: CC1(C)OC(=O)c2nc(-c3c(C(F)F)ccc(Cl)c3F)cnc21]

3-(3-Chloro-6-(difluoromethyl)-2-fluorophenyl)-7,7-dimethylfuro[3,4-b]pyrazin-5(7H)-one (Scheme AL)

Step 1. 6-(3-Chloro-6-(difluoromethyl)-2-fluorophenyl)-3-(methoxycarbonyl)pyrazine-2-carboxylic acid: To a solution of 3-bromo-6-(3-chloro-6-(difluoromethyl)-2-fluorophenyl)pyrazine-2-carboxylic acid (300 mg, 0.786 mmol) and DIEA (0.28 mL, 1.6 mmol) in MeOH (10.0 mL) under a nitrogen atmosphere was added 1,1'-bis(di-tert-butylphosphino)ferrocene palladium dichloride (57.5 mg, 79.0 mol). The reaction mixture was stirred at 50° C. under an atmosphere of CO (50 psi) for 4 h. The mixture was cooled to rt and filtered then the filtrate was purified by preparatory-TLC (SiO$_2$, 20% methanol/DCM) to afford the title compound. MS=360.9 [M+1]$^+$.

Step 2. 6-(3-Chloro-6-(difluoromethyl)-2-fluorophenyl)-3-(2-hydroxypropan-2-yl)pyrazine-2-carboxylic acid: To a solution of 6-(3-chloro-6-(difluoromethyl)-2-fluorophenyl)-3-(methoxycarbonyl)pyrazine-2-carboxylic acid (60 mg, 0.17 mmol) in THF (1.0 mL) cooled to 0° C. was added methylmagnesium chloride (0.055 mL, 0.17 mmol). The mixture was stirred at 0° C. for 5 min then quenched by addition of satd. aq. NH$_4$Cl. The resulting mixture was diluted by addition of ACN (3 mL) and filtered, then the filtrate was purified by reversed-phase preparatory-HPLC (C18 stationary phase, water(0.1% TFA)-ACN, Begin B 45%, End B 65%) to afford the title compound. MS=360.9 [M+1]$^+$.

Step 3. 3-(3-Chloro-6-(difluoromethyl)-2-fluorophenyl)-7,7-dimethylfuro[3,4-b]pyrazin-5(7H)-one: To a solution of 6-(3-chloro-6-(difluoromethyl)-2-fluorophenyl)-3-(2-hydroxypropan-2-yl)pyrazine-2-carboxylic acid (40 mg, 0.11 mmol) in DMF (0.50 mL) was added EDC (21 mg, 0.11 mmol) and pyridine (0.050 mL). The reaction mixture was stirred at rt for 16 h. The mixture was diluted by the addition of EtOAc, then washed with water and brine. The organic layer was dried over Na$_2$SO$_4$, filtered and concentrated under reduced pressure. The crude residue was purified by preparatory-TLC (SiO$_2$, 1:1 EtOAc/petroleum ether) to afford the title compound. MS=343.1 [M+1]$^+$.

TABLE 5

The following compound was prepared using procedures similar to those described for Intermediate AL-5a using the appropriate starting materials.

| Intermediate No. | Structure | Name | [M + H]$^+$ or [M + Na]$^+$ |
|---|---|---|---|
| AL-5b | (structure shown) | 3-(3-Chloro-6-(difluoromethyl)-2-fluorophenyl)furo[3,4-b]pyrazin-5(7H)-one-7,7-d2 | Calcd.: 317.0 Found: 317.1 |

Intermediate AM-3a

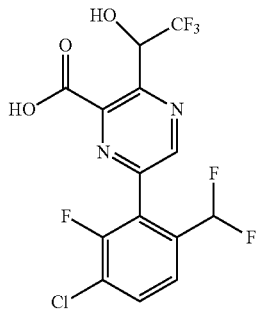 [SMILES: O=C(O)c1nc(-c2c(C(F)F)ccc(Cl)c2F)cnc1C(O)C(F)(F)F]

6-(3-Chloro-6-(difluoromethyl)-2-fluorophenyl)-3-(2,2,2-trifluoro-1-hydroxyethyl)pyrazine-2-carboxylic acid (Scheme AM)

Step 1: tert-Butyl 6-(3-chloro-6-(difluoromethyl)-2-fluorophenyl)-3-(2,2,2-trifluoro-1-hydroxyethyl)pyrazine-2-carboxylate: To a solution of tert-butyl 6-(3-chloro-6-(difluoromethyl)-2-fluorophenyl)-3-formylpyrazine-2-carboxylate (130 mg, 0.336 mmol) in 1,2-dimethoxyethane (6.000 mL) was added trimethylamine N-oxide (25.2 mg, 0.336 mmol) and (trifluoromethyl)trimethylsilane (143 mg, 1.01 mmol). The reaction mixture was stirred at rt for 14 h under an atmosphere of nitrogen. To the reaction mixture was added water then the mixture was extracted with EtOAc. The organic layers were combined and dried over $Na_2SO_4$, filtered and concentrated under reduced pressure. The crude residue was purified by silica gel chromatography (0 to 12% EtOAc/petroleum ether) to afford the title compound. MS=457.0 [M+1]+.

Step 2: 6-(3-Chloro-6-(difluoromethyl)-2-fluorophenyl)-3-(2,2,2-trifluoro-1-hydroxyethyl)pyrazine-2-carboxylic acid: The title compound was prepared following procedures similar to those described above in Intermediate AE-5, step 4. MS=400.8 [M+1]+.

Intermediate AN-7

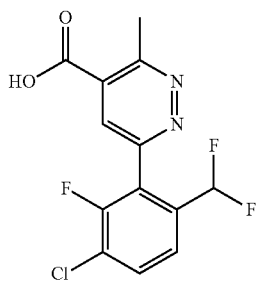 [SMILES: Cc1nnc(-c2c(C(F)F)ccc(Cl)c2F)cc1C(=O)O]

6-(3-chloro-6-(difluoromethyl)-2-fluorophenyl)-3-methylpyridazine-4-carboxylic acid (Scheme AN)

Step 1. Ethyl 3-methyl-6-oxo-1,4,5,6-tetrahydropyridazine-4-carboxylate: To a solution of diethyl 2-acetylsuccinate (1.00 g, 4.62 mmol) in EtOH (5.0 mL) was added hydrazine hydrate (0.272 g, 4.62 mmol). The reaction mixture was stirred at 80° C. for 1 h. The reaction mixture was cooled to rt and concentrated under reduced pressure. The crude residue was purified by silica gel chromatography (0 to 60% EtOAc/petroleum ether) to afford the title compound. MS=185.1 [M+1]+.

Step 2. Ethyl 3-methyl-6-oxo-1,6-dihydropyridazine-4-carboxylate: To a solution of ethyl 3-methyl-6-oxo-1,4,5,6-tetrahydropyridazine-4-carboxylate (100 mg, 0.543 mmol) in AcOH (5.0 mL) was added bromine (174 mg, 1.09 mmol). The reaction mixture was stirred at rt for 15 h. The reaction mixture was diluted with water and concentrated under reduced pressure to afford the title compound. MS=183.0 [M+1]+.

Step 3. Ethyl 6-bromo-3-methylpyridazine-4-carboxylate: A mixture of ethyl 3-methyl-6-oxo-1,6-dihydropyridazine-4-carboxylate (99.0 mg, 0.543 mmol) and phosphorus(V) oxybromide (1.00 g, 3.49 mmol) was stirred under a nitrogen atmosphere at 80° C. for 15 h. The reaction mixture was cooled to rt then poured into ice-cooled water. The resulting mixture was stirred for 1 h, then satd. aq. $NaHCO_3$ solution was added (to adjust the pH of the mixture to ~7). The mixture was extracted with EtOAc. The organic layers were combined and washed with satd. brine, dried over $Na_2SO_4$, filtered and concentrated under reduced pressure. The crude residue was purified by reversed-phase preparatory-HPLC (C18 stationary phase, water (0.2% TFA)-ACN gradient) to afford the title compound. MS=245.0, 247.0 [M+1]+.

Step 4. Ethyl 6-(3-chloro-6-(difluoromethyl)-2-fluorophenyl)-3-methylpyridazine-4-carboxylate: To a solution of ethyl 6-bromo-3-methylpyridazine-4-carboxylate (35 mg, 0.14 mmol), 2-(3-chloro-6-(difluoromethyl)-2-fluorophenyl)-4,4,5,5-tetramethyl-1,3,2-dioxaborolane (130 mg, 0.430 mmol) and [1,1'-bis(di-tert-butylphosphino)ferrocene]dichloropalladium(II) (19 mg, 0.029 mmol) in toluene (1.5 mL) and water (0.3 mL) under a nitrogen atmosphere was added cesium carbonate (140 mg, 0.430 mmol). The reaction vessel was sealed and heated in a microwave at 100° C. for 1 h. The reaction mixture was cooled to rt then filtered and concentrated under reduced pressure. The crude residue was purified by preparatory-TLC ($SiO_2$, 1:4 EtOAc/petroleum ether) to afford the title compound. MS=345.3 [M+1]+.

Step 5. 6-(3-Chloro-6-(difluoromethyl)-2-fluorophenyl)-3-methylpyridazine-4-carboxylic acid: The title compound was prepared following procedures similar to those described above in Intermediate AA-6a, step 4. MS=316.9 [M+1]+.

Intermediate BA-1a

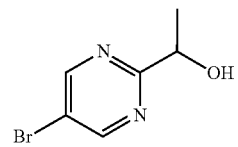

1-(5-Bromopyrimidin-2-yl)ethan-1-ol (Scheme BA)

Step 1. 1-(5-Bromopyrimidin-2-yl)ethan-1-one: To a solution of methyl 5-bromo-4-methylpyrimidine-2-carboxylate (1.00 g, 4.33 mmol) in THF (43 mL) cooled to −78° C. was added methylmagnesium bromide (4.33 mL, 4.33 mmol) in one portion and the mixture was stirred at −78° C. for 30 min. The reaction mixture was quenched by the addition of satd. aq. NH$_4$Cl then the mixture was extracted with EtOAc. The organic layers were combined and washed with brine, dried over Na$_2$SO$_4$, filtered and concentrated under reduced pressure. The crude residue was purified by silica gel column chromatography (EtOAc/hexanes) to afford the title compound. MS=215.0, 217.0 [M+1]$^+$ Step 2. 1-(5-Bromopyrimidin-2-yl)ethan-1-ol: To a solution of 1-(5-bromo-4-methylpyrimidin-2-yl)ethan-1-one (550 mg, 2.56 mmol) in 2-propanol (35.0 mL) cooled to 0° C. was added sodium borohydride (97.0 mg, 2.56 mmol) and the mixture was stirred at 0° C. for 1 h. To the mixture was added satd. aq. NH$_4$Cl and the mixture was extracted with DCM. The organic layers were combined and washed with brine, dried over Na$_2$SO$_4$, filtered and concentrated under reduced pressure. The crude residue was purified by silica gel column chromatography (EtOAc/hexanes) to afford the title compound. MS=217.0, 219.0 [M+H]$^+$

TABLE 6

The following compound was prepared using procedures similar to those described in Intermediate BA-1a using the appropriate starting materials.

| Intermediate No. | Structure | Name | [M + H]$^+$ or [M + Na]$^+$ |
|---|---|---|---|
| BA-1b (MT) | | 1-(5-Bromopyrimidin-2-yl)ethan-1-ol | Calcd.: 203.0, 205.0<br>Found: 208.0 |

Intermediate BA-1c

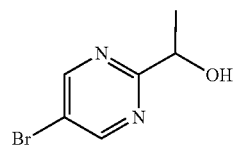

1-(5-Bromo-3-fluoropyridin-2-yl)ethanol (Scheme BA)

Step 1. 1-(5-Bromo-3-fluoropyridin-2-yl)ethanone: To a solution of 5-bromo-3-fluoropicolinonitrile (2.0 g, 10 mmol) in toluene (30 mL) was added methylmagnesium bromide 6.6 mL, 20 mmol, 3M in THF) at 0° C. The reaction mixture was stirred at 0° C. for 1 h, then quenched by the addition of water and extracted with EtOAc. The organic layers were combined and washed with brine, dried over Na$_2$SO$_4$, filtered and concentrated under reduced pressure. The crude residue was purified by silica gel chromatography (0 to 30% EtOAc/petroleum ether) to afford the title compound. MS=217.9, 219.9 [M+1]$^+$.

Step 2. 1-(5-Bromo-3-fluoropyridin-2-yl)ethanol: The title compound was prepared in a similar fashion as described for Intermediate BA-1a. MS=219.9, 221.9 [M+1]$^+$.

Intermediate BB-2a

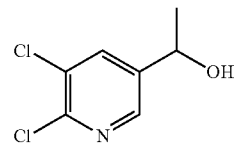

1-(5,6-Dichloropyridin-3-yl)ethan-1-ol (Scheme BB)

To a solution of 5,6-dichloronicotinaldehyde (300 mg, 1.71 mmol) in THF (3.0 mL) under a nitrogen atmosphere, cooled to 0° C. was added methylmagnesium bromide (0.852 mL, 2.56 mmol, 3.0M solution in diethyl ether) drop-wise over 2 h. The mixture was stirred at 0° C. for 30 min. The reaction mixture was quenched by the addition of satd. aq. NH$_4$Cl and extracted with EtOAc. The organic layers were combined and washed with brine, dried over Na$_2$SO$_4$, and concentrated under reduced pressure. The crude residue was purified by silica gel chromatography (0-60% EtOAc/hexanes) to afford the title compound. MS=191.9 [M+1]$^+$.

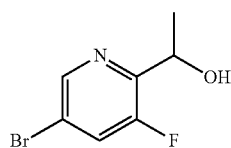

TABLE 7

The following compounds were prepared using procedures similar to those described for Intermediate BB-2a using the appropriate starting materials.

| Intermediate No. | Structure | Name | [M + H]+ or [M + Na]+ |
|---|---|---|---|
| BB-2b (DH) | | 1-(5-Chloro-6-methylpyrazin-2-yl)ethan-1-ol | Calcd.: 173.0<br>Found: 173.0 |
| BB-2c (SL) | | 1-(5-Chloro-6-fluoropyrazin-2-yl)ethan-1-ol | Calcd.: 176.0<br>Found: 175.9 |
| BB-2d (AO) | | 1-(5-Bromothiazol-2-yl)ethanol | $^1$HNMR (CDCl$_3$, 500 MHz) δ 7.60 (d, J = 6.0 Hz, 1H), 5.02-5.19 (m, 1H), 1.60-1.66 ppm (m, 3H) |
| BB-2e (AO) | | 1-(4-Bromo-2-methylphenyl)ethanol | Calcd.: 215.0<br>Found: 214.9 |

Intermediate BC-2a

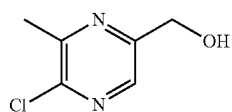

(5-Chloro-6-methylpyrazin-2-yl)methanol (Scheme BC)

To a solution of 5-chloro-6-methylpyrazine-2-carbaldehyde (2.00 g, 12.8 mmol) in THF (10.0 mL) was added sodium borohydride (0.580 g, 15.3 mmol). The reaction mixture was stirred at rt for 30 min. The reaction mixture was quenched by the addition of acetone, then water was added and the mixture was extracted with EtOAc. The organic layers were combined and washed with brine, dried over Na$_2$SO$_4$, filtered and concentrated under reduced pressure. The crude residue was purified by silica gel chromatography (0-50% EtOAc/petroleum ether) to afford the title compound. MS=158.9 [M+1]1.

TABLE 8

The following compounds were prepared using procedures similar to those described for Intermediate BC-2a using the appropriate starting materials.

| Intermediate No. | Structure | Name | [M + H]+ or [M + Na]+ |
|---|---|---|---|
| BC-2c (SL) | 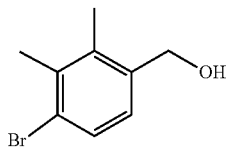 | (4-Bromo-2,3-dimethylphenyl)methanol | Calcd.: 215.0, 217.0 |

TABLE 8-continued

The following compounds were prepared using procedures similar to those described for Intermediate BC-2a using the appropriate starting materials.

| Intermediate No. | Structure | Name | [M + H]⁺ or [M + Na]⁺ |
|---|---|---|---|
| BC-2f (SL) | | 3-Chloro-6,7-dihydro-5H-cyclopenta[c]pyridin-7-ol | Calcd.: 170.0<br>Found: 169.9 |
| BC-2k (AO) | | (2-Chloro-4-methylpyrimidin-5-yl)methanol | Calcd.: 159.0<br>Found: 159.0 |

Intermediate BD-2a

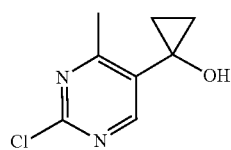

1-(2-Chloro-4-methylpyrimidin-5-yl)cyclopropan-1-ol (Scheme BD)

To a solution of methyl 2-chloro-4-methylpyrimidine-5-carboxylate (1.0 g, 5.4 mmol) in diethylether (27 mL) cooled to −78° C. under an atmosphere of nitrogen was added titanium(IV) isopropoxide (1.6 mL, 5.4 mmol), then ethylmagnesium bromide (3M in diethyl ether, 5.7 mL, 17 mmol) drop-wise over 15 min. The reaction mixture was warmed to 0° C. and stirred for 2 h and then quenched by the addition of water. The resulting mixture was extracted with EtOAc and the organic layers were combined, dried over magnesium sulfate, filtered, and concentrated under reduced pressure. The crude residue was purified by silica gel chromatography (0 to 10% MeOH/DCM). MS=185.0 [M+1]⁺.

Intermediate BE-4a

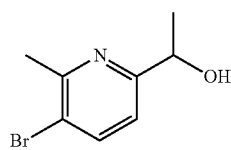

1-(5-Bromo-6-methylpyridin-2-yl)ethan-1-ol (Scheme BE)

Step 1. (5-Bromo-6-methylpyridin-2-yl)methanol: A solution of methyl 5-bromo-6-methylpicolinate (1.00 g, 4.40 mmol) in THF (22 mL) was cooled to −78° C. prior to the drop-wise addition of DIBAL (10.9 mL, 10.9 mmol, 1M in THF). The reaction mixture was stirred at −78° C. for 15 min and then slowly allowed to warm to rt where it was left to stir for 1 h. The reaction mixture was cooled to 0° C. and quenched by addition of EtOAc and a 40% aq. Rochelle's salt solution (potassium sodium tartrate tetrahydrate, 60 mL) and stirred vigorously at rt overnight. The layers were separated, and the aq. layer was extracted with EtOAc. The organic layers were combined and dried over $Na_2SO_4$, filtered and concentrated under reduced pressure to afford the title compound which was used without further purification. MS=203.0 [M+1]⁺.

Step 2. 5-Bromo-6-methylpicolinaldehyde: A solution of (5-bromo-6-methylpyridin-2-yl)methanol (523 mg, 2.60 mmol) in DCM (8.6 mL) was cooled to 0° C. and DMP (1.60 g, 3.90 mmol) was added in one portion. The reaction mixture was warmed to rt and stirred at this temperature for 2 h. The reaction was quenched by the addition of satd. aq. $NaHCO_3$ (10 mL) and satd. aq. sodium thiosulfate and stirred vigorously for 1 h. The layers were separated, and the aq. layer was extracted with DCM. The organic layers were combined and dried over $Na_2SO_4$, filtered and concentrated under reduced pressure to afford the title compound which was used without further purification. MS=201.0 [M+1]⁺.

Step 3. 1-(5-Bromo-6-methylpyridin-2-yl)ethan-1-ol: A solution of 5-bromo-6-methylpicolinaldehyde (517 mg, 2.60 mmol) was dissolved in THF (13 mL) and cooled to −78° C. and a solution of methylmagnesium bromide (3.90 mL, 3.90 mmol, 1M in THF) was added drop-wise. The reaction mixture was allowed to slowly warm to rt and stirred at this temperature for 1 h. The reaction was quenched by the addition of satd. aq. $NH_4Cl$ and stirred for 20 min. The resulting mixture was filtered, and the filtrate was diluted with EtOAc and water. The layers were separated and the aq. layer was extracted with EtOAc. The organic layers were combined and dried over $Na_2SO_4$, filtered and concentrated under reduced pressure to afford the title compound which was used without further purification. MS=217.0 [M+1]⁺.

TABLE 9

The following compounds were prepared using procedures similar to those described in Intermediate BE-4a using the appropriate starting materials.

| Intermediate No. | Structure | Name | [M + H]+ or [M + Na]+ |
|---|---|---|---|
| BE-4b (GSN) | 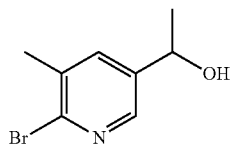 | 1-(5-Chloro-6-ethylpyrazin-2-yl)ethan-1-ol | Calcd.: 187.1 Found: 187.0 |
| BE-4c (GSN) | | 1-(5-Chloro-3-methylpyridin-2-yl)ethan-1-ol | Calcd.: 172.1 Found: 172.0 |
| BE-4d | | 1-(5-Bromo-3,4-dimethylpyridin-2-yl)ethanol | Calcd.: 230.0 Found: 230.0 |

Intermediate BF-3a 1-(6-Bromo-5-methylpyridin-3-yl)ethan-1-ol

Step 1. 6-Bromo-5-methylnicotinaldehyde: The title compound was prepared in a similar fashion as described for 5-bromo-6-methylpicolinaldehyde (en route to Intermediate BE-4a). MS=210.9 [M+1]+.

Step 2. 1-(6-Bromo-5-methylpyridin-3-yl)ethan-1-ol: The title compound was prepared in a similar fashion as described for 1-(5-bromo-6-methylpyridin-2-yl)ethan-1-ol (Intermediate BE-4a). MS=217.9 [M+1]+.

TABLE 10

The following compound was prepared using procedures similar to those described for Intermediate BF-3a using the appropriate starting materials.

| Intermediate No. | Structure | Name | [M + H]+ or [M + Na]+ |
|---|---|---|---|
| BF-3 (GSN) | | 1-(6-Chloro-4-methylpyridin-3-yl)ethan-1-ol | Calcd.: 172.1 Found: 172.0 |

Intermediate BG-5a

1-(6-chloro-5-(difluoromethyl)pyridin-3-yl)ethan-1-ol (Scheme BG)

Step 1. 5-Bromo-2-chloronicotinaldehyde: To a solution of (5-bromo-2-chloropyridin-3-yl)methanol (4.00 g, 18.0 mmol) in DCM (10 mL) was added manganese (IV) oxide (7.82 g, 90.0 mmol). The mixture was stirred at rt for 16 h. The reaction mixture was filtered, and the filtrate was concentrated under reduced pressure. The crude residue was purified by silica gel chromatography (5% EtOAc/petroleum ether) to afford the title compound. $^1$H NMR (400 MHz, CDCl$_3$) δ 10.34 (s, 1H), 8.63 (d, J=2.7 Hz, 1H), 8.29 (d, J=2.7 Hz, 1H).

Step 2. 5-Bromo-2-chloro-3-(difluoromethyl)pyridine: To a solution of 5-bromo-2-chloronicotinaldehyde (3.70 g, 16.8 mmol) in DCM (30 mL) cooled to 0° C. was added DAST (11.1 mL, 84.0 mmol) drop-wise. The reaction mixture was stirred for 1 h at 15° C. The reaction mixture was quenched by addition of satd. aq. sodium carbonate and extracted with DCM. The organic layer was dried over Na$_2$SO$_4$ filtered and concentrated under reduced pressure. The crude residue was purified by silica gel chromatography (5% EtOAc/petroleum ether) to afford the title compound. $^1$H NMR (400 MHz, CD$_3$OD) δ 8.68-8.54 (m, 1H), 8.29-8.14 (m, 1H), 7.19-6.76 (m, 1H).

Step 3. 1-(6-Chloro-5-(difluoromethyl)pyridin-3-yl)ethanol: To a solution of 5-bromo-2-chloro-3-(difluoromethyl)pyridine (2.60 g, 10.7 mmol) in THF (25 mL) cooled to 0° C. was added isopropylmagnesium bromide (16.5 mL, 21.5 mmol) drop-wise. Upon completion of the addition, the resulting mixture was stirred at 0° C. for 30 min, then acetaldehyde (6.4 mL, 32 mmol) was added. The reaction mixture was stirred for 16 h while warming to rt. The reaction mixture was quenched by the addition of water, then extracted with EtOAc. The organic layers were combined and washed with brine, dried over Na$_2$SO$_4$, filtered and concentrated under reduced pressure. The crude product was purified by silica gel chromatography (5% EtOAc/petroleum ether) to afford the title compound. MS=208.0 [M+1]+.

Intermediate BH-5a

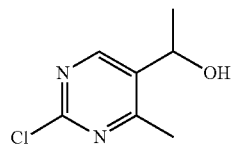

1-(2-Chloro-4-methylpyrimidin-5-yl)ethan-1-ol (Scheme BH)

Step 1. 2-Chloro-4-methyl-5-vinylpyrimidine: The title compound was prepared following procedures similar to those described above in Intermediate AG-5a, step 1. MS=154.6 [M+1]$^+$.

Step 2. 1-(2-Chloro-4-methylpyrimidin-5-yl)ethanol: A mixture of 2-chloro-4-methyl-5-vinylpyrimidine (1.50 g, 9.70 mmol), cobalt(II) acetylacetonate (0.250 g, 0.970 mmol) and phenylsilane (2.10 g, 19.4 mmol) in THF (30 mL) was stirred at rt for 14 h under an O2 atmosphere (15 psi). The reaction mixture was concentrated under reduced pressure and the crude residue was purified by silica gel chromatography (0 to 50% EtOAc/petroleum ether) to afford the title compound. MS=172.6 [M+1]$^+$.

Intermediate BI-4a

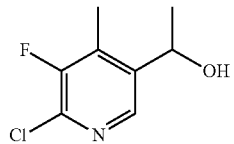

1-(6-Chloro-5-fluoro-4-methylpyridin-3-yl)ethan-1-ol (Scheme BI)

Step 1. 1-(6-Chloro-5-fluoro-4-methylpyridin-3-yl)ethanone: To a suspension of bis(triphenylphosphine)palladium(II) dichloride (220 mg, 0.313 mmol) in toluene (6.0 mL) was added tributyl(1-ethoxyvinyl)stannane (1.47 mL, 4.35 mmol) and 2-chloro-3-fluoro-5-iodo-4-methylpyridine (850 mg, 3.13 mmol). The resulting mixture was stirred for 16 h at 90° C. under a nitrogen atmosphere. The reaction mixture was cooled to rt and 6M aq. HCl (~1 mL) was added. The resulting mixture was stirred for 1 h at rt, then satd. aq. NaHCO$_3$ was added and the mixture was washed with satd. aq. potassium fluoride. The mixture was extracted with DCM. The combined organic fractions were washed with brine, dried over Na$_2$SO$_4$, filtered and concentrated under reduced pressure. The crude residue was purified by silica gel chromatography (0 to 12% EtOAc/petroleum ether) to afford the title compound. MS=188.0 [M+1]$^+$.

Step 2. 1-(6-Chloro-5-fluoro-4-methylpyridin-3-yl)ethanol: The title compound was prepared following procedures similar to those described above in Intermediate BC-2a, step 1. aq. Na$_2$SO$_4$ MS=190.0 [M+1]$^+$.

TABLE 11

The following compounds were prepared using procedures similar to those described for Intermediate BI-4a using the appropriate starting materials.

| Intermediate No. | Structure | Name | [M + H]$^+$ or [M + Na]$^+$ |
|---|---|---|---|
| BI-4b (AO) | | 1-(2-Chloro-4-methylpyrimidin-5-yl)ethan-1-ol | Calcd.: 173.1<br>Found: 173.1 |
| BI-4c (AO) | | 1-(6-Chloro-5-methylpyridazin-3-yl)ethan-1-ol | Calcd.: 173.1<br>Found: 173.0 |
| BI-4d (AO) | | 1-(6-Chloro-4,5-dimethylpyridin-3-yl)ethan-1-ol | Calcd.: 186.1<br>Found: 186.0 |
| BI-4e (AO) | | 1-(6-Chloro-4-methylpyridin-3-yl)ethan-1-ol | $^1$H NMR (400 MHz, CDCl$_3$) δ 8.40 (s, 1H), 7.07 (s, 1H), 5.08 (q, J = 6.4 Hz, 1H), 2.33 (s, 3H), 1.49 (d, J = 6.6 Hz, 3H). |

Intermediate BJ-5a and BJ-5b

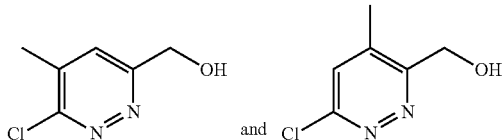

(6-chloro-5-methylpyridazin-3-yl)methanol and (6-chloro-4-methylpyridazin-3-yl)methanol (Scheme BJ)

Step 1. 3-Chloro-4-methyl-6-vinylpyridazine and 6-Chloro-4-methyl-3-vinylpyridazine: To a solution of 3,6-dichloro-4-methylpyridazine (5.00 g, 30.7 mmol) in dioxane (80 mL) and water (40 mL) was added potassium vinyltrifluoroborate (4.11 g, 30.7 mmol), 1,1'-bis(di-tert-butylphosphino)ferrocene palladium dichloride (1.12 g, 1.53 mmol) and potassium phosphate (13.0 g, 61.3 mmol). The reaction mixture was stirred at 90° C. under a nitrogen atmosphere for 16 h. The reaction mixture was cooled to rt and water was added. The mixture was filtered, and the filtrate was extracted with EtOAc. The organic layer was washed with brine, dried over $Na_2SO_4$, filtered and concentrated under reduced pressure. The crude residue was purified by silica gel chromatography (0 to 30% EtOAc/petroleum ether) to afford the title compounds as a mixture. MS=155.0 [M+1]$^+$.

Step 2. 6-Chloro-4-methylpyridazine-3-carbaldehyde and 6-Chloro-5-methylpyridazine-3-carbaldehyde: To a solution of a mixture of 3-chloro-4-methyl-6-vinylpyridazine and 6-chloro-4-methyl-3-vinylpyridazine (1.80 g, 5.82 mmol) in dioxane (80.0 mL) and water (20 mL) was added osmium tetroxide (25.0 mL, 1.97 mmol, 2% in water) and sodium periodate (2.49 g, 11.6 mmol). The mixture was stirred at rt for 2 h. To the mixture was added satd. aq. $Na_2SO_3$, and the resulting mixture was stirred for 10 min. The mixture was extracted with EtOAc, and the organic layers were combined and washed with brine, dried over $Na_2SO_4$, filtered and concentrated under reduced pressure to afford the title compounds as a mixture. MS=157.0 [M+1]$^+$.

Step 3. (6-Chloro-4-methylpyridazin-3-yl)methanol and (6-Chloro-5-methylpyridazin-3-yl)methanol: To a solution of a mixture of 6-chloro-4-methylpyridazine-3-carbaldehyde and 6-chloro-5-methylpyridazine-3-carbaldehyde (1.10 g, 3.51 mmol) in methanol (10 mL) cooled to 0° C. was added sodium borohydride (0.199 g, 5.27 mmol). The mixture was stirred at 0° C. for 30 min, then acetone was added into the mixture. The resulting mixture was stirred at rt for 30 min, the mixture was concentrated under reduced pressure. The crude residue was purified by preparatory-TLC (1:1 petroleum ether/EtOAc) to afford the title compounds as a mixture. MS=158.6 [M+1]$^+$.

TABLE 12

The following compound was prepared using procedures similar to those described for Intermediates BJ-5a and BJ-5b using the appropriate starting materials.

| Intermediate No. | Structure | Name | [M + H]$^+$ or [M + Na]$^+$ |
|---|---|---|---|
| BJ-5c (AO) | 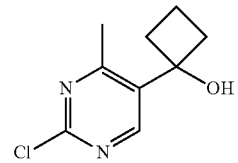 | (6-Chloro-4,5-dimethylpyridazin-3-yl)methanol | Calcd.: 173.1 Found: 172.9 |

Intermediate BK3a 1-(2-chloro-4-methylpyrimidin-5-yl)cyclobutanol (Scheme BK)

To a solution of 5-bromo-2-chloro-4-methylpyrimidine (1.00 g, 4.82 mmol) in THF (10 mL) cooled to −100° C. was added n-butyllithium (2.12 mL, 5.30 mmol, 2.5 M solution in hexanes). The reaction mixture was stirred at −100° C. for 30 min. Then, cerium(III) chloride (1.98 g, 5.30 mmol) as a solution in THF (10 mL) was added at −100° C. and the resulting mixture was stirred at −100° C. for 30 min. At this point, cyclobutanone (0.507 g, 7.23 mmol) was added at −100° C. The reaction mixture was stirred at −100° C. for 2 h, then the mixture was stirred at rt for 12 h. The mixture was quenched by the addition of satd. aq. $NH_4Cl$ then extracted with EtOAc. The organic layers were combined and dried over $Na_2SO_4$, filtered and concentrated under reduced pressure. The crude residue was purified by silica gel chromatography (0 to 15% EtOAc/petroleum ether) to afford the title compound. MS=199.0 [M+1]$^+$.

TABLE 13

The following compound was prepared using procedures similar to those described for Intermediates BK-3a using the appropriate starting materials.

| Intermediate No. | Structure | Name | [M + H]+ or [M + Na]+ |
|---|---|---|---|
| BK-3b (AO) | 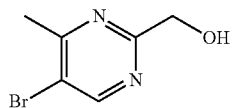 | tert-Butyl (2-chloro-5-(1-hydroxyethyl)pyridin-3-yl)carbamate | Calcd.: 273.1<br>Found: 273.1 |

Intermediate BL-4a

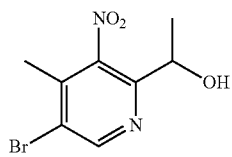

(5-Bromo-4-methylpyrimidin-2-yl)methanol
(Scheme BL)

Step 1. 5-Bromo-4-methylpyrimidine-2-carbonitrile: A mixture of 5-bromo-2-chloro-4-methylpyrimidine (2.00 g, 9.64 mmol), NaCN (0.510 g, 10.4 mmol) and DABCO (0.389 g, 3.47 mmol) in DMSO (10 mL) and water (10 mL) was stirred at rt for 16 h. The reaction mixture was diluted with water and extracted with EtOAc. The organic layers were combined and washed with brine, dried over $Na_2SO_4$, filtered and concentrated under reduced pressure to afford the title compound. $^1$H NMR (400 MHz, $CD_3OD$) δ 8.93 (s, 1H), 2.69 (s, 3H).

Step 2. Methyl 5-bromo-4-methylpyrimidine-2-carboxylate: To a solution of 5-bromo-4-methylpyrimidine-2-carbonitrile (750 mg, 3.79 mmol) in methanol (10.0 mL) was added aq. HCl (10 mL, 122 mmol). After the addition, the mixture was stirred at 80° C. for 1.5 h. Then, the mixture was cooled to rt, then diluted with water and extracted with EtOAc. The organic layers were combined and dried over $Na_2SO_4$, filtered and concentrated under reduced pressure to afford the title compound. $^1$H NMR (400 MHz, $CD_3OD$) δ 8.93 (s, 1H), 3.97 (s, 3H), 2.70 (s, 3H).

Step 3. (5-Bromo-4-methylpyrimidin-2-yl)methanol: The title compound was prepared following procedures similar to those described above in Intermediate BJ-5a, step 3. $Na_2SO_4$ $^1$H NMR (400 MHz, $CD_3OD$) δ 8.74 (s, 1H), 4.66 (s, 2H), 2.62 (s, 3H).

Intermediate BN-5

1-(5-Bromo-4-methyl-3-nitropyridin-2-yl)ethan-1-ol
(Scheme BN)

Step 1. 5-Bromo-2-iodo-4-methyl-3-nitropyridine: To a solution of 5-bromo-4-methyl-3-nitropyridin-2-amine (10.0 g, 43.1 mmol) in a mixture of 1,2-dimethoxyethane and toluene (2.5:1, 150 mL) cooled to 0° C. was added copper(I) iodide (2.50 g, 13.1 mmol) and potassium iodide (15.0 g, 90.0 mmol). The reaction mixture was stirred at 0° C. for 30 min, then tert-butyl nitrite (12.0 g, 116 mmol) was added. The reaction mixture was stirred at 60° C. for 14 h. The reaction mixture was cooled to rt, filtered, and concentrated under reduced pressure. The crude residue was purified by silica gel chromatography (20% EtOAc/petroleum ether) to afford the title compound. MS=342.8, 344.8 [M+1]+.

Step 2. 1-(5-Bromo-4-methyl-3-nitropyridin-2-yl)ethanone: The title compound was prepared following procedures similar to those described above in Intermediate BI-4a, step 1. MS=258.9, 260.9 [M+1]+.

Step 3. 1-(5-Bromo-4-methyl-3-nitropyridin-2-yl)ethanol: The title compound was prepared following procedures similar to those described above in Intermediate BJ-5a, step 3. MS=260.9, 262.9 [M+1]+.

Intermediate BO-5

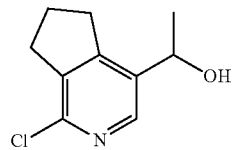

1-(1-Chloro-6,7-dihydro-5H-cyclopenta[c]pyridin-4-yl)ethan-1-ol (Scheme BO)

Step 1. Methyl 1-chloro-6,7-dihydro-5H-cyclopenta[c]pyridine-4-carboxylate: A solution of methyl 1-oxo-2,5,6,7-tetrahydro-1H-cyclopenta[c]pyridine-4-carboxylate (2.00 g, 10.4 mmol) in phosphorus(V) oxychloride (9.65 mL, 104 mmol) was stirred at 90° C. for 4 h. The reaction mixture was cooled to rt and then quenched by the addition of satd. aq. $NaHCO_3$. Additional satd. aq. $NaHCO_3$ was added to adjust the pH ~7. The resulting mixture was extracted with EtOAc. The organic layers were combined and dried over $Na_2SO_4$, filtered, and concentrated under reduced pressure. The crude residue was purified by silica gel chromatography (0 to 20% EtOAc/petroleum ether) to afford the title compound. MS=212.1 [M+1]+.

Step 2. (1-Chloro-6,7-dihydro-5H-cyclopenta[c]pyridin-4-yl)methanol: To a solution of methyl 1-chloro-6,7-dihydro-5H-cyclopenta[c]pyridine-4-carboxylate (2.00 g, 9.45 mmol) in THF (50 mL) was added DIBAL (18.9 mL, 18.9 mmol) at 0° C. The resulting mixture was stirred at rt for 2 h. The mixture was quenched by the addition of water and then extracted with EtOAc. The organic layers were combined and dried over Na$_2$SO$_4$, filtered, and concentrated under reduced pressure to afford the title compound. MS=184.1 [M+1]+.

Step 3. 1-Chloro-6,7-dihydro-5H-cyclopenta[c]pyridine-4-carbaldehyde: The title compound was prepared in a similar fashion as described for 5-bromo-6-methylpicolinaldehyde (en route to Intermediate BE-4a). MS=182.1 [M+1]+.

Step 4. 1-(1-Chloro-6,7-dihydro-5H-cyclopenta[c]pyridin-4-yl)ethanol: The title compound was prepared in a similar fashion as described for 1-(5-bromo-6-methylpyridin-2-yl)ethan-1-ol (Intermediate BE-4a). MS=198.1 [M+1]+.

Intermediate BP-5

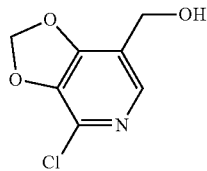 [SMILES: OCc1cnc(Cl)c2c1OCO2]

(4-Chloro-[1,3]dioxolo[4,5-c]pyridin-7-yl)methanol (Scheme BP)

Step 1: 5-Bromo-2-chloro-4-methoxypyridin-3-ol: A solution of 5-bromo-2-chloro-4-methoxypyridine (5.60 g, 25.2 mmol) in THF (80 mL) was cooled to −78° C. To this solution was added a solution of LDA (13.8 mL, 27.7 mmol, 2M in hexanes) dropwise, and the resulting solution was allowed to stir at −78° C. for 30 min. Trimethyl borate (6.54 g, 62.9 mmol) was added, and the reaction continued stirring at −78° C. for 2 h, at which time hydrogen peroxide (6.61 mL, 76 mmol) was added. The mixture was allowed to warm to 0° C. under stirring for 2 h, then sodium dithionite (20 g in 20 mL of water) was added dropwise. The mixture was adjusted to pH=3 by addition of 2N. HCl and extracted with ethyl acetate. The organic layers were dried, concentrated, and the residue was purified by silica gel chromatography (0-20% EtOAc/petroleum ether) to give the title compound. $^1$H NMR (400 MHz, CDCl$_3$) δ 8.04 (s, 1H), 4.08 (s, 3H). MS=239.9 (M+1).

Step 2: 5-Bromo-2-chloropyridine-3,4-diol: To a solution of 5-bromo-2-chloro-4-methoxypyridin-3-ol (2.00 g, 8.39 mmol) in DCM (30 mL) was added BBr$_3$ (1.59 mL, 16.8 mmol) at 0° C. The mixture was stirred at rt for 16 h, at which time, the mixture was cooled to 0° C. and quenched with MeOH, concentrated, and purified by silica gel chromatography (0-30% MeOH/DCM) to give the title compound. MS=225.8 (M+1).

Step 3: 7-Bromo-4-chloro-[1,3]dioxolo[4,5-c]pyridine: To a solution of 5-bromo-2-chloropyridine-3,4-diol (0.90 g, 4.0 mmol) in DMF (15 mL) was added Cs$_2$CO$_3$ (2.61 g, 8.02 mmol) and dibromomethane (0.836 g, 4.81 mmol), and the resulting mixture was heated to 60° C. for 16 h. The reaction mixture was cooled to rt, poured into water and extracted with EtOAc. The organic layer was washed with water, dried (Na$_2$SO$_4$) and concentrated to afford a crude residue, which was purified by silica gel chromatography (0-20% EtOAc/petroleum ether) to give the title compound. MS=237.8 (M+1).

Step 4: 4-Chloro-[1,3]dioxolo[4,5-c]pyridine-7-carbaldehyde: To a solution of 7-bromo-4-chloro-[1,3]dioxolo[4,5-c]pyridine (300 mg, 1.27 mmol) in THF (4 mL) was added n-butyllithium (0.558 mL, 1.396 mmol, 2.5M in hexane) at −78° C. After the mixture was stirred at −78° C. for 0.5 h, DMF (0.49 mL, 6.3 mmol) (dissolved into 0.5 mL of THF) was added dropwise, and the reaction mixture continued stirring at −78° C. for 1 h. The mixture was poured into satd. aq. NH$_4$Cl and extracted with EtOAc. The organic layer was washed by brine, dried (Na$_2$SO$_4$) and concentrated to give crude residue, which was purified by prep-TLC eluting with EtOAc to give the title compound. $^1$H NMR (400 MHz, CDCl$_3$) δ 10.11 (s, 1H), 8.39 (s, 1H), 6.31 (s, 2H). MS=186.0 (M+1).

Step 5: (4-Chloro-[1,3]dioxolo[4,5-c]pyridin-7-yl)methanol: To a solution of 4-chloro-[1,3]dioxolo[4,5-c]pyridine-7-carbaldehyde (190 mg, 1.02 mmol) in THF (2 mL) and MeOH (0.2 mL) was added sodium borohydride (39 mg, 1.02 mmol) at 0° C. After the mixture was stirred at 0° C. for 5 min, the mixture was added acetone and warmed to rt for 1 h. The reaction was concentrated to give crude residue, which was purified by prep-TLC eluting with EtOAc to give the title compound. MS=188.0 (M+1).

Intermediate BQ-6

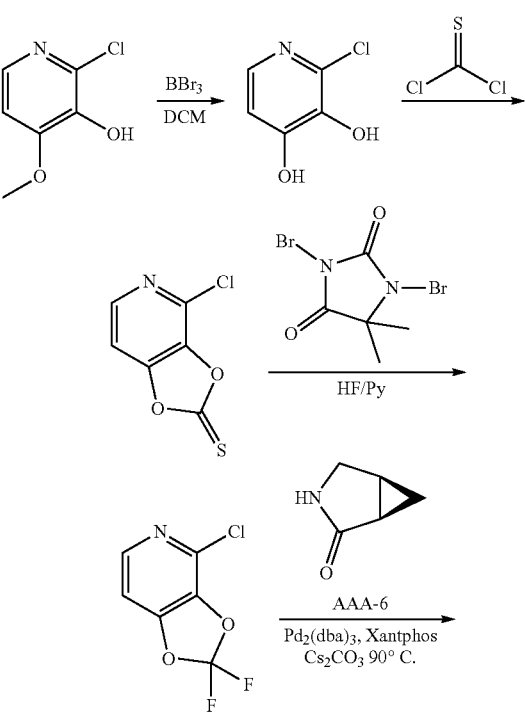

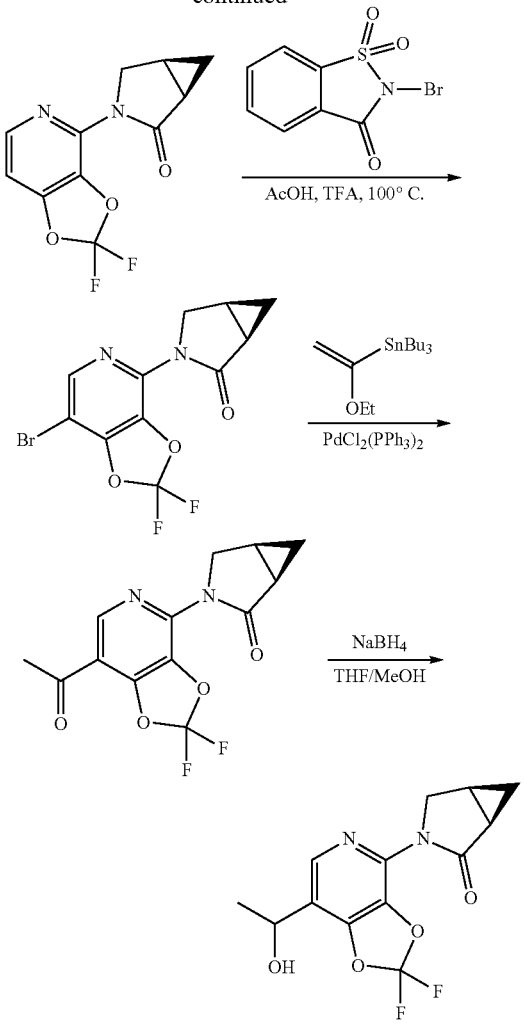

(1R,5S)-3-(2,2-Difluoro-7-(1-hydroxyethyl)-[1,3]
dioxolo[4,5-c]pyridin-4-yl)-3-azabicyclo[3.1.0]
hexan-2-one (Scheme BQ)

Step 1: 2-Chloropyridine-3,4-diol. To a solution of 2-chloro-4-methoxypyridin-3-ol (9.00 g, 56.4 mmol) in DCM (200 mL) was added BBr₃ (5.33 mL, 56.4 mmol) at 0° C. The mixture was stirred at rt for 12 h. The mixture was quenched with MeOH and concentrated to give crude residue that was purified by silica gel chromatography (10-20% MeOH/DCM) to give the title compound. MS=146.1(M+1).

Step 2: 4-Chloro-[1,3]dioxolo[4,5-c]pyridine-2-thione. 2-Chloropyridine-3,4-diol (8.00 g, 55.0 mmol) and DMAP (26.9 g, 220 mmol) were suspended in DCM (200 mL), and the resulting mixture was cooled to 0° C. Thiophosgene (12.0 mL, 165 mmol) was added dropwise, and after 10 min, the reaction was warmed to rt. After 1 h, the reaction was diluted with water, and extracted with DCM. The combined organic layers were washed with brine, dried over anhydrous Na₂SO₄, filtered and concentrated to afford a crude residue that was purified by silica gel chromatography (10-30% EtOAc/petroleum ether) to give the title compound. MS=188.0 (M+1).

Step 3: 4-Chloro-2,2-difluoro-[1,3]dioxolo[4,5-c]pyridine. 4-Chloro-[1,3]dioxolo[4,5-c]pyridine-2-thione (2.00 g, 10.7 mmol) was dissolved in DCM (20 mL) and cooled to −78° C. Pyridine hydrofluoride (20.0 mL, 155 mmol) was added dropwise, followed by 1,3-dibromo-5,5-dimethylimidazolidine-2,4-dione (9.14 g, 32.0 mmol) in several portions. After 20 min, the reaction was warmed to −20° C. After an additional 40 min, the reaction was adjusted to pH 7 by careful addition of 5 M NaOH. Sodium thiosulphate was added, and the resulting mixture was diluted with water and extracted with DCM The organic layer was concentrated to afford a crude residue that was purified by silica gel chromatography (10-30% EtOAc/petroleum ether) to give the title compound. MS=194.0 (M+1). ¹H NMR (400 MHz, CDCl₃) δ 8.22 (d, J 5.5 Hz, 1H), 7.07 (d, J 5.1 Hz, 1H).

Step 4: (1R,5S)-3-(2,2-Difluoro-[1,3]dioxolo[4,5-c]pyridin-4-yl)-3-azabicyclo[3.1.0]hexan-2-one. To a solution of (1R,5S)-3-azabicyclo[3.1.0]hexan-2-one (750 mg, 7.72 mmol), 4-chloro-2,2-difluoro-[1,3]dioxolo[4,5-c]pyridine (1.50 g, 7.75 mmol), Cs₂CO₃ (7.58 g, 23.3 mmol) and XANTPHOS (224 mg, 0.388 mmol) in 1,4-dioxane (20 mL) was added Pd₂(dba)₃ (355 mg, 0.388 mmol). The mixture was degassed and backfilled with N2, and the resulting mixture was heated to 90° C. for 14 h. The reaction was cooled to rt and concentrated to afford a crude residue that was purified by silica gel chromatography (30-40% EtOAc/petroleum ether) to give the title compound. MS=255.1 (M+1). ¹H NMR (500 MHz, CDCl₃) δ 8.15 (d, J 5.3 Hz, 1H), 6.92 (d, J 5.2 Hz, 1H), 4.34 (dd, J=5.1, 10.6 Hz, 1H), 3.76-3.79 (m, 1H), 2.08-2.11 (m, 1H), 1.28 (br dd, J 3.1, 8.1 Hz, 1H), 0.95 (q, J 4.3 Hz, 1H), 0.84-0.88 (m, 1H).

Step 5: (1R,5S)-3-(7-Bromo-2,2-difluoro-[1,3]dioxolo[4,5-c]pyridin-4-yl)-3-azabicyclo[3.1.0]hexan-2-one. To a solution of (1R,5S)-3-(2,2-difluoro-[1,3]dioxolo[4,5-c]pyridin-4-yl)-3-azabicyclo[3.1.0]hexan-2-one (500 mg, 1.97 mmol) in AcOH (10 mL) and TFA (1.0 mL, 13 mmol) was added 2-bromobenzo[d]isothiazol-3(2H)-one 1,1-dioxide (619 mg, 2.36 mmol), and the resulting mixture was heated to 100° C. After 16 h, the reaction was concentrated to afford a crude residue that was purified by reversed-phase preparatory-HPLC (C18 stationary phase, ACN/water+0.1% TFA) to give the title compound. MS=332.9, 334.9 (M+1). ¹H NMR (400 MHz, CDCl₃) δ 8.20 (s, 1H), 4.31 (dd, J 4.9, 10.8 Hz, 1H), 3.76 (d, J 11.0 Hz, 1H), 2.04-2.18 (m, 2H), 1.30 (dt, J 5.1, 8.0 Hz, 1H), 0.88-1.01 (m, 1H).

Step 6: (1R,5S)-3-(7-Acetyl-2,2-difluoro-[1,3]dioxolo[4,5-c]pyridin-4-yl)-3-azabicyclo[3.1.0]hexan-2-one. To a solution of (1R,5S)-3-(7-bromo-2,2-difluoro-[1,3]dioxolo[4,5-c]pyridin-4-yl)-3-azabicyclo[3.1.0]hexan-2-one (300 mg, 0.901 mmol) and tributyl(1-ethoxyvinyl)stannane (395 µL, 1.17 mmol) in toluene (5 mL) was added Pd(PPh₃)₂Cl₂ (63 mg, 0.090 mmol), and the resulting mixture was heated to 90° C. After 14 h, the reaction was cooled to rt, 6 M HCl (2 mL) was added, and the mixture was allowed to stir for 30 min. The reaction was quenched by satd. aq. KF, stirred for 1 h, and extracted with EtOAc. The combined organic layers were dried over Na₂SO₄, filtered and concentrated to afford a crude residue that was purified by silica gel chromatography (30-50% EtOAc/petroleum ether) to give the title compound. MS=297.1 (M+1).

Step 7: (1R,5S)-3-(2,2-Difluoro-7-(1-hydroxyethyl)-[1,3]dioxolo[4,5-c]pyridin-4-yl)-3-azabicyclo[3.1.0]hexan- 2-one. To a solution of (1R,5S)-3-(7-acetyl-2,2-difluoro-[1,3]dioxolo[4,5-c]pyridin-4-yl)-3-azabicyclo[3.1.0]hexan-2-one (250 mg, 0.844 mmol) in THF (3 mL) and MeOH (0.3 mL) at 0° C. was added NaBH$_4$ (31.9 mg, 0.844 mmol). The resulting mixture was stirred at 0° C. for 1 h, at which time, excess acetone was added, and the resulting mixture was warmed to rt. After 1 h, the reaction was concentrated to afford a crude residue that was purified by silica gel chromatography (40-50% EtOAc/petroleum ether) to give the title compound. MS=299.1 (M+1).

Intermediate CA-6a and CA-6b

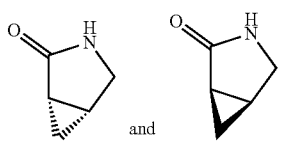 [SMILES: O=C1NC[C@@H]2C[C@H]12 ; O=C1NC[C@H]2C[C@@H]12]

(1S,5R)-3-Azabicyclo[3.1.0]hexan-2-one and (1R,5S)-3-Azabicyclo[3.1.0]hexan-2-one (Scheme CA)

Step 1. 3-Benzyl-3-azabicyclo[3.1.0]hexane-2,4-dione: The following sequence was carried out in two batches in parallel on equivalent scale. These batches were combined for subsequent post-reaction processing. To a solution of 3-oxabicyclo[3.1.0]hexane-2,4-dione (400 g, 3.57 mol) in acetic acid (2.00 L) at 15° C. was added benzylamine (574 g, 5.35 mol). The reaction mixture was stirred at 120° C. for 12 h. The reactions were cooled to rt and combined by pouring into water. The resulting mixture was stirred for 30 min then filtered. The filtered solid was washed with water then dissolved by the addition of EtOAc. The mixture was washed with water and brine, then dried over Na$_2$SO$_4$, filtered and concentrated under reduced pressure to afford the title compound. MS=202.1 [M+1]$^+$.

Step 2. 3-Benzyl-3-azabicyclo[3.1.0]hexane: The following sequence was carried out in three batches in parallel on equivalent scale. To a suspension of LAH (87.9 g, 2.32 mol) in THF (700 mL) was added a solution of 3-benzyl-3-azabicyclo[3.1.0]hexane-2,4-dione (333 g, 1.65 mol) in THF (1.40 L) drop-wise at 10° C. The resulting mixture was stirred at 40° C. for 12 h, then cooled to 0° C. In a sequential fashion, water (87 mL), aq. sodium hydroxide (87 mL, 15% by volume) then water (261 mL) were added drop-wise to the mixture. Na$_2$SO$_4$ was added to the mixture and the resulting mixture was stirred for 30 min then filtered. The filtered solid was washed with EtOAc and the filtrate was concentrated under reduced pressure to afford the title compound. MS=174.2 [M+1]$^+$.

Step 3. tert-Butyl 3-azabicyclo[3.1.0]hexane-3-carboxylate: The following sequence was carried out in 8 batches in parallel on equivalent scale. To a solution of 3-benzyl-3-azabicyclo[3.1.0]hexane (110 g, 635 mmol) and di-tert-butyl dicarbonate (208 g, 952 mmol) in MeOH (770 mL) was added palladium on carbon (11.0 g, 10.4 mmol, 10% by weight). The reaction mixture was stirred at 40° C. for 2 h under a H$_2$ atmosphere (45 psi). The reactions were conducted in parallel and were combined and filtered through a pad of Celite®. The filtrate was concentrated under reduced pressure. The crude residue was purified by silica gel chromatography (5% to 20% EtOAc/petroleum ether) to afford the title compound. $^1$HNMR (400 MHz, CDCl$_3$) δ 3.47-3.59 (m, 2H), 3.30-3.34 (m, 2H), 1.44-1.46 (m, 11H), 0.63-0.68 (m, 1H), 0.15-0.18 (m, 1H).

Step 4. tert-Butyl 2-oxo-3-azabicyclo[3.1.0]hexane-3-carboxylate: The following sequence was carried out in two batches in parallel on equivalent scale. To a solution of tert-butyl 3-azabicyclo[3.1.0]hexane-3-carboxylate (330 g, 1.80 mol) and ruthenium trichloride (11.2 g, 54.0 mmol) in EtOAc (1.6 L) and water (1.60 L) at rt was added sodium periodate (770 g, 3.60 mol) portion-wise. The resulting mixture was stirred for 12 h. The reactions conducted in parallel were combined and filtered. The layers were separated and the aq. layer was extracted with EtOAc. The organic layers were combined and washed with satd. aq. sodium dithionite, dried over Na$_2$SO$_4$, filtered then concentrated under reduced pressure to afford the title compounds as a racemate. $^1$HNMR (400 MHz, CDCl$_3$) δ 3.82-3.78 (m, 1H), 3.72-3.69 (m, 1H), 2.05-2.00 (m, 1H), 1.90-1.89 (m, 1H), 1.52 (s, 9H), 1.26-1.18 (m, 1H), 0.80-0.78 (m, 1H). The enantiomeric title compounds were separated by chiral chromatography (SFC, DAICEL CHIRALPAK IC; 0.1% NH$_3$H$_2$O-EtOH Begin B 25% End B 25%) to furnish the individual isomer compounds in pure form. The faster-eluting enantiomer of the title compounds (Intermediate CA-5a). The slower-eluting enantiomer of the title compounds (Intermediate CA-5a): $^1$H NMR (400 MHz, CDCl$_3$) δ: 3.81-3.77 (m, 1H), 3.72-3.68 (m, 1H), 2.00-1.99 (m, 1H), 1.99-1.87 (m, 1H), 1.48 (s, 9H), 1.25-1.17 (m, 1H), 0.78-0.77 (m, 1H).

Step 5. (1S,5R)-3-azabicyclo[3.1.0]hexan-2-one and (1R,5S)-3-Azabicyclo[3.1.0]hexan-2-one: A mixture of tert-butyl 2-oxo-3-azabicyclo[3.1.0]hexane-3-carboxylate (650 g, 3.30 mol) in HCl/EtOAc (4M, 3.25 L) at 15° C. for 1 h. The reaction mixture was filtered and the filtered solid was washed with EtOAc (2.0 µL, 1.0 L) then dried to afford the title compounds as a mixture of enantiomers. $^1$H NMR (400 MHz, DMSO-d$_6$) δ 8.49 (br s, 1H), 7.09 (br s, 1H), 3.35-3.31 (m, 1H), 3.14-3.12 (m, 1H), 1.92-1.88 (m, 1H), 1.61-1.60 (m, 1H), 1.02-0.97 (m, 1H), 0.45-0.42 (m, 1H).

Step 5. (1R,5S)-3-Azabicyclo[3.1.0]hexan-2-one: A mixture of tert-butyl (1R,5s)-2-oxo-3-azabicyclo[3.1.0]hexane-3-carboxylate (slower-eluting enantiomer from the previous step, 370 g, 1.88 mol) in HCl/EtOAc (4M, 1.4 L) at 0-10° C. for 1 h. The reaction mixture was filtered and the filtered solid was washed with EtOAc (500 mL) then dried to afford the title compound. $^1$H NMR (400 MHz, DMSO-d$_6$) δ 10.0 (s, 1H), 7.07 (s, 1H), 3.34-3.30 (m, 1H), 3.13 (d, J=10.4 Hz, 1H), 1.90-1.87 (m, 1H), 1.60-1.59 (m, 1H), 1.01-0.96 (m, 1H), 0.44-0.41 (m, 1H). MS=98.1 [M+1]$^+$.

TABLE 14

The following compound was prepared using procedures similar to those described for Intermediates CA-6 using the appropriate starting materials.

| Intermediate No. | Structure | Name | [M + H]⁺ or [M + Na]⁺ |
|---|---|---|---|
| CA-6c (AO) | 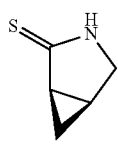 | 3-Azabicyclo[3.1.0]hexan-2-one-4,4-$d_2$ | $^1$H NMR (400 MHz, CDCl$_3$) δ 7.82 (br s, 1H), 2.11 (br d, J = 6.3 Hz, 2H), 1.38-1.23 (m, 1H), 0.81 (q, J = 4.3 Hz, 1H). |

Intermediate CA-7

(1R,5S)-3-azabicyclo[3.1.0]hexane-2-thione (Scheme CA)

To a vial containing (1R,5S)-3-azabicyclo[3.1.0]hexan-2-one (100 mg, 1.03 mmol) was added DCM (5.2 mL). In a separate vial, DCM (5.2 mL) was added to Lawesson's Reagent (208 mg, 0.520 mmol). The lactam solution was slowly added to the Lawesson's Reagent solution and stirred at rt for 15 h. The reaction was concentrated and purified by silica gel chromatography (EtOAc/hexanes). The fractions were combined and concentrated under reduced pressure to give the title compound. MS=114.0 [M+1]⁺.

Examples 1 and 2

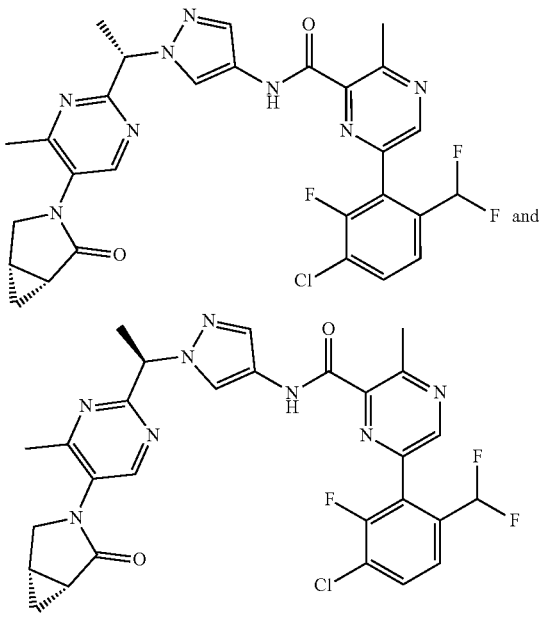

6-(3-Chloro-6-(difluoromethyl)-2-fluorophenyl)-3-methyl-N-(1-((S)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide and 6-(3-Chloro-6-(difluoromethyl)-2-fluorophenyl)-3-methyl-N-(1-((R)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide (Scheme AAA)

Step 1. 5-Bromo-2-(1-bromoethyl)-4-methylpyrimidine: To a mixture of 1-(5-bromo-4-methylpyrimidin-2-yl)ethan-1-ol (550 mg, 2.53 mmol) and triphenylphosphine (997 mg, 3.80 mmol) in THF (8.5 mL) cooled 0° C. was added carbon tetrabromide (1.26 g, 3.80 mmol) and the mixture was stirred at rt for 6 h. The mixture was concentrated under reduced pressure and the crude residue was purified by silica gel column chromatography (EtOAc/hexanes) to afford the title compound. MS=280.9 [M+1]⁺.

Step 2. tert-Butyl (1-(1-(5-bromo-4-methylpyrimidin-2-yl)ethyl)-1H-pyrazol-4-yl)carbamate: To the solution of 5-bromo-2-(1-bromoethyl)-4-methylpyrimidine (210 mg, 0.750 mmol) in DMF (10 mL) was added tert-butyl (1H-pyrazol-4-yl)carbamate (210 mg, 0.750 mmol) and Cs$_2$CO$_3$ (733 mg, 2.25 mmol) at rt. The mixture was stirred at rt for 16 h. The mixture was diluted with EtOAc and washed with water and brine. The organic layer was dried over Na$_2$SO$_4$, filtered and concentrated under reduced pressure. The crude residue was purified by silica gel column chromatography (EtOAc/hexanes) to afford the title compound. MS=284.1 [M+1]⁺.

Step 3. tert-Butyl (1-(1-(4-methyl-5-((1R,5S)-2-oxo-3-azabicyclo[3.1.0]hexan-3-yl)pyrimidin-2-yl)ethyl)-1H-pyrazol-4-yl)carbamate: The mixture of (1R,5S)-3-azabicyclo[3.1.0]hexan-2-one (15 mg, 0.16 mmol), tert-butyl (1-(1-(5-bromo-4-methylpyrimidin-2-yl)ethyl)-1H-pyrazol-4-yl)carbamate (30 mg, 0.078 mmol), Xantphos-Pd-G3 (7.4 mg, 7.9 μmol) and cesium carbonate (77 mg, 0.24 mmol) in 1,4-dioxane (0.79 mL) was stirred at 100° C. for 3 h. After cooling to rt, the mixture was filtered (eluting with additional EtOAc). The organic layer was dried over Na$_2$SO$_4$, filtered and concentrated under reduced pressure. The crude residue was purified by silica gel column chromatography (MeOH/DCM) to afford the title compound. MS=399.3 [M+1]⁺.

Step 4. (1R,5S)-3-(2-(1-(4-Amino-1H-pyrazol-1-yl)ethyl)-4-methylpyrimidin-5-yl)-3-azabicyclo[3.1.0]hexan-2-one: The title compound was prepared following procedures similar to those described above in Intermediate AE-5, step 4. MS=299.1 [M+1]⁺.

Step 5. 6-(3-Chloro-6-(difluoromethyl)-2-fluorophenyl)-3-methyl-N-(1-((S)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide and 6-(3-Chloro-6-(difluoromethyl)-2-fluorophenyl)-3-methyl-N-(1-((R)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide: To a mixture of 6-(3-chloro-6-(difluoromethyl)-2-fluorophenyl)-3-methylpyrazine-2-carboxylic acid (127 mg, 0.402 mmol), (1R,5S)-3-(2-(1-(4-amino-1H-pyrazol-1-yl)ethyl)-4-methylpyrimidin-5-yl)-3-azabicyclo[3.1.0]hexan-2-one (80.0 mg, 0.268 mmol) in pyridine (2.68 mL) cooled 0° C. was added EDC (103 mg, 0.536 mmol). The reaction mixture was stirred at rt overnight, then satd. aq. NaHCO₃ was added and the mixture was extracted with EtOAc. The organic layers were combined and washed with brine, dried over Na₂SO₄, filtered and concentrated under reduced pressure. The crude residue was purified by reversed-phase preparatory-HPLC (C18 stationary phase, ACN/water+0.1% TFA) to afford the mixture of diastereomeric title compounds. The isomeric title compounds were separated by chiral chromatography (SFC, DAICEL CHIRALPAK AD-H; Neutral-EtOH Begin B 40% End B 40%) to furnish the individual isomers in pure form. The faster-eluting diastereoisomer of the title compounds (Example 1): $^1$H NMR (600 MHz, CD₃OD) δ 8.85 (d, J=2.4 Hz, 1H), 8.53 (s, 1H), 8.31 (s, 1H), 7.90-7.74 (m, 1H), 7.75-7.59 (m, 2H), 6.94 (t, J=54.6 Hz, 1H), 5.70 (q, J=7.1 Hz, 1H), 4.05 (dd, J=10.2, 5.9 Hz, 1H), 3.75-3.54 (m, 1H), 2.99 (s, 3H), 2.36 (s, 3H), 2.21-2.13 (m, 1H), 2.09-1.97 (m, 1H), 1.93 (d, J=7.1 Hz, 3H), 1.36-1.24 (m, 2H), 0.93 (d, J=3.4 Hz, 1H). MS=597.1 [M+1]⁺. The slower-eluting diastereoisomer of the title compounds (Example 2): $^1$H NMR (600 MHz, CD₃OD) δ 8.85 (d, J=2.4 Hz, 1H), 8.53 (s, 1H), 8.31 (s, 1H), 7.84-7.78 (m, 1H), 7.69-7.64 (m, 2H), 6.94 (t, J=54.6 Hz, 1H), 5.70 (q, J=7.1 Hz, 1H), 4.05 (dd, J=10.2, 5.9 Hz, 1H), 3.67 (d, J=10.2 Hz, 1H), 2.99 (s, 3H), 2.36 (s, 3H), 2.21-2.14 (m, 1H), 2.08-2.01 (m, 1H), 1.93 (d, J=7.1 Hz, 3H), 1.36-1.25 (m, 1H), 0.96-0.87 (m, 1H). MS=597.1 [M+1]⁺.

TABLE 15

The following compounds were prepared using procedures similar to those described in Examples 1 and 2 using appropriate starting materials. In some examples, racemic products or diatereoisomeric mixtures were separated using chiral columns (SFC or HPLC) specified in the table. For those pairs or sets of isomers, the isomers are listed by order of elution (i.e. the fastest-eluting isomer is listed first). This convention for listing isomers from chiral SFC or HPLC separation will be used in all subsequent tables.

| Example No. | Structure | Name | [M + H]⁺ or [M + Na]⁺ | Chiral column |
|---|---|---|---|---|
| 3 | | 6-(3-Chloro-6-(difluoromethyl)-2-fluorophenyl)-N-(1-((S or R)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide | Calcd.: 583.2 Found: 583.1 | DAICEL CHIRACEL OJ-H |
| 4 | | 6-(3-Chloro-6-(difluoromethyl)-2-fluorophenyl)-N-(1-((R or S)-1-(4-methyl-5-((1R,5S)-2-oxo-3-azabicyclo[3.1.0]hexan-3-yl)pyrimidin-2-yl)ethyl)-1H-pyrazol-4-yl)pyrazine-2-carboxamide | Calcd.: 583.2 Found: 583.1 | DAICEL CHIRACEL OJ-H |

TABLE 15-continued

*The following compounds were prepared using procedures similar to those described in Examples 1 and 2 using appropriate starting materials. In some examples, racemic products or diatereoisomeric mixtures were separated using chiral columns (SFC or HPLC) specified in the table. For those pairs or sets of isomers, the isomers are listed by order of elution (i.e. the fastest-eluting isomer is listed first). This convention for listing isomers from chiral SFC or HPLC separation will be used in all subsequent tables.*

| Example No. | Structure | Name | [M + H]+ or [M + Na]+ | Chiral column |
|---|---|---|---|---|
| 5 | | 6-(3-Chloro-6-(difluoromethyl)-2-fluorophenyl)-N-(1-((S or R)-1-(5-((1R,5S)-2-oxo-3-azabicyclo[3.1.0]hexan-3-yl)pyrimidin-2-yl)ethyl)-1H-pyrazol-4-yl)pyrazine-2-carboxamide | Calcd.: 568.1<br>Found: 569.0 | DAICEL CHIRACEL OJ-H |
| 6 | | 6-(3-Chloro-6-(difluoromethyl)-2-fluorophenyl)-3-methyl-N-(1-((R or S)-1-(5-((1R,5S)-2-oxo-3-azabicyclo[3.1.0]hexan-3-yl)pyrimidin-2-yl)ethyl)-1H-pyrazol-4-yl)pyrazine-2-carboxamide | Calcd.: 583.2<br>Found: 583.0 | DAICEL CHIRACEL OJ-H |
| 7 | | N-(1-((5-Chloro-6-((1R,5S)-2-oxo-3-azabicyclo[3.1.0]hexan-3-yl)pyridin-3-yl)methyl)-1H-pyrazol-4-yl)-6-(3-chloro-6-(difluoromethyl)-2-fluorophenyl)-3-methylpyrazine-2-carboxamide | Calcd.: 602.1<br>Found: 603.0 | |
| 8 | | N-(1-((5-Chloro-6-((1R,5S)-2-oxo-3-azabicyclo[3.1.0]hexan-3-yl)pyridin-3-yl)methyl)-1H-pyrazol-4-yl)-6-(3-chloro-6-(difluoromethyl)-2-fluorophenyl)pyrazine-2-carboxamide | Calcd.: 588.1<br>Found: 589.0 | |

TABLE 15-continued

*The following compounds were prepared using procedures similar to those described in Examples 1 and 2 using appropriate starting materials. In some examples, racemic products or diatereoisomeric mixtures were separated using chiral columns (SFC or HPLC) specified in the table. For those pairs or sets of isomers, the isomers are listed by order of elution (i.e. the fastest-eluting isomer is listed first). This convention for listing isomers from chiral SFC or HPLC separation will be used in all subsequent tables.*

| Example No. | Structure | Name | [M + H]+ or [M + Na]+ | Chiral column |
|---|---|---|---|---|
| 9 | | 6-(3-Chloro-6-(difluoromethyl)-2-fluorophenyl)-N-(1-((6-((1R,5S)-2-oxo-3-azabicyclo[3.1.0]hexan-3-yl)pyridin-3-yl)methyl)-1H-pyrazol-4-yl)pyrazine-2-carboxamide | Calcd.: 554.1<br>Found: 554.3 | |
| 10 | | 6-(3-Chloro-6-(difluoromethyl)-2-fluorophenyl)-N-(1-((S or R)-1-(6-((1R,5S or 1S,5R)-2-oxo-3-azabicyclo[3.1.0]hexan-3-yl)pyridin-3-yl)ethyl)-1H-pyrazol-4-yl)pyrazine-2-carboxamide | Calcd.: 568.1<br>Found: 567.9 | DAICEL CHIRACEL AD-H |
| 11 | | 6-(3-Chloro-6-(difluoromethyl)-2-fluorophenyl)-N-(1-((R or S)-1-(6-((1R,5S or 1S,5R)-2-oxo-3-azabicyclo[3.1.0]hexan-3-yl)pyridin-3-yl)ethyl)-1H-pyrazol-4-yl)pyrazine-2-carboxamide | Calcd.: 568.1<br>Found: 567.9 | DAICEL CHIRACEL AD-H |
| 12 | | 6-(3-Chloro-6-(difluoromethyl)-2-fluorophenyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 583.2<br>Found: 583.2 | REGIS(S,S) WHELK-O1 |

TABLE 15-continued

The following compounds were prepared using procedures similar to those described in Examples 1 and 2 using appropriate starting materials. In some examples, racemic products or diatereoisomeric mixtures were separated using chiral columns (SFC or HPLC) specified in the table. For those pairs or sets of isomers, the isomers are listed by order of elution (i.e. the fastest-eluting isomer is listed first). This convention for listing isomers from chiral SFC or HPLC separation will be used in all subsequent tables.

| Example No. | Structure | Name | [M + H]+ or [M + Na]+ | Chiral column |
|---|---|---|---|---|
| 13 | | 6-(3-Chloro-6-(difluoromethyl)-2-fluorophenyl)-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 583.2<br>Found: 583.2 | REGIS(S,S) WHELK-O1 |
| 14 | | 6-(3-Chloro-6-(difluoromethyl)-2-fluorophenyl)-3-methyl-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 597.2<br>Found: 597.3 | DAICEL CHIRACEL AD-H |
| 15 | | 6-(3-Chloro-6-(difluoromethyl)-2-fluorophenyl)-3-methyl-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 597.2<br>Found: 597.3 | DAICEL CHIRACEL AD-H |
| 16 | | 6-(3-Chloro-6-(difluoromethoxy)-2-fluorophenyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 599.2<br>Found: 599.3 | DAICEL CHIRACEL AD-H |

TABLE 15-continued

The following compounds were prepared using procedures similar to those described in Examples 1 and 2 using appropriate starting materials. In some examples, racemic products or diatereoisomeric mixtures were separated using chiral columns (SFC or HPLC) specified in the table. For those pairs or sets of isomers, the isomers are listed by order of elution (i.e. the fastest-eluting isomer is listed first). This convention for listing isomers from chiral SFC or HPLC separation will be used in all subsequent tables.

| Example No. | Structure | Name | [M + H]+ or [M + Na]+ | Chiral column |
|---|---|---|---|---|
| 17 | | 6-(3-Chloro-6-(difluoromethoxy)-2-fluorophenyl)-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Found: 599.2 Calcd.: 599.3 | DAICEL CHIRACEL AD-H |
| 18 | | 6-(3-Chloro-2-fluoro-6-(trifluoromethyl)phenyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 601.1 Found: 601.3 | DAICEL CHIRACEL AD-H |
| 19 | | 6-(3-Chloro-2-fluoro-6-(trifluoromethyl)phenyl)-N-(1-((R or S)-1-(6-methyl-5-((1R,5S)-2-ox--3-azabicyclo[3.1.0]hexan-3-yl)pyrazin-2-yl)ethyl)-1H-pyrazol-4-yl)pyrazine-2-carboxamide | Found: 601.1 Calcd.: 601.3 | DAICEL CHIRACEL AD-H |
| 20 | | 6-(3-Chloro-6-(difluoromethyl)-2-fluorophenyl)-N-(1-((S or R)-1-(5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 569.1 Found: 569 | |

Example 21

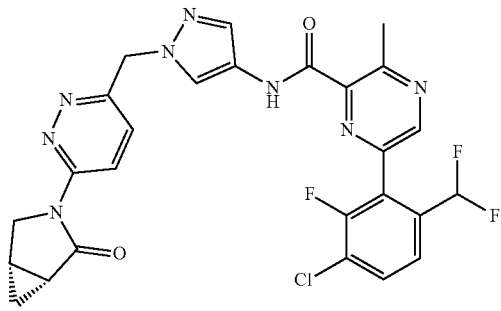 [SMILES: Cc1ncc(-c2c(C(F)F)ccc(Cl)c2F)nc1C(=O)Nc1cnn(Cc2ccc(N3C[C@H]4C[C@H]4C3=O)nn2)c1]

6-(3-Chloro-6-(difluoromethyl)-2-fluorophenyl)-3-methyl-N-(1-((6-((1R,5S)-2-oxo-3-azabicyclo[3.1.0]hexan-3-yl)pyridazin-3-yl)methyl)-1H-pyrazol-4-yl)pyrazine-2-carboxamide (Scheme AAB)

Step 1. 3-(Bromomethyl)-6-chloropyridazine: A mixture of 3-chloro-6-methylpyridazine (1 g, 7.78 mmol), NBS (1.384 g, 7.78 mmol) and AIBN (0.128 g, 0.778 mmol) in CCl$_4$ (26 ml) was stirred at 90° C. overnight. The reaction mixture was cooled to rt, diluted with EtOAc, filtered and concentrated under reduced pressure. The residue was purified by silica gel column chromatography (EtOAc/hexanes) to afford the title compound. MS=208.9 [M+1]$^+$ Step 2. tert-Butyl (1-((6-chloropyridazin-3-yl)methyl)-1H-pyrazol-4-yl)carbamate: To a solution of 3-(bromomethyl)-6-chloropyridazine (530 mg, 2.55 mmol) in DMF (10 mL) was added tert-butyl (1H-pyrazol-4-yl)carbamate (702 mg, 3.83 mmol) and cesium carbonate (2.50 g, 7.66 mmol) at rt. The mixture was stirred at rt for 16 h, diluted with EtOAc, and washed with water then brine. The organic layer was dried over Na$_2$SO$_4$, filtered and concentrated under reduced pressure. The crude residue was purified by silica gel column chromatography (EtOAc/hexanes) to afford the title compound. MS=310.0 [M+1]$^+$.

Step 3. tert-Butyl (1-((6-(2-oxo-3-azabicyclo[3.1.0]hexan-3-yl)pyridazin-3-yl)methyl)-1H-pyrazol-4-yl)carbamate: To a suspension of 6-(3-chloro-6-(difluoromethyl)-2-fluorophenyl)-N-(1-(1-(4-methyl-2-(methylthio)pyrimidin-5-yl)ethyl)-1H-pyrazol-4-yl)pyrazine-2-carboxamide (500 mg, 0.936 mmol) in DCM (20 mL) was added mCPBA (441 mg, 2.0 mmol) at rt. The mixture was stirred at rt for 1 h, diluted with DCM, washed with 1N aq. Na$_2$CO$_3$. The organic layer was dried (Na$_2$SO$_4$), filtered and the solvent was evaporated under reduced pressure. The residue was purified by silica gel column chromatography eluting with EtOAc/hexanes to give 6-(3-chloro-6-(difluoromethyl)-2-fluorophenyl)-N-(1-(1-(4-methyl-2-(methylsulfonyl)-pyrimidin-5-yl)ethyl)-1H-pyrazol-4-yl)pyrazine-2-carboxamide. The mixture of tert-butyl (1-((6-chloropyridazin-3-yl)methyl)-1H-pyrazol-4-yl)carbamate (250 mg, 0.807 mmol), (1R,5S)-3-azabicyclo[3.1.0]hexan-2-one (118 mg, 1.21 mmol), ethylenediamine (5.5 µl, 0.081 mmol) and CuI (15.4 mg, 0.081 mmol) in 1,4-dioxane (4.0 mL) was stirred at 100° C. for 2 h. The mixture was cooled to rt and filtered through Celite® (washing with DCM). The filtrate was washed with brine, dried over Na$_2$SO$_4$, filtered and concentrated under reduced pressure. The crude residue was purified by silica gel column chromatography (MeOH/DCM) to afford the title compound. MS=371.1 [M+1]$^+$.

Step 4. (1R,5S)-3-(6-((4-Amino-1H-pyrazol-1-yl)methyl)pyridazin-3-yl)-3-azabicyclo[3.1.0]hexan-2-one: The title compound was prepared following procedures similar to those described above in Intermediate AE-5, step 4. MS=271.1 [M+1]$^+$.

Step 5. 6-(3-Chloro-6-(difluoromethyl)-2-fluorophenyl)-3-methyl-N-(1-((6-((1R,5S)-2-oxo-3-azabicyclo[3.1.0]hexan-3-yl)pyridazin-3-yl)methyl)-1H-pyrazol-4-Yl)pyrazine-2-carboxamide: The title compound was prepared following procedures similar to those described above in Example 1, step 5. aq. $^1$H NMR (600 MHz, CD$_3$OD) δ 8.88 (d, J=1.9 Hz, 1H), 8.55 (d, J=9.3 Hz, 1H), 8.30 (s, 1H), 7.84 (t, J=7.8 Hz, 1H), 7.76 (s, 1H), 7.69 (d, J=8.4 Hz, 1H), 7.45 (d, J=9.4 Hz, 1H), 6.96 (s, 1H), 5.61 (s, 2H), 4.26 (dd, J=11.5, 5.6 Hz, 1H), 4.20 (d, J=11.6 Hz, 1H), 3.01 (s, 3H), 2.22 (p, J=6.0 Hz, 1H), 2.16 (d, J=4.5 Hz, 1H), 1.36-1.30 (m, 1H), 0.94-0.86 (m, 1H). MS=555.3 [M+1]$^+$ Examples 22 and 23

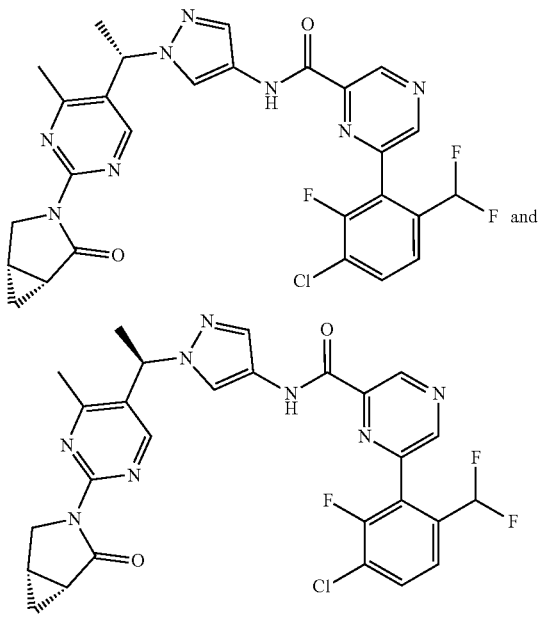

6-(3-Chloro-6-(difluoromethyl)-2-fluorophenyl)-N-(1-((S)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide and 6-(3-Chloro-6-(difluoromethyl)-2-fluorophenyl)-N-(1-((R)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAC)

Step 1. 5-(1-Bromoethyl)-4-methyl-2-(methylthio)pyrimidine: The title compound was prepared following procedures similar to those described above in Example AAA-10a, step 1. MS=248.9 [M+1]$^+$.

Step 2. 6-(3-Chloro-6-(difluoromethyl)-2-fluorophenyl)-N-(1-(1-(4-methyl-2-(methylthio)-pyrimidin-5-yl)ethyl)-1H-pyrazol-4-yl)pyrazine-2-carboxamide. To a solution of 5-(1-bromoethyl)-4-methyl-2-(methylthio)pyrimidine (310 mg, 1.25 mmol) in DMF (3.4 mL) was added 6-(3-chloro-6-(difluoromethyl)-2-fluorophenyl)-N-(1H-pyrazol-4-yl)pyrazine-2-carboxamide, (461 mg, 1.25 mmol) and cesium carbonate (1.23 g, 3.76 mmol) at rt. The mixture was stirred at rt for 16h, diluted with EtOAc then washed with water and brine. The organic layer was dried over Na$_2$SO$_4$, filtered and concentrated under reduced pressure. The crude residue was purified by silica gel chromatography (EtOAc/hexanes) to afford the title compound. MS=533.9 [M+1]$^+$.

Step 3. 6-(3-Chloro-6-(difluoromethyl)-2-fluorophenyl)-N-(1-(1-(4-methyl-2-(methylsulfonyl)-pyrimidin-5-yl)ethyl)-1H-pyrazol-4-yl)pyrazine-2-carboxamide. To a suspension of 6-(3-chloro-6-(difluoromethyl)-2-fluorophenyl)-N-(1-(1-(4-methyl-2-(methylthio)pyrimidin-5-yl)ethyl)-1H-pyrazol-4-yl)pyrazine-2-carboxamide (500 mg, 0.936 mmol) in DCM (20 mL) was added mCPBA (441 mg, 2.00 mmol). The mixture was stirred at rt for 1 h, diluted with DCM, washed with 1N aq. sodium carbonate. The organic layer was dried (Na$_2$SO$_4$), filtered and the solvent was evaporated under reduced pressure. The residue was purified by silica gel column chromatography eluting with EtOAc/hexanes to give the title compound. MS=565.9 [M+1]$^+$.

Step 4. 6-(3-Chloro-6-(difluoromethyl)-2-fluorophenyl)-N-(1-((S)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide and 6-(3-Chloro-6-(difluoromethyl)-2-fluorophenyl)-N-(1-((R)-1-(4-methyl-2-((1R,5S)-2-oxo-3-azabicyclo[3.1.0]-hexan-3-yl)pyrimidin-5-yl)ethyl)-1H-pyrazol-4-yl)pyrazine-2-carboxamide: The mixture of 6-(3-chloro-6-(difluoromethyl)-2-fluorophenyl)-N-(1-(1-(4-methyl-2-(methylsulfonyl)-pyrimidin-5-yl)ethyl)-1H-pyrazol-4-yl)pyrazine-2-carboxamide (200 mg, 0.353 mmol), (1R,5S)-3-azabicyclo[3.1.0]hexan-2-one (137 mg, 1.40 mmol) and cesium carbonate (461 mg, 1.40 mmol) in 1,4-dioxane (3.5 mL) was stirred at 90° C. for 30 min. The mixture was cooled to rt and purified by reversed-phase preparatory-HPLC (C18 stationary phase, ACN/water+0.1% TFA) to afford the diastereomeric title compound as a mixture. The isomeric title compounds were separated by chiral chromatography (SFC, DAICEL CHIRALCEL IA, 0.1% DEA-EtOH Begin B 35% End B 35%) to furnish the individual isomers in pure form. The faster-eluting isomer of the title compounds (Example 22): $^1$H NMR (600 MHz, CD$_3$OD) δ 9.38 (s, 1H), 9.01 (s, 1H), 8.38 (s, 1H), 8.21 (s, 1H), 7.84 (t, J=7.8 Hz, 1H), 7.77 (s, 1H), 7.66 (d, J=8.5 Hz, 1H), 7.00 (t, J=54.7 Hz, 1H), 5.80 (q, J=7.0 Hz, 1H), 4.18 (dd, J=11.5, 5.0 Hz, 1H), 3.99 (d, J=11.5 Hz, 1H), 2.43 (s, 3H), 2.10 (dt, J=8.2, 4.5 Hz, 2H), 1.89 (d, J=7.0 Hz, 3H), 1.27 (td, J=7.7, 4.1 Hz, 1H), 0.82 (q, J=3.7 Hz, 1H). MS=583.0 [M+1]$^+$. The slower-eluting isomer of the title compounds (Example 23): $^1$H NMR (600 MHz, CD$_3$OD) δ 9.39 (s, 1H), 9.02 (d, J=2.0 Hz, 1H), 8.41 (d, J=3.7 Hz, 1H), 8.26 (s, 1H), 7.87-7.81 (m, 1H), 7.78 (d, J=3.2 Hz, 1H), 7.66 (d, J=8.5 Hz, 1H), 7.00 (t, J=54.7 Hz, 1H), 5.85 (q, J=7.0 Hz, 1H), 4.18 (dq, J=11.3, 4.5, 4.0 Hz, 1H), 4.05 (d, J=11.5 Hz, 1H), 2.51 (s, 3H), 2.17 (dt, J=8.2, 4.7 Hz, 2H), 1.90 (d, J=6.9 Hz, 3H), 1.37-1.30 (m, 1H), 0.89 (q, J=4.1 Hz, 1H). MS=583.0 [M+1]$^+$.

TABLE 16

The following compounds were prepared using procedures similar to those described in Examples 22 and 23 using appropriate starting materials. In some examples, racemic products or diatereoisomeric mixtures were separated using chiral columns (SFC or HPLC) specified in the table.

| Example No. | Structure | Name | [M + H]$^+$ or [M + Na]$^+$ | Chiral column |
|---|---|---|---|---|
| 24 | | 6-(3-Chloro-6-(difluoromethyl)-2-fluorophenyl)-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide | Calcd.: 569.1 Found: 569.0 | |

TABLE 16-continued

The following compounds were prepared using procedures
similar to those described in Examples 22 and 23 using appropriate
starting materials. In some examples, racemic products or diatereoisomeric
mixtures were separated using chiral columns (SFC or HPLC) specified in the table.

| Example No. | Structure | Name | [M + H]+ or [M + Na]+ | Chiral column |
|---|---|---|---|---|
| 25 | | 6-(3-Chloro-6-(difluoromethyl)-2-fluorophenyl)-N-(1-((2-((1R,5S)-2-oxo-3-azabicyclo-[3.1.0]hexan-3-yl)pyrimidin-5-yl)methyl)-1H-pyrazol-4-yl)pyrazine-2-carboxamide | Calcd.: 555.1 Found: 554.9 | |
| 26 | | (S and R)-6-(3-Chloro-6-(difluoromethyl)-2-fluorophenyl)-N-(1-(1-(2-(7-oxo-5,7-dihydro-6H-pyrrolo[3,4-b]pyridin-6-yl)pyrimidin-5-yl)ethyl)-1H-pyrazol-4-yl)pyrazine-2-carboxamide | Calcd.: 606.0 Found: 606.1 | |
| 27 | | (S and R)-6-(3-Chloro-6-(difluoromethyl)-2-fluorophenyl)-N-(1-(1-(2-(5-oxo-5,7-dihydro-6H-pyrrolo[3,4-b]pyridin-6-yl)pyrimidin-5-yl)ethyl)-1H-pyrazol-4-yl)pyrazine-2-carboxamide | Calcd.: 606.0 Found: 606.1 | |
| 28 | | (S and R)-6-(3-Chloro-6-(difluoromethyl)-2-fluorophenyl)-N-(1-(1-(2-(3-methyl-2-oxoimidazolidin-1-yl)pyrimidin-5-yl)ethyl)-1H-pyrazol-4-yl)pyrazine-2-carboxamide | Calcd.: 572.0 Found: 572.1 | |

TABLE 16-continued

The following compounds were prepared using procedures similar to those described in Examples 22 and 23 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 29 | | 6-(3-Chloro-6-(difluoromethyl)-2-fluorophenyl)-3-methyl-N-(1-((S or R)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 583.2<br>Found: 583.2 | CHIRALPAK OD-H |
| 30 | | 6-(3-Chloro-6-(difluoromethyl)-2-fluorophenyl)-3-methyl-N-(1-((R or S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 583.2<br>Found: 583.2 | CHIRALPAK OD-H |
| 31 | | 6-(3-Chloro-6-(difluoromethyl)-2-fluorophenyl)-N-(1-((S or R)-1-(2-((1R,5S)-2-thioxo-3-azabicyclo[3.1.0]hexan-3-yl)pyrimidin-5-yl)ethyl)-1H-pyrazol-4-yl)pyrazine-2-carboxamide | Calcd.: 585.1<br>Found: 585.0 | |
| 32 | | 6-(3-Chloro-6-(difluoromethyl)-2-fluorophenyl)-N-(1-((R or S)-1-(2-((1R,5S)-2-thioxo-3-azabicyclo[3.1.0]hexan-3-yl)pyrimidin-5-yl)ethyl)-1H-pyrazol-4-yl)pyrazine-2-carboxamide | Calcd.: 585.1<br>Found: 585.0 | |

Examples 33 and 34

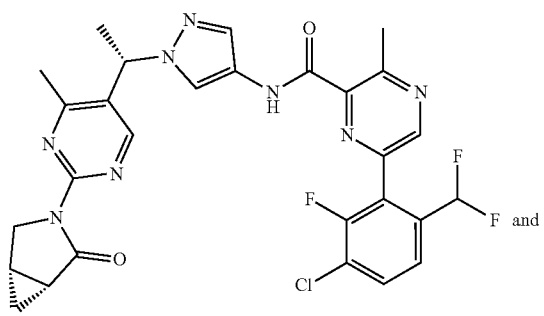 [SMILES: Cc1nc(N2C[C@H]3C[C@H]3C2=O)ncc1Cn1cc(NC(=O)c2nc(-c3c(OC(F)F)ccc(Cl)c3F)cnc2C)cn1]

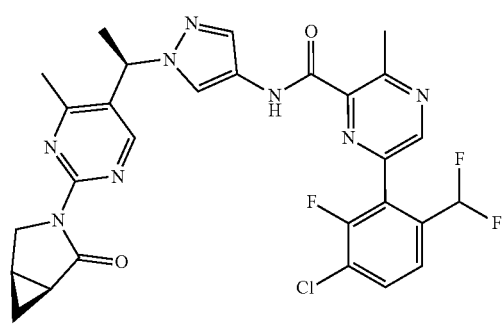

6-(3-Chloro-6-(difluoromethyl)-2-fluorophenyl)-3-methyl-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide and 6-(3-Chloro-6-(difluoromethyl)-2-fluorophenyl)-3-methyl-N-(1-((4-methyl-2-((1S,5R)-2-oxo-3-azabicyclo[3.1.0]hexan-3-yl)pyrimidin-5-yl)methyl)-1H-pyrazol-4-yl)pyrazine-2-carboxamide (Scheme AAD)

Step 1. 5-(Bromomethyl)-4-methyl-2-(methylthio)pyrimidine: To a solution of (4-methyl-2-(methylthio)pyrimidin-5-yl)methanol (500 mg, 2.94 mmol) in DCM (5.0 mL) cooled to 0° C. was added carbon tetrabromide (1.267 mg, 3.82 mmol) and triphenylphosphine (1.00 g, 3.82 mmol). The mixture was stirred at 0° C. for 2 h, then concentrated under reduced pressure. The crude residue was purified by silica gel chromatography (0 to 20% EtOAc/hexanes) to afford the title compound. MS=234.9.0 [M+1]*.

Step 2. tert-Butyl (1-((4-methyl-2-(methylthio)pyrimidin-5-yl)methyl)-1H-pyrazol-4-yl)carbamate: To a solution of tert-butyl (1H-pyrazol-4-yl)carbamate (754 mg, 4.12 mmol) in DMF (10.0 mL) was added 5-(bromomethyl)-4-methyl-2-(methylthio)pyrimidine (640 mg, 2.75 mmol) and cesium carbonate (3.58 g, 11.0 mmol). The mixture was stirred at rt for 16 then diluted with EtOAc and washed with water and brine. The organic layer was dried over $Na_2SO_4$, filtered and concentrated under reduced pressure. The crude residue was purified by silica gel chromatography (5 to 60% EtOAc/hexanes) to afford the title compound. MS=336.0 [M+1]⁺.

Step 3. tert-Butyl (1-((4-methyl-2-(methylsulfonyl)pyrimidin-5-yl)methyl)-1H-pyrazol-4-yl)carbamate: The title compound was prepared following procedures similar to those described above in Example 22, step 3. aq. MS=368.0 [M+1]⁺.

Step 4. tert-Butyl (1-((4-methyl-2-(2-oxo-3-azabicyclo[3.1.0]hexan-3-yl)pyrimidin-5-yl)methyl)-1H-pyrazol-4-yl)carbamate: The mixture of (1-((4-methyl-2-(methylsulfonyl)pyrimidin-5-yl)methyl)-1H-pyrazol-4-yl)carbamate (660 mg, 1.80 mmol), 3-azabicyclo[3.1.0]hexan-2-one (523 mg, 5.39 mmol) and cesium carbonate (1.76 g, 5.39 mmol) in 1,4-dioxane (18.0 mL) was stirred at 90° C. for 30 min. The reaction mixture was cooled to rt then the mixture was filtered. The filtrate was concentrated under reduced pressure and the crude residue was purified by silica gel chromatography (MeOH/DCM) to afford the title compound. MS=385.1 [M+1]⁺.

Step 5. 3-(5-((4-Amino-1H-pyrazol-1-yl)methyl)-4-methylpyrimidin-2-yl)-3-azabicyclo[3.1.0]-hexan-2-one: The title compound was prepared following procedures similar to those described above in Intermediate AE-5, step 4. MS=285.1 [M+1]⁺.

Step 6. 6-(3-Chloro-6-(difluoromethyl)-2-fluorophenyl)-3-methyl-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide and 6-(3-Chloro-6-(difluoromethyl)-2-fluorophenyl)-3-methyl-N-(1-((4-methyl-2-((1S,5R)-2-oxo-3-azabicyclo[3.1.0]hexan-3-yl)pyrimidin-5-yl)methyl)-1H-pyrazol-4-yl)pyrazine-2-carboxamide: The title compound was prepared following procedures similar to those described above Example 1, step 5. The isomeric title compounds were separated by chiral chromatography (SFC, DAICEL CHIRACEL AS-H; MeOH Begin B 25% End B 25%) to furnish the individual isomers in pure form. The faster-eluting isomer of the title compounds (Example 33): $^1$H NMR (600 MHz, CD$_3$OD) δ 8.85 (d, J=2.4 Hz, 1H), 8.28 (s, 1H), 8.17 (s, 1H), 7.84-7.78 (m, 1H), 7.70 (s, 1H), 7.66 (d, J=8.5 Hz, 1H), 6.93 (t, J=54.6 Hz, 1H), 5.37 (s, 2H), 4.19 (dd, J=11.5, 5.1 Hz, 1H), 4.00 (d, J=11.1 Hz, 1H), 2.98 (s, 3H), 2.46 (s, 3H), 2.14-2.08 (m, 2H), 1.27 (dt, J=12.6, 4.4 Hz, 1H), 0.83 (q, J=4.2 Hz, 1H). MS=583.0 [M+1]⁺. The slower-eluting isomer of the title compounds (Example 34): $^1$H NMR (600 MHz, CD$_3$OD) δ 8.85 (d, J=2.4 Hz, 1H), 8.28 (s, 1H), 8.17 (s, 1H), 7.84-7.78 (m, 1H), 7.70 (s, 1H), 7.66 (d, J=8.5 Hz, 1H), 6.93 (t, J=54.6 Hz, 1H), 5.37 (s, 2H), 4.19 (dd, J=11.5, 5.1 Hz, 1H), 4.00 (d, J=11.1 Hz, 1H), 2.98 (s, 3H), 2.46 (s, 3H), 2.14-2.08 (m, 2H), 1.31-1.24 (m, 1H), 0.92-0.80 (m, 1H). MS=583.0 [M+1]⁺.

TABLE 17

The following compounds were prepared
using procedures similar to those described in Examples 33 and 34
using appropriate starting materials. In some examples, racemic products or
diastereoisomeric mixtures were separated using chiral columns (SFC or HPLC) specified in the table.

| Example No. | Structure | Name | [M + H]$^+$ or [M + Na]$^+$ | Chiral column |
|---|---|---|---|---|
| 35 | | 6-(3-Chloro-6-(difluoromethyl)-2-fluorophenyl)-N-(1-((4-methyl-2-((1R,5S)-2-oxo-3-azabicyclo[3.1.0]hexan-3-yl)pyrimidin-5-yl)methyl)-1H-pyrazol-4-yl)-3-vinylpyrazine-2-carboxamide | Calcd.: 595.2 Found: 595.0 | |
| 36 | | 6-(3-Chloro-6-(difluoromethoxy)-2-fluorophenyl)-3-methyl-N-(1-((4-methyl-2-((1R,5S)-2-ox0-3-azabicyclo[3.1.0]hexan-3-yl)pyrimidin-5-yl)methyl)-1H-pyrazol-4-yl)pyrazine-2-carboxamide | Calcd.: 599.2 Found: 599.0 | |

Examples 37 and 38

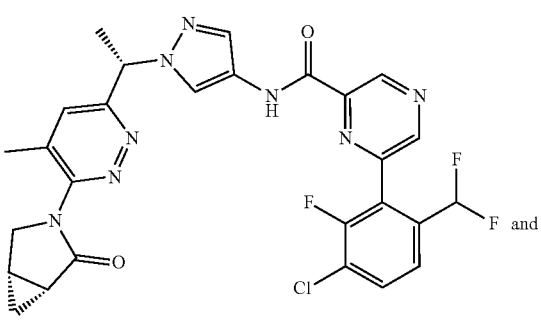

and

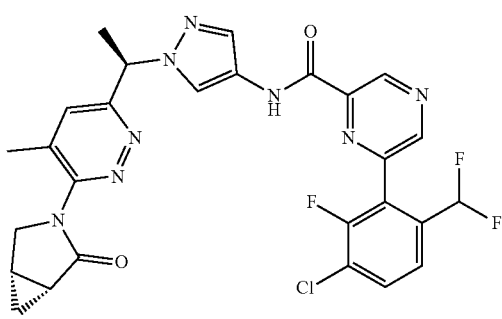

6-(3-Chloro-6-(difluoromethyl)-2-fluorophenyl)-N-(1-((S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide and 6-(3-Chloro-6-(difluoromethyl)-2-fluorophenyl)-N-(1-((R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide (Scheme AAE)

Step 1. 3-Chloro-4-methyl-6-(1-(4-nitro-1H-pyrazol-1-yl)ethyl)pyridazine: To a solution of a mixture of 1-(6-chloro-4-methylpyridazin-3-yl)ethanol and 1-(6-chloro-5-methylpyridazin-3-yl)ethanol (480 mg, 1.39 mmol), 4-nitro-1H-pyrazole (377 mg, 3.34 mmol) and triphenylphosphine (875 mg, 3.34 mmol) in THF (10 mL) was added di-tert-butyl azodicarboxylate (960 mg, 4.17 mmol) at 0° C. The reaction mixture was stirred at for 2 h, then concentrated under reduced pressure. The crude residue was purified by silica gel chromatography (0 to 4% EtOAc/petroleum ether) to afford the title compound as a mixture with 6-chloro-4-methyl-3-(1-(4-nitro-1H-pyrazol-1-yl)ethyl)pyridazine. MS=267.9 [M+1]$^+$.

Step 2. (1R,5S)-3-(4-Methyl-6-(1-(4-nitro-1H-pyrazol-1-yl)ethyl)pyridazin-3-yl)-3-azabicyclo[3.1.0]hexan-2-one: To a solution of a mixture of 3-chloro-4-methyl-6-(1-(4-nitro-1H-pyrazol-1-yl)ethyl)pyridazine and 6-chloro-4-methyl-3-(1-(4-nitro-1H-pyrazol-1-yl)ethyl)pyridazine (600 mg, 1.12 mmol) in dioxane (10.0 mL) was added (1R,5s)-3-azabicyclo[3.1.0]hexan-2-one (218 mg, 2.24 mmol), (9,9-dimethyl-9H-xanthene-4,5-diyl)bis(diphenylphosphine) (130 mg, 0.224 mmol), tris(dibenzylideneacetone)dipalladium (205 mg, 0.224 mmol) and cesium carbonate (730 mg, 2.24 mmol). The reaction mixture was stirred at 90° C. for 16 h. The reaction mixture was cooled to rt, filtered and the filtrate was concentrated under reduced vacuum. The crude residue was purified by silica gel chromatography (30% EtOAc/petroleum ether) and then preparatory-TLC (50% EtOAc/petroleum ether) to afford the title compound. MS=329.2 [M+1]$^+$.

Step 3. (1R,5S)-3-(6-(1-(4-Amino-1H-pyrazol-1-yl)ethyl)-4-methylpyridazin-3-yl)-3-azabicyclo[3.1.0]hexan-2-one: To a solution of (1R,5S)-3-(4-methyl-6-(1-(4-nitro-1H-pyrazol-1-yl)ethyl)pyridazin-3-yl)-3-azabicyclo[3.1.0]hexan-2-one (80.0 mg, 0.244 mmol) in a mixture of EtOAc (0.6 mL) and MeOH (0.2 mL) was added platinum(IV) oxide (5.5 mg, 0.024 mmol). The reaction mixture was stirred at rt for 2 h under a $H_2$ atmosphere (15 psi). The reaction mixture was filtered and then concentrated under reduced pressure to afford the title compound. MS=299 [M+1]$^+$.

Step 4. 6-(3-Chloro-6-(difluoromethyl)-2-fluorophenyl)-N-(1-((S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide and 6-(3-Chloro-6-(difluoromethyl)-2-fluorophenyl)-N-(1-((R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide: To a solution of (1R,5S)-3-(6-(1-(4-amino-1H-pyrazol-1-yl)ethyl)-4-methylpyridazin-3-yl)-3-azabicyclo[3.1.0]hexan-2-one (16.0 mg, 54 µmol), 6-(3-chloro-6-(difluoromethyl)-2-fluorophenyl)pyrazine-2-carboxylic acid (16.2 mg, 54 µmol), pyridine (22 µL, 0.268 mmol) and EDC (21 mg, 0.11 mmol) in DCM (2.0 mL) was stirred at rt for 16 h. The mixture was concentrated under reduced pressure and purified by reversed-phase preparatory-HPLC (C18 stationary phase, water(0.1% TFA)-ACN Begin B 45% End B 75%) to afford the diastereoisomeric mixture of title compounds. The diastereoisomeric title compounds were separated by chiral chromatography (SFC, DAICEL CHIRALPAK AD; Neutral-IPA Begin B 55% End B 55%) to furnish the individual isomer compounds in pure form. The faster-eluting diastereoisomer of the title compounds (Example 37): $^1$H NMR (500 MHz, CD$_3$OD) δ 9.30 (s, 1H), 8.92 (d, J=2.0 Hz, 1H), 8.24 (s, 1H), 7.74 (t, J=7.9 Hz, 1H), 7.71 (s, 1H), 7.57 (d, J=8.2 Hz, 1H), 7.27 (s, 1H), 7.03-6.79 (m, 1H), 5.76 (d, J=7.2 Hz, 1H), 4.37 (dd, J=5.8, 10.4 Hz, 1H), 3.71 (d, J=10.1 Hz, 1H), 2.15-2.11 (m, 1H), 2.08 (s, 3H), 1.96 (br s, 1H), 1.90 (d, J=7.2 Hz, 3H), 1.23 (dt, J=4.7, 8.0 Hz, 1H), 0.90-0.86 (m, 1H). MS=583.2 [M+1]$^+$. The slower-eluting diastereoisomer of the title compounds (Example 38): $^1$H NMR (500 MHz, CD$_3$OD) δ 9.30 (s, 1H), 8.92 (d, J=2.1 Hz, 1H), 8.24 (s, 1H), 7.74 (t, J=7.9 Hz, 1H), 7.71 (s, 1H), 7.57 (d, J=8.7 Hz, 1H), 7.26 (s, 1H), 7.04-6.78 (m, 1H), 5.77 (d, J=7.2 Hz, 1H), 4.37 (dd, J=5.9, 10.5 Hz, 1H), 3.71 (d, J=9.9 Hz, 1H), 2.16-2.10 (m, 1H), 2.08 (s, 3H), 1.97 (br s, 1H), 1.90 (d, J=7.0 Hz, 3H), 1.27-1.22 (m, 1H), 0.91-0.86 (m, 1H). MS=583.2 [M+1]$^+$.

Examples 39 and 40

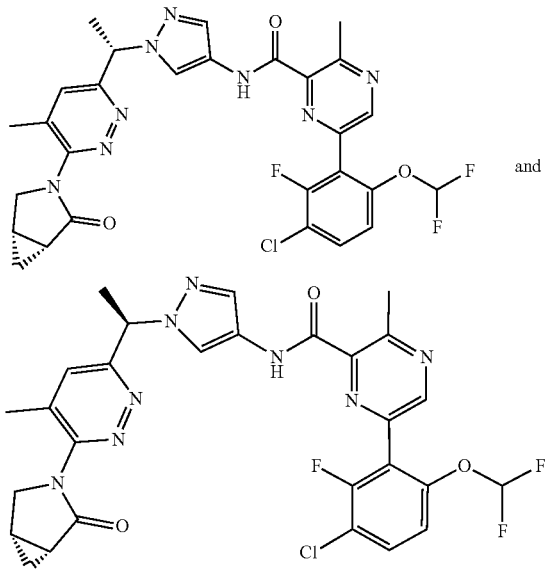

6-(3-Chloro-6-(difluoromethoxy)-2-fluorophenyl)-3-methyl-N-(1-((S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide and 6-(3-Chloro-6-(difluoromethoxy)-2-fluorophenyl)-3-methyl-N-(1-((R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide (Scheme AAE)

Step 5. 6-(3-Chloro-6-(difluoromethoxy)-2-fluorophenyl)-3-methyl-N-(1-((S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide and 6-(3-Chloro-6-(difluoromethoxy)-2-fluorophenyl)-3-methyl-N-(1-((R)-1-(5-methyl-6-((1R,5S)-2-oxo-3-azabicyclo[3.1.0]hexan-3-yl)pyridazin-3-yl)ethyl)-TH-pyrazol-4-yl)pyrazine-2-carboxamide: To a solution of 6-(3-chloro-6-(difluoromethoxy)-2-fluorophenyl)-3-methylpyrazine-2-carboxylic acid (140 mg, 0.421 mmol) and (1R,5S)-3-(6-(1-(4-amino-TH-pyrazol-1-yl)ethyl)-4-methylpyridazin-3-yl)-3-azabicyclo[3.1.0]hexan-2-one (151 mg, 0.505 mmol) in pyridine (2.0 mL) was added EDC (161 mg, 0.842 mmol). After the addition was completed, the reaction mixture was stirred at rt for 4 h. The mixture was concentrated under reduced pressure and the crude residue was purified by reversed-phase preparatory-HPLC (C18 stationary phase, water(0.1% TFA)-ACN Begin B 37% End B 67%) to afford the diastereoisomeric mixture of title compounds. The diastereoisomeric title compounds were separated by chiral chromatography (SFC, DAICEL CHIRALPAK AD; 0.1% NH$_3$H$_2$O-IPA Begin B 50% End B 50%) to furnish the individual isomer compounds in pure form. The faster-eluting diastereoisomer of the title compounds (Example 39): $^1$H NMR (400 MHz, CD$_3$OD) δ 8.79 (s, 1H), 8.32 (s, 1H), 7.77 (s, 1H), 7.74-7.68 (m, 1H), 7.36 (d, J=0.8 Hz, 1H), 7.25 (d, J=9.0 Hz, 1H), 6.93 (t, J=72.8 Hz, 1H), 5.85 (q, J=7.3 Hz, 1H), 4.47 (dd, J=10.6, 5.9 Hz, 1H), 3.82 (d, J=9.4 Hz, 1H), 2.98 (s, 3H), 2.27-2.20 (m, 1H), 2.18 (d, J=0.8 Hz, 3H), 2.10-2.03 (m, 1H), 2.00 (d, J=7.4 Hz, 3H), 1.37-1.32 (m, 1H), 1.01-0.96 (m, 1H). MS=613.2 [M+1]⁺. The slower-eluting diastereoisomer of the title compounds (Example 40): ¹H NMR (400 MHz, CD₃OD) δ 8.79 (s, 1H), 8.31 (s, 1H), 7.77 (s, 1H), 7.71 (t, J=8.6 Hz, 1H), 7.35 (s, 1H), 7.25 (d, J=9.0 Hz, 1H), 6.93 (t, J=72.8 Hz, 1H), 5.86 (q, J=7.0 Hz, 1H), 4.47 (dd, J=10.6, 5.9 Hz, 1H), 3.81 (d, J=9.4 Hz, 1H), 2.98 (s, 3H), 2.27-2.20 (m, 1H), 2.18 (s, 3H), 2.10-2.04 (m, 1H), 2.00 (d, J=7.0 Hz, 3H), 1.37-1.33 (m, 1H), 1.01-0.96 (m, 1H). MS=613.2 [M+1]⁺.

Example 41

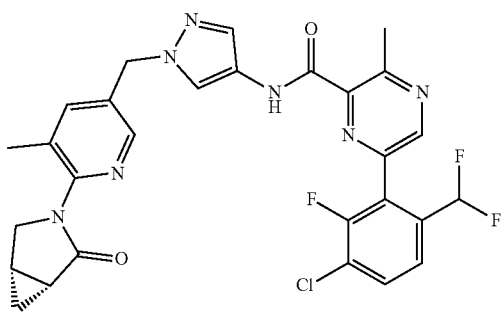 [SMILES: Cc1cc(Cn2cc(NC(=O)c3nc(-c4c(C(F)F)ccc(Cl)c4F)cnc3C)cn2)cnc1N1C[C@H]2C[C@H]2C1=O]

6-(3-Chloro-6-(difluoromethyl)-2-fluorophenyl)-3-methyl-N-(1-((5-methyl-6-((1R,5S)-2-oxo-3-azabicyclo[3.1.0]hexan-3-yl)pyridin-3-yl)methyl)-1H-pyrazol-4-yl)pyrazine-2-carboxamide (Scheme AAE)

Step 1. 2-Bromo-3-methyl-5-((4-nitro-1H-pyrazol-1-yl)methyl)pyridine: To a solution of (6-bromo-5-methylpyridin-3-yl)methanol (10.0 g, 49.5 mmol), 4-nitro-1H-pyrazole (8.39 g, 74.2 mmol), and triphenylphosphine (19.5 g, 74.2 mmol) in THF (200 mL) cooled to 0° C. was added di-iso-propyl azodicarboxylate (14.4 mL, 74.2 mmol). After completion of the addition, the reaction mixture was stirred at 50° C. for 2 h. The reaction mixture was cooled to rt and concentrated under reduced pressure. The crude residue was purified by silica gel chromatography (0 to 100% EtOAc/hexanes) to afford the title compound. MS=297.0, 299.0 [M+1]⁺.

Step 2. (1R,5S)-3-(3-Methyl-5-((4-nitro-1H-pyrazol-1-yl)methyl)pyridin-2-yl)-3-azabicyclo[3.1.0]hexan-2-one: To a vessel containing [(4,5-bis(diphenylphosphino)-9,9-dimethylxanthene)-2-(2'-amino-1,1'-biphenyl)]palladium(II) methanesulfonate (Xantphos-Pd-G3, 4.69 g, 4.95 mmol), cesium carbonate (48.4 g, 148 mmol), (1R,5S)-3-azabicyclo[3.1.0]hexan-2-one (7.21 g, 74.2 mmol) and 2-bromo-3-methyl-5-((4-nitro-1H-pyrazol-1-yl)methyl)pyridine (14.7 g, 49.5 mmol) under a nitrogen atmosphere at rt was added 1,4-Dioxane (200 mL). The resulting mixture was stirred at 100° C. for 16 h. The reaction mixture was cooled to rt, filtered and concentrated under reduced pressure. The crude residue was purified by silica gel chromatography (0 to 6% MeOH/DCM) to provide the title compound. MS=314.1 [M+1]⁺.

Step 3. (1R,5S)-3-(5-((4-Amino-1H-pyrazol-1-yl)methyl)-3-methylpyridin-2-yl)-3-azabicyclo[3.1.0]hexan-2-one: To a vessel containing (1R,5S)-3-(3-methyl-5-((4-nitro-1H-pyrazol-1-yl)methyl)pyridin-2-yl)-3-azabicyclo[3.1.0]hexan-2-one (16.1 g, 17.5 mmol), iron (7.80 g, 140 mmol) and NH₄Cl (9.34 g, 175 mmol) at rt was added EtOH (70 mL) and water (18 mL). The resulting mixture was stirred at 80° C. for 6 h. The reaction mixture was cooled to rt and filtered through a pad of Celite® (eluting with additional DCM). The filtrate was concentrated under reduced pressure, and the resulting residue was suspended in EtOH and filtered to afford the title compound. MS=284.1 [M+1]⁺.

Step 4. 6-(3-Chloro-6-(difluoromethyl)-2-fluorophenyl)-3-methyl-N-(1-((5-methyl-6-((1R,5S)-2-oxo-3-azabicyclo[3.1.0]hexan-3-yl)pyridin-3-yl)methyl)-1H-pyrazol-4-yl)pyrazine-2-carboxamide: To a solution of (1R,5S)-3-(5-((4-amino-1H-pyrazol-1-yl)methyl)-3-methylpyridin-2-yl)-3-azabicyclo[3.1.0]hexan-2-one (16.5 g, 17.5 mmol) in ACN (87 mL) cooled to 0° C. was added 6-(3-chloro-6-(difluoromethyl)-2-fluorophenyl)-3-methylpyrazine-2-carboxylic acid (6.92 g, 21.8 mmol) and HATU (8.30 g, 21.8 mmol), followed by DIEA (9.15 mL, 52.4 mmol). The reaction mixture was allowed to warm to rt and stirred for 1 h. The reaction mixture was concentrated under reduced pressure. The crude residue was purified by silica gel chromatography (0 to 10% MeOH/DCM) to afford the title compound. ¹H NMR (500 MHz, CDCl₃) δ 9.77 (s, 1H), 8.95 (d, J=3.4 Hz, 1H), 8.25 (d, J=2.1 Hz, 1H), 8.15 (s, 1H), 7.75-7.66 (m, 2H), 7.60 (s, 1H), 7.46 (d, J=1.9 Hz, 1H), 6.60 (t, J=54.0 Hz, 1H), 5.27 (s, 2H), 4.42-4.33 (m, 1H), 3.68 (d, J=10.0 Hz, 1H), 3.15 (s, 3H), 2.17 (s, 3H), 2.09-2.00 (m, 2H), 1.27-1.23 (m, 1H), 0.91 (q, J=3.8 Hz, 1H). MS=582.0 [M+1]⁺.

Examples 42 and 43

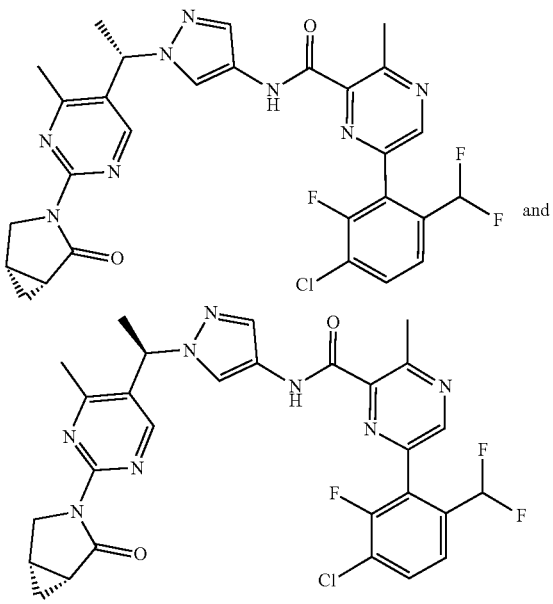

6-(3-Chloro-6-(difluoromethyl)-2-fluorophenyl)-3-methyl-N-(1-((R)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide and 6-(3-Chloro-6-(difluoromethyl)-2-fluorophenyl)-3-methyl-N-(1-((S)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAE)

Step 1. 2-Chloro-4-methyl-5-(1-(4-nitro-1H-pyrazol-1-yl)ethyl)pyrimidine: To a solution of 4-nitro-1H-pyrazole (197 mg, 1.74 mmol), 1-(2-chloro-4-methylpyrimidin-5-yl)ethanol (150 mg, 0.869 mmol) and triphenylphosphine (456 mg, 1.738 mmol) in THF (5.0 mL) under a nitrogen atmosphere was added di-tert-butyl azodicarboxylate (400 mg, 1.74 mmol). The reaction mixture was stirred at 15° C. for 2 h. The reaction mixture was concentrated under reduced pressure and the crude residue was purified by silica gel chromatography (0 to 40% EtOAc/hexanes) to afford the title compound. MS=268.0 [M+1]$^+$.

Step 2. (1R,5S)-3-(4-Methyl-5-(1-(4-nitro-1H-pyrazol-1-yl)ethyl)pyrimidin-2-yl)-3-azabicyclo[3.1.0]hexan-2-one: To a mixture of 2-chloro-4-methyl-5-(1-(4-nitro-1H-pyrazol-1-yl)ethyl)pyrimidine (185 mg, 0.691 mmol), (1R,5S)-3-azabicyclo[3.1.0]hexan-2-one (87.0 mg, 0.898 mmol), cesium carbonate (450 mg, 1.38 mmol) in dioxane (5.0 mL) under a nitrogen atmosphere was added tris(dibenzylideneacetone)dipalladium (63 mg, 69 µmol) and Xantphos (40 mg, 69 µmol). The reaction mixture was stirred at 90° C. for 16 h then cooled to rt and concentrated under reduced pressure. To the resulting mixture was added water and it was extracted with EtOAc. The organic layers were combined and washed with brine and concentrated under reduced pressure. The crude residue was purified by preparatory-TLC (1:1 EtOAc/petroleum ether) to afford the title compound. MS=329.1 [M+1]$^+$.

Step 3. (1R,5S)-3-(5-(1-(4-Amino-1H-pyrazol-1-yl)ethyl)-4-methylpyrimidin-2-yl)-3-azabicyclo[3.1.0]hexan-2-one: To a solution of (1R,5S)-3-(4-methyl-5-(1-(4-nitro-1H-pyrazol-1-yl)ethyl)pyrimidin-2-yl)-3-azabicyclo[3.1.0]hexan-2-one (80 mg, 0.24 mmol) in EtOAc (3.0 mL) and MeOH (1.0 mL) was added platinum(IV) oxide (5.5 mg, 0.024 mmol). The resulting mixture was stirred under a hydrogen atmosphere (pressure: 15 psi) at 15° C. for 1 h. Then, the mixture was filtered, and the filtrate was concentrated under reduced pressure afford the title compound. MS=299.0 [M+1]$^+$.

Step 4. 6-(3-Chloro-6-(difluoromethyl)-2-fluorophenyl)-3-methyl-N-(1-(1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide: The title compounds were prepared as an initial mixture of diastereomers following procedures similar to those described above in Intermediate AL-5a, step 3. The diastereoisomeric title compounds were separated by chiral chromatography (SFC, DAICEL CHIRALPAK AD; Neutral-EtOH Begin B 50% End B 50%) to furnish the individual isomer compounds in pure form. The faster-eluting diastereoisomer of the title compounds (Example 42): $^1$H NMR (400 MHz, CD$_3$OD) δ 8.83 (d, J=2.5 Hz, 1H), 8.47-8.26 (m, 1H), 8.25-8.07 (m, 1H), 7.83-7.74 (m, 1H), 7.69 (s, 1H), 7.63 (d, J=8.6 Hz, 1H), 7.05-6.77 (m, 1H), 5.77 (q, J=6.9 Hz, 1H), 4.22-4.09 (m, 1H), 4.03-3.91 (m, 1H), 2.95 (s, 3H), 2.41 (s, 3H), 2.12-2.03 (m, 2H), 1.86 (d, J=7.1 Hz, 3H), 1.25 (dt, J=4.7, 8.0 Hz, 1H), 0.84-0.77 (m, 1H). MS=597.2 [M+1]$^+$. The slower-eluting diastereoisomer of the title compounds (Example 43): $^1$H NMR (400 MHz, CD$_3$OD) δ 8.83 (d, J=2.5 Hz, 1H), 8.36 (s, 1H), 8.16 (s, 1H), 7.82-7.75 (m, 1H), 7.68 (s, 1H), 7.63 (d, J=8.6 Hz, 1H), 7.17-6.68 (m, 1H), 5.77 (q, J=7.10 Hz, 1H), 4.24-4.11 (m, 1H), 3.96 (d, J=11.3 Hz, 1H), 2.95 (s, 3H), 2.41 (s, 3H), 2.14-2.02 (m, 2H), 1.86 (d, J=7.1 Hz, 3H), 1.25 (td, J=3.9, 8.01 Hz, 1H), 0.80 (q, J=4.1 Hz, 1H). MS=597.2 [M+1]$^+$.

Examples 44 and 45

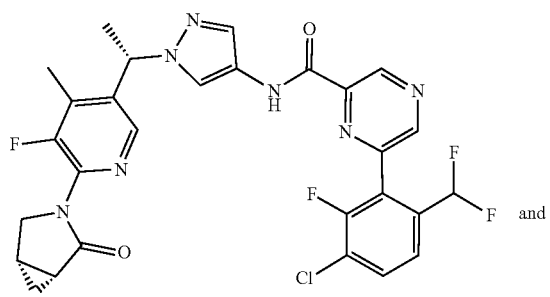 and

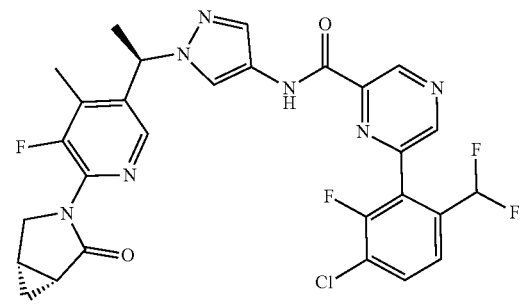

6-(3-Chloro-6-(difluoromethyl)-2-fluorophenyl)-N-(1-((S)-1-(5-fluoro-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide and 6-(3-Chloro-6-(difluoromethyl)-2-fluorophenyl)-N-(1-((R)-1-(5-fluoro-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide (Scheme AAE)

Step 1. (1R, 5S)-3-(3-Fluoro-4-methylpyridin-2-yl)-3-azabicyclo[3.1.0]hexan-2-one: The title compound was prepared following procedures similar to those described above in Example 1, Step 3. MS=207.1 [M+1]⁺.

Step 2. (1R, 5S)-3-(4-Bromo-3-fluoro-4-methylpyridin-2-yl)-3-azabicyclo[3.1.0]hexan-2-one: N-Bromosuccinimide (4.00 g, 22.5 mmol) was added to a stirred solution of (1R, 5S)-3-(3-Fluoro-4-methylpyridin-2-yl)-3-azabicyclo[3.1.0]hexan-2-one (3.09 g, 15.0 mmol) and TFA (1.73 mL, 22.5 mmol) in ACN (50 mL), and the resulting mixture was heated to 50° C. overnight. The reaction mixture was cooled to rt and concentrated under reduced pressure. The resulting crude mixture was partitioned between satd. aq. NaHCO₃ and EtOAc. The layers were separated, and the aq. layer was extracted with EtOAc. The combined organics were concentrated to afford a crude residue was purified by silica gel chromatography (0 to 80% EtOAc/hexanes) to afford the title compound. MS=284.9, 286.9 [M+1, M+3]+.

Step 3. (1R, 5S)-3-(5-Acetyl-3-fluoro-4-methylpyridin-2-yl)-3-azabicyclo[3.1.0]hexan-2-one: (1R, 5S)-3-(4-Bromo-3-fluoro-4-methylpyridin-2-yl)-3-azabicyclo [3.1.0]hexan-2-one (1.50 g, 5.26 mmol) was added to a vial containing tetrakis(triphenylphosphine)palladium (0) (608 mg, 0.526 mmol), and the resulting solid mixture was degassed, replacing the atmosphere with N2. Tributyl(1-ethoxyvinyl)tin (2.49 mL, 7.37 mmol) and toluene (26 mL) were added, and the resulting mixture was heated to 100° C. overnight. The reaction was cooled to rt, quenched with concentrated HCl, and allowed to stir at rt for 1 h. The mixture was then added to satd. aq. NaHCO₃ and extracted with EtOAc. The combined organics were concentrated to afford a crude residue was purified by silica gel chromatography (0 to 10% MeOH/DCM) to afford the title compound. MS=249.0 [M+1]⁺.

Step 4. (1R, 5S)-3-(3-Fluoro-5-(1-hydroxyethyl)-4-methylpyridin-2-yl)-3-azabicyclo[3.1.0]hexan-2-one: Sodium borohydride (220 mg, 5.81 mmol) was added to a stirred solution of (1R, 5S)-3-(5-Acetyl-3-fluoro-4-methylpyridin-2-yl)-3-azabicyclo[3.1.0]hexan-2-one (1.11 g, 4.47 mmol) in a mixture of THF (17 mL) and MeOH (5.5 mL). The resulting mixture was stirred at rt for 30 min, at which time, the reaction was concentrated to afford a crude mixture that was added to satd. aq. NaHCO₃ and extracted with EtOAc. The combined organics were dried (MgSO₄), filtered and concentrated to afford a crude residue to afford the title compound. MS=251.0 [M+1]⁺.

Step 5. (1R, 5S)-3-(3-Fluoro-4-methyl-5-(1-(4-nitro-1H-pyrazol-1-yl)ethyl)pyridin-2-yl)-3-azabicyclo[3.1.0] hexan-2-one: (1R, 5S)-3-(3-Fluoro-5-(1-hydroxyethyl)-4-methylpyridin-2-yl)-3-azabicyclo[3.1.0] hexan-2-one (900 mg, 3.60 mmol) was added to a stirred solution of 4-nitro-1H-pyrazole (529 mg, 4.67 mmol) and triphenylphosphine (1.23 g, 4.67 mmol) in THF (18 mL). DIAD (910 µL, 4.7 mmol) was added, and the resulting mixture was heated to 50° C. for 1 h. The reaction was cooled to rt and concentrated to afford a crude residue that was purified by silica gel chromatography (0 to 10% MeOH/DCM) to afford the title compound. MS=346.0 [M+1]⁺.

Step 6. 6-(3-Chloro-6-(difluoromethyl)-2-fluorophenyl)-N-(1-(1-(5-fluoro-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide: (1R, 5S)-3-(3-Fluoro-4-methyl-5-(1-(4-nitro-1H-pyrazol-1-yl)ethyl) pyridin-2-yl)-3-azabicyclo[3.1.0]hexan-2-one (1.04 g, 3.00 mmol) was added to a stirred suspension of iron powder (1.68 g, 30.0 mmol) and ammonium chloride (1.93 g, 36.0 mmol) in a mixture of EtOH (11 mL) and water (3.8 mL). The resulting mixture was heated to 50° C. for 2 h, at which time, the reaction was cooled to rt and filtered. The filtrate was concentrated, added to satd. aq. NaHCO₃ and extracted with DCM. The combined organics were dried (MgSO₄), filtered and concentrated to afford the title compound that was carried forward directly and combined with HATU (1.37 g, 3.60 mmol) and dissolved in DMF (15 mL). 6-(3-Chloro-6-(difluoromethyl)-2-fluorophenyl)pyrazine-2-carboxylic acid (1.09 g, 3.60 mmol) and TEA (1.25 mL, 9.00 mmol) were added, and the resulting mixture was allowed to stir at rt overnight. The reaction was diluted with EtOAc, and the organics were washed with water and brine, and concentrated to afford a crude residue that was purified by silica gel chromatography (0 to 10% MeOH/DCM) to afford the title compound. MS=600.0 [M+1]⁺. The diastereoisomeric title compounds were separated by chiral chromatography (SFC, DAICEL CHIRALPAK OD-H; Neutral-EtOH Begin B 20% End B 20%) to furnish the individual isomer compounds in pure form. The faster-eluting diastereoisomer of the title compounds (Example 44): $^1$H NMR (400 MHz, CD₃OD) δ 9.40 (s, 1H), 9.02 (d, J=2.0 Hz, 1H), 8.23 (s, 1H), 8.03 (s, 1H), 7.85 (t, J=7.8 Hz, 1H), 7.79 (s, 1H), 7.67 (d, J=8.6 Hz, 1H), 6.86-7.17 (m, 1H), 5.85 (q, J=7.3 Hz, 1H), 4.29 (dd, J=10.2, 5.9 Hz, 1H), 3.68 (d, J=10.6 Hz, 1H), 2.28 (d, J=2.0 Hz, 3H), 2.14-2.21 (m, 1H), 2.03 (br s, 1H), 1.92 (d, J=7.0 Hz, 3H), 1.29-1.31 (m, 1H), 0.86-0.91 (m, 1H). MS=600.1 [M+1]⁺. The slower-eluting diastereoisomer of the title compounds (Example 45): $^1$H NMR (400 MHz, CD₃OD) δ 9.39 (s, 1H), 9.02 (d, J=2.3 Hz, 1H), 8.21 (s, 1H), 8.07 (s, 1H), 7.81-7.88 (m, 1H), 7.79 (s, 1H), 7.67 (d, J=8.6 Hz, 1H), 6.86-7.17 (m, 1H), 5.85 (q, J=6.9 Hz, 1H), 4.27 (dd, J=10.6, 5.9 Hz, 1H), 3.70 (d, J=11.0 Hz, 1H), 2.28 (d, J=2.0 Hz, 3H), 2.13-2.20 (m, 1H), 2.03 (br s, 1H), 1.92 (d, J=7.0 Hz, 3H), 1.32 (br d, J=3.5 Hz, 1H), 0.89 (br d, J=3.1 Hz, 1H). MS=600.1 [M+1]⁺.

TABLE 18

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 46 | | 6-(3-Chloro-6-(difluoromethyl)-2-fluorophenyl)-3-methyl-N-(1-((6-methyl-5-((1R,5S)-2-oxo-3-azabicyclo[3.1.0]hexan-3-yl)pyrazin-2-yl)methyl)-1H-pyrazol-4-yl)pyrazine-2-carboxamide | Calcd.: 583.2 Found: 583.3 | |
| 47 | | 6-(3-Chloro-6-(difluoromethyl)-2-fluorophenyl)-N-(1-((6-methyl-5-((1R,5S)-2-oxo-3-azabicyclo[3.1.0]hexan-3-yl)pyrazin-2-yl)methyl)-1H-pyrazol-4-yl)pyrazine-2-carboxamide | Calcd.: 569.1 Found: 569.6 | |
| 48 | | 6-(3-Chloro-6-(difluoromethyl)-2-fluorophenyl)-N-(1-(2,3-dimethyl-4-((1R,5S)-2-oxo-3-azabicyclo[3.1.0]hexan-3-yl)benzyl)-1H-pyrazol-4-yl)pyrazine-2-carboxamide | Calcd.: 581.2 Found: 581.3 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 49 | | 6-(3-Chloro-6-(difluoromethyl)-2-fluorophenyl)-N-(1-((5-methoxy-6-((1R,5S)-2-oxo-3-azabicyclo[3.1.0]hexan-3-yl)pyridin-3-yl)methyl)-1H-pyrazol-4-yl)pyrazine-2-carboxamide | Calcd.: 584.1 Found: 584.3 | |
| 50 | | 6-(3-Chloro-6-(difluoromethyl)-2-fluorophenyl)-N-(1-((5-fluoro-6-((1R,5S)-2-oxo-3-azabicyclo[3.1.0]hexan-3-yl)pyridin-3-yl)methyl)-1H-pyrazol-4-yl)pyrazine-2-carboxamide | Calcd.: 572.1 Found: 572.2 | |
| 51 | | 6-(3-Chloro-6-(difluoromethyl)-2-fluorophenyl)-N-(1-((S or R)-1-(5-fluoro-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 600.2 Found: 600.3 | REGIS (S,S) WHELK-O1 |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 52 | | 6-(3-Chloro-6-(difluoromethyl)-2-fluorophenyl)-N-(1-((R or S)-1-(5-fluoro-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 600.2<br>Found: 600.3 | REGIS (S,S) WHELK-O1 |
| 53 | | 6-(3-Chloro-6-(difluoromethyl)-2-fluorophenyl)-N-(1-((S or R)-1-(3-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 583.2<br>Found: 583.0 | DAICEL CHIRACEL AD-H |
| 54 | | 6-(3-Chloro-6-(difluoromethyl)-2-fluorophenyl)-3-methyl-N-(1-(1-(4-methyl-2-((1R,5S)-2-oxo-3-azabicyclo[3.1.0]hexan-3-yl)pyrimidin-5-yl)cyclopropyl)-1H-pyrazol-4-yl)pyrazine-2-carboxamide | Calcd.: 609.2<br>Found: 609.3 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 55 | | 6-(3-Chloro-6-(difluoromethyl)-2-fluorophenyl)-N-(1-((S or R)-1-(6-ethyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 597.2 Found: 597.0 | DAICEL CHIRACEL AD-H |
| 56 | | 6-(3-Chloro-6-(difluoromethyl)-2-fluorophenyl)-N-(1-((R or S)-1-(6-ethyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 597.2 Found: 597.0 | DAICEL CHIRACEL AD-H |
| 57 | | 6-(3-Chloro-6-(difluoromethyl)-2-fluorophenyl)-N-(1-((4-methyl-6-((1R,5S)-2-oxo-3-azabicyclo[3.1.0]hexan-3-yl)pyridin-3-yl)methyl)-1H-pyrazol-4-yl)pyrazine-2-carboxamide | Calcd.: 568.2 Found: 568.0 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 58 | | 6-(3-Chloro-6-(difluoromethyl)-2-fluorophenyl)-3-methyl-N-(1-((S or R)-1-(6-methyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 596.2 Found: 596.0 | DAICEL CHIRACEL AD-H |
| 59 | | 6-(3-Chloro-6-(difluoromethyl)-2-fluorophenyl)-3-methyl-N-(1-((R or S)-1-(6-methyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 596.2 Found: 596.0 | DAICEL CHIRACEL AD-H |
| 60 | | 6-(3-Chloro-6-(difluoromethyl)-2-fluorophenyl)-N-(1-((S or R)-1-(6-methyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 582.2 Found: 582.0 | DAICEL CHIRACEL OJ-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 61 | | 6-(3-Chloro-6-(difluoromethyl)-2-fluorophenyl)-N-(1-((R or S)-1-(6-methyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 582.2 Found: 582.0 | DAICEL CHIRACEL OJ-H |
| 62 | | 6-(3-Chloro-6-(difluoromethyl)-2-fluorophenyl)-N-(1-((S or R)-1-(3-methyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 582.2 Found: 582.0 | DAICEL CHIRACEL AS-H |
| 63 | | 6-(3-Chloro-6-(difluoromethyl)-2-fluorophenyl)-3-methyl-N-(1-((6-methyl-5-((1R,5S)-2-oxo-3-azabicyclo[3.1.0]hexan-3-yl)pyridin-2-yl)methyl)-1H-pyrazol-4-yl)pyrazine-2-carboxamide | Calcd.: 582.2 Found: 582.0 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 64 | | 6-(3-Chloro-6-(difluoromethyl)-2-fluorophenyl)-N-(1-((6-methyl-5-((1R,5S)-2-oxo-3-azabicyclo[3.1.0]hexan-3-yl)pyridin-2-yl)methyl)-1H-pyrazol-4-yl)pyrazine-2-carboxamide | Calcd.: 568.2<br>Found: 568.0 | |
| 65 | | 6-(3-Chloro-6-(difluoromethyl)-2-fluorophenyl)-N-(1-((4-methyl-5-((1R,5S)-2-oxo-3-azabicyclo[3.1.0]hexan-3-yl)pyridin-2-yl)methyl)-1H-pyrazol-4-yl)pyrazine-2-carboxamide | Calcd.: 568.2<br>Found: 568.0 | |
| 66 | | 6-(3-Chloro-6-(difluoromethyl)-2-fluorophenyl)-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 582.2<br>Found: 582.0 | DAICEL CHIRACEL AD-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 67 | | 6-(3-Chloro-6-(difluoromethyl)-2-fluorophenyl)-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 582.2 Found: 582.0 | DAICEL CHIRACEL AD-H |
| 68 | | 6-(3-Chloro-6-(difluoromethyl)-2-fluorophenyl)-N-(1-((S or R)-1-(4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 582.2 Found: 582.0 | DAICEL CHIRACEL AD-H |
| 69 | | 6-(3-Chloro-6-(difluoromethyl)-2-fluorophenyl)-N-(1-((S and R)-1-(4-((1R,5S)-2-oxo-3-azabicyclo[3.1.0]hexan-3-yl)phenyl)ethyl)-1H-pyrazol-4-yl)pyrazine-2-carboxamide | Calcd.: 567.2 Found: 567.2 | |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]⁺ or [M + Na]⁺ | Chiral column |
|---|---|---|---|---|
| 70 | 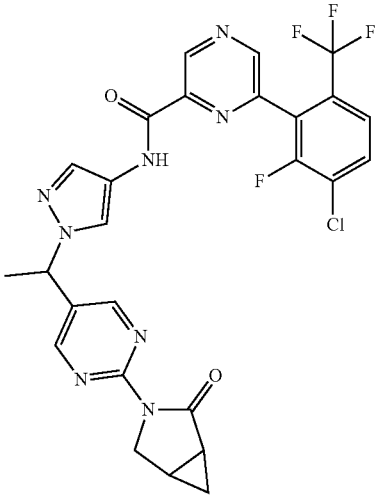 [SMILES: CC(c1cnc(N2CC3CC3C2=O)nc1)n1cc(NC(=O)c2cncc(-c3c(C(F)(F)F)ccc(Cl)c3F)n2)cn1] | 6-(3-Chloro-2-fluoro-6-(trifluoromethyl)phenyl)-N-(1-((S or R)-1-(2-((1R,5S or 1S,5R)-2-oxo-3-azabicyclo[3.1.0]hexan-3-yl)pyrimidin-5-yl)ethyl)-1H-pyrazol-4-yl)pyrazine-2-carboxamide | Calcd.: 587.1<br>Found: 587.2 | Phenomenex-Cellulose-2 |
| 71 | 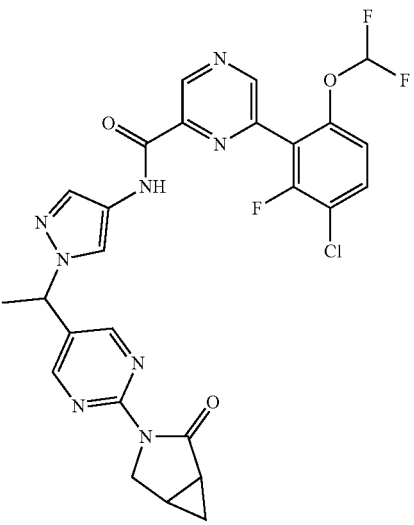 [SMILES: CC(c1cnc(N2CC3CC3C2=O)nc1)n1cc(NC(=O)c2cncc(-c3c(OC(F)F)ccc(Cl)c3F)n2)cn1] | 6-(3-Chloro-6-(difluoromethoxy)-2-fluorophenyl)-N-(1-((S or R)-1-(2-((1R,5S or 1S,5R)-2-oxo-3-azabicyclo[3.1.0]hexan-3-yl)pyrimidin-5-yl)ethyl)-1H-pyrazol-4-yl)pyrazine-2-carboxamide | Calcd.: 585.1<br>Found: 585.0 | Phenomenex-Cellulose-2 |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]$^+$ or [M + Na]$^+$ | Chiral column |
|---|---|---|---|---|
| 72 | | 6-(3-Chloro-6-(difluoromethoxy)-2-fluorophenyl)-N-(1-((R or S)-1-(2-((1R,5S or 1S,5R)-2-oxo-3-azabicyclo[3.1.0]hexan-3-yl)pyrimidin-5-yl)ethyl)-1H-pyrazol-4-yl)pyrazine-2-carboxamide | Calcd.: 585.1 Found: 585.2 | Phenomenex-Cellulose-2 |
| 73 | | 6-(3-Chloro-6-(difluoromethoxy)-2-fluorophenyl)-N-(1-((S or R)-1-(2-((1S,5R or 1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 585.1 Found: 585.2 | Phenomenex-Cellulose-2 |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 74 | | 6-(3-Chloro-6-(difluoromethyl)-2-fluorophenyl)-3-methyl-N-(1-((S or R)-1-(6-((1R,5S or 1S,5R)-2-oxo-3-azabicyclo[3.1.0]hexan-3-yl)pyridin-3-yl)ethyl)-1H-pyrazol-4-yl)pyrazine-2-carboxamide | Calcd.: 582.2 Found: 582.2 | DAICEL CHIRALPAK AD |
| 75 | | 6-(3-Chloro-6-(difluoromethyl)-2-fluorophenyl)-3-methyl-N-(1-((R or S)-1-(6-((1R,5S or 1S,5R)-2-oxo-3-azabicyclo[3.1.0]hexan-3-yl)pyridin-3-yl)ethyl)-1H-pyrazol-4-yl)pyrazine-2-carboxamide | Calcd.: 582.2 Found: 582.2 | DAICEL CHIRALPAK AD |
| 76 | | 6-(3-Chloro-6-(difluoromethyl)-2-fluorophenyl)-3-methyl-N-(1-((S or R)-1-(6-((1S,5R or 1R,5S)-2-oxo-3-azabicyclo[3.1.0]hexan-3-yl)pyridin-3-yl)ethyl)-1H-pyrazol-4-yl)pyrazine-2-carboxamide | Calcd.: 582.2 Found: 582.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 77 | | 6-(3-Chloro-6-(difluoromethyl)-2-fluorophenyl)-N-(1-((S or R)-1-(5-(difluoromethyl)-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 618.1 Found: 618.2 | DAICEL CHIRALPAK AD |
| 78 | | 6-(3-Chloro-6-(difluoromethyl)-2-fluorophenyl)-N-(1-((R or S)-1-(5-(difluoromethyl)-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 618.1 Found: 618.2 | DAICEL CHIRALPAK AD |
| 79 | | 4-(3-Chloro-6-(difluoromethyl)-2-fluorophenyl)-1-methyl-N-(1-((S or R)-1-(4-methyl-2-((1R,5S)-2-oxo-3-azabicyclo[3.1.0]hexan-3-yl)pyrimidin-5-yl)ethyl)-1H-pyrazol-4-yl)-6-oxo-1,6-dihydropyrimidine-2-carboxamide | Calcd.: 613.2 Found: 613.2 | DAICEL CHIRALPAK AD |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]+ or [M + Na]+ | Chiral column |
|---|---|---|---|---|
| 80 | 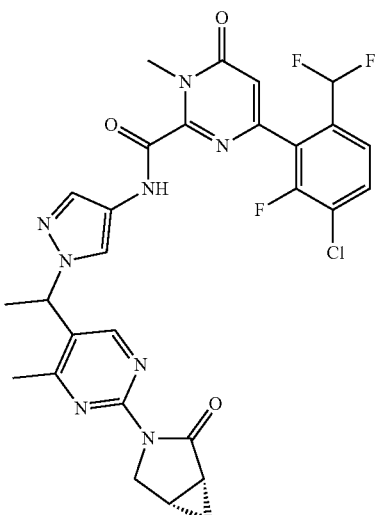 | 4-(3-Chloro-6-(difluoromethyl)-2-fluorophenyl)-1-methyl-N-(1-((R or S)-1-(4-methyl-2-((1R,5S)-2-oxo-3-azabicyclo[3.1.0]hexan-3-yl)pyrimidin-5-yl)ethyl)-1H-pyrazol-4-yl)-6-oxo-1,6-dihydropyrimidine-2-carboxamide | Calcd.: 613.2<br>Found: 613.2 | DAICEL CHIRALPAK AD |
| 81 | 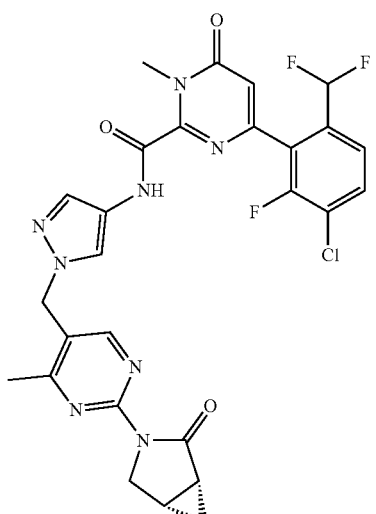 | 4-(3-Chloro-6-(difluoromethyl)-2-fluorophenyl)-1-methyl-N-(1-((4-methyl-2-((1R,5S)-2-oxo-3-azabicyclo[3.1.0]hexan-3-yl)pyrimidin-5-yl)methyl)-1H-pyrazol-4-yl)-6-oxo-1,6-dihydropyrimidine-2-carboxamide | Calcd.: 599.2<br>Found: 599.1 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 82 | | 6-(3-Chloro-6-(difluoromethyl)-2-fluorophenyl)-N-(1-((5-fluoro-6-((1R,5S)-2-oxo-3-azabicyclo[3.1.0]hexan-3-yl)pyridin-3-yl)methyl)-1H-pyrazol-4-yl)-3-methylpyrazine-2-carboxamide | Calcd.: 586.1 Found: 586.2 | |
| 83 | | 6-(3-Chloro-6-(difluoromethyl)-2-fluorophenyl)-3-methyl-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide | Calcd.: 583.2 Found: 583.2 | |
| 84 | | 6-(3-Chloro-6-(difluoromethyl)-2-fluorophenyl)-3-methyl-N-(1-((4-methyl-6-((1R,5S)-2-oxo-3-azabicyclo[3.1.0]hexan-3-yl)pyridazin-3-yl)methyl)-1H-pyrazol-4-yl)pyrazine-2-carboxamide | Calcd.: 583.2 Found: 583.2 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 85 | 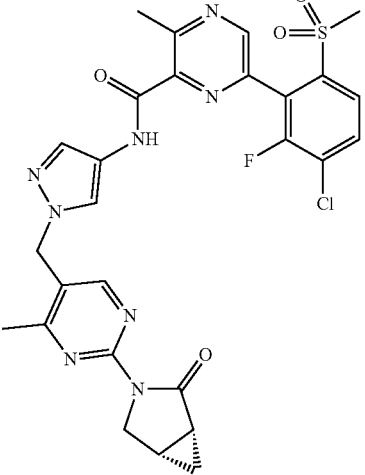 | 6-(3-Chloro-2-fluoro-6-(methylsulfonyl)phenyl)-3-methyl-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide | Calcd.: 611.1 Found: 611.1 | |
| 86 | 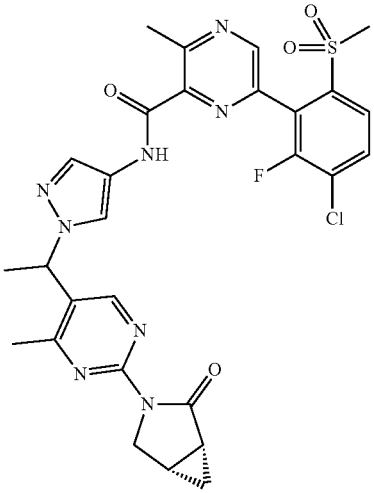 [SMILES: Cc1nc(N2C[C@H]3C[C@H]3C2=O)ncc1C(C)n1cc(NC(=O)c2nc(-c3c(S(C)(=O)=O)ccc(Cl)c3F)cnc2C)cn1] | 6-(3-Chloro-2-fluoro-6-(methylsulfonyl)phenyl)-N-(1-((S or R)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 611.1 Found: 611.0 | DAICEL CHIRALPAK AD |
| 87 | 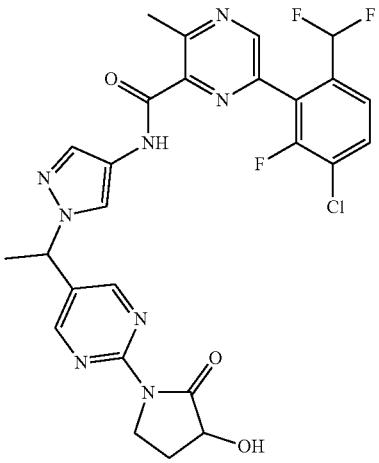 [SMILES: Cc1ncc(-c2c(C(F)F)ccc(Cl)c2F)nc1C(=O)Nc1cnn(C(C)c2cnc(N3CCC(O)C3=O)nc2)c1] | 6-(3-Chloro-6-(difluoromethyl)-2-fluorophenyl)-N-(1-((S or R)-1-(2-((R or S)-3-hydroxy-2-oxopyrrolidin-1-yl)pyrimidin-5-yl)ethyl)-1H-pyrazol-4-yl)-3-methylpyrazine-2-carboxamide | Calcd.: 587.2 Found: 587.1 | REGIS (S,S) WHELK-O1 then DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 88 | | 6-(3-Chloro-6-(difluoromethyl)-2-fluorophenyl)-N-(1-((4,5-dimethyl-6-((1R,5S)-2-oxo-3-azabicyclo[3.1.0]hexan-3-yl)pyridazin-3-yl)methyl)-1H-pyrazol-4-yl)-3-methylpyrazine-2-carboxamide | Calcd.: 597.2<br>Found: 597.1 | |
| 89 | | 6-(3-Chloro-6-cyano-2-fluorophenyl)-N-(1-((S or R)-1-(6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 543.2<br>Found: 543.1 | DAICEL CHIRALPAK AD |
| 90 | | 6-(3-Chloro-6-cyano-2-fluorophenyl)-N-(1-((R or S)-1-(6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 543.2<br>Found: 543.1 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 91 | | N-(1-((S)-1-(5-chloro-6-((1R,5S)-2-oxo-3-azabicyclo[3.1.0]hexan-3-yl)pyridin-3-yl)ethyl)-1H-pyrazol-4-yl)-6-(3-chloro-6-(difluoromethyl)-2-fluorophenyl)-3-methylpyrazine-2-carboxamide | Calcd.: 616.1 Found: 616.1 | DAICEL CHIRALPAK AD |
| 92 | | N-(1-((S)-1-(5-chloro-6-((1R,5S)-2-oxo-3-azabicyclo[3.1.0]hexan-3-yl)pyridin-3-yl)ethyl)-1H-pyrazol-4-yl)-6-(3-chloro-6-(difluoromethyl)-2-fluorophenyl)-3-methylpyrazine-2-carboxamide | Calcd.: 616.1 Found: 616.1 | DAICEL CHIRALPAK AD |
| 93 | | 6-(3-Chloro-6-(difluoromethyl)-2-fluorophenyl)-3-methyl-N-(1-((4-methyl-5-((1R,5S)-2-oxo-3-azabicyclo[3.1.0]hexan-3-yl)pyrimidin-2-yl)methyl)-1H-pyrazol-4-yl)pyrazine-2-carboxamide | Calcd.: 583.2 Found: 583.1 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 94 | | 6-(3-Chloro-6-(difluoromethyl)-2-fluorophenyl)-3-(difluoromethyl)-N-(1-((6-methyl-5-((1R,5S)-2-oxo-3-azabicyclo[3.1.0]hexan-3-yl)pyrazin-2-yl)methyl)-1H-pyrazol-4-yl)pyrazine-2-carboxamide | Calcd.: 619.1 Found: 619.3 | |
| 95 | | 6-(3-Chloro-6-(difluoromethyl)-2-fluorophenyl)-N-(1-((4-methoxy-2-((1R,5S)-2-oxo-3-azabicyclo[3.1.0]hexan-3-yl)pyrimidin-5-yl)methyl)-1H-pyrazol-4-yl)-3-methylpyrazine-2-carboxamide | Calcd.: 599.2 Found: 599.1 | |
| 96 | | tert-Butyl (5-((S and R)-1-(4-(6-(3-chloro-6-(difluoromethyl)-2-fluorophenyl)-3-methylpyrazine-2-carboxamido)-1H-pyrazol-1-yl)ethyl)-2-((1R,5S)-2-oxo-3-azabicyclo[3.1.0]hexan-3-yl)pyridin-3-yl)carbamate | Calcd. for [M − 100 + Na]: 619.2 Found: 619.3 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 97 | | 6-(3-Chloro-6-(difluoromethyl)-2-fluorophenyl)-3-methyl-N-(1-((S or R)-1-(2-methyl-4-((1R,5S)-2-oxo-3-azabicyclo[3.1.0]hexan-3-yl)phenyl)ethyl)-1H-pyrazol-4-yl)pyrazine-2-carboxamide | Calcd.: 617.2 Found: 617.2 | DAICEL CHIRALPAK AD |
| 98 | | 6-(3-Chloro-6-(difluoromethyl)-2-fluorophenyl)-N-(1-((S or R)-1-(2-methyl-4-((1R,5S)-2-oxo-3-azabicyclo[3.1.0]hexan-3-yl)phenyl)ethyl)-1H-pyrazol-4-yl)pyrazine-2-carboxamide | Calcd.: 581.2 Found: 581.1 | DAICEL CHIRALPAK AD |
| 99 | | 6-(3-Chloro-6-(difluoromethyl)-2-fluorophenyl)-N-(1-((R or S)-1-(2-methyl-4-((1R,5S)-2-oxo-3-azabicyclo[3.1.0]hexan-3-yl)phenyl)ethyl)-1H-pyrazol-4-yl)pyrazine-2-carboxamide | Calcd.: 581.2 Found: 581.1 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 100 | 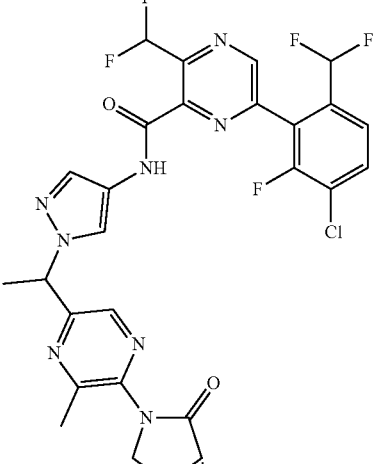 | 6-(3-Chloro-6-(difluoromethyl)-2-fluorophenyl)-3-(difluoromethyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 633.2 Found: 633.2 | DAICEL CHIRALPAK OD-H |
| 101 | 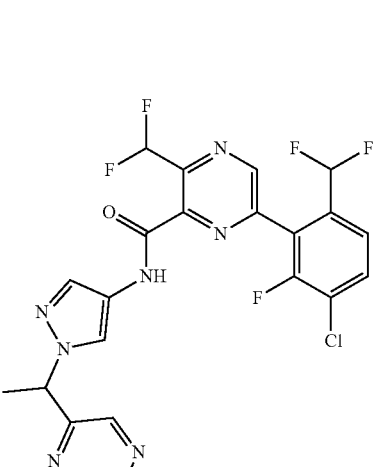 | 6-(3-Chloro-6-(difluoromethyl)-2-fluorophenyl)-3-(difluoromethyl)-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 633.2 Found: 633.2 | DAICEL CHIRALPAK OD-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 102 | | 6-(3-Chloro-6-(difluoromethyl)-2-fluorophenyl)-3-methyl-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 597.2 Found: 597.2 | DAICEL CHIRALPAK AD |
| 103 | | 6-(3-Chloro-6-(difluoromethyl)-2-fluorophenyl)-3-methyl-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 597.2 Found: 597.2 | DAICEL CHIRALPAK AD |
| 104 | | 6-(3-Chloro-6-(difluoromethoxy)-2-fluorophenyl)-N-(1-((S or R)-1-(4,5-dimethyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 105 | | 6-(3-Chloro-6-(difluoromethoxy)-2-fluorophenyl)-N-(1-((R or S)-1-(4,5-dimethyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD |
| 106 | | 5-(3-Chloro-6-(difluoromethyl)-2-fluorophenyl)-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)-1-(11-oxidanyl)-1l4-pyridine-3-carboxamide | Calcd.: 597.2 Found: 597.2 | DAICEL CHIRALPAK OJ-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 107 | | 5-(3-Chloro-6-(difluoromethyl)-2-fluorophenyl)-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)-1-(l1-oxidanyl)-1l4-pyridine-3-carboxamide | Calcd.: 597.2 Found: 597.2 | DAICEL CHIRALPAK OJ-H |
| 108 | | 6-(3-Chloro-2-fluoro-6-methylphenyl)-N-(1-((S or R)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 547.2 Found: 547.2 | DAICEL CHIRALPAK AD |
| 109 | | 6-(3-Chloro-2-fluoro-6-methylphenyl)-N-(1-((R or S)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 547.2 Found: 547.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 110 | | 6-(3-Chloro-6-(difluoromethyl)-2-fluorophenyl)-N-(1-((S or R)-1-(4,5-dimethyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 597.2 Found: 597.2 | DAICEL CHIRALPAK AS |
| 111 | | 6-(3-Chloro-6-(difluoromethyl)-2-fluorophenyl)-N-(1-((R or S)-1-(4,5-dimethyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 597.2 Found: 597.2 | DAICEL CHIRALPAK AS |
| 112 | | 6-(3-Chloro-2-fluoro-6-methylphenyl)-N-(1-((4,5-dimethyl-6-((1R,5S)-2-oxo-3-azabicyclo[3.1.0]hexan-3-yl)pyridazin-3-yl)methyl)-1H-pyrazol-4-yl)-3-methylpyrazine-2-carboxamide | Calcd.: 561.2 Found: 561.2 | |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]⁺ or [M + Na]⁺ | Chiral column |
|---|---|---|---|---|
| 113 | | 6-(3-Chloro-6-(difluoromethoxy)-2-fluorophenyl)-3-methyl-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide | Calcd.: 599.2<br>Found: 599.1 | |
| 114 | | 6-(3-Chloro-6-(difluoromethoxy)-2-fluorophenyl)-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 599.2<br>Found: 599.2 | DAICEL CHIRALPAK AD-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 115 | | 6-(3-Chloro-6-(difluoromethoxy)-2-fluorophenyl)-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 599.2 Found: 599.2 | DAICEL CHIRALPAK AD-H |
| 116 | | 6-(3-Chloro-6-(difluoromethyl)-2-fluorophenyl)-3-(cyclopropoxymethyl)-N-(1-((2-((1R,5S)-2-oxo-3-azabicyclo[3.1.0]hexan-3-yl)pyrimidin-5-yl)methyl)-1H-pyrazol-4-yl)pyrazine-2-carboxamide | Calcd.: 625.2 Found: 625.1 | |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 117 | | N-(1-((S or R)-1-(3-Amino-4-methyl-5-((1R,5S)-2-oxo-3-azabicyclo[3.1.0]hexan-3-yl)pyridin-2-yl)ethyl)-1H-pyrazol-4-yl)-6-(3-chloro-6-(difluoromethyl)-2-fluorophenyl)pyrazine-2-carboxamide | Calcd.: 597.2 Found: 597.3 | DAICEL CHIRALPAK AD |
| 118 | | N-(1-((R or S)-1-(3-Amino-4-methyl-5-((1R,5S)-2-oxo-3-azabicyclo[3.1.0]hexan-3-yl)pyridin-2-yl)ethyl)-1H-pyrazol-4-yl)-6-(3-chloro-6-(difluoromethyl)-2-fluorophenyl)-3-methylpyrazine-2-carboxamide | Calcd.: 611.2 Found: 611.3 | DAICEL CHIRALPAK AD |
| 119 | | 6-(3-Chloro-6-(difluoromethyl)-2-fluorophenyl)-3-methyl-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 596.2 Found: 596.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 120 | | 6-(3-Chloro-6-(difluoromethyl)-2-fluorophenyl)-3-methyl-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 596.2 Found: 596.2 | DAICEL CHIRALPAK AD |
| 121 | | 6-(3-Chloro-6-(difluoromethyl)-2-fluorophenyl)-3-methyl-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyridazine-4-carboxamide | Calcd.: 596.2 Found: 596.3 | DAICEL CHIRALPAK AD |
| 122 | | 6-(3-Chloro-6-(difluoromethyl)-2-fluorophenyl)-3-methyl-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyridazine-4-carboxamide | Calcd.: 596.2 Found: 596.2 | DAICEL CHIRALPAK AD |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]⁺ or [M + Na]⁺ | Chiral column |
|---|---|---|---|---|
| 123 | | 6-(3-Chloro-6-(difluoromethoxy)-2-fluorophenyl)-3-methyl-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 613.2 Found: 613.2 | DAICEL CHIRALPAK AD-H |
| 124 | | 6-(3-Chloro-6-(difluoromethoxy)-2-fluorophenyl)-3-methyl-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 613.2 Found: 613.2 | DAICEL CHIRALPAK AD-H |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 125 | 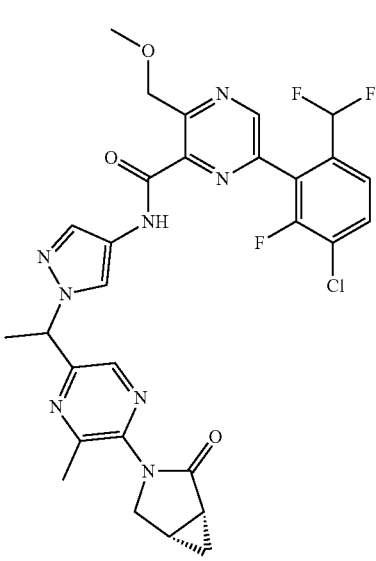 [SMILES: COCc1ncc(-c2c(C(F)F)ccc(Cl)c2F)nc1C(=O)Nc1cnn(C(C)c2cnc(N3C[C@H]4C[C@H]4C3=O)c(C)n2)c1] | 6-(3-Chloro-6-(difluoromethyl)-2-fluorophenyl)-3-(methoxymethyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 627.2<br>Found: 627.1 | DAICEL CHIRALPAK AD |
| 126 | 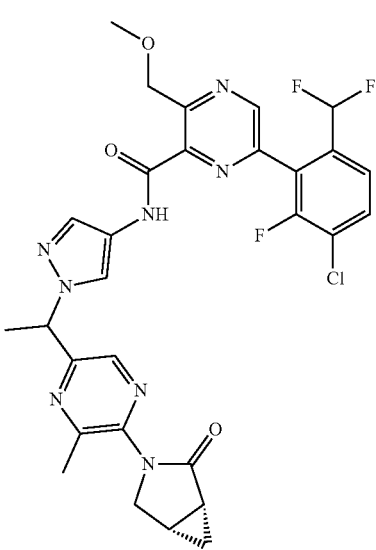 [SMILES: COCc1ncc(-c2c(C(F)F)ccc(Cl)c2F)nc1C(=O)Nc1cnn(C(C)c2cnc(N3C[C@H]4C[C@H]4C3=O)c(C)n2)c1] | 6-(3-Chloro-6-(difluoromethyl)-2-fluorophenyl)-3-(methoxymethyl)-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 627.2<br>Found: 627.1 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 127 | | 6-(3-Chloro-6-(difluoromethyl)-2-fluorophenyl)-N-(1-((S or i)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 614.2 Found: 614.0 | DAICEL CHIRALPAK AD |
| 128 | | 6-(3-Chloro-6-(difluoromethyl)-2-fluorophenyl)-N-(1-((R or S)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 614.2 Found: 614.0 | DAICEL CHIRALPAK AD |
| 129 | | 6-(3-Chloro-6-(difluoromethoxy)-2-fluorophenyl)-N-(1-((S or R)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 630.2 Found: 630.1 | DAICEL CHIRALPAK OD |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]+ or [M + Na]+ | Chiral column |
|---|---|---|---|---|
| 130 | 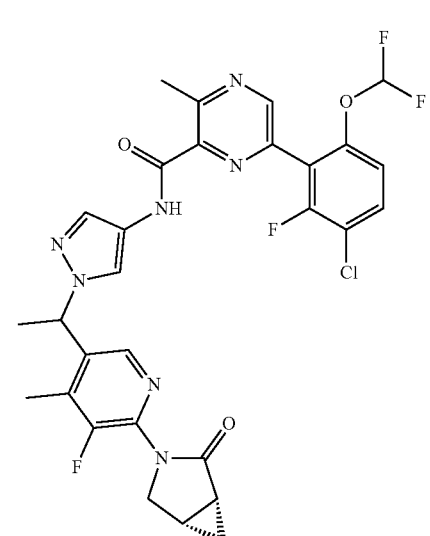 | 6-(3-Chloro-6-(difluoromethoxy)-2-fluorophenyl)-N-(1-((R or S)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 630.2 Found: 630.1 | DAICEL CHIRALPAK OD |
| 131 | 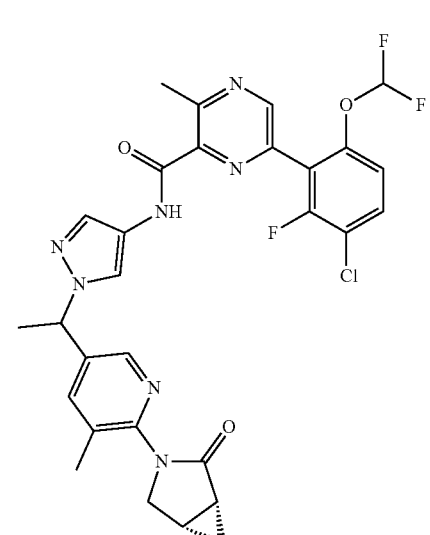 | 6-(3-Chloro-6-(difluoromethoxy)-2-fluorophenyl)-3-methyl-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]⁺ or [M + Na]⁺ | Chiral column |
|---|---|---|---|---|
| 132 | | 6-(3-Chloro-6-(difluoromethoxy)-2-fluorophenyl)-3-methyl-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD |
| 133 | | 6-(3-Chloro-6-(difluoromethoxy)-2-fluorophenyl)-N-(1-((S or R)-1-(5-fluoro-4-methyl-6-((1R,5S)-2-oxo-3-azabicyclo[3.1.0]hexan-3-yl)pyridin-3-yl)ethyl)-li-pyrazol-4-yl)pyrazine-2-carboxamide | Calcd.: 616.2 Found: 616.2 | DAICEL CHIRALPAK AD |

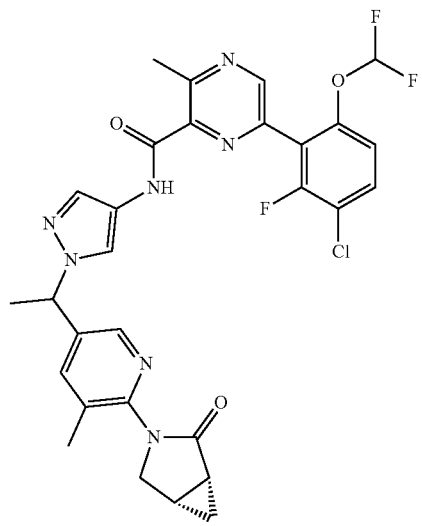 [SMILES: Cc1cc(C(C)n2cc(NC(=O)c3nc(-c4c(OC(F)F)ccc(Cl)c4F)cnc3C)cn2)cnc1N1C[C@H]2C[C@H]2C1=O]

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 134 | | 6-(3-Chloro-6-(difluoromethoxy)-2-fluorophenyl)-N-(1-((R or S)-1-(5-fluoro-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 616.2 Found: 616.2 | DAICEL CHIRALPAK AD |
| 135 | | 6-(3-Chloro-6-cyano-2-fluorophenyl)-N-(1-((S or R)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 589.2 Found: 589.2 | DAICEL CHIRALPAK AD |
| 136 | | 6-(3-Chloro-6-cyano-2-fluorophenyl)-N-(1-((R or S)-1-(5-fluoro-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 589.2 Found: 589.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]$^+$ or [M + Na]$^+$ | Chiral column |
|---|---|---|---|---|
| 137 | | 6-(3-Chloro-6-(difluoromethyl)-2-fluorophenyl)-N-(1-((S or R)-1-(3-fluoro-5-((1R,5S)-2-oxo-3-azabicyclo[3.1.0]hexan-3-yl)pyridin-2-yl)ethyl)-1H-pyrazol-4-yl)-3-methylpyrazine-2-carboxamide | Calcd.: 600.2 Found: 600.0 | DAICEL CHIRALPAK OD-H |
| 138 | | 6-(3-Chloro-6-(difluoromethyl)-2-fluorophenyl)-N-(1-((3-fluoro-5-((1R,5S)-2-oxo-3-azabicyclo[3.1.0]hexan-3-yl)pyridin-2-yl)methyl)-1H-pyrazol-4-yl)-3-methylpyrazine-2-carboxamide | Calcd.: 586.1 Found: 586.0 | |
| 139 | | 6-(3-Chloro-6-cyano-2-fluorophenyl)-3-methyl-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 571.2 Found: 571.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 140 | | 6-(3-Chloro-6-cyano-2-fluorophenyl)-3-methyl-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 571.2 Found: 571.2 | DAICEL CHIRALPAK AD |
| 141 | | 6-(3-Chloro-6-(difluoromethyl)-2-fluorophenyl)-N-(1-((S or R)-1-(1-((1R,5S)-2-oxo-3-azabicyclo[3.1.0]hexan-3-yl)-6,7-dihydro-5H-cyclopenta[c]pyridin-4-yl)ethyl)-1H-pyrazol-4-yl)pyrazine-2-carboxamide | Calcd.: 608.2 Found: 608.2 | DAICEL CHIRALPAK AD |
| 142 | | 6-(3-Chloro-6-(difluoromethyl)-2-fluorophenyl)-N-(1-((R or S)-1-(1-((1R,5S)-2-oxo-3-azabicyclo[3.1.0]hexan-3-yl)-6,7-dihydro-5H-cyclopenta[c]pyridin-4-yl)ethyl)-1H-pyrazol-4-yl)pyrazine-2-carboxamide | Calcd.: 608.2 Found: 608.2 | DAICEL CHIRALPAK AD |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]⁺ or [M + Na]⁺ | Chiral column |
|---|---|---|---|---|
| 143 | | 3-(tert-Butoxymethyl)-6-(3-chloro-6-(difluoromethyl)-2-fluorophenyl)-N-(1-((S or R)-1-(5-fluoro-6-((1R,5S)-2-oxo-3-azabicyclo[3.1.0]hexan-3-yl)pyridin-3-yl)ethyl)-1H-pyrazol-4-yl)pyrazine-2-carboxamide | [M + 1 − 56]⁺ Calcd.: 616.2 Found: 616.2 | DAICEL CHIRALPAK AD |
| 144 | | 3-(tert-Butoxymethyl)-6-(3-chloro-6-(difluoromethyl)-2-fluorophenyl)-N-(1-((R or S)-1-(5-fluoro-6-((1R,5S)-2-oxo-3-azabicyclo[3.1.0]hexan-3-yl)pyridin-3-yl)ethyl)-1H-pyrazol-4-yl)pyrazine-2-carboxamide | [M + 1 − 56]⁺ Calcd.: 616.2 Found: 616.2 | DAICEL CHIRALPAK AD |

TABLE 18-continued

The following compounds were prepared using procedures similar to those described in Examples 37-45 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 145 | | 6-(3-Chloro-6-(difluoromethyl)-2-fluorophenyl)-N-(1-(4-((1R,5S)-2-oxo-3-azabicyclo[3.1.0]hexan-3-yl)benzyl)-1H-pyrazol-4-yl)pyrazine-2-carboxamide | [M + 1]+ Calcd.: 567.2 Found: 566.9 | |
| 146 | | 6-(3-Chloro-6-(difluoromethyl)-2-fluorophenyl)-N-(1-((R or S)-1-(3-fluoro-5-((1R,5S)-2-oxo-3-azabicyclo[3.1.0]hexan-3-yl)pyridin-2-yl)ethyl)-1H-pyrazol-4-yl)pyrazine-2-carboxamide | [M + 1]+ Calcd.: 586.1 Found: 586.1 | Whelko-O1 |
| 147 | | N-(1-((R or S)-1-(3-Chloro-5-((1R,5S)-2-oxo-3-azabicyclo[3.1.0]hexan-3-yl)pyridin-2-yl)ethyl)-1H-pyrazol-4-yl)-6-(3-chloro-6-(difluoromethyl)-2-fluorophenyl)-3-methylpyrazine-2-carboxamide | [M + 1]+ Calcd.: 616.1 Found: 616.0 | Whelko-O1 |

TABLE 18-continued

*The following compounds were prepared using procedures similar to those described in Examples 37-45 using appropriate starting materials. In some examples, racemic products or diatereoisomeric mixtures were separated using chiral columns (SFC or HPLC) specified in the table.*

| Example No. | Structure | Name | [M + H]+ or [M + Na]+ | Chiral column |
|---|---|---|---|---|
| 148 | | N-(1-((R or S)-1-(3-Chloro-5-((1R,5S)-2-oxo-3-azabicyclo[3.1.0]hexan-3-yl)pyridin-2-yl)ethyl)-1H-pyrazol-4-yl)-6-(3-chloro-6-(difluoromethyl)-2-fluorophenyl)-3-methylpyrazine-2-carboxamide | [M + 1]+ Calcd.: 602.1 Found: 602.1 | Whelko-01 |
| 149 | | 6-(3-Chloro-6-(difluoromethyl)-2-fluorophenyl)-3-methyl-N-(1-((4-((1R,5S)-2-oxo-3-azabicyclo[3.1.0]hexan-3-yl)-[1,3]dioxolo[4,5-c]pyridin-7-yl)methyl)-1H-pyrazol-4-yl)pyrazine-2-carboxamide | [M + 1]+ Calcd.: 612.1 Found: 612.1 | |

Examples 150 and 151

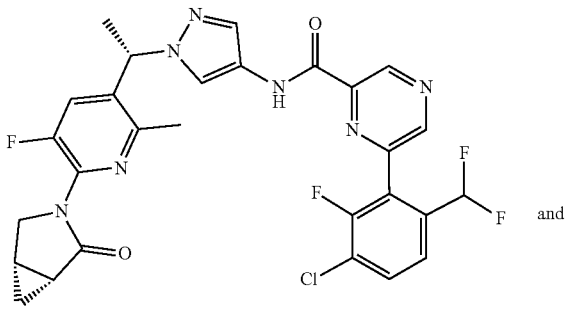

6-(3-Chloro-6-(difluoromethyl)-2-fluorophenyl)-N-(1-((S)-1-(5-fluoro-2-methyl-6-((1R,5S)-2-oxo-3-azabicyclo[3.1.0]hexan-3-yl)pyridin-3-yl)ethyl)-1H-pyrazol-4-yl)pyrazine-2-carboxamide and 6-(3-Chloro-6-(difluoromethyl)-2-fluorophenyl)-N-(1-((R)-1-(5-fluoro-2-methyl-6-((1R,5S)-2-oxo-3-azabicyclo[3.1.0]hexan-3-yl)pyridin-3-yl)ethyl)-1H-pyrazol-4-yl)pyrazine-2-carboxamide (Scheme AAF)

Step 1. (1R,5S)-3-(3-Fluoro-6-methylpyridin-2-yl)-3-azabicyclo[3.1.0]hexan-2-one: To a solution of 2-chloro-3-fluoro-6-methylpyridine (1.00 g, 6.87 mmol), (1R,5S)-3-azabicyclo[3.1.0]hexan-2-one (0.667 g, 6.87 mmol) and cesium carbonate (4.48 g, 13.7 mmol) in dioxane (10 mL) was added Xantphos (0.398 g, 0.687 mmol) and tris(dibenzylideneacetone)dipalladium (556 mg, 0.687 mmol). The reaction mixture was stirred at 100° C. for 12 h. The mixture was cooled to rt, and to the mixture was added water then the resulting mixture was extracted with EtOAc. The organic layers were dried over $Na_2SO_4$, filtered and concentrated under reduced pressure. The crude residue was purified by silica gel chromatography (0 to 50% EtOAc/petroleum ether) to afford the title compound. MS=207.1 $[M+1]^+$.

Step 2. (1R,5S)-3-(5-Bromo-3-fluoro-6-methylpyridin-2-yl)-3-azabicyclo[3.1.0]hexan-2-one: To a solution of (1R,5S)-3-(3-fluoro-6-methylpyridin-2-yl)-3-azabicyclo[3.1.0]hexan-2-one (700 mg, 3.39 mmol) in ACN (10 mL) was added NBS (665 mg, 3.73 mmol). The resulting mixture was stirred at 80° C. for 3 h. The reaction mixture was cooled to rt and concentrated under reduced pressure. The crude residue was purified by silica gel chromatography (0 to 30% EtOAc/petroleum ether) to afford the title compound. MS=284.9, 286.9 $[M+1]^+$.

Step 3. (1R,5S)-3-(5-Acetyl-3-fluoro-6-methylpyridin-2-yl)-3-azabicyclo[3.1.0]hexan-2-one: The title compound was prepared following procedures similar to those described above in Intermediate BI-4a, step 1. MS=249.2 $[M+1]^+$.

Step 4. (1R,5S)-3-(3-Fluoro-5-(1-hydroxyethyl)-6-methylpyridin-2-yl)-3-azabicyclo[3.1.0]hexan-2-one: The title compound was prepared following procedures similar to those described above in Intermediate BJ-5a, step 3. MS=251.1 $[M+1]^+$.

Step 5: (1R,5S)-3-(3-Fluoro-6-methyl-5-(1-(4-nitro-1H-pyrazol-1-yl)ethyl)pyridin-2-yl)-3-azabicyclo[3.1.0]hexan-2-one: To a solution of (1R,5S)-3-(3-fluoro-5-(1-hydroxyethyl)-6-methylpyridin-2-yl)-3-azabicyclo[3.1.0]hexan-2-one (600 mg, 2.40 mmol), 4-nitro-1H-pyrazole (325 mg, 2.88 mmol) and triphenylphosphine (943 mg, 3.60 mmol) in THF (10 mL) was added di-iso-propyl azodicarboxylate (0.699 mL, 3.60 mmol) at 0° C. The reaction mixture was stirred at 0° C. for 2 h, then concentrated under reduced pressure. The crude product was purified by silica gel chromatography (0 to 30% EtOAc/petroleum ether) to afford the title compound. MS=346.2 $[M+1]^+$.

Step 6. (1R,5S)-3-(5-(1-(4-Amino-1H-pyrazol-1-yl)ethyl)-3-fluoro-6-methylpyridin-2-yl)-3-azabicyclo[3.1.0]hexan-2-one: The title compound was prepared following procedures similar to those described above in Example 41, step 3. MS=316.2 $[M+1]^+$.

Step 7. 6-(3-Chloro-6-(difluoromethyl)-2-fluorophenyl)-N-(1-(1-(5-fluoro-2-methyl-6-((1R,5S)-2-oxo-3-azabicyclo[3.1.0]hexan-3-yl)pyridin-3-yl)ethyl)-1H-pyrazol-4-yl)pyrazine-2-carboxamide: The title compounds were prepared as an initial mixture of diastereomers following procedures similar to those described above in Example 1, step 5. The diastereoisomeric title compounds were separated by chiral chromatography (SFC, DAICEL CHIRALPAK AD; 0.1% $NH_3H_2O$ EtOH Begin B 35% End B 35%) to furnish the individual isomer compounds in pure form. The faster-eluting diastereoisomer of the title compounds (Example 150): $^1$H NMR (400 MHz, $CD_3OD$) δ 9.39 (s, 1H), 9.02 (d, J=2.0 Hz, 1H), 8.22 (s, 1H), 7.86-7.84 (m, 1H), 7.78 (s, 1H), 7.67 (d, J=8.6 Hz, 1H), 7.41 (d, J=10.6 Hz, 1H), 7.18-6.84 (m, 1H), 5.81 (d, J=7.0 Hz, 1H), 4.29 (dd, J=10.6, 5.9 Hz, 1H), 3.67 (d, J=10.2 Hz, 1H), 2.48 (d, J=0.8 Hz, 3H), 2.15 (br d, J=7.4 Hz, 1H), 2.01 (br s, 1H), 1.86 (d, J=7.0 Hz, 3H), 1.32-1.26 (m, 1H), 0.91-0.84 (m, 1H). MS=600.1 $[M+1]^+$. The slower-eluting diastereoisomer of the title compounds (Example 151): $^1$H NMR (400 MHz, $CD_3OD$) δ 9.39 (s, 1H), 9.01 (d, J=2.0 Hz, 1H), 8.20 (s, 1H), 7.88-7.81 (m, 1H), 7.79 (s, 1H), 7.66 (d, J=8.6 Hz, 1H), 7.44 (d, J=10.6 Hz, 1H), 7.18-6.83 (m, 1H), 5.81 (d, J=7.0 Hz, 1H), 4.28 (dd, J=10.6, 5.9 Hz, 1H), 3.70 (d, J=9.4 Hz, 1H), 2.48 (s, 3H), 2.20-2.13 (m, 1H), 2.02 (br d, J=7.0 Hz, 1H), 1.86 (d, J=7.0 Hz, 3H), 1.32-1.26 (m, 1H), 0.92-0.85 (m, 1H). MS=600.2 $[M+1]^+$.

TABLE 19

The following compounds were prepared using procedures similar to those described in Examples 150 and 151 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 152 | | 6-(3-Chloro-6-(difluoromethyl)-2-fluorophenyl)-N-(1-((R or S)-1-(4,5-dimethyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 596.2 Found: 596.3 | DAICEL DCpak SFC-B |
| 153 | | 6-(3-Chloro-6-(difluoromethyl)-2-fluorophenyl)-N-(1-((S or R)-1-(4,5-dimethyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 596.2 Found: 596.3 | DAICEL DCpak SFC-B |
| 154 | | 6-(3-Chloro-6-(difluoromethyl)-2-fluorophenyl)-N-(1-((R or S)-1-(5-methoxy-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.3 | DAICEL CHIRALPAK AD-H |

TABLE 19-continued

The following compounds were prepared using procedures similar to those described in Examples 150 and 151 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 155 | | 6-(3-Chloro-6-(difluoromethyl)-2-fluorophenyl)-N-(1-((S or R)-1-(5-methoxy-4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.3 | DAICEL CHIRALPAK AD-H |

Example 156

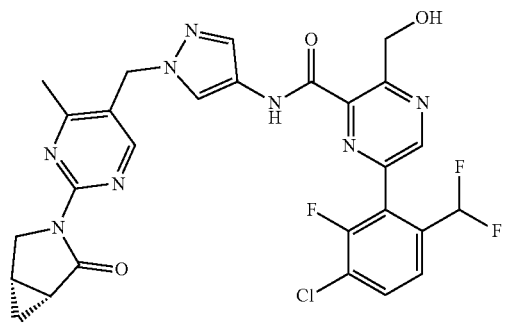 [SMILES: Cc1nc(N2C[C@H]3C[C@H]3C2=O)ncc1Cn1cc(NC(=O)c2nc(-c3c(C(F)F)ccc(Cl)c3F)cnc2CO)cn1]

6-(3-Chloro-6-(difluoromethyl)-2-fluorophenyl)-3-(hydroxymethyl)-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide (Scheme AAG)

Step 1. 6-(3-Chloro-6-(difluoromethyl)-2-fluorophenyl)-N-(1-((4-methyl-2-((1R,5S)-2-oxo-3-azabicyclo[3.1.0]hexan-3-yl)pyrimidin-5-yl)methyl)-1H-pyrazol-4-yl)-N-((2-(trimethylsilyl)ethoxy)methyl)-3-vinylpyrazine-2-carboxamide: To a mixture of 6-(3-chloro-6-(difluoromethyl)-2-fluorophenyl)-N-(1-((4-methyl-2-((1R,5S)-2-oxo-3-azabicyclo[3.1.0]hexan-3-yl)pyrimidin-5-yl)methyl)-1H-pyrazol-4-yl)-3-vinylpyrazine-2-carboxamide (120 mg, 0.202 mmol) in DMF (2.0 mL) cooled to 0° C. was added sodium hydride (16 mg, 0.40 mmol, 60% dispersion oil). The resulting mixture was stirred at 0° C. for 5 min then 2-(trimethylsilyl)ethoxymethyl chloride (71.5 mL, 0.403 mmol) was added. The mixture was stirred at 0° C. for 2 h then quenched by addition of satd. aq. NH$_4$Cl and the mixture was extracted with EtOAc. The organic layers were combined and washed with brine, dried over Na$_2$SO$_4$, filtered and concentrated under reduced pressure. The crude residue was purified by silica gel column chromatography (EtOAc/hexanes) to afford the title compound. MS=752.2 [M+1]+.

Step 2. 6-(3-Chloro-6-(difluoromethyl)-2-fluorophenyl)-3-formyl-N-(1-((4-methyl-2-((1R,5S)-2-oxo-3-azabicyclo[3.1.0]hexan-3-yl)pyrimidin-5-yl)methyl)-1H-pyrazol-4-yl)-N-((2-(trimethylsilyl)ethoxy)methyl)pyrazine-2-carboxamide: The title compound was prepared following procedures similar to those described above in Intermediate AE-5, step 2. MS=745.1 [M+H$_2$O+1]+.

Step 3. 6-(3-Chloro-6-(difluoromethyl)-2-fluorophenyl)-3-(hydroxymethyl)-N-(1-((4-methyl-2-((1R,5S)-2-oxo-3-azabicyclo[3.1.0]hexan-3-yl)pyrimidin-5-yl)methyl)-1H-pyrazol-4-yl)-N-((2-(trimethylsilyl)ethoxy)methyl)pyrazine-2-carboxamide: The title compound was prepared following procedures similar to those described above in Intermediate BA-1a, step 2. MS=731.2 [M+1]+.

Step 4. 6-(3-Chloro-6-(difluoromethyl)-2-fluorophenyl)-3-(hydroxymethyl)-N-(1-((4-methyl-2-((1R,5S)-2-oxo-3-azabicyclo[3.1.0]hexan-3-yl)pyrimidin-5-yl)methyl)-1H-pyrazol-4-yl)pyrazine-2-carboxamide:
The title compound was prepared following procedures similar to those described above in Intermediate AE-5, step 4. $^1$H NMR (600 MHz, CD$_3$OD) δ 8.98 (d, J=2.0 Hz, 1H), 8.55 (s, 1H), 8.28 (s, 1H), 8.20 (s, 1H), 7.83 (t, J=7.8 Hz, 1H), 7.73 (s, 1H), 7.67 (d, J=8.5 Hz, 1H), 6.95 (t, J=54.6 Hz, 1H), 5.37 (s, 2H), 5.23 (s, 2H), 4.19 (dd, J=11.5, 5.0 Hz, 1H), 4.00 (d, J=11.5 Hz, 1H), 2.45 (s, 3H), 2.10 (dt, J=8.0, 4.6 Hz, 2H), 1.27 (dq, J=8.0, 4.4 Hz, 1H), 0.83 (q, J=4.0 Hz, 1H). MS=599.4 [M+1]+.

Examples 157-160

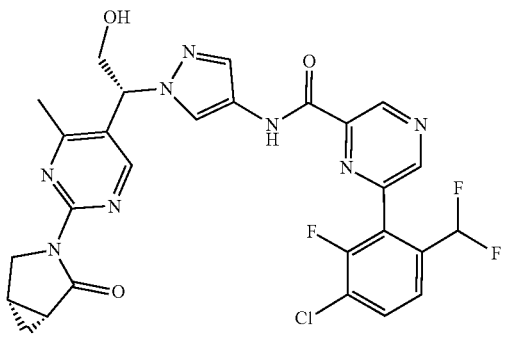
and

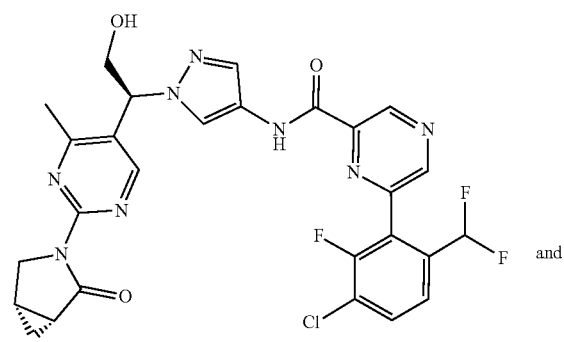
and

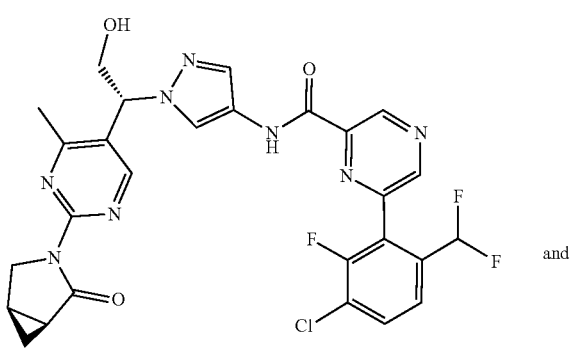
and

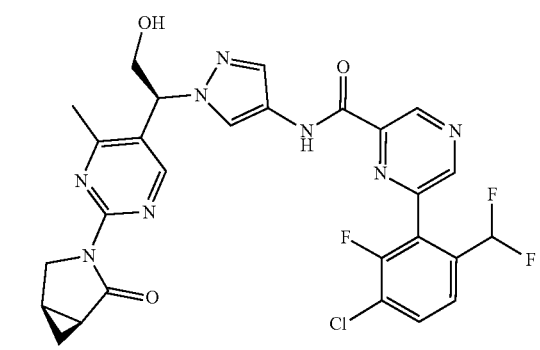

6-(3-Chloro-6-(difluoromethyl)-2-fluorophenyl)-N-(1-((S)-2-hydroxy-1-(4-methyl-2-((1S,5R)-2-oxo-3-azabicyclo[3.1.0]hexan-3-yl)pyrimidin-5-yl)ethyl)-1H-pyrazol-4-yl)pyrazine-2-carboxamide, 6-(3-Chloro-6-(difluoromethyl)-2-fluorophenyl)-N-(1-((R)-2-hydroxy-1-(4-methyl-2-((1S,5R)-2-oxo-3-azabicyclo[3.1.0]hexan-3-yl)pyrimidin-5-yl)ethyl)-1H-pyrazol-4-yl)pyrazine-2-carboxamide, 6-(3-Chloro-6-(difluoromethyl)-2-fluorophenyl)-N-(1-((S)-2-hydroxy-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide and 6-(3-Chloro-6-(difluoromethyl)-2-fluorophenyl)-N-(1-((R)-2-hydroxy-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAH)

Step 1. 2-Chloro-4-methyl-5-vinylpyrimidine: A solution of 5-bromo-2-chloro-4-methylpyrimidine (7.00 g, 33.7 mmol), TEA (7.05 mL, 50.6 mmol), potassium vinyltrifluoroborate (4.97 g, 37.1 mmol) and bis(di-tert-butylphosphino)ferrocene palladium dichloride (0.741 g, 1.01 mmol) in ethanol (100 mL) was stirred at 90° C. for 3 h. The reaction mixture was cooled to rt and concentrated under reduced pressure. To the mixture was added water, and the resulting mixture was extracted with EtOAc. The organic layers were combined and washed with brine, dried over $Na_2SO_4$, filtered and concentrated under reduced pressure. The crude residue was purified by silica gel chromatography (0 to 20% EtOAc/petroleum ether) to afford the title compound. $^1$H NMR (400 MHz, $CD_3OD$) δ 8.64 (s, 1H), 6.93-6.83 (m, 1H), 5.90-5.85 (m, 1H), 5.58-5.52 (m, 1H), 2.52 (d, J=1.2 Hz, 3H).

Step 2. 3-(4-Methyl-5-vinylpyrimidin-2-yl)-3-azabicyclo[3.1.0]hexan-2-one: The mixture of 2-chloro-4-methyl-5-vinylpyrimidine (1.10 g, 7.12 mmol), 3-azabicyclo[3.1.0]hexan-2-one (898 mg, 9.25 mmol), cesium carbonate (4.64 g, 14.2 mmol), tris(dibenzylideneacetone)dipalladium (652 mg, 0.712 mmol) and Xantphos (412 mg, 0.712 mmol) in dioxane (20 mL) was stirred at 100° C. for 14 h under a nitrogen atmosphere. The reaction mixture was cooled to rt and concentrated under reduced pressure. To the mixture was added water and the resulting mixture was extracted with EtOAc. The organic layers were combined and washed with brine, dried over $Na_2SO_4$, filtered and concentrated under reduced pressure. The crude residue was purified by silica gel chromatography (0 to 95% EtOAc/petroleum ether) to afford the title compound. MS=216.0 $[M+1]^+$.

Step 3. 3-(5-(1,2-Dihydroxyethyl)-4-methylpyrimidin-2-yl)-3-azabicyclo[3.1.0]hexan-2-one: To a solution of 3-(4-methyl-5-vinylpyrimidin-2-yl)-3-azabicyclo[3.1.0]hexan-2-one (815 mg, 3.79 mmol) in a mixture of ACN (15 mL) and water (5.0 mL) was added an aq.

solution of osmium tetroxide (9.63 mL, 0.379 mmol, 10 mg/mL) and 4-methylmorpholine N-oxide (444 mg, 3.79 mmol). The resulting mixture was stirred for 12 h at rt. The mixture was cooled to 0° C., then satd. aq. $Na_2S_2O_3$ was added to the reaction and the resulting mixture was stirred for 30 min. Then, the mixture was filtrated through a pad of diatomaceous earth (eluting with ACN) and the filtrate was concentrated under reduced pressure to afford the title compound. MS=250.3 [M+1]⁺.

Step 4. 3-(5-(2-((tert-Butyldiphenylsilyl)oxy)-1-hydroxyethyl)-4-methylpyrimidin-2-yl)-3-azabicyclo[3.1.0]hexan-2-one: To a solution of 3-(5-(1,2-dihydroxyethyl)-4-methylpyrimidin-2-yl)-3-azabicyclo[3.1.0]hexan-2-one (1.25 g, 5.01 mmol) in DMF (30 mL) was added 1H-imidazole (750 mg, 11.0 mmol) and TBDP-SCl (1.65 g, 6.01 mmol). The reaction mixture was stirred at 50° C. for 2 h. The reaction mixture was cooled to rt. To the mixture was added water and the resulting mixture was extracted with EtOAc. The organic layers were combined and washed with brine, dried over $Na_2SO_4$, filtered and concentrated under reduced pressure. The crude residue was purified by silica gel chromatography (0 to 95% EtOAc/petroleum ether then 0 to 10% MeOH/DCM) to afford the title compound. MS=488.2 [M+1]⁺.

Step 5: 3-(5-(2-((tert-Butyldiphenylsilyl)oxy)-1-(4-nitro-1H-pyrazol-1-yl)ethyl)-4-methylpyrimidin-2-yl)-3-azabicyclo[3.1.0]hexan-2-one: To a solution of 3-(5-(2-((tert-butyldiphenylsilyl)oxy)-1-hydroxyethyl)-4-methylpyrimidin-2-yl)-3-azabicyclo[3.1.0]hexan-2-one (1.46 g, 2.99 mmol), di-tert-butyl azodicarboxylate (1.38 g, 5.99 mmol) and triphenylphosphine (1.57 g, 5.99 mmol) in THF (20 mL) was added 4-nitro-1H-pyrazole (0.677 g, 5.99 mmol). The reaction mixture was stirred at 50° C. for 4 h. The mixture was cooled to rt and concentrated under reduced pressure. The crude residue was purified by silica gel chromatography (0 to 100% EtOAc/petroleum ether) to afford the title compound. MS=583.6 [M+1]⁺.

Step 6: 3-(5-(1-(4-Amino-1H-pyrazol-1-yl)-2-((tert-butyldiphenylsilyl)oxy)ethyl)-4-methylpyrimidin-2-yl)-3-azabicyclo[3.1.0]hexan-2-one: The title compound was prepared following procedures similar to those described above in Example 41, step 3. MS=553.3 [M+1]⁺.

Step 7. N-(1-(2-((tert-Butyldiphenylsilyl)oxy)-1-(4-methyl-2-(2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide: The title compound was prepared following procedures similar to those described above in Example 41, step 4. MS=837.3 [M+1]⁺.

Step 8. 6-(3-Chloro-6-(difluoromethyl)-2-fluorophenyl)-N-(1-((S)-2-hydroxy-1-(4-methyl-2-((1S,5R)-2-oxo-3-azabicyclo[3.1.0]hexan-3-yl)pyrimidin-5-yl)ethyl)-1TH-pyrazol-4-yl)pyrazine-2-carboxamide, 6-(3-Chloro-6-(difluoromethyl)-2-fluorophenyl)-N-(1-((R)-2-hydroxy-1-(4-methyl-2-((1S,5R)-2-oxo-3-azabicyclo[3.1.0]hexan-3-yl)pyrimidin-5-yl)ethyl)-1H-pyrazol-4-yl)pyrazine-2-carboxamide, 6-(3-Chloro-6-(difluoromethyl)-2-fluorophenyl)-N-(1-((S)-2-hydroxy-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide and 6-(3-Chloro-6-(difluoromethyl)-2-fluorophenyl)-N-(1-((R)-2-hydroxy-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide: The title compounds were prepared as an initial mixture of diastereomers following procedures similar to those described above in Intermediate AE-5, step 4. The diastereoisomeric title compounds were separated by chiral chromatography (SFC, REGIS (S,S) WHELK-O1; 0.1% $NH_3H_2O$ EtOH Begin B 40% End B 40%) to furnish the individual isomer compounds in pure form. The faster-eluting diastereoisomer of the title compounds (Example 157): ¹H NMR (400 MHz, CD₃OD) δ 9.29 (s, 1H), 8.92 (d, J=2.1 Hz, 1H), 8.39 (s, 1H), 8.19 (s, 1H), 7.74 (t, J=7.7 Hz, 1H), 7.71 (s, 1H), 7.57 (d, J=8.5 Hz, 1H), 7.03-6.80- (m, 1H), 5.61-5.56 (m, 1H), 4.21 (dd, J=11.8, 7.2 Hz, 1H), 4.09 (dd, J=11.6, 5.2 Hz, 2H), 3.89 (d, J=11.3 Hz, 1H), 2.40 (s, 3H), 2.05-1.96 (m, 2H), 1.18 (dd, J=8.1, 4.4 Hz, 1H), 0.72 (q, J=4.1 Hz, 1H). MS=599.1 [M+1]⁺. The second-eluting diastereoisomer of the title compounds (Example 158): ¹H NMR (400 MHz, CD₃OD) δ 9.41 (s, 1H), 9.07-9.03 (m, 1H), 8.54 (s, 1H), 8.37-8.31 (m, 1H), 7.89-7.82 (m, 2H), 7.69 (d, J=8.5 Hz, 1H), 7.16-6.92 (m, 1H), 5.73 (br t, J=5.8 Hz, 1H), 4.33 (dd, J=11.9, 7.0 Hz, 1H), 4.27-4.17 (m, 2H), 4.05 (br d, J=11.6 Hz, 1H), 2.55 (s, 3H), 2.16 (br d, J=4.3 Hz, 2H), 1.38-1.29 (m, 1H), 0.89 (br d, J=3.7 Hz, 1H). MS=599.1 [M+1]⁺. The third-eluting diastereoisomer of the title compounds (Example 159): ¹H NMR (400 MHz, CD₃OD) δ 9.29 (s, 1H), 8.92 (d, J=2.1 Hz, 1H), 8.38 (s, 1H), 8.19 (s, 1H), 7.74 (t, J=7.8 Hz, 1H), 7.71 (s, 1H), 7.57 (d, J=8.2 Hz, 1H), 7.04-6.80 (m, 1H), 5.60-5.56 (m, 1H), 4.21 (dd, J=11.8, 7.2 Hz, 1H), 4.09 (dd, J=11.6, 5.2 Hz, 2H), 3.89 (d, J=11.3 Hz, TH), 2.40 (s, 3H), 2.00 (dd, J=7.5, 4.1 Hz, 2H), 1.18 (dt, J=7.9, 4.0 Hz, TH), 0.72 (q, J=4.0 Hz, TH). MS=599.2 [M+1]⁺. The fourth-eluting isomer of the title compounds (Example 160): ¹H NMR (400 MHz, CD₃OD) δ 9.29 (s, TH), 8.92 (s, TH), 8.38 (s, TH), 8.19 (s, TH), 7.74 (br t, J=7.5 Hz, TH), 7.72-7.70 (in, TH), 7.57 (d, J=8.2 Hz, TH), 7.03-6.80 (in, TH), 5.57 (t, J=6.3 Hz, TH), 4.21 (dd, J=11.4, 7.2 Hz, TH), 4.09 (dd, J=11.6, 5.2 Hz, 2H), 3.89 (d, J=11.6 Hz, TH), 2.39 (s, 3H), 2.00 (br d, J=4.6 Hz, 2H), 1.18 (br d, J=9.2 Hz, TH), 0.72 (br d, J=4.0 Hz, TH). MS=599.1 [M+1]c.

TABLE 20

The following compounds were prepared using procedures similar to those described in Examples 157-160 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 161 | | 6-(3-chloro-6-(difluoromethyl)-2-fluorophenyl)-N-(1-((S or R)-2-hydroxy-1-(2-((1S,5R or 1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 585.1<br>Found: 585.0 | DAICEL CHIRALPAK AD |
| 162 | | 6-(3-chloro-6-(difluoromethyl)-2-fluorophenyl)-N-(1-((S or R)-2-hydroxy-1-(6-((1S,5R or 1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 598.2<br>Found: 598.2 | DAICEL CHIRALPAK OD-H |
| 163 | | 6-(3-Chloro-6-(difluoromethyl)-2-fluorophenyl)-N-(1-((S or R)-2-hydroxy-1-(6-((1S,5R or 1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 598.2<br>Found: 598.2 | DAICEL CHIRALPAK OD-H |

TABLE 20-continued

The following compounds were prepared using procedures similar to those described in Examples 157-160 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 164 | | 6-(3-Chloro-6-(difluoromethyl)-2-fluorophenyl)-N-(1-((R or S)-2-hydroxy-1-(2-((1R,5S)-2-oxo-3-azabicyclo[3.1.0]hexan-3-yl)pyrimidin-5-yl)ethyl)-1H-pyrazol-4-yl)-3-methylpyrazine-2-carboxamide | Calcd.: 599.2 Found: 599.1 | DAICEL CHIRALPAK OD |
| 165 | | 6-(3-Chloro-6-(difluoromethyl)-2-fluorophenyl)-N-(1-((S or R)-2-hydroxy-1-(2-((1R,5S)-2-oxo-3-azabicyclo[3.1.0]hexan-3-yl)pyrimidin-5-yl)ethyl)-1H-pyrazol-4-yl)-3-methylpyrazine-2-carboxamide | Calcd.: 599.2 Found: 599.1 | DAICEL CHIRALPAK OD |
| 166 | | 6-(3-Chloro-6-cyano-2-fluorophenyl)-N-(1-((R or S)-2-hydroxy-1-(2-((1R,5S)-2-oxo-3-azabicyclo[3.1.0]hexan-3-yl)pyrimidin-5-yl)ethyl)-1H-pyrazol-4-yl)-3-methylpyrazine-2-carboxamide | Calcd.: 574.2 Found: 574.2 | DAICEL CHIRALPAK AD |

TABLE 20-continued

The following compounds were prepared using procedures similar to those described in Examples 157-160 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 167 | | 6-(3-Chloro-6-(difluoromethyl)-2-fluorophenyl)-N-(1-((R or S)-1-(4,5-dimethyl-6-((1R,5S)-2-oxo-3-azabicyclo[3.1.0]hexan-3-yl)pyridin-3-yl)-2-hydroxyethyl)-1H-pyrazol-4-yl)pyrazine-2-carboxamide | Calcd.: 612.2 Found: 612.2 | REGIS (S,S) WHELK-O1 |
| 168 | | 6-(3-Chloro-6-(difluoromethyl)-2-fluorophenyl)-N-(1-((S or R)-1-(4,5-dimethyl-6-((1R,5S)-2-oxo-3-azabicyclo[3.1.0]hexan-3-yl)pyridin-3-yl)-2-hydroxyethyl)-1H-pyrazol-4-yl)pyrazine-2-carboxamide | Calcd.: 612.2 Found: 612.2 | REGIS (S,S) WHELK-O1 |

Example 169

6-(3-Chloro-6-(difluoromethyl)-2-fluorophenyl)-N-(1-(1-(4-(hydroxymethyl)-2-((1R,5S)-2-oxo-3-azabicyclo[3.1.0]hexan-3-yl)pyrimidin-5-yl)ethyl)-1H-pyrazol-4-yl)pyrazine-2-carboxamide

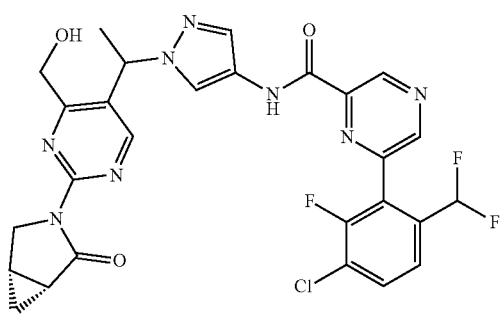 [SMILES: CC(c1cnc(N2C[C@H]3C[C@H]3C2=O)nc1CO)n1cc(NC(=O)c2cncc(-c3c(C(F)F)ccc(Cl)c3F)n2)cn1]

Step 1. 1-(4-(tert-Butoxymethyl)-2-chloropyrimidin-5-yl)ethanone: To a solution of 1-(2-chloropyrimidin-5-yl)ethanone (400 mg, 2.55 mmol) in ACN (9.0 mL) and water (9.0 mL) was added 2-(tert-butoxy)acetic acid (675 mg, 5.11 mmol), silver nitrate (1.2 g, 7.06 mmol) and ammonium persulfate (2.10 g, 9.20 mmol) at rt. After the addition was finished, the mixture was stirred at 6° C. for 1 h. The mixture was poured into water and extracted with EtOAc. The organic layers were combined and dried over Na$_2$SO$_4$, filtered and concentrated under reduced vacuum. The crude residue was purified by silica gel chromatography (0 to 8% EtOAc/petroleum ether) to afford the title compound. MS=243.3 [M+1]+.

245

Step 2. 1-(4-(tert-Butoxymethyl)-2-chloropyrimidin-5-yl)ethanol: The title compound was prepared following procedures similar to those described above in Intermediate BJ-5a, step 3. aq. MS=245.1 [M+1]⁺.

Step 3. 4-(tert-Butoxymethyl)-2-chloro-5-(1-(4-nitro-1H-pyrazol-1-yl)ethyl)pyrimidine: To a solution of 1-(4-(tert-butoxymethyl)-2-chloropyrimidin-5-yl)ethanol (150 mg, 0.613 mmol), 4-nitro-1H-pyrazole (90 mg, 0.80 mmol) and triphenylphosphine (241 mg, 0.919 mmol) in toluene (5.0 mL) under a nitrogen atmosphere and cooled to 0° C., was added di-iso-propyl azodicarboxylate (186 mg, 0.919 mmol). After the addition was finished, the reaction was stirred at rt for 15 h. The mixture was diluted with water and extracted with EtOAc. The organic layers were combined and dried over Na₂SO₄, filtered and concentrated under reduced vacuum. The crude residue was purified by silica gel chromatography (0 to 18% EtOAc/petroleum ether to afford the title compound. MS=339.9 [M+1]⁺.

Step 4. (1S,5R)-3-(4-(tert-Butoxymethyl)-5-(1-(4-nitro-1H-pyrazol-1-yl)ethyl)pyrimidin-2-yl)-3-azabicyclo[3.1.0]hexan-2-one: To a solution of 4-(tert-butoxymethyl)-2-chloro-5-(1-(4-nitro-1H-pyrazol-1-yl)ethyl)pyrimidine (90.0 mg, 0.265 mmol), (1S,5R)-3-azabicyclo[3.1.0]hexan-2-one (36.0 mg, 0.371 mmol), Xantphos (16.0 mg, 28.0 µmol) and cesium carbonate (173 mg, 0.530 mmol) in dioxane (2.0 mL) under a nitrogen atmosphere was added tris(dibenzylideneacetone)dipalladium (25 mg, 27 µmol) at rt. The reaction mixture was stirred at 100° C. for 15 h. The reaction mixture was cooled to rt and filtered. The filtrate was concentrated under reduced pressure and the residue was purified by preparatory-TLC (1:1 EtOAc/petroleum ether) to afford the title compound. MS=401.1 [M+1]⁺.

Step 5. 3-(5-(1-(4-amino-1H-pyrazol-1-yl)ethyl)-4-(tert-butoxymethyl)pyrimidin-2-yl)-3-azabicyclo[3.1.0]hexan-2-one: The title compound was prepared following procedures similar to those described above in Example 41, step 3. MS=371.5 [M+1]⁺.

Step 6. N-(1-(1-(4-(tert-Butoxymethyl)-2-(2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide: The title compound was prepared following procedures similar to those described above in Example 1, step 5. MS=655.2 [M+1]⁺.

Step 7. 6-(3-Chloro-6-(difluoromethyl)-2-fluorophenyl)-N-(1-(1-(4-(hydroxymethyl)-2-(2-oxo-3-azabicyclo[3.1.0]hexan-3-yl)pyrimidin-5-yl)ethyl)-1H-pyrazol-4-yl)pyrazine-2-carboxamide: The title compound was prepared following procedures similar to those described above in Intermediate AE-5, step 4. ¹H NMR (500 MHz, CDCl₃) δ 9.51-9.48 (m, 1H), 9.06 (d, J=2.9 Hz, 1H), 8.55 (br d, J=7.6 Hz, 1H), 8.14 (s, 1H), 7.70-7.76 (m, 1H), 7.65 (d, J=8.2 Hz, 1H), 7.61 (br s, 1H), 6.73-6.46 (m, 1H), 5.57 (br d, J=7.2 Hz, 1H), 4.82-4.69 (m, 1H), 4.60 (br s, 1H), 4.18 (br d, J=3.5 Hz, 1H), 4.07 (br d, J=10.4 Hz, 1H), 2.17 (br s, 1H), 2.07 (br s, 1H), 1.93 (br d, J=7.0 Hz, 3H), 1.27 (br d, J=6.1 Hz, 1H), 0.90 (br s, 1H). MS=599.2 [M+1]⁺.

246

Examples 170 and 171

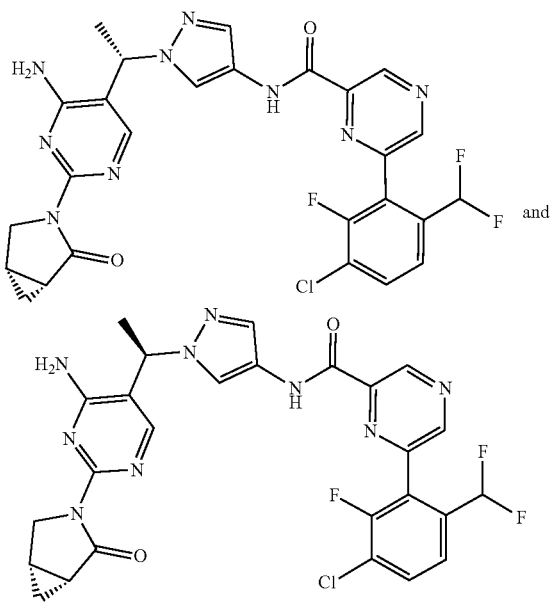

N-(1-((S)-1-(4-Amino-2-((1R,5S)-2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide and N-(1-((R)-1-(4-Amino-2-((1R,5S)-2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide (Scheme AAJ)

Step 1. 1-(2,4-Dichloropyrimidin-5-yl)ethanol: To a solution of 2,4-dichloro-5-iodopyrimidine (8.00 g, 29.1 mmol) in THF (100 mL) cooled to −78° C. under a nitrogen atmosphere was added iso-propylmagnesium chloride (17.5 mL, 34.9 mmol, 2M in THF) drop-wise. The resulting mixture was stirred at −78° C. for 20 min, then acetaldehyde (11.6 mL, 58.2 mmol, 5M in THF) was added drop-wise and the resulting mixture was stirred at −78° C. for 2 h and at rt for another 1 h. The reaction mixture was quenched by the addition of satd. aq. NH₄Cl, and the resulting mixture was extracted with EtOAc. The organic layers were combined and dried over Na₂SO₄, filtered and concentrated under reduced pressure. The crude residue was purified by silica gel chromatography (0 to 25% EtOAc/petroleum ether) to afford the title compound. MS=192.6 [M+1]⁺.

Step 2. 2,4-Dichloro-5-(1-(4-nitro-1H-pyrazol-1-yl)ethyl)pyrimidine: The mixture of 1-(2,4-dichloropyrimidin-5-yl)ethanol (3.70 g, 19.2 mmol), 4-nitro-1H-pyrazole (3.25 g, 28.8 mmol), triphenylphosphine (10.1 g, 38.3 mmol) and di-tert-butyl azodicarboxylate (8.83 g, 38.3 mmol) in THF (50 mL) was stirred at rt for 14 h. The reaction mixture was concentrated under reduced pressure and the residue was purified sequentially by silica gel chromatography (0 to 15% EtOAc/petroleum ether) then reversed-phase preparatory-HPLC (C18 stationary phase, water (0.1% TFA)-ACN Begin B 40%, End B 70%) to afford the title compound. ¹H NMR (400 MHz, CDCl₃, ppm) δ 8.55 (d, J=3.2 Hz, 1H), 8.31 (d, J=3.2 Hz, 1H), 8.11 (d, J=3.2 Hz, 1H), 5.81 (m, 1H), 1.98 (dd, J=3.3, 7.0 Hz, 3H).

Step 3. 2-Chloro-5-(1-(4-nitro-1H-pyrazol-1-yl)ethyl)pyrimidin-4-amine: The mixture of 2,4-dichloro-5-(1-(4-nitro-1H-pyrazol-1-yl)ethyl)pyrimidine (800 mg, 2.78 mmol) in THF (15 mL) and ammonium hydroxide (10 mL) was stirred at rt for 14 h. The reaction mixture was diluted with satd. aq. NH₄Cl and extracted with DCM. The organic layers were combined and dried over Na₂SO₄, filtered and concentrated under reduced pressure. The crude residue was purified by reversed-phase preparatory-HPLC (C18 stationary phase, water (0.1% TFA)-ACN Begin B 24%, End B 44%) to afford the title compound. MS=268.6 [M+1]⁺.

Step 4. (1R,5S)-3-(4-Amino-5-(1-(4-nitro-1H-pyrazol-1-yl)ethyl)pyrimidin-2-yl)-3-azabicyclo[3.1.0]hexan-2-one: The mixture of 2-chloro-5-(1-(4-nitro-1H-pyrazol-1-yl)ethyl)pyrimidin-4-amine (320 mg, 1.19 mmol), (1R,5S)-3-azabicyclo[3.1.0]hexan-2-one (174 mg, 1.79 mmol), cesium carbonate (1.16 g, 3.57 mmol) and [(4,5-bis(diphenylphosphino)-9,9-dimethylxanthene)-2-(2'-amino-1,1'-biphenyl)]palladium(II) methanesulfonate (Xantphos-Pd-G3, 113 mg, 0.119 mmol) in dioxane (6.0 mL) was stirred at 100° C. for 14 h under a nitrogen atmosphere. The reaction mixture was cooled to rt and concentrated under reduced pressure. The crude residue was purified by reversed-phase MPLC (C18 stationary phase, 0 to 18% ACN/water (0.5% TFA) to afford the title compound. MS=329.6 [M+1]⁺.

Step 5. (1R,5S)-3-(4-Amino-5-(1-(4-amino-1H-pyrazol-1-yl)ethyl)pyrimidin-2-yl)-3-azabicyclo[3.1.0]hexan-2-one: The title compound was prepared following procedures similar to those described above in Example 42, step 3. MS=300.0 [M+1]⁺.

Step 6. N-(1-((R)-1-(4-Amino-2-((1R,5S)-2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide and N-(1-((S)-1-(4-Amino-2-((1R,5S)-2-oxo-3-azabicyclo[3.1.0]hexan-3-yl)pyrimidin-5-yl)ethyl)-1H-pyrazol-4-yl)-6-(3-chloro-6-(difluoromethyl)-2-fluorophenyl)pyrazine-2-carboxamide: The title compounds were prepared as an initial mixture of diastereomers following procedures similar to those described above in Example 41, step 4. The diastereoisomeric title compounds were separated by chiral chromatography (SFC, DAICEL CHIRAL-PAK AD; 0.1% NH₃H₂O IPA Begin B 60% End B 60%) to furnish the individual isomer compounds in pure form. The faster-eluting diastereoisomer of the title compounds (Example 170): ¹H NMR (400 MHz, CD₃OD) δ 9.29 (s, 1H), 8.92 (d, J=2.2 Hz, 1H), 8.09 (s, 1H), 7.85 (s, 1H), 7.71-7.78 (m, 1H), 7.69 (s, 1H), 7.57 (d, J=8.1 Hz, 1H), 7.05-6.64 (m, 2H), 5.44 (m, 1H), 4.00 (m, 1H), 3.82 (d, J=11.0 Hz, 1H), 1.97-1.94 (m, 2H), 1.76 (d, J=7.1 Hz, 3H), 1.14 (m, 1H), 0.83-0.81 (m, 1H). MS=584.2 [M+1]⁺. The slower-eluting diastereoisomer of the title compounds (Example 171): ¹H NMR (400 MHz, CD₃OD) δ 9.29 (s, 1H), 8.92 (d, J=2.2 Hz, 1H), 8.09 (s, 1H), 7.84 (s, 1H), 7.77-7.71 (m, 1H), 7.69 (s, 1H), 7.57 (d, J=8.3 Hz, 1H), 7.06-6.78 (m, 2H), 5.49-5.39 (m, 1H), 4.01 (m, 1H), 3.82 (d, J=11.5 Hz, 1H), 1.95-1.97 (m, 2H), 1.75 (m, 3H), 1.14 (m, 1H), 0.83-0.81 (m, 1H). MS=584.2 [M+1]⁺.

Example 172

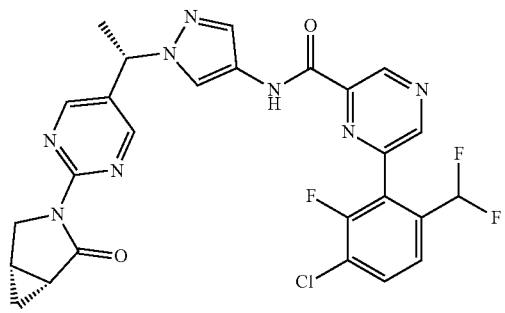 [SMILES: C[C@@H](c1cnc(N2C[C@H]3C[C@H]3C2=O)nc1)n1cc(NC(=O)c2cncc(-c3c(C(F)F)ccc(Cl)c3F)n2)cn1]

6-(3-Chloro-6-(difluoromethyl)-2-fluorophenyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAK)

Step 1. 5-(1-Chloroethyl)-2-(methylthio)pyrimidine: To a solution of 1-(2-(methylthio)pyrimidin-5-yl)ethan-1-ol (370 g, 2.17 mol) in DCM (1.11 L) cooled to 0° C. was added thionyl chloride (388 g, 3.26 mmol, 237 mL). Upon completion of the addition, the resulting mixture was stirred at 0° C. for 10 min, then the reaction mixture was concentrated under reduced pressure. To the crude residue was added DCM, and the mixture was stirred then filtered and concentrated under reduced pressure to afford the title compound. TLC (R_f=0.7, 1:4 EtOAc/petroleum ether).

Step 2. 2-(Methylthio)-5-(1-(4-nitro-1H-pyrazol-1-yl)ethyl)pyrimidine: To a solution of 5-(1-chloroethyl)-2-(methylthio)pyrimidine (336 g, 1.78 mol), 4-nitro-1H-pyrazole (201 g, 1.78 mol) in DMF (1.69 L) cooled to 0° C. was added cesium carbonate (1.74 kg, 5.34 mol). The reaction mixture was stirred at rt for 16 h. The reaction mixture was diluted with EtOAc and washed with water then brine. The organic layer was dried over Na₂SO₄, filtered and concentrated under reduced pressure. The crude residue was purified by silica gel chromatography (0 to 100% EtOAc/petroleum ether) to afford the title compound. TLC (R_f=0.15, 1:5 EtOAc/petroleum ether).

Step 3. 1-(1-(2-(Methylthio)pyrimidin-5-yl)ethyl)-1H-pyrazol-4-amine: The title compound was prepared following procedures similar to those described above in Example 41, step 3. MS=236.2 [M+1]⁺.

Step 4. tert-Butyl (1-(1-(2-(methylthio)pyrimidin-5-yl)ethyl)-1H-pyrazol-4-yl)carbamate: The title compound was prepared following procedures similar to those described above in Intermediate AE-5, step 1. MS=336.1 [M+1]⁺.

Step 5. tert-Butyl (1-(1-(2-(methylsulfonyl)pyrimidin-5-yl)ethyl)-1H-pyrazol-4-yl)carbamate: The following sequence was carried out in two batches in parallel on equivalent scale. These batches were combined for subsequent post-reaction processing. To a solution of tert-butyl (1-(1-(2-(methylthio)pyrimidin-5-yl)ethyl)-1H-pyrazol-4-yl)carbamate (200 g, 596 mmol) in DCM (1.40 L) under a nitrogen atmosphere, cooled to -10° C. was added mCPBA (326 g, 1.49 mol, 80% purity) portion-wise. The resulting mixture was stirred at rt for 1 h. The reaction mixtures were combined and quenched by the addition of satd. aq. sodium carbonate and extracted with DCM. The organic layers were combined and washed with brine, dried over Na₂SO₄, filtered and concentrated under reduced pressure to afford the title compound. ¹HNMR (400 MHz, DMSO-$d_6$) δ 9.20 (s, 1H), 8.95 (s, 2H), 7.91 (s, 1H), 7.28 (s, 1H), 5.83-5.78 (m, 1H), 3.40 (s, 3H), 1.88 (d, J=7.2 Hz, 3H), 1.45 (s, 9H).

Step 6. tert-Butyl (1-((S)-1-(2-((1R,5S)-2-oxo-3-azabicyclo[3.1.0]hexan-3-yl)pyrimidin-5-yl)ethyl)-1H-pyrazol-4-yl)carbamate: To a solution of tert-butyl (1-(1-(2-(methylsulfonyl)pyrimidin-5-yl)ethyl)-1H-pyrazol-4-yl)carbamate (250 g, 680 mmol), (1R,5S)-3-azabicyclo[3.1.0]hexan-2-one (99.1 g, 1.02 mol) in dioxane (1.75 L) was added cesium carbonate (333 g, 1.02 mol). The reaction mixture was stirred at 50° C. for 2.5 h. The reaction mixture was cooled to rt then quenched by the addition of brine and extracted with MTBE. The organic layers were combined and dried over $Na_2SO_4$, filtered and concentrated under reduced pressure to afford the title compound. The crude residue was purified by silica gel chromatography (0:0:1 to 1:10:0 MeOH/EtOAc/petroleum ether) to afford the title compound as a mixture of diastereomers. The diastereoisomeric compounds were separated by chiral chromatography (SFC, DAICEL CHIRALPAK AY; 0.1% $NH_3H_2O$ EtOH Begin B 45% End B 45%) to furnish the individual isomer compounds in pure form. The title compound is the slower-eluting diastereoisomer, which was purified by reversed-phase preparatory-HPLC (C18 stationary phase, water(0.05% HCl)-ACN Begin B 5%, End B 45%) to afford the title compound. ¹H NMR (400 MHz, DMSO-$d_6$) δ 9.17 (s, 1H), 8.56 (s, 2H), 7.81 (s, 1H), 7.31 (s, 1H), 5.55-5.60 (m, 1H), 4.08-4.04 (m, 1H), 3.81 (d, J=12 Hz, 1H), 2.06-1.99 (m, 2H), 1.78 (d, J=7.2 Hz, 3H), 1.43 (s, 9H), 1.17-1.15 (m, 1H), 0.78-0.76 (m, 1H).

Step 7. (1R,5S)-3-(5-((S)-1-(4-Amino-1H-pyrazol-1-yl)ethyl)pyrimidin-2-yl)-3-azabicyclo[3.1.0]hexan-2-one: To a solution of tert-butyl (1-((S)-1-(2-((1R,5S)-2-oxo-3-azabicyclo[3.1.0]hexan-3-yl)pyrimidin-5-yl)ethyl)-1H-pyrazol-4-yl)carbamate (26.0 g, 67.6 mmol) in DCM (210 mL) cooled to 0° C. was added HCl (4M solution in EtOAc, 169 mL). The reaction mixture was stirred at 25° C. for 12 h then concentrated under reduced pressure to afford the title compound as the hydrochloride salt. MS=285.2 [M+1]⁺.

Step 8. 6-(3-Chloro-6-(difluoromethyl)-2-fluorophenyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide: The following sequence was carried out in three batches in parallel on equivalent scale. These batches were combined for subsequent post-reaction processing. To a solution of (1R,5S)-3-(5-((S)-1-(4-amino-1H-pyrazol-1-yl)ethyl)pyrimidin-2-yl)-3-azabicyclo[3.1.0]hexan-2-one (5.00 g, 17.6 mmol) in DCM (35 mL) cooled to 0° C. was added sequentially 6-(3-chloro-6-(difluoromethyl)-2-fluorophenyl)pyrazine-2-carboxylic acid (4.43 g, 14.7 mmol), 1-propanephosphonic anhydride solution (T3P, 22.4 g, 35.2 mmol, 20.9 mL, 50% purity) and DIEA (9.09 g, 70.3 mmol, 12.3 mL). The reaction mixture was stirred at 20° C. for 2 h. The reaction mixtures were combined and quenched by the addition of satd. aq. $NaHCO_3$ and extracted with DCM. The organic layers were combined and washed with brine, dried over $Na_2SO_4$, filtered and concentrated under reduced pressure. The crude residue was purified by silica gel chromatography (0 to 100% EtOAc/petroleum ether) to afford the title compound. ¹H NMR (400 MHz, DMSO-$d_6$) δ 10.8 (s, 1H), 9.34 (s, 1H), 9.16 (s, 1H), 8.61 (s, 2H), 8.30 (s, 1H), 7.99 (t, J=7.2 Hz, 1H), 7.77 (s, 1H), 7.71 (d, J=8.8 Hz, 1H), 7.20 (t, J=54 Hz, 1H), 5.72-5.67 (m, 1H), 4.09-4.02 (m, 1H), 3.83-3.80 (m, 1H), 2.05-1.99 (m, 2H), 1.83 (d, J=6.8 Hz, 3H), 1.19-1.15 (m, 1H), 0.78-0.76 (m, 1H). MS=569.1 [M+1]⁺.

TABLE 21

The following compounds were prepared using procedures similar to those described in Example 172 using the appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 173 | | 3-(3-Chloro-6-(difluoromethyl)-2-fluorophenyl)-5-((1-((S)-1-(2-((1R,5S)-2-oxo-3-azabicyclo[3.1.0]hexan-3-yl)pyrimidin-5-yl)ethyl)-1H-pyrazol-4-yl)carbamoyl)pyridine 1-oxide | Calcd.: 584.1 Found: 584.1 | |

TABLE 21-continued

The following compounds were prepared using procedures similar to those described in Example 172 using the appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 174 | 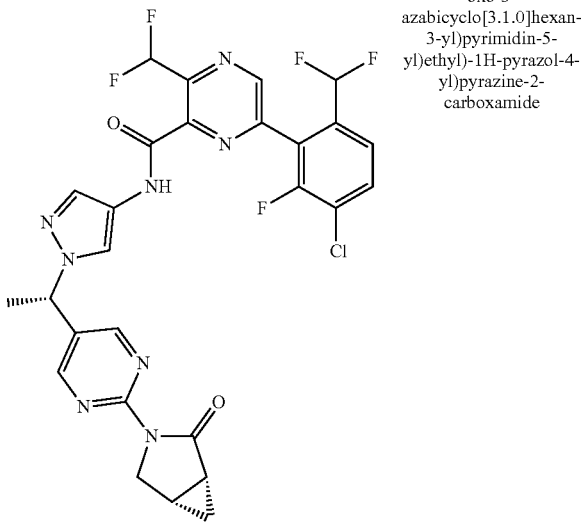 | 6-(3-Chloro-6-(difluoromethyl)-2-fluorophenyl)-3-(difluoromethyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 619.1 Found: 619.1 | |
| 175 | 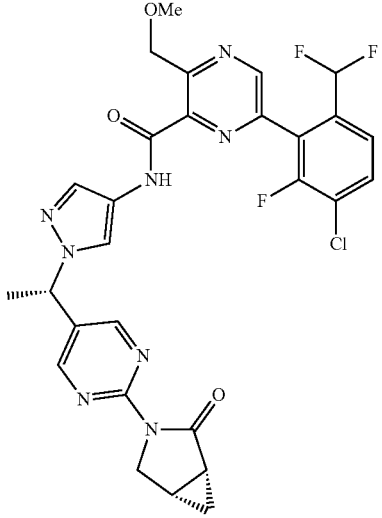 [SMILES: COCc1ncc(-c2c(C(F)F)ccc(Cl)c2F)nc1C(=O)Nc1cnn([C@@H](C)c2cnc(N3C[C@H]4C[C@H]4C3=O)nc2)c1] | 6-(3-Chloro-6-(difluoromethyl)-2-fluorophenyl)-3-(methoxymethyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 613.2 Found: 613.1 | |

TABLE 21-continued

The following compounds were prepared using procedures similar to those described in Example 172 using the appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
| --- | --- | --- | --- | --- |
| 176 | 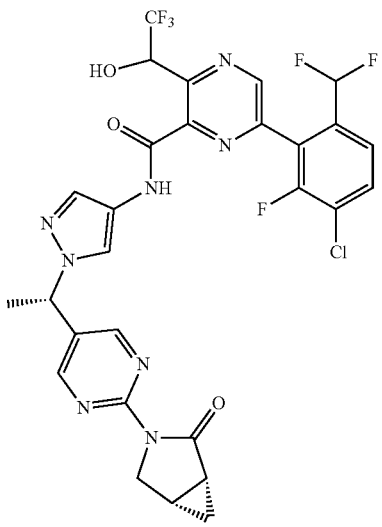 [SMILES: C[C@@H](c1cnc(N2C[C@H]3C[C@H]3C2=O)nc1)n1cc(NC(=O)c2nc(-c3c(C(F)F)ccc(Cl)c3F)cnc2C(O)C(F)(F)F)cn1] | 6-(3-Chloro-6-(difluoromethyl)-2-fluorophenyl)-N-(1-((S)-1-(2-((1R,5S)-2-oxo-3-azabicyclo[3.1.0]hexan-3-yl)pyrimidin-5-yl)ethyl)-1H-pyrazol-4-yl)-3-((S or R)-2,2,2-trifluoro-1-hydroxyethyl)pyrazine-2-carboxamide | Calcd.: 667.1 Found: 667.2 | DAICEL CHIRALPAK AS |
| 177 | 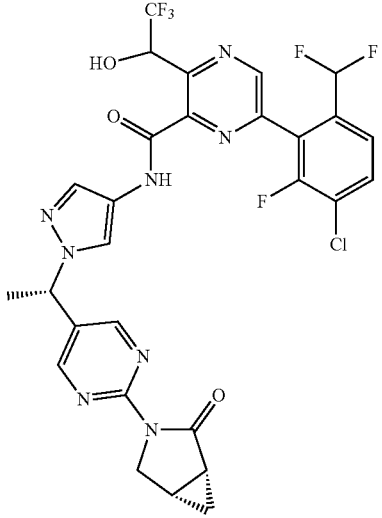 [SMILES: C[C@@H](c1cnc(N2C[C@H]3C[C@H]3C2=O)nc1)n1cc(NC(=O)c2nc(-c3c(C(F)F)ccc(Cl)c3F)cnc2C(O)C(F)(F)F)cn1] | 6-(3-Chloro-6-(difluoromethyl)-2-fluorophenyl)-N-(1-((S)-1-(2-((1R,5S)-2-oxo-3-azabicyclo[3.1.0]hexan-3-yl)pyrimidin-5-yl)ethyl)-1H-pyrazol-4-yl)-3-((R or S)-2,2,2-trifluoro-1-hydroxyethyl)pyrazine-2-carboxamide | Calcd.: 667.1 Found: 667.1 | DAICEL CHIRALPAK AS |

TABLE 21-continued

The following compounds were prepared using procedures similar to those described in Example 172 using the appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 178 | | 6-(3-Chloro-6-(difluoromethyl)-2-fluorophenyl)-3-methyl-N-(1-((S)-1-(4-methyl-2-((1R,5S or 1S,5R)-2-oxo-3-azabicyclo[3.1.0]hexan-3-yl-4,4-d₂)pyrimidin-5-yl)ethyl)-1H-pyrazol-4-yl)pyrazine-2-carboxamide | Calcd.: 599.2 Found: 599.1 | DAICEL CHIRALPAK OD-H |
| 179 | | 6-(3-Chloro-6-(difluoromethyl)-2-fluorophenyl)-3-methyl-N-(1-((S)-1-(4-methyl-2-((1S,5R or 1R,5S)-2-oxo-3-azabicyclo[3.1.0]hexan-3-yl-4,4-d₂)pyrimidin-5-yl)ethyl)-1H-pyrazol-4-yl)pyrazine-2-carboxamide | Calcd.: 599.2 Found: 599.1 | DAICEL CHIRALPAK OD-H |

Example 180

6-(3-Chloro-6-(difluoromethyl)-2-fluorophenyl)-3-(2-hydroxy-2-methylpropyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAK)

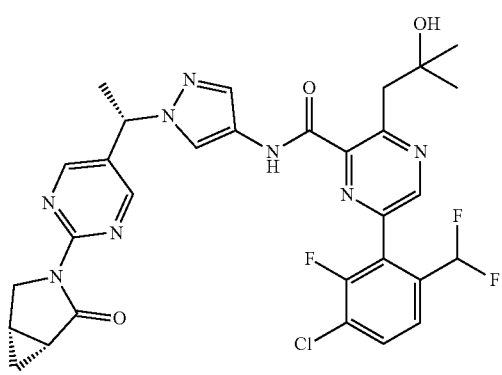 [SMILES: C[C@@H](c1cnc(N2C[C@H]3C[C@H]3C2=O)nc1)n1cc(NC(=O)c2nc(-c3c(C(F)F)ccc(Cl)c3F)cnc2CC(C)(C)O)cn1]

To a solution of (1R,5S)-3-(5-((S)-1-(4-amino-1H-pyrazol-1-yl)ethyl)pyrimidin-2-yl)-3-azabicyclo[3.1.0]hexan-2-one (16 mg, 0.056 mmol) in toluene (0.5 mL) was added trimethylaluminum (0.084 mL, 0.17 mmol). The reaction mixture was stirred at rt for 30 min, then 3-(3-chloro-6-(difluoromethyl)-2-fluorophenyl)-7,7-dimethyl-7,8-dihydro-5H-pyrano[3,4-b]pyrazin-5-one (20 mg, 0.056 mmol) in toluene (0.5 mL) was added. The resulting mixture was stirred at rt for 16 h. The mixture was concentrated under reduced pressure and purified by reversed-phase preparatory-HPLC (C18 stationary phase, water(0.1% TFA)-ACN Begin B 37%, End B 67%) to afford the title compound. ¹H NMR (400 MHz, CD₃OD) δ 8.93 (d, J=2.4 Hz, 1H), 8.54 (s, 2H), 8.29 (s, 1H), 7.83-7.75 (m, 1H), 7.70 (s, 1H), 7.65 (d, J=8.6 Hz, 1H), 6.92 (t, J=54.4 Hz, 1H), 5.64 (q, J=6.8 Hz, 1H), 4.15 (dd, J=10.9, 4.8 Hz, 1H), 3.98 (d, J=11.7 Hz, 1H), 3.57 (s, 2H), 2.09 (br dd, J=7.8, 3.2 Hz, 2H), 1.90 (d, J=7.1 Hz, 3H), 1.32-1.21 (m, 7H), 0.82 (br d, J=4.2 Hz, 1H). MS=641.2 [M+1]$^+$.

TABLE 22

The following compounds were prepared using procedures similar to those described in Example 180 using the appropriate starting materials.

| Example No. | Structure | Name | [M + H]$^+$ or [M + Na]$^+$ | Chiral column |
|---|---|---|---|---|
| 181 | 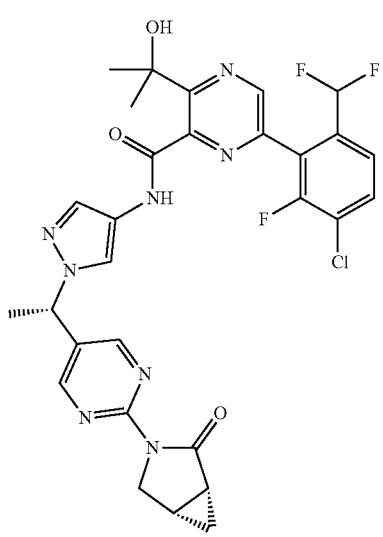 [SMILES: C[C@@H](c1cnc(N2C[C@H]3C[C@H]3C2=O)nc1)n1cc(NC(=O)c2nc(-c3c(C(F)F)ccc(Cl)c3F)cnc2C(C)(C)O)cn1] | 6-(3-Chloro-6-(difluoromethyl)-2-fluorophenyl)-3-(2-hydroxypropan-2-yl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 627.2 Found: 627.3 | |
| 182 | 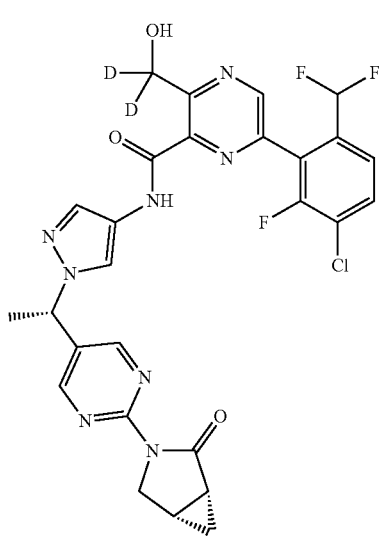 [SMILES: [2H]C([2H])(O)c1ncc(-c2c(C(F)F)ccc(Cl)c2F)nc1C(=O)Nc1cnn([C@@H](C)c2cnc(N3C[C@H]4C[C@H]4C3=O)nc2)c1] | 6-(3-Chloro-6-(difluoromethyl)-2-fluorophenyl)-3-(hydroxymethyl-d$_2$)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 601.2 Found: 601.4 | |

Example 183

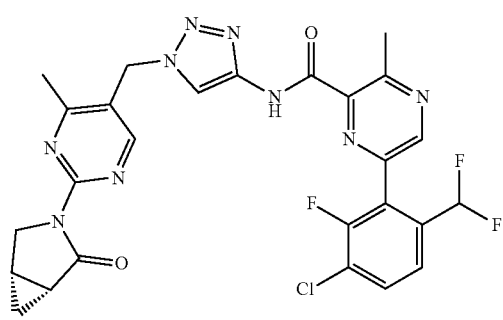 [SMILES: Cc1nc(N2C[C@H]3C[C@H]3C2=O)ncc1Cn1cc(NC(=O)c2nc(-c3c(C(F)F)ccc(Cl)c3F)cnc2C)nn1]

6-(3-Chloro-6-(difluoromethyl)-2-fluorophenyl)-3-methyl-N-(1-((4-methyl-2-((1R,5S)-2-oxo-3-azabicyclo[3.1.0]hexan-3-yl)pyrimidin-5-yl)methyl)-1H-1,2,3-triazol-4-yl)pyrazine-2-carboxamide (Scheme AAL)

Step 1. 2-Chloro-4-methyl-5-((4-nitro-TH-1,2,3-triazol-1-yl)methyl)pyrimidine and 2-Chloro-4-methyl-5-((4-nitro-2H-1,2,3-triazol-2-yl)methyl)pyrimidine: To a solution of (2-chloro-4-methylpyrimidin-5-yl)methanol (500 mg, 3.15 mmol), 4-nitro-1,2,3-triazole (396 mg, 3.47 mmol) and triphenylphosphine (1.24 g, 4.73 mmol) in toluene (0.6 mL) cooled to 0° C. was added di-iso-propyl azodicarboxylate (0.92 mL, 4.7 mmol). The reaction mixture was stirred at rt for 12 h, then concentrated under reduced pressure. The crude residue was purified by reversed-phase MPLC (C18 stationary phase, 10 to 20% ACN/water (0.5% TFA)) to afford the regioisomeric title compounds in individual form. The faster eluting regioisomer is 2-chloro-4-methyl-5-((4-nitro-TH-1,2,3-triazol-1-yl)methyl)pyrimidine: $^1$H NMR ((500 MHz, CDCl$_3$) δ 8.45 (s, 1H), 8.43 (s, 1H), 6.00 (s, 2H), 2.68 ppm (s, 3H). MS=254.9 [M+1]$^+$. The second-eluting isomer is 2-chloro-4-methyl-5-((4-nitro-2H-1,2,3-triazol-2-yl)methyl)pyrimidine: $^1$H NMR (500 MHz, CDCl$_3$) δ 8.58 (s, 1H), 8.21 (s, 1H), 5.68 (s, 2H), 2.66 ppm (s, 3H). MS=254.9 [M+1]$^+$. The third eluting isomer is 2-chloro-4-methyl-5-((4-nitro-3H-1,2,3-triazol-2-yl)methyl)pyrimidine: $^1$H NMR (500 MHz, CDCl$_3$,) δ 8.53 (s, 1H), 8.27 (s, 1H), 5.66 (s, 2H), 2.61 ppm (s, 3H). MS=254.9 [M+1]$^+$.

Step 2. (1R,5S)-3-(4-Methyl-5-((4-nitro-TH-1,2,3-triazol-1-yl)methyl)pyrimidin-2-yl)-3-azabicyclo[3.1.0]hexan-2-one: To a solution of 2-chloro-4-methyl-5-((4-nitro-TH-1,2,3-triazol-1-yl)methyl)pyrimidine (120 mg, 0.471 mmol), (1R,5S)-3-azabicyclo[3.1.0]hexan-2-one (46 mg, 0.47 mmol) and cesium carbonate (307 mg, 0.943 mmol) in dioxane (2.0 mL) was added [(4,5-bis(diphenylphosphino)-9,9-dimethylxanthene)-2-(2'-amino-1,1'-biphenyl)]palladium(II) methanesulfonate (Xantphos-Pd-G3, 45 mg, 0.047 mmol). The reaction mixture was stirred at 100° C. for 12 h, then concentrated under reduced pressure. The crude residue was purified by silica gel chromatography (40 to 60% EtOAc/petroleum ether) to afford the title compound. MS=316.0 [M+1]t.

Step 3. (1R,5S)-3-(5-((4-Amino-TH-1,2,3-triazol-1-yl)methyl)-4-methylpyrimidin-2-yl)-3-azabicyclo[3.1.0]hexan-2-one: The title compound was prepared following procedures similar to those described above in Example 41, step 3. aq. MS=286.0 [M+1]$^+$.

Step 4. 6-(3-Chloro-6-(difluoromethyl)-2-fluorophenyl)-3-methyl-N-(1-((4-methyl-2-((1R,5S)-2-oxo-3-azabicyclo[3.1.0]hexan-3-yl)pyrimidin-5-yl)methyl)-1H-1,2,3-triazol-4-yl)pyrazine-2-carboxamide: To a solution of (1R,5S)-3-(5-((4-amino-1H-1,2,3-triazol-1-yl)methyl)-4-methylpyrimidin-2-yl)-3-azabicyclo[3.1.0]hexan-2-one (11 mg, 0.038 mmol), 6-(3-chloro-6-(difluoromethyl)-2-fluorophenyl)-3-methylpyrazine-2-carboxylic acid (12 mg, 0.038 mmol) and 1-methyl-1H-imidazole (3.1 mg, 0.038 mmol) in ACN (0.5 mL) was added chloro-N,N,N,N'-tetramethylformamidinium hexafluorophosphate (11 mg, 0.038 mmol). The reaction mixture was stirred at rt for 2 h. The mixture was purified by reversed-phase preparatory-HPLC (C18 stationary phase, water (0.2m MHFBA+0.1% TFA)-ACN Begin B 40% End B 70%) to afford the title compound. $^1$H NMR (400 MHz, CD$_3$OD) δ 8.92 (d, J=2.7 Hz, 1H), 8.51 (s, 1H), 8.36 (s, 1H), 7.87-7.77 (m, 1H), 7.68 (d, J=9.4 Hz, 1H), 7.11-6.76 (m, 1H), 5.70 (s, 2H), 4.20 (dd, J=11.3, 5.1 Hz, 1H), 4.04 (d, J=11.0 Hz, 1H), 2.99 (s, 3H), 2.53 (s, 3H), 2.18-2.07 (m, 2H), 1.36-1.22 (br m, 1H), 0.87 ppm (br d, J=3.9 Hz, 1H). MS=584.2 [M+1]$^+$.

TABLE 23

The following compounds were prepared using procedures similar to those described in Example 183 using the appropriate starting materials.

| Example No. | Structure | Name | [M + H]$^+$ or [M + Na]$^+$ |
|---|---|---|---|
| 184 | | 6-(3-Chloro-6-(difluoromethyl)-2-fluorophenyl)-3-methyl-N-(2-((4-methyl-2-((1R,5S)-2-oxo-3-azabicyclo[3.1.0]hexan-3-yl)pyrimidin-5-yl)methyl)-2H-1,2,3-triazol-4-yl)pyrazine-2-carboxamide | Calcd.: 584.2 Found: 584.1 |

TABLE 23-continued

The following compounds were prepared using procedures similar to those described in Example 183 using the appropriate starting materials.

| Example No. | Structure | Name | [M + H]+ or [M + Na]+ |
|---|---|---|---|
| 185 | | 6-(3-Chloro-6-(difluoromethyl)-2-fluorophenyl)-3-methyl-N-(1-((6-methyl-5-((1R,5S)-2-oxo-3-azabicyclo[3.1.0]hexan-3-yl)pyrazin-2-yl)methyl)-1H-1,2,3-triazol-4-yl)pyrazine-2-carboxamide | Calcd.: 584.2 Found: 584.1 |
| 186 | | 6-(3-Chloro-6-(difluoromethyl)-2-fluorophenyl)-3-methyl-N-(2-((6-methyl-5-((1R,5S)-2-oxo-3-azabicyclo[3.1.0]hexan-3-yl)pyrazin-2-yl)methyl)-2H-1,2,3-triazol-4-yl)pyrazine-2-carboxamide | Calcd.: 584.2 Found: 584.2 |
| 187 | | 6-(3-Chloro-6-(difluoromethyl)-2-fluorophenyl)-3-methyl-N-(2-((5-methyl-6-((1R,5S)-2-oxo-3-azabicyclo[3.1.0]hexan-3-yl)pyridin-3-yl)methyl)-2H-1,2,3-triazol-4-yl)pyrazine-2-carboxamide | Calcd.: 583.2 Found: 583.1 |

Example 188

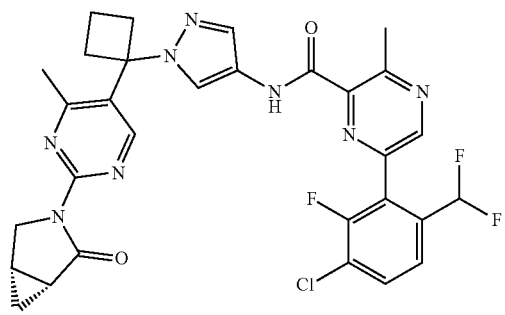 [SMILES: Cc1nc(N2C[C@H]3C[C@H]3C2=O)ncc1C1(n2cc(NC(=O)c3nc(-c4c(C(F)F)ccc(Cl)c4F)cnc3C)cn2)CCC1]

6-(3-Chloro-6-(difluoromethyl)-2-fluorophenyl)-3-methyl-N-(1-(1-(4-methyl-2-((1R,5S)-2-oxo-3-azabicyclo[3.1.0]hexan-3-yl)pyrimidin-5-yl)cyclobutyl)-1H-pyrazol-4-yl)pyrazine-2-carboxamide (Scheme AAM)

Step 1. (1R,5S)-3-(5-(1-Hydroxycyclobutyl)-4-methylpyrimidin-2-yl)-3-azabicyclo[3.1.0]hexan-2-one: To a solution of 1-(2-chloro-4-methylpyrimidin-5-yl)cyclobutanol (200 mg, 1.01 mmol), (1R,5S)-3-azabicyclo[3.1.0]hexan-2-one (196 mg, 2.01 mmol) and cesium carbonate (984 mg, 3.02 mmol) in dioxane (1.0 mL) was added Xantphos (58 mg, 0.10 mmol) and tris(dibenzylideneacetone)dipalladium (81. mg, 0.10 mmol). The reaction mixture was stirred at 100° C. for 12 h. The reaction mixture was concentrated under reduced pressure. The crude residue was purified by preparatory-TLC (1:0 EtOAc/petroleum ether) to afford the title compound. MS=260.0 [M+1]$^+$.

Step 2. (1R,5S)-3-(4-Methyl-5-(1-(4-nitro-1H-pyrazol-1-yl)cyclobutyl)pyrimidin-2-yl)-3-azabicyclo[3.1.0]hexan-2-one: To a solution of (1R,5S)-3-(5-(1-hydroxycyclobutyl)-4-methylpyrimidin-2-yl)-3-azabicyclo[3.1.0]hexan-2-one (180 mg, 0.694 mmol), 4-nitro-1H-pyrazole (94 mg, 0.83 mmol) and triphenylphosphine (273 mg, 1.04 mmol) in toluene (3.0 mL) was added di-tert-butyl azodicarboxylate (240 mg, 1.04 mmol). The reaction mixture was stirred at 120° C. for 12 h. The reaction mixture was cooled to rt and concentrated under reduced pressure. The crude residue was purified by preparatory-TLC (1:0 EtOAc/petroleum ether) to afford the title compound. MS=355.0 [M+1]$^+$.

Step 3. (1R,5S)-3-(5-(1-(4-Amino-1H-pyrazol-1-yl)cyclobutyl)-4-methylpyrimidin-2-yl)-3-azabicyclo[3.1.0]hexan-2-one: The title compound was prepared following procedures similar to those described above in Example 41, step 3. aq. MS=325.0 [M+1]$^+$.

Step 4. 6-(3-Chloro-6-(difluoromethyl)-2-fluorophenyl)-3-methyl-N-(1-(1-(4-methyl-2-((1R,5S)-2-oxo-3-azabicyclo[3.1.0]hexan-3-yl)pyrimidin-5-yl)cyclobutyl)-1H-pyrazol-4-yl)pyrazine-2-carboxamide: The title compound was prepared following procedures similar to those described above in Example 1, step 5. $^1$H NMR (500 MHz, CD$_3$OD) δ 8.88 (d, J=2.4 Hz, 1H), 8.72 (s, 1H), 8.18 (s, 1H), 7.84 (t, J=7.8 Hz, 1H), 7.75 (s, 1H), 7.68 (d, J=8.5 Hz, 1H), 7.08-6.81 (m, 1H), 4.30-4.17 (m, 1H), 4.07 (d, J=11.6 Hz, 1H), 3.18-3.06 (m, 2H), 3.00 (s, 3H), 2.95 (br d, J=8.9 Hz, 2H), 2.31-2.23 (m, 4H), 2.21-2.15 (m, 2H), 2.05-1.96 (m, 1H), 1.35 (td, J=8.1, 4.9 Hz, 1H), 0.91 (br d, J=4.0 Hz, 1H). MS=623.2 [M+1]$^+$.

Example 189 and 190

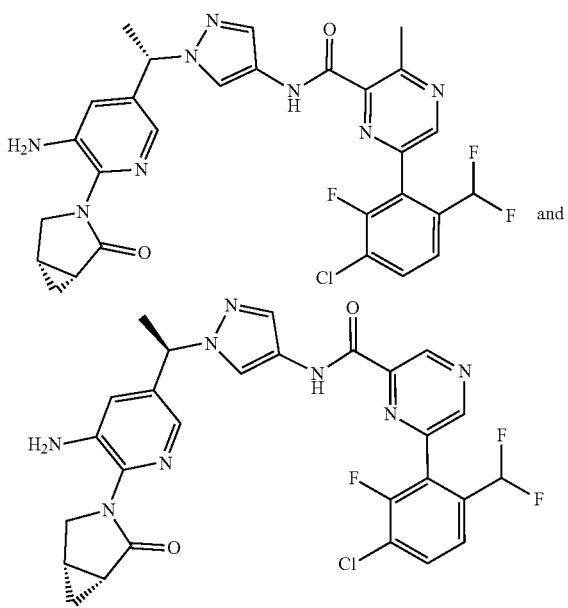

N-(1-((S)-1-(5-Amino-6-((1R,5S)-2-oxo-3-azabicyclo[3.1.0]hexan-3-yl)pyridin-3-yl)ethyl)-1H-pyrazol-4-yl)-6-(3-chloro-6-(difluoromethyl)-2-fluorophenyl)-3-methylpyrazine-2-carboxamide and N-(1-((R)-1-(5-Amino-6-((1R,5S)-2-oxo-3-azabicyclo[3.1.0]hexan-3-yl)pyridin-3-yl)ethyl)-1H-pyrazol-4-yl)-6-(3-chloro-6-(difluoromethyl)-2-fluorophenyl)-3-methylpyrazine-2-carboxamide (Scheme AAN)

The title compounds were prepared as an initial mixture of diastereomers following procedures similar to those described above in Intermediate AE-5, step 4. The diastereoisomeric title compounds were separated by chiral chromatography (SFC, REGIS (S,S) WHELK-O1; 0.1% NH$_3$H$_2$O EtOH Begin B 55% End B 55%) to furnish the individual isomer compounds in pure form. The faster-eluting diastereoisomer of the title compounds (Example 189): $^1$H NMR (500 MHz, CD$_3$OD) δ 8.88 (d, J=2.4 Hz, 1H), 8.26 (s, 1H), 7.84 (t, J=7.8 Hz, 1H), 7.75 (s, 1H), 7.74 (d, J=1.8 Hz, 1H), 7.69 (d, J=8.5 Hz, 1H), 7.18 (s, 1H), 6.96 (s, 1H), 5.60 (br d, J=7.0 Hz, 1H), 4.22 (dd, J=10.5, 6.0 Hz, 1H), 3.69 (d, J=10.7 Hz, 1H), 3.01 (s, 3H), 2.13-2.23 (m, 1H), 2.08-1.99 (m, 1H), 1.91 (d, J=7.3 Hz, 3H), 1.30 (br dd, J=8.2, 4.6 Hz, 1H), 1.04-0.97 (m, 1H). MS=597.0 [M+1]$^+$. The slower-eluting diastereoisomer of the title compounds (Example 190): $^1$H NMR (500 MHz, CD$_3$OD) δ 8.88 (d, J=2.4 Hz, 1H), 8.26 (s, 1H), 7.84 (t, J=7.8 Hz, 1H), 7.76-7.74 (m, 1H), 7.73 (d, J=1.8 Hz, 1H), 7.69 (d, J=8.2 Hz, 1H), 7.17 (d, J=1.8 Hz, 1H), 7.11-6.81 (m, 1H), 5.60 (q, J=7.0 Hz, 1H), 4.22 (dd, J=10.7, 5.8 Hz, 1H), 3.69 (d, J=10.4 Hz, 1H), 3.01 (s, 3H), 2.19-2.10 (m, 1H), 2.10-2.02 (m, 1H), 1.91 (d, J=7.3 Hz, 3H), 1.32-1.23 (m, 1H), 1.01 (br d, J=3.4 Hz, 1H). MS=597.0 [M+1]$^+$.

Table 24. The following compound was prepared using procedures similar to those described in Examples 189 and 190 using the appropriate starting materials.

TABLE 24

The following compound was prepared using procedures similar to those described in Examples 189 and 190 using the appropriate starting materials.

| Example No. | Structure | Name | [M + H]⁺ or [M + Na]⁺ |
|---|---|---|---|
| 191 | | N-(1-((5-Amino-6-((1R,5S)-2-oxo-3-azabicyclo[3.1.0]hexan-3-yl)pyridin-3-yl)methyl)-1H-pyrazol-4-yl)-6-(3-chloro-6-(difluoromethyl)-2-fluorophenyl)-3-methylpyrazine-2-carboxamide | Calcd.: 583.2 Found: 583.0 |

Example 192

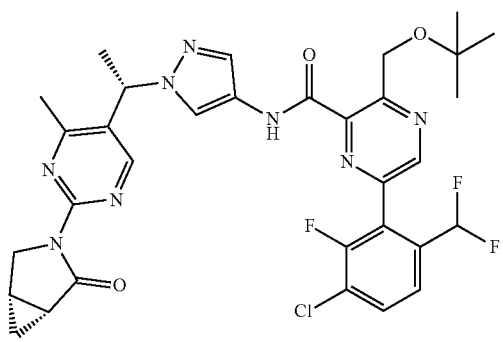 [SMILES: Cc1nc(N2C[C@H]3C[C@H]3C2=O)ncc1[C@H](C)n1cc(NC(=O)c2nc(-c3c(C(F)F)ccc(Cl)c3F)cnc2COC(C)(C)C)cn1]

3-(tert-Butoxymethyl)-6-(3-chloro-6-(difluoromethyl)-2-fluorophenyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAO)

The title compound was prepared following procedures similar to those described above in Example 41, step 4. ¹H NMR (400 MHz, CD₃OD) δ 8.90 (d, J=2.5 Hz, 1H), 8.51 (s, 2H), 8.26 (s, 1H), 7.80 (t, J=7.8 Hz, 1H), 7.70 (s, 1H), 7.64 (d, J=8.3 Hz, 1H), 7.09-6.78 (m, 1H), 5.64 (d, J=7.1 Hz, 1H), 5.06 (s, 2H), 4.15 (dd, J=4.3, 11.6 Hz, 1H), 3.97 (d, J=11.5 Hz, 1H), 2.09 (dd, J=3.4, 8.1 Hz, 2H), 1.90 (d, J=7.1 Hz, 3H), 1.26 (br s, 1H), 1.24 (s, 9H), 0.85-0.76 (m, 1H). MS=655.1 [M+1]⁺.

Example 193

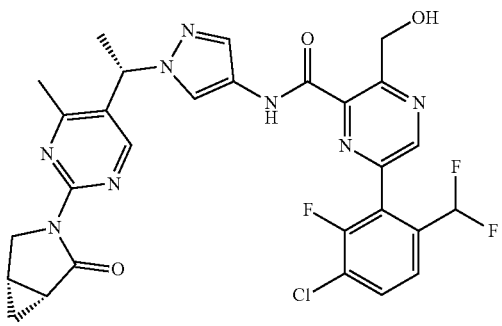 [SMILES: Cc1nc(N2C[C@H]3C[C@H]3C2=O)ncc1C(C)n1cc(NC(=O)c2nc(-c3c(C(F)F)ccc(Cl)c3F)cnc2CO)cn1]

6-(3-Chloro-6-(difluoromethyl)-2-fluorophenyl)-3-(hydroxymethyl)-N-(1-((S)-1-(2-((1R,5S)-2-oxo-3-azabicyclo[3.1.0]hexan-3-yl)pyrimidin-5-yl)ethyl)-1H-pyrazol-4-yl)pyrazine-2-carboxamide (Scheme AAO)

The title compound was prepared following procedures similar to those described above in Intermediate AE-5, step 4. ¹H NMR (400 MHz, CDCl₃) δ 9.82 (br s, 1H), 8.99 (d, J=2.5 Hz, 1H), 8.51 (s, 2H), 8.20 (s, 1H), 7.74-7.68 (m, 1H), 7.67-7.62 (m, 1H), 7.60 (s, 1H), 6.81-6.34 (m, 1H), 5.52 (q, J=7.0 Hz, 1H), 5.28 (s, 2H), 4.14 (dd, J=5.7, 11.37 Hz, 1H), 3.98 (br s, 1H), 2.15 (br s, 1H), 2.07-1.99 (m, 1H), 1.93 (br d, J=6.8 Hz, 3H), 1.28-1.17 (m, 1H), 0.86 (br d, J=3.4 Hz, 1H). MS=599.2 [M+1]⁺.

TABLE 25

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 194 | | 6-(3-Chloro-6-(difluoromethyl)-2-fluorophenyl)-3-(hydroxymethyl)-N-(1-((S or R)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 613.2<br>Found: 613.2 | DAICEL CHIRALPAK AD |
| 195 | | 6-(3-Chloro-6-(difluoromethyl)-2-fluorophenyl)-3-(hydroxymethyl)-N-(1-((R or S)-1-(4-methyl-2-((1R,5S)-2-oxo-3-azabicyclo[3.1.0]hexan-3-yl)pyrimidin-5-yl)ethyl)-1H-pyrazol-4-yl)pyrazine-2-carboxamide | Calcd.: 613.2<br>Found: 613.1 | DAICEL CHIRALPAK AD |
| 196 | | 3-(tert-Butoxymethyl)-6-(3-chloro-6-(difluoromethyl)-2-fluorophenyl)-N-(1-((S and R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 669.2<br>Found: 669.1 | |

TABLE 25-continued

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 197 | 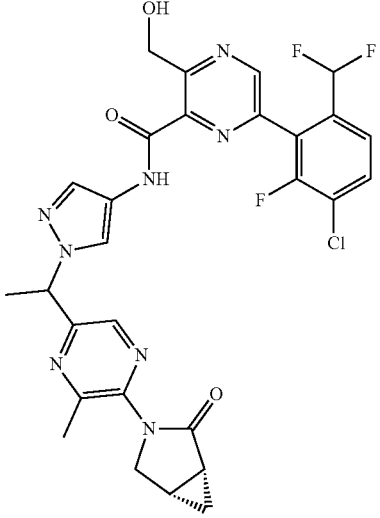 [SMILES: Cc1nc(C(C)n2cc(NC(=O)c3nc(-c4c(C(F)F)ccc(Cl)c4F)cnc3CO)cn2)cnc1N1C[C@H]2C[C@H]2C1=O] | 6-(3-Chloro-6-(difluoromethyl)-2-fluorophenyl)-3-(hydroxymethyl)-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 613.2<br>Found: 613.2 | DAICEL CHIRALPAK AD-H |
| 198 | 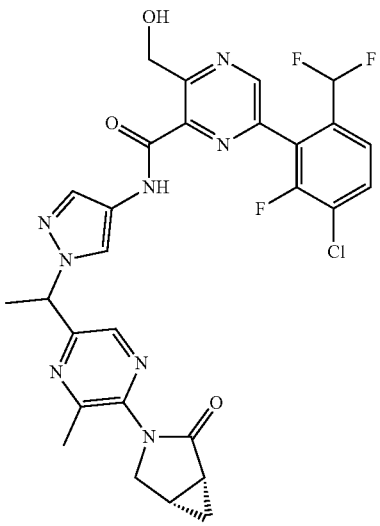 [SMILES: Cc1nc(C(C)n2cc(NC(=O)c3nc(-c4c(C(F)F)ccc(Cl)c4F)cnc3CO)cn2)cnc1N1C[C@H]2C[C@H]2C1=O] | 6-(3-Chloro-6-(difluoromethyl)-2-fluorophenyl)-3-(hydroxymethyl)-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 613.2<br>Found: 613.2 | DAICEL CHIRALPAK AD-H |

TABLE 25-continued

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 199 | | 6-(3-Chloro-6-(difluoromethyl)-2-fluorophenyl)-3-(hydroxymethyl)-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2<br>Found: 612.2 | Phenomenex-Cellulose-2 |
| 200 | | 6-(3-Chloro-6-(difluoromethyl)-2-fluorophenyl)-3-(hydroxymethyl)-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2<br>Found: 612.2 | Phenomenex-Cellulose-2 |

TABLE 25-continued

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]⁺ or [M + Na]⁺ | Chiral column |
|---|---|---|---|---|
| 201 | 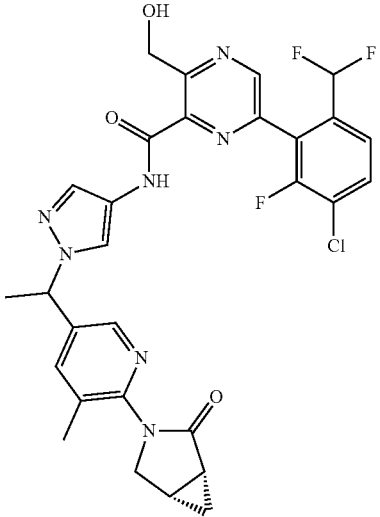 | 6-(3-Chloro-6-(difluoromethyl)-2-fluorophenyl)-N-(1-((S or R)-1-(4,5-dimethyl-6-((1R,5S)-2-oxo-3-azabicyclo[3.1.0]hexan-3-yl)pyridin-3-yl)ethyl)-1H-pyrazol-4-yl)-3-(hydroxymethyl)pyrazine-2-carboxamide | Calcd.: 626.2<br>Found: 626.2 | DAICEL CHIRALPAK AD-H |
| 202 | 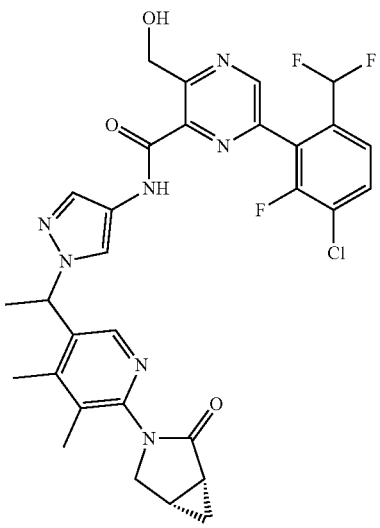 [SMILES: Cc1c(C(C)n2cc(NC(=O)c3nc(-c4c(C(F)F)ccc(Cl)c4F)cnc3CO)cn2)cnc(N2C[C@H]3C[C@H]3C2=O)c1C] | 6-(3-Chloro-6-(difluoromethyl)-2-fluorophenyl)-N-(1-((R or S)-1-(4,5-dimethyl-6-((1R,5S)-2-oxo-3-azabicyclo[3.1.0]hexan-3-yl)pyridin-3-yl)ethyl)-1H-pyrazol-4-yl)-3-(hydroxymethyl)pyrazine-2-carboxamide | Calcd.: 626.2<br>Found: 626.2 | DAICEL CHIRALPAK AD-H |

TABLE 25-continued

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 203 | | 6-(3-Chloro-6-(difluoromethyl)-2-fluorophenyl)-3-(hydroxymethyl)-N-(1-((S or R)-1-(4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD-H |
| 204 | | 6-(3-Chloro-6-(difluoromethyl)-2-fluorophenyl)-3-(hydroxymethyl)-N-(1-((R or S)-1-(4-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 612.2 Found: 612.2 | DAICEL CHIRALPAK AD-H |

TABLE 25-continued

The following compounds were prepared using procedures similar to those described in Examples 192 and 193 using appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 205 | 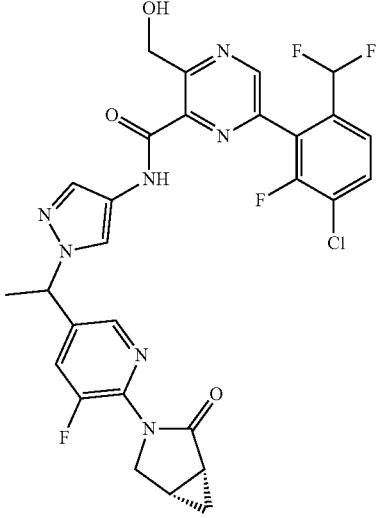 | 6-(3-Chloro-6-(difluoromethyl)-2-fluorophenyl)-N-(1-((S or R)-1-(5-fluoro-6-((1R,5S)-2-oxo-3-azabicyclo[3.1.0]hexan-3-yl)pyridin-3-yl)ethyl)-1H-pyrazol-4-yl)-3-(hydroxymethyl)pyrazine-2-carboxamide | Calcd.: 616.2 Found: 616.2 | DAICEL CHIRALPAK OD |
| 206 | 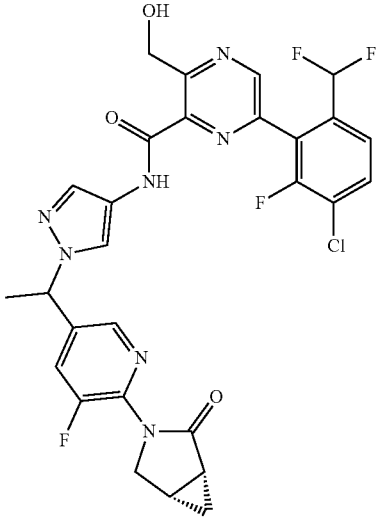 [SMILES: CC(c1cnc(N2C[C@H]3C[C@H]3C2=O)c(F)c1)n1cc(NC(=O)c2nc(-c3c(C(F)F)ccc(Cl)c3F)cnc2CO)cn1] | 6-(3-Chloro-6-(difluoromethyl)-2-fluorophenyl)-N-(1-((R or S)-1-(5-fluoro-6-((1R,5S)-2-oxo-3-azabicyclo[3.1.0]hexan-3-yl)pyridin-3-yl)ethyl)-1H-pyrazol-4-yl)-3-(hydroxymethyl)pyrazine-2-carboxamide | Calcd.: 616.2 Found: 616.2 | DAICEL CHIRALPAK OD |

Example 207

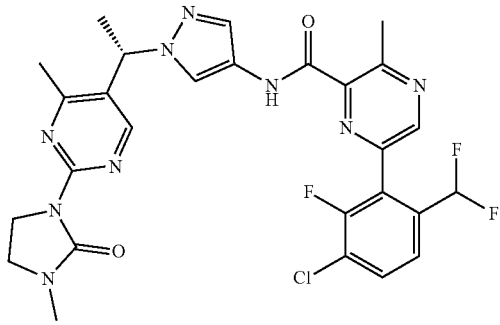 [SMILES: Cc1nc(N2CCN(C)C2=O)ncc1[C@H](C)n1cc(NC(=O)c2nc(-c3c(C(F)F)ccc(Cl)c3F)cnc2C)cn1]

(S)-6-(3-Chloro-6-(difluoromethyl)-2-fluorophenyl)-3-methyl-N-(1-(1-(4-methyl-2-(3-methyl-2-oxoimidazolidin-1-yl)pyrimidin-5-yl)ethyl)-1H-pyrazol-4-yl)pyrazine-2-carboxamide (Scheme AAP)

Step 1. ( )-6-(3-S Chloro-6-(difluoromethyl)-2-fluorophenyl)-3-methyl-N-(1-(1-(4-methyl-2-(methyltho)pyrimidin-5-yl)ethyl)-1H-pyrazol-4-yl)pyrazine-2-carboxamide: The title compound was prepared following procedures similar to those described above in Example AAA-10a, step 5. MS=548.1 [M+1]$^+$.

Step 2. (S)-6-(3-Chloro-6-(difluoromethyl)-2-fluorophenyl)-3-methyl-N-(1-(1-(4-methyl-2-(methylsulfonyl)pyrimidin-5-yl)ethyl)-1H-pyrazol-4-yl)pyrazine-2-carboxamide: To a solution of (S)-6-(3-chloro-6-(difluoromethyl)-2-fluorophenyl)-3-methyl-N-(1-(1-(4-methyl-2-(methylthio)pyrimidin-5-yl)ethyl)-1H-pyrazol-4-yl)pyrazine-2-carboxamide (70 mg, 0.130 mmol) in MeOH (3.0 mL) and water (0.5 mL) was added Oxone® (240 mg, 0.38 mmol). The reaction mixture was stirred at rt for 2 h. To the mixture was added water, and the resulting mixture was extracted with EtOAc. The organic layers were combined and dried over Na$_2$SO$_4$, filtered, and concentrated under reduced pressure. The crude residue was purified by preparatory-TLC (1:1 EtOAc/petroleum ether) afford the title compound. MS=580.1 [M+1]$^+$.

Step 3. (S)-6-(3-Chloro-6-(difluoromethyl)-2-fluorophenyl)-3-methyl-N-(1-(1-(4-methyl-2-(3-methyl-2-oxoimidazolidin-1-yl)pyrimidin-5-yl)ethyl)-1H-pyrazol-4-yl)pyrazine-2-carboxamide: To a solution of (S)-6-(3-chloro-6-(difluoromethyl)-2-fluorophenyl)-3-methyl-N-(1-(1-(4-methyl-2-(methylsulfonyl)pyrimidin-5-yl)ethyl)-1H-pyrazol-4-yl)pyrazine-2-carboxamide (50 mg, 0.086 mmol) in ACN (1.0 mL) was added 1-methylimidazolidin-2-one (26 mg, 0.26 mmol) and potassium carbonate (36 mg, 0.26 mmol). The resulting mixture was stirred at 80° C. for 12 h. The mixture was concentrated under reduced pressure. The crude residue was purified by preparatory-HPLC (C18 stationary phase water(0.1% TFA)-ACN Begin B 33%, End B 63%) to afford the title compound. $^1$H NMR (400 MHz, CD$_3$OD) δ 8.86 (d, J=2.3 Hz, 1H), 8.40 (s, 1H), 8.27 (s, 1H), 7.86-7.77 (m, 1H), 7.73 (s, 1H), 7.66 (d, J=8.6 Hz, 1H), 7.08-6.75 (m, 1H), 5.87 (d, J=6.7 Hz, 1H), 4.10 (br d, J=8.2 Hz, 2H), 3.66-3.56 (m, 2H), 2.98 (s, 3H), 2.94 (s, 3H), 2.56 (s, 3H), 1.90 (d, J=7.0 Hz, 3H). MS=600.2 [M+1]$^+$.

Example 208 and 209

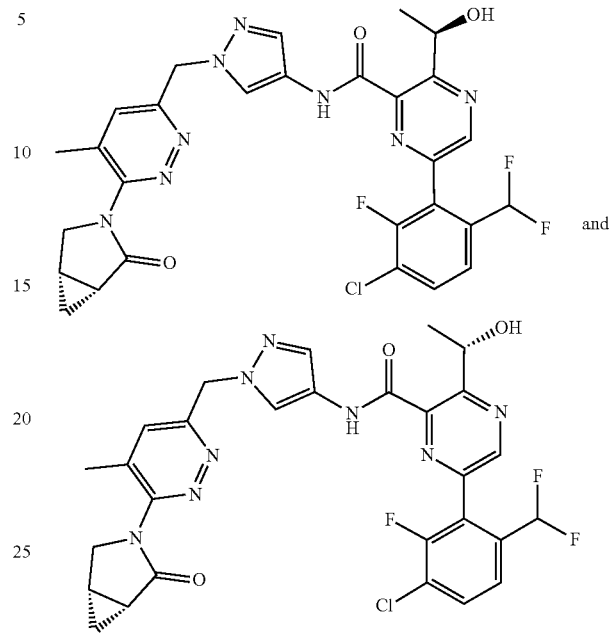

6-(3-Chloro-6-(difluoromethyl)-2-fluorophenyl)-3-((R)-1-hydroxyethyl)-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide and 6-(3-Chloro-6-(difluoromethyl)-2-fluorophenyl)-3-((S)-1-hydroxyethyl)-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide (Scheme AAQ)

Step 1. 6-(3-Chloro-6-(difluoromethyl)-2-fluorophenyl)-N-(1-((5-methyl-6-((1R,5S)-2-oxo-3-azabicyclo[3.1.0]hexan-3-yl)pyridazin-3-yl)methyl)-1H-pyrazol-4-yl)-3-vinylpyrazine-2-carboxamide: To a solution of 6-(3-chloro-6-(difluoromethyl)-2-fluorophenyl)-3-vinylpyrazine-2-carboxylic acid (127 mg, 0.387 mmol), EDC (202 mg, 1.06 mmol) and pyridine (57 μL, 0.70 mmol) in DCM (10 mL) was added (1R,5S)-3-(6-((4-amino-1H-pyrazol-1-yl)methyl)-4-methylpyridazin-3-yl)-3-azabicyclo[3.1.0]hexan-2-one (100 mg, 0.352 mmol). The mixture was stirred at rt for 1.5 h. The reaction mixture was concentrated under reduced pressure and purified by reversed-phase preparatory-HPLC (C18 stationary phase, water(0.1% TFA)-ACN Begin B 45% End B 65%) to afford the title compound. MS=595.1 [M+1]$^+$.

Step 2. 6-(3-Chloro-6-(difluoromethyl)-2-fluorophenyl)-3-(1-hydroxyethyl)-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide: To a solution of 6-(3-chloro-6-(difluoromethyl)-2-fluorophenyl)-N-(1-((5-methyl-6-((1R,5S)-2-oxo-3-azabicyclo[3.1.0]hexan-3-yl)pyridazin-3-yl)methyl)-1H-pyrazol-4-yl)-3-vinylpyrazine-2-carboxamide (60 mg, 0.10 mmol) in 2-propanol (5.0 mL) was added phenylsilane (27 mg, 0.25 mmol) and tris(2,2,6,6-tetramethyl-3,5- heptanedionato)manganese(III) (12 mg, 0.020 mmol) at rt under an atmosphere of oxygen. The reaction mixture was stirred at rt for 2 h then concentrated under reduced pressure. Water was added to the mixture and the resulting mixture was extracted with EtOAc. The organic layers were combined and washed with brine, dried over $Na_2SO_4$, filtered, and concentrated under reduced pressure. The crude residue was purified by reversed-phase preparatory-HPLC (C18 stationary phase, water(0.1% TFA)-ACN Begin B 35% End B 55%) to afford the mixture of diastereomeric title compounds. The diastereoisomeric title compounds were separated by chiral chromatography (SFC, DAICEL CHIRALCEL OJ-H; 0.1% $NH_3H_2O$ MeOH Begin B 25% End B 25%) to furnish the individual isomer compounds in pure form. The faster-eluting diastereoisomer of the title compounds (Example 208): $^1$H NMR (400 MHz, $CD_3OD$) δ 8.98 (d, J=2.5 Hz, 1H), 8.31 (s, 1H), 7.81 (t, J=7.7 Hz, 1H), 7.74 (s, 1H), 7.66 (d, J=8.6 Hz, 1H), 7.36 (s, 1H), 6.93 (t, J=54.4 Hz, 1H), 5.80 (q, J=6.6 Hz, 1H), 5.60 (s, 2H), 4.45 (dd, J=5.7, 10.39 Hz, 1H), 3.80 (d, J=9.5 Hz, 1H), 2.25-2.18 (m, 1H), 2.17 (s, 3H), 2.09-2.01 (m, 1H), 1.60 (d, J=6.4 Hz, 3H), 1.35-1.31 (m, 1H), 1.00-0.93 (m, 1H). MS=613.2 $[M+1]^+$. The slower-eluting diastereoisomer of the title compounds (Example 209): $^1$H NMR (400 MHz, $CD_3OD$) δ 8.97 (d, J=2.5 Hz, 1H), 8.30 (s, 1H), 7.81 (t, J=7.7 Hz, 1H), 7.74 (s, 1H), 7.65 (d, J=8.3 Hz, 1H), 7.36 (s, 1H), 6.95 (t, J=54.8 Hz, 1H), 5.80 (q, J=6.6 Hz, 1H), 5.60 (s, 2H), 4.45 (dd, J=5.7, 10.39 Hz, 1H), 3.80 (d, J=10.5 Hz, 1H), 2.26-2.15 (m, 4H), 2.05 (br t, J=5.6 Hz, 1H), 1.60 (d, J=6.4 Hz, 3H), 1.36-1.31 (m, 1H), 1.01-0.93 (m, 1H). MS=613.2 $[M+1]^+$.

TABLE 26

The following compounds were prepared using procedures similar to those described in Examples 208 and 209 using the appropriate starting materials. In some examples, racemic products or diastereoisomeric mixtures were separated using chiral columns (SFC or HPLC) specified in the table.

| Example No. | Structure | Name | $[M + H]^+$ or $[M + Na]^+$ | Chiral column |
|---|---|---|---|---|
| 210 | | 6-(3-Chloro-6-(difluoromethyl)-2-fluorophenyl)-3-((S or R)-1-hydroxyethyl)-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 626.2 Found: 626.2 | DAICEL CHIRALPAK AS then DAICEL CHIRALPAK AD |
| 211 | | 6-(3-Chloro-6-(difluoromethyl)-2-fluorophenyl)-3-((R or S)-1-hydroxyethyl)-N-(1-((S or R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide Name | Calcd.: 626.2 Found: 626.2 | DAICEL CHIRALPAK AS then DAICEL CHIRALPAK AD |

TABLE 26-continued

*The following compounds were prepared using procedures similar to those described in Examples 208 and 209 using the appropriate starting materials. In some examples, racemic products or diatereoisomeric mixtures were separated using chiral columns (SFC or HPLC) specified in the table.*

| Example No. | Structure | Name | [M + H]+ or [M + Na]+ | Chiral column |
|---|---|---|---|---|
| 212 | 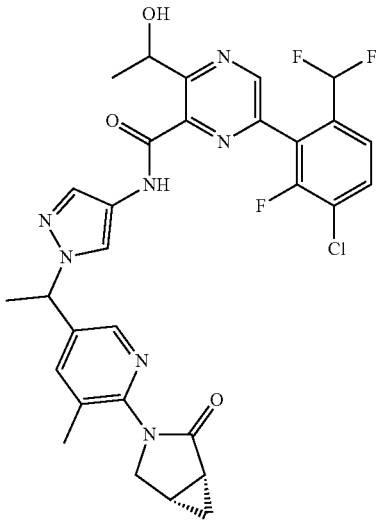 [SMILES: Cc1cc(C(C)n2cc(NC(=O)c3nc(-c4c(C(F)F)ccc(Cl)c4F)cnc3C(C)O)cn2)cnc1N1C[C@H]2C[C@H]2C1=O] | 6-(3-Chloro-6-(difluoromethyl)-2-fluorophenyl)-3-((S or R)-1-hydroxyethyl)-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 626.2<br>Found: 626.2 | DAICEL CHIRALPAK AS |
| 213 | 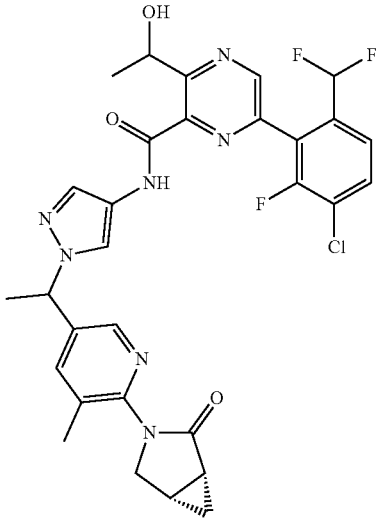 [SMILES: Cc1cc(C(C)n2cc(NC(=O)c3nc(-c4c(C(F)F)ccc(Cl)c4F)cnc3C(C)O)cn2)cnc1N1C[C@H]2C[C@H]2C1=O] | 6-(3-Chloro-6-(difluoromethyl)-2-fluorophenyl)-3-((R or S)-1-hydroxyethyl)-N-(1-((R or S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 626.2<br>Found: 626.2 | DAICEL CHIRALPAK AS |

TABLE 26-continued

The following compounds were prepared using procedures similar to those described in Examples 208 and 209 using the appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 214 | | 6-(3-Chloro-6-(difluoromethyl)-2-fluorophenyl)-3-ethyl-N-(1-((S and R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide | Calcd.: 610.2 Found: 610.2 | |

Example 215

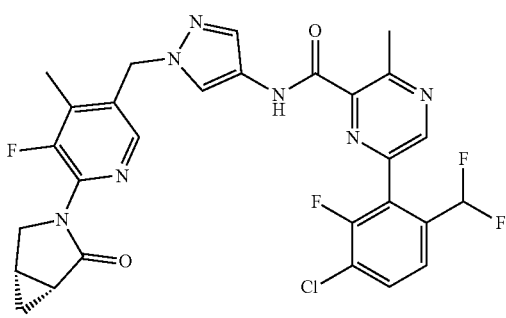 [SMILES: Cc1ncc(-c2c(C(F)F)ccc(Cl)c2F)nc1C(=O)Nc1cnn(Cc2cnc(N3C[C@H]4C[C@H]4C3=O)c(F)c2C)c1]

6-(3-Chloro-6-(difluoromethyl)-2-fluorophenyl)-N-(1-((3-fluoro-4-methyl-5-((1R,5S)-2-oxo-3-azabicyclo[3.1.0]hexan-3-yl)pyridin-2-yl)methyl)-1H-pyrazol-4-yl)-3-methylpyrazine-2-carboxamide (Scheme AAR)

Step 1. (1R,5S)-3-(6-Chloro-5-fluoro-4-methylpyridin-3-yl)-3-azabicyclo[3.1.0]hexan-2-one: To a solution of 2-chloro-3-fluoro-5-iodo-4-methylpyridine (300 mg, 1.11 mmol), (1R,5S)-3-azabicyclo[3.1.0]hexan-2-one (150 mg, 1.55 mmol) and cesium carbonate (1.08 g, 3.32 mmol) in toluene (5.0 mL) was added [(4,5-bis(diphenylphosphino)-9,9-dimethylxanthene)-2-(2'-amino-1,1'-biphenyl)]palladium(II) methanesulfonate (Xantphos-Pd-G3, 60 mg, 58 □mol) at rt in a nitrogen-filled glove box. After the addition, the reaction vessel was sealed and stirred at 80° C. for 15 h. The reaction mixture was cooled to rt then filtered, and the filtrate was concentrated under reduced pressure. The crude residue was purified by preparatory-TLC (SiO₂, 2:1 EtOAc/petroleum ether) to afford the title compound. MS=241.0 [M+1]+.

Step 2. (1R,5S)-3-(5-Fluoro-4-methyl-6-vinylpyridin-3-yl)-3-azabicyclo[3.1.0]hexan-2-one: To a mixture of (1R,5S)-3-(6-chloro-5-fluoro-4-methylpyridin-3-yl)-3-azabicyclo[3.1.0]hexan-2-one (100 mg, 0.416 mmol), potassium vinyltrifluoroborate (111 mg, 0.831 mmol) and TEA (126 mg, 1.25 mmol) in ethanol (5.0 mL) was added bis(di-tert-butylphosphino)ferrocene palladium dichloride (30 mg, 41 μmol). The reaction mixture was stirred at 80° C. under a nitrogen atmosphere for 15 h. The reaction was cooled to rt then filtered and the filtrate was concentrated under reduced pressure. The crude residue was purified by preparatory-TLC (SiO₂, 3:2 EtOAc/petroleum ether) to give the title compound. MS=233.1 [M+1]+.

Step 3. 3-Fluoro-4-methyl-5-((1R,5S)-2-oxo-3-azabicyclo[3.1.0]hexan-3-yl)picolinaldehyde: The title compound was prepared following procedures similar to those described above in Intermediate AE-5, step 2. MS=235.1 [M+1]+.

Step 4. (1R,5S)-3-(5-Fluoro-6-(hydroxymethyl)-4-methylpyridin-3-yl)-3-azabicyclo[3.1.0]hexan-2-one: The title compound was prepared following procedures similar to those described above in Intermediate BJ-5a, step 3. MS=237.1 [M+1]+.

Step 5. (1R,5S)-3-(5-Fluoro-4-methyl-6-((4-nitro-1H-pyrazol-1-yl)methyl)pyridin-3-yl)-3-azabicyclo[3.1.0]hexan-2-one: The title compound was prepared following procedures similar to those described above in Example 150, step 5. MS=332.1 [M+1]+.

Step 6. (1R,5S)-3-(6-((4-Amino-1H-pyrazol-1-yl)methyl)-5-fluoro-4-methylpyridin-3-yl)-3-azabicyclo[3.1.0]hexan-2-one: The title compound was prepared following procedures similar to those described above in Example 42, step 3. MS=302.1 [M+1]+.

Step 7. 6-(3-Chloro-6-(difluoromethyl)-2-fluorophenyl)-N-(1-((3-fluoro-4-methyl-5-((1R,5S)-2-oxo-3-azabicyclo[3.1.0]hexan-3-yl)pyridin-2-yl)methyl)-1H-pyrazol-4-yl)-3-methylpyrazine-2-carboxamide: The title compound was prepared following procedures similar to those described above in Example 1, step 5. $^1$H NMR (400 MHz, CDCl$_3$) δ 9.76 (s, 1H), 8.94 (d, J=3.1 Hz, 1H), 8.24 (br d, J=15.7 Hz, 2H), 7.78-7.60 (m, 3H), 6.76-6.39 (m, 1H), 5.57-5.44 (m, 2H), 4.03 (dd, J=10.0, 5.3 Hz, 1H), 3.64 (br d, J=10.2 Hz, 1H), 3.15 (s, 3H), 2.19-2.08 (m, 5H), 1.34 (td, J=8.0, 5.5 Hz, 1H), 0.90 (q, J=4.2 Hz, 1H). MS=600.2 [M+1]$^+$.

Example 216 and 217

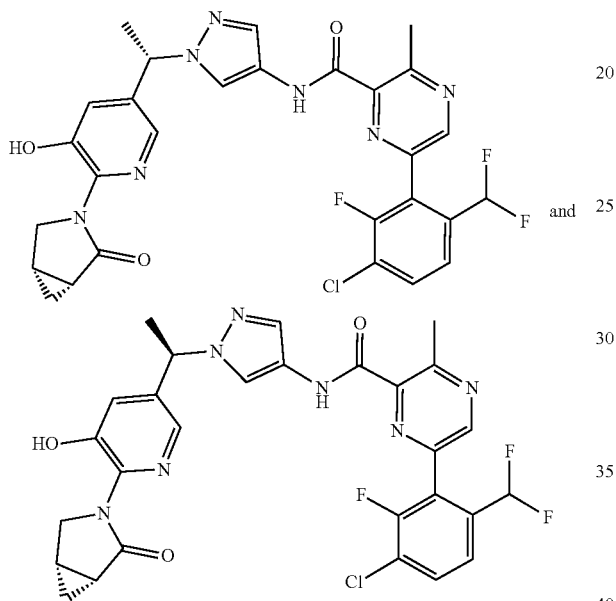

and 6-(3-Chloro-6-(difluoromethyl)-2-fluorophenyl)-N-(1-((R)-1-(5-hydroxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide and 6-(3-Chloro-6-(difluoromethyl)-2-fluorophenyl)-N-(1-((S)-1-(5-hydroxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide (Scheme AAS)

Step 1. tert-Butyl (1-(1-(4,4,5,5-tetramethyl-1,3,2-dioxaborolan-2-yl)ethyl)-1H-pyrazol-4-yl)carbamate: The following sequence was carried out in three batches in parallel on equivalent scale. These batches were combined for subsequent post-reaction processing. To a solution of tert-butyl (1H-pyrazol-4-yl)carbamate (65.0 g, 355 mmol) in DMF (1.30 L) at 0° C. was added sodium hydride (17.0 g, 426 mmol, 60% dispersion in mineral oil). The resulting mixture was at 0° C. for 1 h, then 2-(iodomethyl)-4,4,5,5-tetramethyl-1,3,2-dioxaborolane (130 g, 461 mmol) was added dropwise. Upon completion of the addition, the reaction mixture was stirred at rt for 11 h. The reaction mixtures were combined and quenched by the addition of satd. aq. NH$_4$Cl and extracted with a 10:1 mixture of EtOAc/MeOH. The organic layers were combined and washed with water then brine, dried over Na$_2$SO$_4$, filtered and concentrated under reduced pressure to afford (1-(4-((tert-butoxycarbonyl)amino)-1H-pyrazol-1-yl)ethyl)boronic acid. The following sequence was carried out in two batches in parallel on equivalent scale. These batches were combined for subsequent post-reaction processing. To a solution of (1-(4-((tert-butoxycarbonyl)amino)-1H-pyrazol-1-yl)ethyl)boronic acid (165 g, 401 mmol) in THF (1.20 L) was added 2,3-dimethylbutane-2,3-diol (47.4 g, 401 mmol) and the resulting mixture was stirred at 35° C. under a nitrogen atmosphere for 6 h. The reaction mixtures were combined and concentrated under reduced pressure to afford the title compound.

Step 2. Potassium (1-(4-((tert-butoxycarbonyl)amino)-1H-pyrazol-1-yl)ethyl)trifluoroborate: The following sequence was carried out in three batches in parallel on equivalent scale. These batches were combined for subsequent post-reaction processing. To a solution of tert-butyl (1-(1-(4,4,5,5-tetramethyl-1,3,2-dioxaborolan-2-yl)ethyl)-1H-pyrazol-4-yl)carbamate (135 g, 400 mmol) in MeOH (1.35 L) was added potassium bifluoride (125 g, 1.60 mol). The resulting mixture was stirred at rt for 12 h. The reaction mixtures were combined and concentrated under reduced pressure. The crude residue was suspended in EtOAc and filtered. The solid was washed with acetone and the combined filtrate was concentrated under reduced pressure to afford the title compound: $^1$H NMR: (400 MHz, DMSO-d$_6$) δ8.85 (s, 1H), 7.56 (s, 1H), 7.09 (s, 1H), 3.13 (br d, J=3.2 Hz, 1H), 1.44 (s, 9H), 1.10 (d, J=7.2 Hz, 3H).

Step 3. tert-Butyl (1-(1-(6-chloro-5-((4-methoxy benzyl)oxy)pyridin-3-yl)ethyl)-1H-pyrazol-4-yl)carbamate: To a solution of 5-bromo-2-chloro-3-((4-methoxybenzyl)oxy)pyridine (500 mg, 1.52 mmol) and potassium (1-(4-((tert-butoxycarbonyl)amino)-1H-pyrazol-1-yl)ethyl)trifluoroborate (483 mg, 1.52 mmol) in 1,3-dimethyl-2-imidazolidinone (5.0 mL) was added lithium hydroxide (109 mg, 4.56 mmol), 4,4'-di-tert-butyl-2,2'-bipyridine (49 mg, 0.18 mmol), [Ir{dFCF$_3$ppy}$_2$(bpy)]PF$_6$ (33 mg, 38 µmol) in a nitrogen-filled glove-box. The reaction mixture was stirred for 6 h in front of a single blue LED (450 nm) at rt. The mixture was quenched by the addition of water and extracted with EtOAc. The organic layers were combined and washed with brine, dried over Na$_2$SO$_4$, filtered then concentrated under reduced pressure. The crude residue was purified by silica gel chromatography (0 to 30% EtOAc/petroleum ether) to afford the title compound. MS=459.2 [M+1]$^+$.

Step 4. tert-Butyl (1-(1-(5-((4-methoxy benzyl)oxy)-6-((1R,5S)-2-oxo-3-azabicyclo[3.1.0]hexan-3-yl)pyridin-3-yl)ethyl)-1H-pyrazol-4-yl)carbamate: The mixture of tert-butyl (1-(1-(6-chloro-5-((4-methoxybenzyl)oxy)pyridin-3-yl)ethyl)-1H-pyrazol-4-yl)carbamate (150 mg, 0.327 mmol), (1R,5S)-3-azabicyclo[3.1.0]hexan-2-one (48 mg, 0.49 mmol), cesium carbonate (319 mg, 0.981 mmol) and (9,9-dimethyl-9H-xanthene-4,5-diyl)bis(diphenylphosphine) (19 mg, 33 µmol) and tris(dibenzylideneacetone)dipalladium (40 mg, 49 µmol) in 1,4-dioxane (2.0 mL) was stirred at 100° C. for 14 h under a nitrogen atmosphere. The mixture was cooled to rt then quenched by the addition of water and extracted with EtOAc. The organic layers were combined and washed with brine, dried over Na$_2$SO$_4$ filtered then concentrated under reduced pressure. The crude residue was purified by silica gel chromatography (0 to 10% MeOH/DCM) to afford the title compound. MS=520.3 [M+1]+.

Step 5. (1R,5S)-3-(5-(1-(4-Amino-1H-pyrazol-1-yl)ethyl)-3-hydroxypyridin-2-yl)-3-azabicyclo[3.1.0]hexan-2-one: The title compound was prepared following procedures similar to those described above in Intermediate AE-5, step 4. MS=300.1 [M+1]+.

Step 6. 6-(3-Chloro-6-(difluoromethyl)-2-fluorophenyl)-N-(1-((R)-1-(5-hydroxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide and 6-(3-Chloro-6-(difluoromethyl)-2-fluorophenyl)-N-(1-((S)-1-(5-hydroxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide: The title compounds were prepared as an initial mixture of diastereomers following procedures similar to those described above in Example 1, step 5. The diastereoisomeric title compounds were separated by chiral chromatography (SFC, DAICEL CHIRALCEL AD; 0.1% NH$_3$H$_2$O IPA Begin B 40% End B 40%) to furnish the individual isomer compounds in pure form. The faster-eluting diastereoisomer of the title compounds (Example 216): $^1$H NMR (500 MHz, CD$_3$OD) δ 8.88 (d, J=2.4 Hz, 1H), 8.26 (s, 1H), 7.85 (dd, J=15.3, 7.2 Hz, 2H), 7.78-7.64 (m, 2H), 7.18 (s, 1H), 7.12-6.73 (t, J=54.4 Hz, 1H), 5.63 (q, J=7.0 Hz, 1H), 4.24 (br dd, J=10.9, 6.0 Hz, 1H), 3.86 (br d, J=11.0 Hz, 1H), 3.01 (s, 3H), 2.24-2.04 (m, 2H), 1.92 (d, J=7.2 Hz, 3H), 1.39-1.31 (m, 1H), 0.95 (br d, J=3.4 Hz, 1H). MS=598.2 [M+1]+. The slower-eluting diastereoisomer of the title compounds (Example 217): $^1$H NMR (400 MHz, CD$_3$OD): δ 8.84 (d, J=2.4 Hz, 1H), 8.21 (s, 1H), 7.90-7.75 (m, 2H), 7.71 (s, 1H), 7.64 (d, J=8.6 Hz, 1H), 7.13 (s, 1H), 7.07-6.77 (t, J=54.4 Hz, 1H), 5.65-5.53 (m, 1H), 4.20 (br dd, J=11.1, 6.0 Hz, 1H), 3.81 (br d, J=11.0 Hz, 1H), 2.97 (s, 3H), 2.17-2.02 (m, 2H), 1.87 (d, J=7.1 Hz, 3H), 1.30-1.25 (m, 1H), 0.91 (br d, J=3.4 Hz, 1H). MS=598.2 [M+1]+.

TABLE 27

The following compounds were prepared using procedures similar to those described in Examples 216 and 217 using the appropriate starting materials. In some examples, racemic products or diatereoisomeric mixtures were separated using chiral columns (SFC or HPLC) specified in the table.

| Example No. | Structure | Name | [M + H]+ or [M + Na]+ | Chiral column |
|---|---|---|---|---|
| 218 | | 6-(3-Chloro-6-(difluoromethyl)-2-fluorophenyl)-N-(1-((S or R)-1-(5-methoxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 612.2 Found: 612.3 | REGIS (S,S) WHELK-O1 |
| 219 | | 6-(3-Chloro-6-(difluoromethyl)-2-fluorophenyl)-N-(1-((R or S)-1-(5-methoxy-6-((1R,5S)-2-oxo-3-azabicyclo[3.1.0]hexan-3-yl)pyridin-3-yl)ethyl)-1H-pyrazol-4-yl)-3-methylpyrazine-2-carboxamide | Calcd.: 612.2 Found: 612.3 | REGIS (S,S) WHELK-O1 |

Example 220

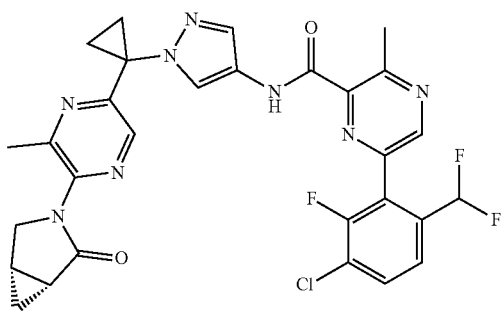 [SMILES: Cc1ncc(-c2c(C(F)F)ccc(Cl)c2F)nc1C(=O)Nc1cnn(C2(c3cnc(N4C[C@H]5C[C@H]5C4=O)c(C)n3)CC2)c1]

6-(3-Chloro-6-(difluoromethyl)-2-fluorophenyl)-3-methyl-N-(1-(1-(6-methyl-5-((1R,5S)-2-oxo-3-azabicyclo[3.1.0]hexan-3-yl)pyrazin-2-yl)cyclopropyl)-1H-pyrazol-4-yl)pyrazine-2-carboxamide (Scheme AAT)

Step 1. 2-Bromo-3-methyl-5-(1-(4-nitro-1H-pyrazol-1-yl)cyclopropyl)pyrazine: To a solution of 2-bromo-3-methyl-5-((4-nitro-1H-pyrazol-1-yl)methyl)pyrazine (200 mg, 0.671 mmol) in DMF (8.0 mL) was added diphenyl(vinyl)sulfonium triflate (486 mg, 1.34 mmol) and DBU (0.30 mL, 2.0 mmol). The reaction mixture was stirred at rt for 14 h under a nitrogen atmosphere. To the mixture was added EtOAc, and the resulting mixture was washed with water and brine, dried over Na$_2$SO$_4$, filtered and concentrated under reduced pressure. The crude residue was purified by silica gel chromatography (0 to 25% EtOAc/petroleum ether) to afford the title compound. MS=324.0, 326.0 [M+1]$^+$.

Step 2. (1R,5S)-3-(3-Methyl-5-(1-(4-nitro-1H-pyrazol-1-yl)cyclopropyl)pyrazin-2-yl)-3-azabicyclo[3.1.0]hexan-2-one: To a mixture of (1R,5S)-3-azabicyclo[3.1.0]hexan-2-one (81.0 mg, 0.833 mmol), 2-bromo-3-methyl-5-(1-(4-nitro-1H-pyrazol-1-yl)cyclopropyl)pyrazine (180 mg, 0.555 mmol) and cesium carbonate (543 mg, 1.67 mmol) under a nitrogen atmosphere was added tris(dibenzylideneacetone)dipalladium (51 mg, 56 µmol) and Xantphos (32 mg, 56 µmol). The reaction mixture was stirred at 100° C. for 14 h. The mixture was cooled to rt and concentrated under reduced pressure. Water was added to the mixture and then resulting mixture was extracted with DCM. The organic layers were combined and dried over Na$_2$SO$_4$, filtered and concentrated under reduced pressure. The crude residue was purified by silica gel chromatography (0 to 50% EtOAc/petroleum ether) to afford the title compound. MS=341.1 [M+1]$^+$.

Step 3. (1R,5S)-3-(5-(1-(4-Amino-1H-pyrazol-1-yl)cyclopropyl)-3-methylpyrazin-2-yl)-3-azabicyclo[3.1.0]hexan-2-one: A mixture of (1R,5S)-3-(3-methyl-5-(1-(4-nitro-1H-pyrazol-1-yl)cyclopropyl)pyrazin-2-yl)-3-azabicyclo[3.1.0]hexan-2-one (50 mg, 0.15 mmol) and platinum(IV) oxide (3.3 mg, 0.015 mmol) in EtOAc (3.0 mL) and MeOH (1.0 mL) was stirred under an atmosphere of hydrogen (pressure: 15 psi) at rt for 2 h. The crude mixture was filtered, and the filtrate was concentrated under reduced pressure to afford the title compound. MS=311.1 [M+1]$^+$.

Step 4. 6-(3-Chloro-6-(difluoromethyl)-2-fluorophenyl)-3-methyl-N-(1-(1-(6-methyl-5-((1R,5S)-2-oxo-3-azabicyclo[3.1.0]hexan-3-yl)pyrazin-2-yl)cyclopropyl)-1H-pyrazol-4-yl)pyrazine-2-carboxamide: The title compound was prepared following procedures similar to those described above in Example 41, step 4. $^1$H NMR (400 MHz, CD$_3$OD) δ 8.87 (d, J=2.4 Hz, 1H), 8.34 (s, 1H), 7.87 (s, 1H), 7.84-7.80 (m, 1H), 7.68-7.66 (m, 1H), 7.27 (s, 1H), 6.95 (t, J=54.8 Hz, 1H), 4.29-4.25 (m, 1H), 3.68-3.65 (m, 1H), 3.00 (s, 3H), 2.35 (s, 3H), 2.16-2.01 (m, 1H), 1.93-1.90 (m, 1H), 1.87-1.84 (m, 1H) 1.79-1.78 (m, 1H), 1.32-1.30 (m, 2H), 1.29-1.27 (m, 1H), 0.92-0.91 (in, 1H). MS=609.1 [M+1]$^+$.

TABLE 28

The following compounds were prepared using procedures similar to those described in Example 220 using the appropriate starting materials.

| Example No. | Structure | Name | [M + H]$^+$ or [M + Na]$^+$ | Chiral column |
|---|---|---|---|---|
| 221 | | 6-(3-Chloro-6-(difluoromethyl)-2-fluorophenyl)-3-(methoxymethyl)-N-(1-(1-(6-methyl-5-((1R,5S)-2-oxo-3-azabicyclo[3.1.0]hexan-3-yl)pyrazin-2-yl)cyclopropyl)-1H-pyrazol-4-yl)pyrazine-2-carboxamide | Calcd.: 639.2 Found: 639.2 | |

TABLE 28-continued

The following compounds were prepared using procedures similar to those described in Example 220 using the appropriate starting materials.

| Example No. | Structure | Name | [M + H]+ or [M + Na]+ | Chiral column |
|---|---|---|---|---|
| 222 | | 3-(tert-Butoxymethyl)-6-(3-chloro-6-(difluoromethyl)-2-fluorophenyl)-N-(1-(1-(6-methyl-5-((1R,5S)-2-oxo-3-azabicyclo[3.1.0]hexan-3-yl)pyrazin-2-yl)cyclopropyl)-1H-pyrazol-4-yl)pyrazine-2-carboxamide | [M + 1 − 56]+ Calcd.: 625.2 Found: 625.2 | |
| 223 | | 6-(3-Chloro-6-(difluoromethyl)-2-fluorophenyl)-3-(hydroxymethyl)-N-(1-(1-(6-methyl-5-((1R,5S)-2-oxo-3-azabicyclo[3.1.0]hexan-3-yl)pyrazin-2-yl)cyclopropyl)-1H-pyrazol-4-yl)pyrazine-2-carboxamide | Calcd.: 625.2 Found: 625.2 | |

Example 224 and 225

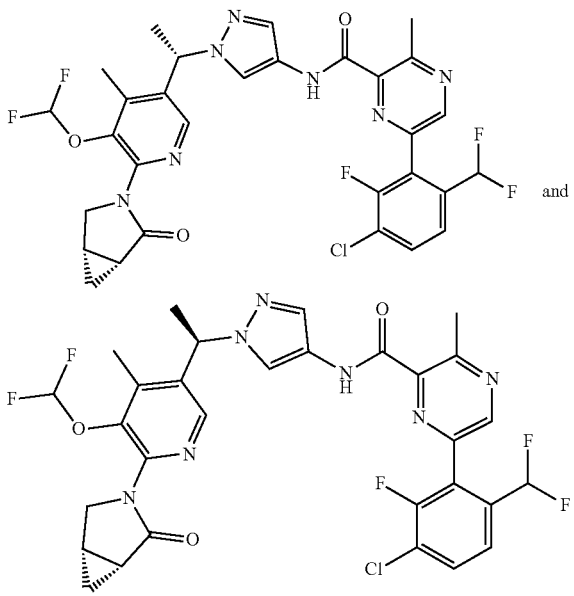

and 6-(3-Chloro-6-(difluoromethyl)-2-fluorophenyl)-N-(1-((S)-1-(5-(difluoromethoxy)-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide and 6-(3-Chloro-6-(difluoromethyl)-2-fluorophenyl)-N-(1-((S)-1-(5-(difluoromethoxy)-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide (Scheme AAU)

Step 1. 2-Chloro-5-iodo-3-methoxy-4-methylpyridine: To a solution of 2-chloro-3-fluoro-5-iodo-4-methylpyridine (2.3 g, 8.5 mmol) in MeOH (40 mL) was added sodium methoxide (0.69 g, 13 mmol) at rt. The reaction mixture was stirred at 80° C. for 48 h. The reaction mixture was cooled to rt and water was added to the mixture. The resulting mixture was extracted with EtOAc, then the organic layers were combined and washed with brine, dried over $Na_2SO_4$, filtered and concentrated under reduced pressure. The crude residue was purified by silica gel chromatography (0 to 7% EtOAc/petroleum ether) then by reversed-phase preparatory HPLC (C18 stationary phase, 30% ACN/$H_2O$+ 0.5% TFA) to afford the title compound. MS=283.9 [M+1]$^+$.

Step 2. 1-(6-Chloro-5-methoxy-4-methylpyridin-3-yl)ethan-1-one: The title compound was prepared following procedures similar to those described above in Intermediate BI-4a, step 1. aq. MS=200.1 [M+1]$^+$.

Step 3. 1-(6-Chloro-5-methoxy-4-methylpyridin-3-yl)ethan-1-ol: To a solution of 1-(6-chloro-5-methoxy-4-methylpyridin-3-yl)ethan-1-one (1.4 g, 7.0 mmol) in THF (20 mL) and MeOH (2.0 mL) was added the sodium borohydride (0.32 g, 8.4 mmol) at 0° C. The reaction mixture was stirred for 2 h at 0° C. The reaction mixture was quenched by the addition of satd. aq. $NH_4Cl$ and extracted with EtOAc. The organic layers were combined and concentrated under reduced pressure and the crude residue was purified by silica gel chromatography (0 to 50% EtOAc/petroleum ether) to afford the title compound. MS=202.1 [M+1]$^+$.

Step 4. 2-Chloro-3-methoxy-4-methyl-5-(1-(4-nitro-1H-pyrazol-1-yl)ethyl)pyridine: The title compound was prepared following procedures similar to those described above Example 183, step 1. MS=297.0 [M+1]$^+$.

Step 5. 2-Chloro-4-methyl-5-(1-(4-nitro-1H-pyrazol-1-yl)ethyl)pyridin-3-ol: To a stirred solution of 2-chloro-3-methoxy-4-methyl-5-(1-(4-nitro-1H-pyrazol-1-yl)ethyl)pyridine (1.1 g, 1.9 mmol) in DCM (15 mL) was added boron tribromide (1.0 mL, 11 mmol) drop-wise at 0° C. Upon completion of addition, the reaction mixture was stirred for 12 h at rt. The reaction mixture was diluted with DCM (10 mL), cooled to 0° C., then quenched by addition of MeOH (5 mL). The mixture was concentrated under reduced pressure and the crude residue was purified by silica gel chromatography (0 to 30% EtOAc/petroleum ether) to afford the title compound. MS=283.0 [M+1]$^+$.

Step 6. 2-Chloro-3-(difluoromethoxy)-4-methyl-5-(1-(4-nitro-1H-pyrazol-1-yl)ethyl)pyridine: To a stirred solution of 2-chloro-4-methyl-5-(1-(4-nitro-1H-pyrazol-1-yl)ethyl)pyridin-3-ol (420 mg, 1.49 mmol) in DMF (8.0 mL) was added sodium 2-chloro-2,2-difluoroacetate (340 mg, 2.23 mmol) and cesium carbonate (968 mg, 2.97 mmol) at rt, and then the reaction mixture was stirred at 70° C. for 12 h. The mixture was diluted with water and extracted with EtOAc. The organic layers were combined and concentrated under reduced pressure and the crude residue was purified by silica gel chromatography (0 to 30% EtOAc/petroleum ether) to afford the title compound. MS=333.0 [M+1]$^+$.

Step 7. (1R,5S)-3-(3-(Difluoromethoxy)-4-methyl-5-(1-(4-nitro-1H-pyrazol-1-yl)ethyl)pyridin-2-yl)-3-azabicyclo[3.1.0]hexan-2-one: To a solution of 2-chloro-3-(difluoromethoxy)-4-methyl-5-(1-(4-nitro-1H-pyrazol-1-yl)ethyl)pyridine (360 mg, 1.08 mmol) in toluene (8.0 mL) was added (1R,5S)-3-azabicyclo[3.1.0]hexan-2-one (137 mg, 1.41 mmol), Xantphos (63 mg, 0.11 mmol), tris(dibenzylideneacetone)dipalladium (99 mg, 0.11 mmol) and cesium carbonate (705 mg, 2.16 mmol). The resulting mixture was stirred at 120° C. for 16 h. The reaction mixture was cooled to rt, diluted with water and extracted with EtOAc. The organic layers were combined and concentrated under reduced pressure and the crude residue was purified by silica gel chromatography (0 to 75% EtOAc/petroleum ether) to afford title compound. MS=394.1 [M+1]$^+$.

Step 8. (1R,5S)-3-(5-(1-(4-Amino-1H-pyrazol-1-yl)ethyl)-3-(difluoromethoxy)-4-methylpyridin-2-yl)-3-azabicyclo[3.1.0]hexan-2-one: The title compound was prepared following procedures similar to those described above in Example 41, step 3. MS=364.1 [M+1]$^+$.

Step 9. 6-(3-Chloro-6-(difluoromethyl)-2-fluorophenyl)-N-(1-(1-(5-(difluoromethoxy)-4-methyl-6-((1R,5S)-2-oxo-3-azabicyclo[3.1.0]hexan-3-yl)pyridin-3-yl)ethyl)-1H-pyrazol-4-yl)-3-methylpyrazine-2-carboxamide: The title compounds were prepared as an initial mixture of diastereomers following procedures similar to those described above in Example 1, step 5. The diastereoisomeric title compounds were separated by chiral chromatography (SFC, Phenomenex-Cellulose-2; 0.1% $NH_3H_2O$ EtOH Begin B 55% End B 55%) to furnish the individual isomer compounds in pure form. The faster-eluting diastereoisomer of the title compounds (Example 224): $^1$H NMR (400 MHz, CD$_3$OD) δ 8.85 (d, J=2.4 Hz, 1H), 8.19 (s, 1H), 8.17 (s, 1H), 7.78-7.85 (m, 1H), 7.74 (s, 1H), 7.66 (d, J=8.6 Hz, 1H), 7.10-6.78 (t, J=54.8 Hz, 1H), 6.76-6.36 (t, J=72.8 Hz, 1H), 5.86 (q, J=7.0 Hz, 1H), 4.26 (dd, J=10.3, 5.9 Hz, 1H), 3.67 (d, J=10.3 Hz, 1H), 2.98 (s, 3H), 2.34 (s, 3H), 2.21-2.12 (m, 1H), 2.05-1.97 (m, 1H), 1.92 (d, J=6.8 Hz, 3H), 1.28-1.22 (m, 1H), 1.00-0.93 (m, 1H). MS=662.2 [M+1]$^+$. The slower-eluting diastereoisomer of the title compounds (Example 225): $^1$H NMR (400 MHz, CD$_3$OD) δ 8.86 (d, J=2.4 Hz, 1H), 8.23 (s, 1H), 8.14 (s, 1H), 7.81 (t, J=7.8 Hz, 1H), 7.72 (s, 1H), 7.66 (d, J=8.6 Hz, 1H), 7.09-6.77 (t, J=54.8 Hz, 1H), 6.73-6.33 (t, J=73.2 Hz, 1H), 5.86 (q, J=7.1 Hz, 1H), 4.28 (dd, J=10.3, 5.9 Hz, 1H), 3.65 (d, J=10.5 Hz, 1H), 2.98 (s, 3H), 2.33 (s, 3H), 2.23-2.13 (m, 1H), 2.06-1.97 (m, 1H), 1.92 (d, J=7.1 Hz, 3H), 1.25 (dt, J=8.0, 3.9 Hz, 1H), 1.00-0.93 (m, 1H). MS=662.2 [M+1]$^+$.

Example 226 and 227

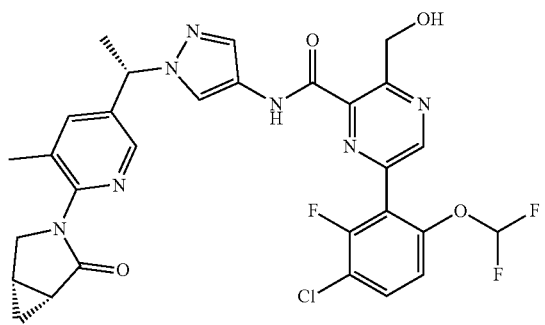

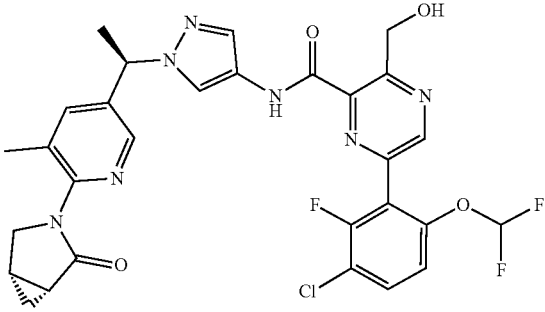

6-(3-Chloro-6-(difluoromethoxy)-2-fluorophenyl)-3-(hydroxymethyl)-N-(1-((S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide and 6-(3-Chloro-6-(difluoromethoxy)-2-fluorophenyl)-3-(hydroxymethyl)-N-(1-((R)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide (Scheme AAV)

To a solution of (1R,5S)-3-(5-(1-(4-amino-1H-pyrazol-1-yl)ethyl)-3-methylpyridin-2-yl)-3-azabicyclo[3.1.0]hexan-2-one (11 mg, 36 μmol) in toluene (2.0 mL) was added trimethylaluminum 0.018 mL, 36 μmol, 2M in toluene). The reaction mixture was stirred at rt for 30 min, then 3-(3-chloro-6-(difluoromethoxy)-2-fluorophenyl)furo[3,4-b]pyrazin-5(7H)-one (10 mg, 30 μmol) in DCM (1.0 mL) was added. The resulting mixture was stirred at rt for 16 h. The mixture was quenched by the addition of water (0.5 mL) then concentrated under reduced pressure and purified by reversed-phase preparatory-HPLC (C18 stationary phase, water(0.1% TFA)-ACN Begin B 33%, End B 63%) to afford the mixture of diastereomeric title compounds. The diastereoisomeric title compounds were separated by chiral chromatography (SFC, DAICEL CHIRALCEL AD; 0.1% NH$_3$H$_2$O EtOH Begin B 45% End B 45%) to furnish the individual isomer compounds in pure form. The faster-eluting diastereoisomer of the title compounds (Example 226): $^1$H NMR (400 MHz, CD$_3$OD) δ 8.90 (s, 1H), 8.26 (s, 1H), 8.16 (d, J=1.7 Hz, 1H), 7.77-7.67 (m, 2H), 7.61 (d, J=1.7 Hz, 1H), 7.24 (d, J=9.1 Hz, 1H), 7.13-6.72 (m, 1H), 5.62 (d, J=7.1 Hz, 1H), 5.21 (s, 2H), 4.22 (dd, J=5.9, 10.5 Hz, 1H), 3.65 (d, J=10.3 Hz, 1H), 2.13 (s, 4H), 2.03-1.96 (m, 1H), 1.89 (d, J=7.1 Hz, 3H), 1.26 (br s, 1H), 0.94-0.87 (m, 1H). MS=628.2 [M+1]$^+$. The slower-eluting diastereoisomer of the title compounds (Example 227): $^1$H NMR (400 MHz, CD$_3$OD) δ 8.82 (br s, 1H), 8.18 (s, 1H), 8.09 (d, J=1.9 Hz, 1H), 7.66 (s, 1H), 7.62 (t, J=8.7 Hz, 1H), 7.52 (d, J=1.7 Hz, 1H), 7.16 (d, J=9.1 Hz, 1H), 7.04-6.65 (m, 1H), 5.54 (q, J=7.1 Hz, 1H), 5.13 (s, 2H), 4.14 (dd, J=6.0, 10.4 Hz, 1H), 3.57 (d, J=10.3 Hz, 1H), 2.10-2.02 (m, 4H), 1.96-1.88 (m, 1H), 1.81 (d, J=7.1 Hz, 3H), 1.21-1.19 (m, 1H), 0.85-0.80 (m, 1H). MS=628.2 [M+1]$^+$.

Example 228

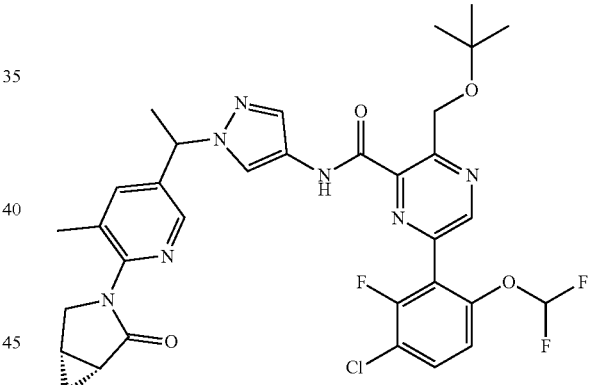

3-(tert-Butoxymethyl)-6-(3-chloro-6-(difluoromethoxy)-2-fluorophenyl)-N-(1-((R and S)-1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide (Scheme AAV)

To a solution of 6-(3-chloro-6-(difluoromethoxy)-2-fluorophenyl)-N-(1-(1-(5-methyl-6-((1R,5S)-2-oxo-3-azabicyclo[3.1.0]hexan-3-yl)pyridin-3-yl)ethyl)-1H-pyrazol-4-yl)pyrazine-2-carboxamide (60 mg, 0.096 mmol) in DCM (1.0 mL) was added tert-butyl acetate (110 mg, 0.960 mmol) and sulfuric acid (0.5 μL, 10 μmol). The reaction was stirred at rt for 12 h. The mixture was concentrated under reduced pressure and the crude was purified by reversed-phase preparatory-HPLC (C18 stationary phase, water(0.1% TFA)-ACN Begin B 45% End B 75%) to afford the mixture of diastereomeric title compounds. $^1$H NMR (500 MHz, CD$_3$OD) δ 8.87 (s, 1H), 8.28

(s, 1H), 8.21 (br d, J=5.3 Hz, 1H), 7.72-7.76 (m, 2H), 7.64 (br s, 1H), 7.27 (br d, J=9.3 Hz, 1H), 7.10-6.77 (m, 1H), 5.73-5.64 (m, 1H), 5.09 (s, 2H), 4.26 (dd, J=5.9, 10.3 Hz, 1H), 3.70 (d, J=11.4 Hz, 1H), 2.18 (s, 4H), 2.04 (br d, J=5.2 Hz, 1H), 1.94 (d, J=7.2 Hz, 3H), 1.33-1.31 (m, 1H), 1.28 (s, 9H), 0.96 (br s, 1H). MS=684.0 [M+1]⁺.

TABLE 29

The following compounds were prepared using procedures similar to any of those described above using the appropriate starting materials.

| Example No. | Structure | Name | [M + H]⁺ or [M + Na]⁺ | Chiral column |
|---|---|---|---|---|
| 229 | | 6-(3-Chloro-6-(difluoromethyl)-2-fluorophenyl)-3-((R or S)-1-hydroxyethyl)-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 627.2 Found: 627.1 | DAICEL CHIRALPAK AD |
| 230 | | 6-(3-Chloro-6-(difluoromethyl)-2-fluorophenyl)-3-((S or R)-1-hydroxyethyl)-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 627.2 Found: 627.1 | DAICEL CHIRALPAK AD |
| 231 | | 6-(3-Chloro-6-(difluoromethyl)-2-fluorophenyl)-3-((R or S)-1-hydroxyethyl)-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 627.2 Found: 627.1 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 232 | | 6-(3-Chloro-6-(difluoromethyl)-2-fluorophenyl)-3-((S or R)-1-hydroxyethyl)-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 627.2 Found: 627.1 | DAICEL CHIRALPAK AD |
| 233 | | 6-(3-Chloro-6-(difluoromethyl)-2-fluorophenyl)-3-ethyl-N-(1-((5-methyl-6-((1R,5S)-2-oxo-3-azabicyclo[3.1.0]hexan-3-yl)pyridazin-3-yl)methyl)-1H-pyrazol-4-yl)pyrazine-2-carboxamide | Calcd.: 597.2 Found: 597.0 | |
| 234 | | 6-(3-Chloro-6-cyano-2-fluorophenyl)-3-methyl-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 572.2 Found: 572.0 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 235 | | 6-(3-Chloro-6-cyano-2-fluorophenyl)-3-methyl-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 572.2 Found: 572.0 | DAICEL CHIRALPAK AD |
| 236 | | 6-(3-Chloro-6-cyano-2-fluorophenyl)-3-methyl-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 572.2 Found: 572.0 | DAICEL CHIRALPAK AD |
| 237 | | 6-(3-Chloro-6-cyano-2-fluorophenyl)-3-methyl-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 572.2 Found: 572.0 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 238 | | 6-(3-Chloro-6-(difluoromethyl)-2-fluorophenyl)-3-ethyl-N-(1-((R or S)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 611.2 Found: 611.1 | Phenomenex-Cellulose-2 |
| 239 | | 6-(3-Chloro-6-(difluoromethyl)-2-fluorophenyl)-3-ethyl-N-(1-((S or R)-1-(5-methyl-6-((1R,5S)-2-oxo-3-azabicyclo[3.1.0]hexan-3-yl)pyridazin-3-yl)ethyl)-1H-pyrazol-4-yl)pyrazine-2-carboxamide | Calcd.: 611.2 Found: 611.1 | Phenomenex-Cellulose-2 |
| 240 | | 6-(3-Chloro-6-(difluoromethoxy)-2-fluorophenyl)-3-methoxy-N-(1-((R or S)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 629.2 Found: 629.0 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 241 | | 6-(3-Chloro-6-(difluoromethoxy)-2-fluorophenyl)-3-methoxy-N-(1-((S or R)-1-(6-methyl-5-((1R,5S)-2-oxo-3-azabicyclo[3.1.0]hexan-3-yl)pyrazin-2-yl)ethyl)-1H-pyrazol-4-yl)pyrazine-2-carboxamide | Calcd.: 629.2 Found: 629.0 | DAICEL CHIRALPAK AD |
| 242 | | 6-(3-Chloro-6-(difluoromethyl)-2-fluorophenyl)-N-(1-((R or S)-1-(3,4-dimethyl-5-((1R,5S)-2-oxo-3-azabicyclo[3.1.0]hexan-3-yl)pyridin-2-yl)ethyl)-1H-pyrazol-4-yl)-3-methylpyrazine-2-carboxamide | Calcd.: 610.2 Found: 610.3 | DAICEL CHIRALPAK AD |
| 243 | | 6-(3-Chloro-6-(difluoromethyl)-2-fluorophenyl)-N-(1-((R or S)-1-(3,4-dimethyl-5-((1R,5S)-2-oxo-3-azabicyclo[3.1.0]hexan-3-yl)pyridin-2-yl)ethyl)-1H-pyrazol-4-yl)pyrazine-2-carboxamide | Calcd.: 596.2 Found: 596.3 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 244 | | 6-(3-Chloro-6-(difluoromethyl)-2-fluorophenyl)-N-(1-((R or S)-1-(3-fluoro-4-methyl-5-((1R,5S)-2-oxo-3-azabicyclo[3.1.0]hexan-3-yl)pyridin-2-yl)ethyl)-1H-pyrazol-4-yl)-3-methylpyrazine-2-carboxamide | Calcd.: 614.2 Found: 614.2 | DAICEL CHIRALPAK AD |
| 245 | | 6-(3-Chloro-6-(difluoromethyl)-2-fluorophenyl)-N-(1-((S or R)-1-(3-fluoro-4-methyl-5-((1R,5S)-2-oxo-3-azabicyclo[3.1.0]hexan-3-yl)pyridin-2-yl)ethyl)-1H-pyrazol-4-yl)-3-methylpyrazine-2-carboxamide | Calcd.: 614.2 Found: 614.2 | DAICEL CHIRALPAK AD |
| 246 | | 6-(3-Chloro-6-(difluoromethyl)-2-fluorophenyl)-N-(1-((R or S)-1-(2,2-difluoro-4-((1R,5S)-2-oxo-3-azabicyclo[3.1.0]hexan-3-yl)-[1,3]dioxolo[4,5-c]pyridin-7-yl)ethyl)-1H-pyrazol-4-yl)-3-methylpyrazine-2-carboxamide | Calcd.: 662.1 Found: 662.1 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 247 | | 6-(3-Chloro-6-(difluoromethyl)-2-fluorophenyl)-N-(1-((S or R)-1-(2,2-difluoro-4-((1R,5S)-2-oxo-3-azabicyclo[3.1.0]hexan-3-yl)-[1,3]dioxolo[4,5-c]pyridin-7-yl)ethyl)-1H-pyrazol-4-yl)-3-methylpyrazine-2-carboxamide | Calcd.: 662.1 Found: 662.1 | DAICEL CHIRALPAK AD |
| 248 | | 6-(3-Chloro-6-(difluoromethyl)-2-fluorophenyl)-N-(1-((R or S)-1-(2,2-difluoro-4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 648.1 Found: 648.1 | DAICEL CHIRALPAK AD |
| 249 | | 6-(3-Chloro-6-(difluoromethyl)-2-fluorophenyl)-N-(1-((S or R)-1-(2,2-difluoro-4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 648.1 Found: 648.1 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 250 | | 6-(3-Chloro-6-(difluoromethyl)-2-fluorophenyl)-N-(1-((R or S)-1-(4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 612.1 Found: 612.2 | DAICEL CHIRALPAK AD |
| 251 | | 6-(3-Chloro-6-(difluoromethyl)-2-fluorophenyl)-N-(1-((R or S)-1-(4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 612.1 Found: 612.2 | DAICEL CHIRALPAK AD |
| 252 | | 6-(3-Chloro-6-(difluoromethyl)-2-fluorophenyl)-3-methyl-N-(1-((R or S)-1-(4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 626.2 Found: 626.2 | DAICEL CHIRALPAK AD |
| 253 | | 6-(3-Chloro-6-(difluoromethyl)-2-fluorophenyl)-3-methyl-N-(1-((S or R)-1-(4-((1R,5S)-2-oxo-3-azabicyclo[3.1.0]hexan-3-yl)-[1,3]dioxolo[4,5-c]pyridin-7-yl)ethyl)-1H-pyrazol-4-yl)pyrazine-2-carboxamide | Calcd.: 626.2 Found: 626.2 | DAICEL CHIRALPAK AD |

TABLE 29-continued

The following compounds were prepared using procedures similar to any of those described above using the appropriate starting materials.

| Example No. | Structure | Name | [M + H]+ or [M + Na]+ | Chiral column |
|---|---|---|---|---|
| 254 | | 6-(3-Chloro-6-(difluoromethyl)-2-fluorophenyl)-3-((R or S)-1-hydroxyethyl)-N-(1-((4-((1R,5S)-2-oxo-3-azabicyclo[3.1.0]hexan-3-yl)-[1,3]dioxolo[4,5-c]pyridin-7-yl)methyl)-1H-pyrazol-4-yl)pyrazine-2-carboxamide | Calcd.: 642.1 Found: 642.2 | Phenomenex Synergi C18 |
| 255 | | 6-(3-Chloro-6-(difluoromethyl)-2-fluorophenyl)-3-ethyl-N-(1-((4-((1R,5S)-2-oxo-3-azabicyclo[3.1.0]hexan-3-yl)-[1,3]dioxolo[4,5-c]pyridin-7-yl)methyl)-1H-pyrazol-4-yl)pyrazine-2-carboxamide | Calcd.: 626.2 Found: 626.3 | Phenomenex Synergi C18, then DAICEL CHIRALCEL OJ |

Factor XIa Assay

The effectiveness of a compound of the present invention as an inhibitor of Coagulation Factor XIa can be determined using a relevant purified serine protease, and an appropriate synthetic substrate. The rate of hydrolysis of the chromogenic or fluorogenic substrate by the relevant serine protease was measured both in the absence and presence of compounds of the present invention. Assays were conducted at room temperature or at 37° C. Hydrolysis of the substrate resulted in release of amino trifluoromethylcoumarin (AFC), which was monitored spectrofluorometrically by measuring the increase in emission at 510 nm with excitation at 405 nm. A decrease in the rate of fluorescence change in the presence of inhibitor is indicative of enzyme inhibition. Such methods are known to one skilled in the art. The results of this assay are expressed as the half-maximal inhibitory concentrations (IC50), or the inhibitory constant, $K_i$.

Compounds were pre-incubated for 30 minutes at 25° C. with human (0.04 nM) Factor XIa in 50 mM HEPES buffer with 150 mM sodium chloride, 5 mM calcium chloride, 0.1% PEG 8000, pH 7.4. Factor XIa enzymatic activity was determined by addition of the substrate glycine-proline-arginine-7-amido-4-trifluoromethylcoumarin (GPR-AFC) and measurement of the fluorescence at 400/505 nm after a 60 minute incubation at 25° C. The % inhibition for each data point was calculated from the data and analyzed using the log (inhibitor) vs. response four parameters equation to determine the half-maximal inhibitory concentrations (IC50). The IC50 were converted to equilibrium inhibitory constants (Ki) using the Cheng-Prusoff equation.

The activities shown by this assay indicate that the compounds of the invention may be therapeutically useful for treating or preventing various cardiovascular and/or cerebrovascular thromboembolic conditions in patients suffering from unstable angina, acute coronary syndrome, refractory angina, myocardial infarction, transient ischemic attacks, atrial fibrillation, stroke such as thrombotic stroke or embolic stroke, venous thrombosis, coronary and cerebral arterial thrombosis, cerebral and pulmonary embolism, atherosclerosis, deep vein thrombosis, disseminated intravascular coagulation, and reocclusion or restenosis of recanalized vessels.

Kallikrein Assay

The effectiveness of a compound of the present invention as an inhibitor of Kallikrein can be determined using a relevant purified serine protease, and an appropriate synthetic substrate. The rate of hydrolysis of the chromogenic or fluorogenic substrate by the relevant serine protease was measured both in the absence and presence of compounds of the present invention. Assays were conducted at room temperature or at 37° C. Hydrolysis of the substrate resulted in release of amino trifluoromethylcoumarin (AFC), which was monitored spectrofluorometrically by measuring the increase in emission at 510 nm with excitation at 405 nm. A decrease in the rate of fluorescence change in the presence of inhibitor is indicative of enzyme inhibition. Such methods are known to one skilled in the art. The results of this assay are expressed as the half-maximal inhibitory concentrations (IC50), or the inhibitory constant, Ki.

Kallikrein determinations were made in 50 mM HEPES buffer at pH 7.4 containing 150 mM NaCl, 5 mM $CaCl_2$), and 0.1% PEG 8000 (polyethylene glycol; Fisher Scientific). Determinations were made using purified Human plasma kallikrein at a final concentration of 0.5 nM (Enzyme Research Laboratories) and the synthetic substrate, Acetyl-K-P-R-AFC (Sigma #C6608) at a concentration of 100 mM.

Activity assays were performed by diluting a stock solution of substrate at least tenfold to a final concentration ≤0.2

Km into a solution containing enzyme or enzyme equilibrated with inhibitor. Times required to achieve equilibration between enzyme and inhibitor were determined in control experiments. The reactions were performed under linear progress curve conditions and fluorescence increase measured at 405 Ex/510 Em nm. Values were converted to percent inhibition of the control reaction (after subtracting 100% Inhibition value). $IC_{50}$ was determined by inflection point from a four parameter logistic curve fit. Ki was calculated using the Cheng Prusoff equation, $Ki=IC_{50}/(1+([S]/Km))$.

The activities shown by this assay indicate that the compounds of the invention may be therapeutically useful for treating or preventing various ophthalmic, cardiovascular and/or cerebrovascular thromboembolic conditions in patients suffering from unstable angina, acute coronary syndrome, refractory angina, myocardial infarction, transient ischemic attacks, atrial fibrillation, stroke such as thrombotic stroke or embolic stroke, venous thrombosis, coronary and cerebral arterial thrombosis, cerebral and pulmonary embolism, atherosclerosis, deep vein thrombosis, disseminated intravascular coagulation, reocclusion or restenosis of recanalized vessels, hereditary angioedema, uveitis, posterior uveitis, wet age related macular edema, diabetic macular edema, diabetic retinopathy and retinal vein occlusion.

Plasma Kallikrein (PKal) and Factor XIa (FXIa) IC50 (nM) for selected compounds are as follows:

| Example | PKal IC50 (nM) | FXIa IC50 (nM) |
|---|---|---|
| 1 | 0.9 | >10000 |
| 2 | 11.9 | >10000 |
| 3 | 1.0 | >10000 |
| 4 | 16.8 | >10000 |
| 5 | 17.2 | >10000 |
| 6 | 0.9 | >10000 |
| 7 | 1.9 | 527 |
| 8 | 11.9 | >10000 |
| 9 | 1.0 | >10000 |
| 10 | 16.8 | >10000 |
| 11 | 17.2 | >10000 |
| 12 | 1.9 | 1158 |
| 13 | 0.5 | 2822 |
| 14 | 0.8 | 550 |
| 15 | 0.4 | 992 |
| 16 | 1.9 | 772 |
| 17 | 0.7 | 1737 |
| 18 | 19.5 | 4078 |
| 19 | 3.7 | >10000 |
| 20 | 28.5 | >10000 |
| 21 | 38.0 | 7008 |
| 22 | 1.8 | 2727 |
| 23 | 48.7 | 7598 |
| 24 | 10.5 | 3107 |
| 25 | 27.7 | 4689 |
| 26 | 6.2 | >10000 |
| 27 | 14.8 | 5651 |
| 28 | 47.4 | >10000 |
| 29 | 19.6 | 2037 |
| 30 | 1.8 | 2832 |
| 31 | 6.3 | >10000 |
| 32 | 16.4 | >10000 |
| 33 | 2.5 | 875 |
| 34 | 19.3 | 2892 |
| 35 | 6.8 | 4940 |
| 36 | 3.0 | 609 |
| 37 | 1.2 | 1269 |
| 38 | 6.2 | 742 |
| 39 | 0.4 | 328 |
| 40 | 1.8 | 255 |
| 41 | 0.2 | 53 |
| 42 | 0.7 | 1518 |
| 43 | 73.4 | 4515 |
| 44 | 0.3 | 1117 |
| 45 | 6.1 | 4669 |
| 46 | 0.9 | 755 |
| 47 | 2.5 | 1152 |
| 48 | 0.6 | >10000 |
| 49 | 3.5 | 423 |
| 50 | 5.5 | 2118 |
| 51 | 2.4 | 1379 |
| 52 | 1.1 | 4833 |
| 53 | 38.3 | 6634 |
| 54 | 2.4 | 1277 |
| 55 | 5.8 | 5356 |
| 56 | 1.5 | >10000 |
| 57 | 4.9 | 1893 |
| 58 | 0.6 | >10000 |
| 59 | 3.2 | >10000 |
| 60 | 5.5 | >10000 |
| 61 | 0.7 | >10000 |
| 62 | 4.2 | 7633 |
| 63 | 1.7 | >10000 |
| 64 | 3.4 | >10000 |
| 65 | 35.7 | >10000 |
| 66 | 0.6 | 1633 |
| 67 | 2.1 | 389 |
| 68 | 1.1 | 5248 |
| 69 | 10.0 | >10000 |
| 70 | 18.6 | 7680 |
| 71 | 39.0 | 4295 |
| 72 | 3.7 | 2743 |
| 73 | 23.1 | 2270 |
| 74 | 14.6 | 7599 |
| 75 | 4.8 | >10000 |
| 76 | 43.0 | >10000 |
| 77 | 12.6 | 7921 |
| 78 | 2.7 | >10000 |
| 79 | 0.5 | 57 |
| 80 | 25.3 | 284 |
| 81 | 1.8 | 94 |
| 82 | 1.8 | 935 |
| 83 | 3.4 | 259 |
| 84 | 20.7 | 5714 |
| 85 | 10.1 | 2068 |
| 86 | 36.0 | >10000 |
| 87 | 26.2 | >10000 |
| 88 | 0.7 | 127 |
| 89 | 31.3 | >10000 |
| 90 | 13.7 | >10000 |
| 91 | 1.3 | 2581 |
| 92 | 1.3 | 577 |
| 93 | 19.9 | >10000 |
| 94 | 1.6 | 1007 |
| 95 | 14.3 | 4594 |
| 96 | 10.8 | 3947 |
| 97 | 1.3 | >10000 |
| 98 | 1.4 | >10000 |
| 99 | 49.1 | 2883 |
| 100 | 1.7 | 2001 |
| 101 | 0.6 | 3952 |
| 102 | 0.7 | 739 |
| 103 | 1.8 | 445 |
| 104 | 1.2 | 420 |
| 105 | 0.6 | 101 |
| 106 | 1.4 | 103 |
| 107 | 1.5 | 260 |
| 108 | 16.6 | >10000 |
| 109 | 5.1 | 1920 |
| 110 | 14.0 | 3447 |
| 111 | 0.4 | 108 |
| 112 | 4.8 | 1202 |
| 113 | 2.1 | 114 |
| 114 | 0.7 | 558 |
| 115 | 2.5 | 468 |
| 116 | 19.1 | 4378 |
| 117 | 1.9 | >10000 |
| 118 | 1.0 | 7565 |

| Example | PKal IC50 (nM) | FXIa IC50 (nM) |
|---|---|---|
| 119 | 0.6 | 782 |
| 120 | 0.5 | 149 |
| 121 | 4.5 | >10000 |
| 122 | 14.2 | 5259 |
| 123 | 1.0 | 364 |
| 124 | 0.6 | 963 |
| 125 | 1.2 | 449 |
| 126 | 0.5 | 1034 |
| 127 | 0.5 | 596 |
| 128 | 7.1 | 5267 |
| 129 | 4.3 | 3206 |
| 130 | 0.8 | 549 |
| 131 | 0.5 | 545 |
| 132 | 0.6 | 139 |
| 133 | 0.6 | 510 |
| 134 | 13.9 | 5575 |
| 135 | 5.4 | 4877 |
| 136 | 0.2 | 591 |
| 137 | 7.7 | >10000 |
| 138 | 47.0 | >10000 |
| 139 | 0.9 | 282 |
| 140 | 0.6 | 972 |
| 141 | 1.1 | 906 |
| 142 | 0.6 | 373 |
| 143 | 4.9 | 4305 |
| 144 | 1.6 | >10000 |
| 145 | 2.4 | >10000 |
| 146 | 9.8 | >10000 |
| 147 | 2.9 | 7305 |
| 148 | 5.9 | 9418 |
| 149 | 0.9 | 244 |
| 150 | 176.6 | >10000 |
| 151 | 5.8 | >10000 |
| 152 | 0.3 | 197 |
| 153 | 2.0 | 2169 |
| 154 | 0.3 | 661 |
| 155 | 7.1 | 8201 |
| 156 | 0.9 | 162 |
| 157 | 1019.0 | >10000 |
| 158 | 2716.0 | >10000 |
| 159 | 11.2 | 6904 |
| 160 | 249.3 | >10000 |
| 161 | 26.7 | >10000 |
| 162 | 8.7 | 3450 |
| 163 | 9.2 | >10000 |
| 164 | 5.4 | 4893 |
| 165 | 20.7 | 2046 |
| 166 | 19.7 | >10000 |
| 167 | 10.5 | 3654 |
| 168 | 0.4 | 261 |
| 169 | 15.2 | 2198 |
| 170 | 20.7 | >10000 |
| 171 | 712.8 | >10000 |
| 172 | 6.4 | 6726 |
| 173 | 3.6 | 1844 |
| 174 | 6.5 | 9346 |
| 175 | 3.0 | 3682 |
| 176 | 5.3 | 4554 |
| 177 | 47.8 | >10000 |
| 178 | 14.2 | 4533 |
| 179 | 0.7 | 1816 |
| 180 | 7.7 | 4949 |
| 181 | 37.1 | >10000 |
| 182 | 0.7 | 572 |
| 183 | 30.6 | >10000 |
| 184 | 8.1 | 7731 |
| 185 | 2.4 | 3180 |
| 186 | 1.4 | 1384 |
| 187 | 4.3 | 5666 |
| 188 | 6.5 | 3110 |
| 189 | 1.3 | 667 |
| 190 | 0.7 | 1038 |
| 191 | 1.1 | 111 |
| 192 | 4.4 | 6827 |
| 193 | 0.4 | 441 |
| 194 | 0.5 | 262 |
| 195 | 18.2 | 765 |
| 196 | 0.9 | 2087 |
| 197 | 0.2 | 48 |
| 198 | 0.1 | 110 |
| 199 | 0.2 | 69 |
| 200 | 0.2 | 21 |
| 201 | 0.4 | 52 |
| 202 | 0.3 | 11 |
| 203 | 0.3 | 282 |
| 204 | 5.9 | 2518 |
| 205 | 0.3 | 389 |
| 206 | 0.3 | 120 |
| 207 | 8.6 | 3275 |
| 208 | 12.7 | 1055 |
| 209 | 3.8 | 167 |
| 210 | 0.4 | 186 |
| 211 | 0.6 | 50 |
| 212 | 1.0 | 354 |
| 213 | 0.9 | 2031 |
| 214 | 1.2 | 944 |
| 215 | 7.8 | >10000 |
| 216 | 2.8 | 8419 |
| 217 | 14.9 | 4146 |
| 218 | 1.8 | 414 |
| 219 | 0.3 | 549 |
| 220 | 7.8 | >10000 |
| 221 | 14.9 | >10000 |
| 222 | 16.7 | >10000 |
| 223 | 1.0 | 1844 |
| 224 | 66.1 | >10000 |
| 225 | 0.9 | 5740 |
| 226 | 0.4 | 41 |
| 227 | 0.6 | 25 |
| 228 | 1.6 | 602 |
| 229 | 0.37 | 178 |
| 230 | 1.1 | 1334 |
| 231 | 5 | 903 |
| 232 | 1.8 | 194 |
| 233 | 19.7 | 1195 |
| 234 | 1 | 679 |
| 235 | 0.4 | 2062 |
| 236 | 0.7 | 750 |
| 237 | 4.3 | 561 |
| 238 | 6.3 | 734 |
| 239 | 1.8 | 1233 |
| 240 | 0.4 | 985 |
| 241 | 0.7 | 377 |
| 242 | 0.8 | >10000 |
| 243 | 0.6 | >10000 |
| 244 | 46.8 | >10000 |
| 245 | 0.9 | >10000 |
| 246 | 6 | 6558 |
| 247 | 0.8 | 9238 |
| 248 | 22.3 | >10000 |
| 249 | 2.1 | >10000 |
| 250 | 3.2 | 1321 |
| 251 | 1 | 2475 |
| 252 | 0.9 | 1828 |
| 253 | 2.2 | 733 |
| 254 | 1.4 | 157 |
| 255 | 2.6 | 734 |

What is claimed is:

1. A compound of the formula:

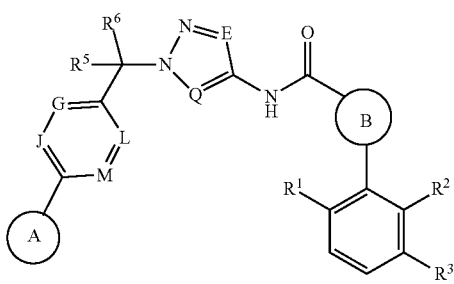

wherein Ⓐ is selected from

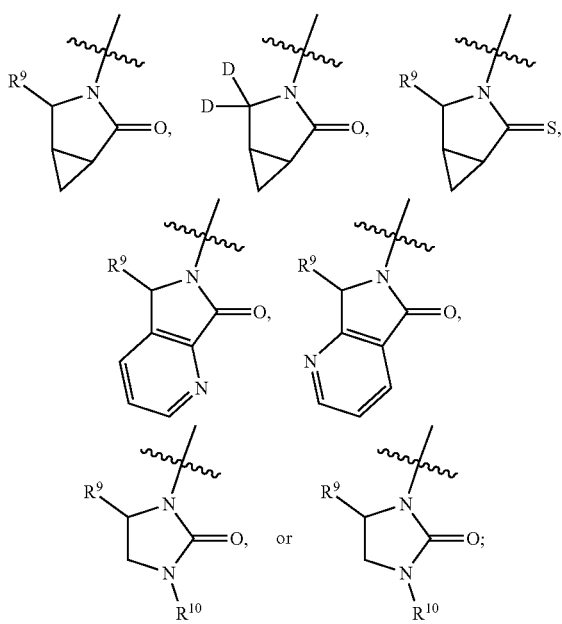

Ⓑ is selected from

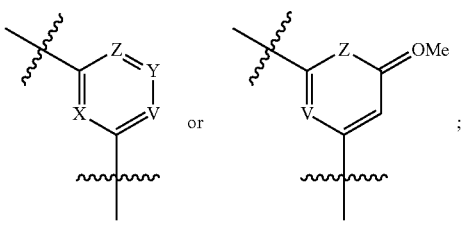

V is CH or N;
X is CH or N;
Y is N, NO, NR$^x$ or C=O;
Z is NR$^4$ or CR$^4$;
E is N or CH;
Q is N or CH;
G is N or CR$^7$;
J is N or CR$^7$;
L is N or CR$^7$;
M is N or CR$^8$;
R$^1$ is selected from the group consisting of hydrogen, halo, cyano, R$^x$, OR$^x$ and SO$_2$R$^x$;
R$^2$ is hydrogen or halo;
R$^3$ is hydrogen or halo;
R$^4$ is hydrogen, R$^x$, C$_{1-3}$ alkyl-OR$^x$, C$_{1-3}$ alkyl-O—C$_{3-6}$ cycloalkyl or CH=CH$_2$;
R$^5$ is hydrogen or C$_{1-3}$ alkyl, which is optionally substituted with one to three substituents selected from halo and hydroxy;
R$^6$ is hydrogen or C$_{1-3}$ alkyl;
or R$^5$ and R$^6$ can be taken together with the carbon atom between them to form a C$_{3-6}$ cycloalkyl group;
each R$^7$ is independently selected from the group consisting of halo, R$^x$, OR$^x$, C$_{1-3}$ alkyl-OR$^x$, NH(C=O)OR$^x$ and NH$_2$;
R$^8$ is selected from the group consisting of R$^x$ or OR$^x$;
or R$^7$ and R$^8$ can be taken together with the carbon atoms between them to form a 5-membered cycloalkyl or heterocyclyl group;
R$^9$ is hydrogen or C$_{1-3}$ alkyl;
R$^{10}$ is hydrogen, hydroxy or C$_{1-3}$ alkyl;
R$^x$ is hydrogen or C$_{1-6}$ alkyl, which is optionally substituted with one to four substituents selected from halo and hydroxy;
or a pharmaceutically acceptable salt thereof.

2. The compound of claim 1 wherein E is CH and Z is CH; or a pharmaceutically acceptable salt thereof.

3. The compound of claim 1 wherein
wherein Ⓐ is

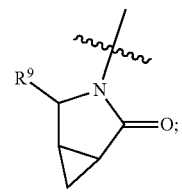

or a pharmaceutically acceptable salt thereof.

4. The compound of claim 1 wherein R$^1$ is selected from the group consisting of hydrogen, CH$_3$, CHF$_2$, CF$_3$, OCHF$_2$ and SO$_2$CH$_3$; or a pharmaceutically acceptable salt thereof.

5. The compound of claim 1 wherein R$^4$ is selected from the group consisting of cyano, CH$_3$, CHF$_2$, CH$_2$OH, CH$_2$OCH$_3$, CH$_2$OC(CH$_3$)$_3$, CH$_2$O(cyclopropyl), CH(OH) CF$_3$, CH$_2$C(CH$_3$)$_2$OH, CD$_2$OH, CH(CH$_3$)OH; or a pharmaceutically acceptable salt thereof.

6. The compound of claim 1 wherein R$^5$ is hydrogen, CH$_3$ or CH$_2$OH; or a pharmaceutically acceptable salt thereof.

7. The compound of a claim 1 wherein X is N; Y is N; V is CH; or a pharmaceutically acceptable salt thereof.

8. The compound of claim 1 wherein each R$^7$ is independently selected from the group consisting of hydrogen, chloro, fluoro, CH$_3$, OCH$_3$, CHF$_2$, OCHF$_2$, CH$_2$OH, NH$_2$ and NH(C=O)OR$^x$; or a pharmaceutically acceptable salt thereof.

9. The compound of claim 1 selected from any one of compounds 1-228, or a pharmaceutically acceptable salt thereof.

10. A pharmaceutical composition comprising a compound of claim 1 or a pharmaceutically acceptable salt thereof and a pharmaceutically acceptable carrier.

11. The composition of claim 10 further comprising another agent selected from the group consisting of anti-inflammatory agents, anti-VEGF agents, immunosuppressive agents, anticoagulants, antiplatelet agents, and thrombolytic agents.

12. A method for treating impaired visual activity, diabetic retinopathy, diabetic macular edema, retinal vein occlusion, hereditary angioedema, diabetes, pancreatitis, cerebral hemorrhage, nephropathy, cardiomyopathy, neuropathy, inflammatory bowel disease, arthritis, inflammation, septic shock, hypotension, cancer, adult respiratory distress syndrome, disseminated intravascular coagulation, blood coagulation during cardiopulmonary bypass surgery, or bleeding from postoperative surgery in a mammal, comprising administering a composition of claim 10 to a mammal in need of thereof.

13. The method of claim 12 further comprising another agent selected from the group consisting of anti-inflammatory agents, anti-VEGF agents, immunosuppressive agents, anticoagulants, antiplatelet agents, and thrombolytic agents.

14. A method for treating uveitis, posterior uveitis, wet age related macular edema, diabetic macular edema, diabetic retinopathy or retinal vein occlusion in a mammal comprising administering a composition of claim 10 to a mammal in need thereof.

15. A method of treating diabetic retinopathy or diabetic macular edema in a mammal comprising administering a composition of claim 10 to a mammal in need thereof.

16. A method of treating retinal vein occlusion in a mammal comprising administering a composition of claim 10 to a mammal in need thereof.

\* \* \* \* \*

UNITED STATES PATENT AND TRADEMARK OFFICE
CERTIFICATE OF CORRECTION

PATENT NO. : 12,459,927 B2
APPLICATION NO. : 18/007787
DATED : November 4, 2025
INVENTOR(S) : Salman Jabri et al.

Page 1 of 1

It is certified that error appears in the above-identified patent and that said Letters Patent is hereby corrected as shown below:

In the Claims

Column 321, Lines 47-55, Claim 1 the structure on the right should be corrected as follows:

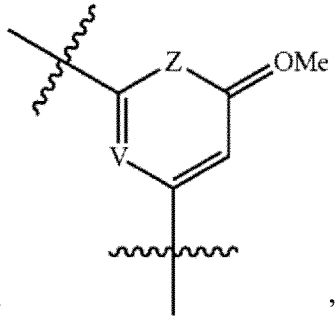 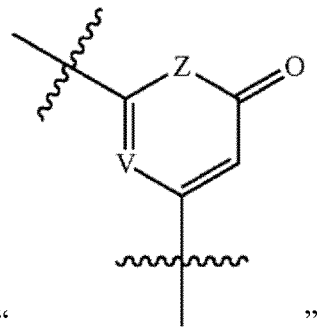

Please delete " " and replace with " "

Signed and Sealed this
Twenty-third Day of December, 2025

John A. Squires
*Director of the United States Patent and Trademark Office*